(12) United States Patent
Iimura

(10) Patent No.: US 7,532,800 B2
(45) Date of Patent: *May 12, 2009

(54) LIGHT GUIDE UNIT

(76) Inventor: Keiji Iimura, 10-8, Akatsuka 3 Chome, Itabashi-Ku, Tokyo (JP) 175-0092

(*) Notice: Subject to any disclaimer, the term of this patent is extended or adjusted under 35 U.S.C. 154(b) by 0 days.

This patent is subject to a terminal disclaimer.

(21) Appl. No.: 11/701,636

(22) Filed: Feb. 5, 2007

(65) Prior Publication Data

US 2007/0147760 A1 Jun. 28, 2007

Related U.S. Application Data

(62) Division of application No. 11/151,092, filed on Jun. 14, 2005, now Pat. No. 7,218,830.

(30) Foreign Application Priority Data

Jun. 14, 2004 (JP) ............... 2004-176193

(51) Int. Cl.
*G02B 6/10* (2006.01)
*F21V 7/04* (2006.01)

(52) U.S. Cl. ............ 385/146; 385/129; 385/901; 362/610; 362/612

(58) Field of Classification Search ........ 385/129, 385/145, 146, 901; 632/610, 612
See application file for complete search history.

(56) References Cited

U.S. PATENT DOCUMENTS

| 5,359,691 | A | * | 10/1994 | Tai et al. | 385/146 |
| 6,474,826 | B1 | * | 11/2002 | Tanaka et al. | 362/612 |
| 6,700,634 | B2 | * | 3/2004 | Taniguchi et al. | 349/65 |
| 6,824,285 | B2 | * | 11/2004 | Saitoh et al. | 362/629 |
| 6,943,947 | B2 | * | 9/2005 | Adachi et al. | 359/453 |
| 2004/0170011 | A1 | * | 9/2004 | Kim et al. | 362/31 |

* cited by examiner

*Primary Examiner*—Michelle R Connelly Cushwa

(57) ABSTRACT

The disclosed is a light guide unit and a surface illuminator illuminating a liquid crystal display (LCD). The light guide unit (100) is composed of a surface lighting light guide (30) having a light emitting major surface (30a) and a light receiving side surface (30c); a channel light guide (20) having optical cores (21) to form a fiber optic channel array having light entrance core surfaces (21a) and light exit core surfaces (21b); and a distribution light guide (10) having a light distribution guide surface (10d) and a light receiving portion (10b) receiving light from the LED (200). The light guides (10, 20 and 30) are positioned respectively in that order to form a light guide unit (100). Each width (w1) and/or a pitch (p) of the optical cores (21) may change in accordance with a distance from the light receiving portion (10b). The channel light guide (20)/the distribution light guide (10) may have a linear shape or a nonlinear shape with "L", "U" or "O" shape. The distribution light guide (10) may have a "V" shaped or rectangular reflector (40) with opposed surfaces (40a, 40b) to reflect light (L) from the LED (200) to face the reflector (40).

23 Claims, 51 Drawing Sheets

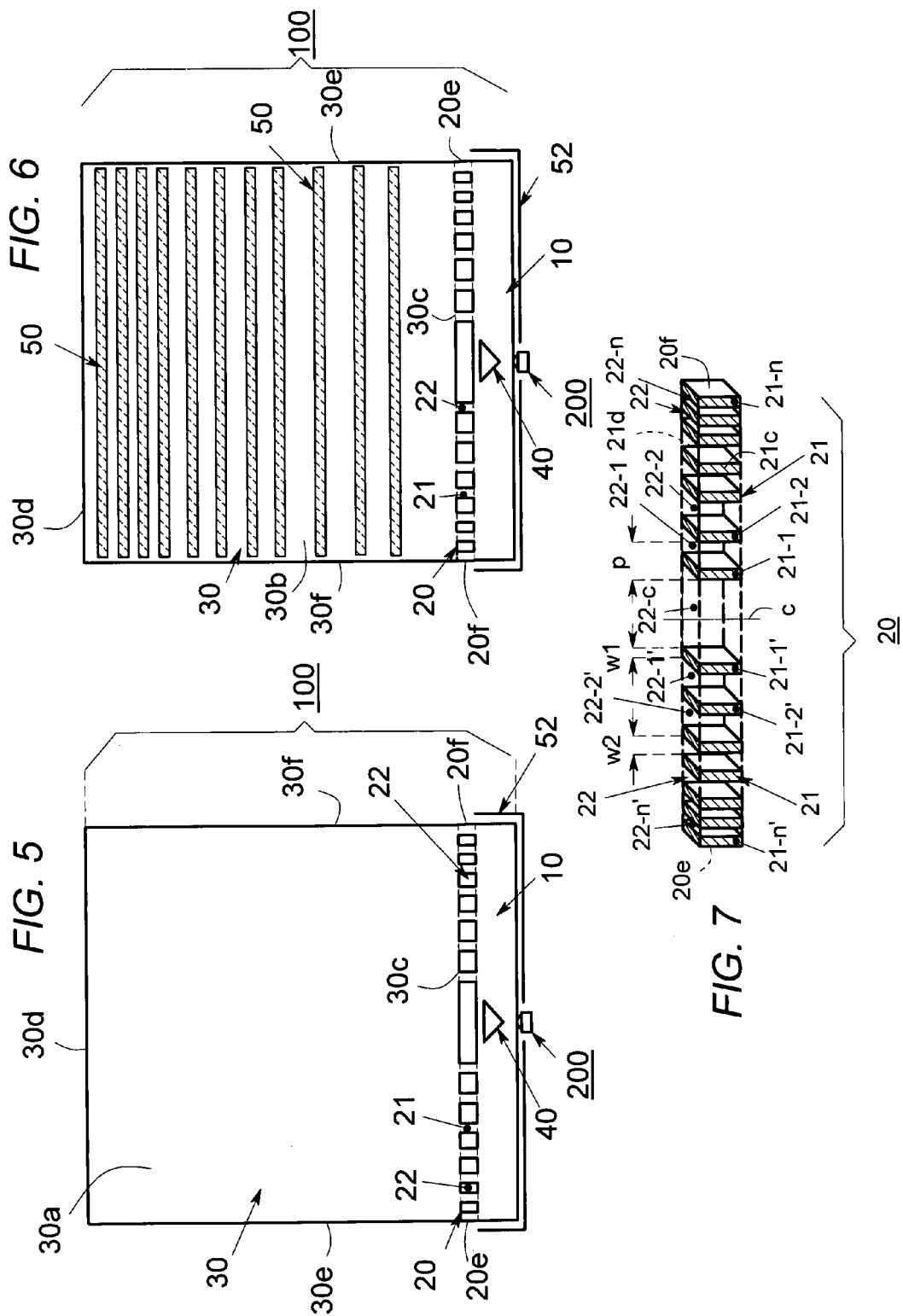

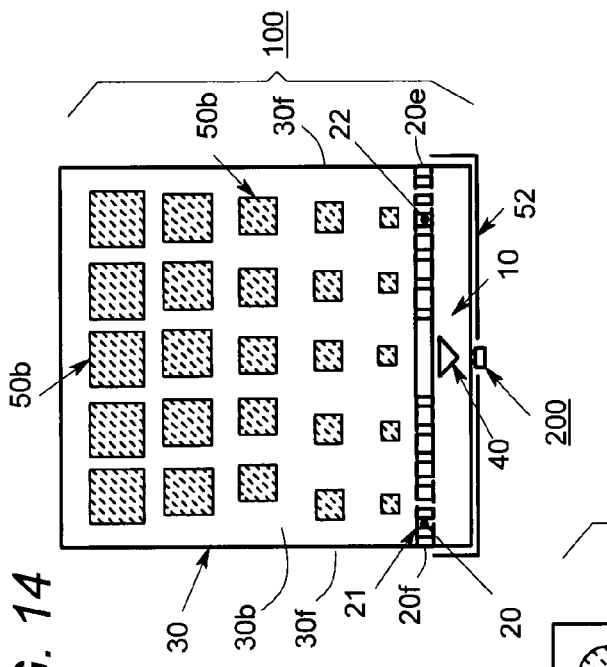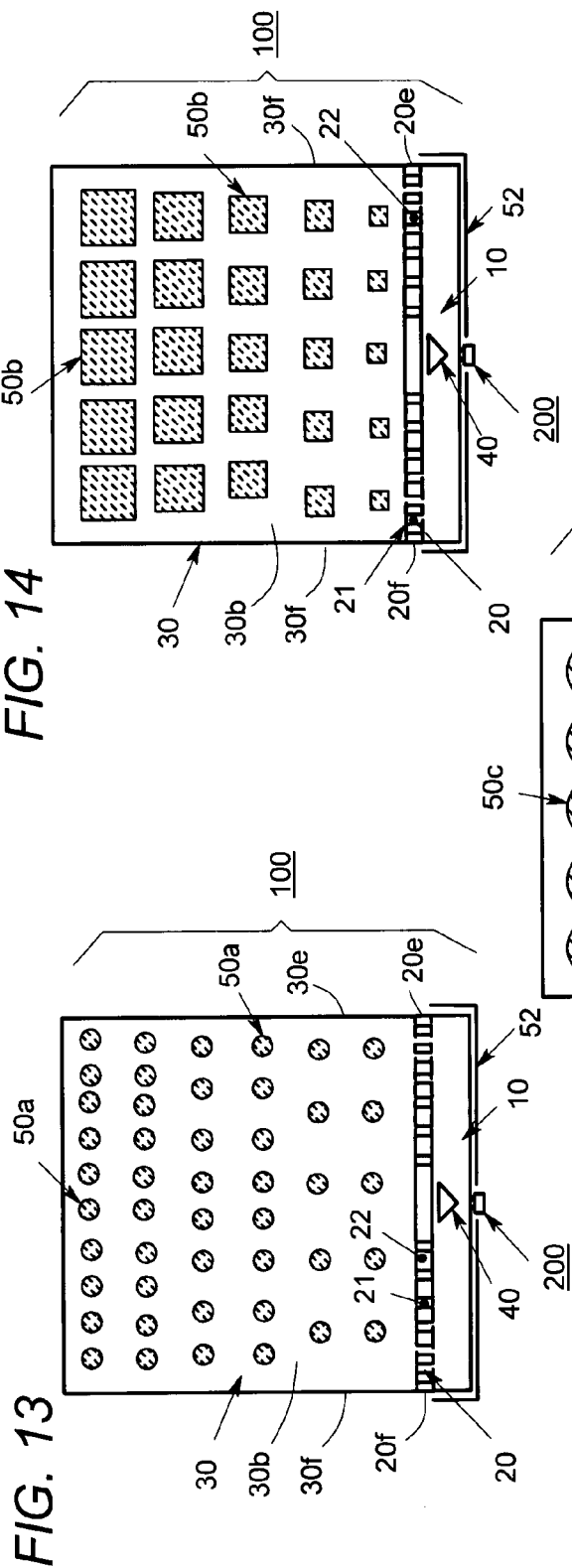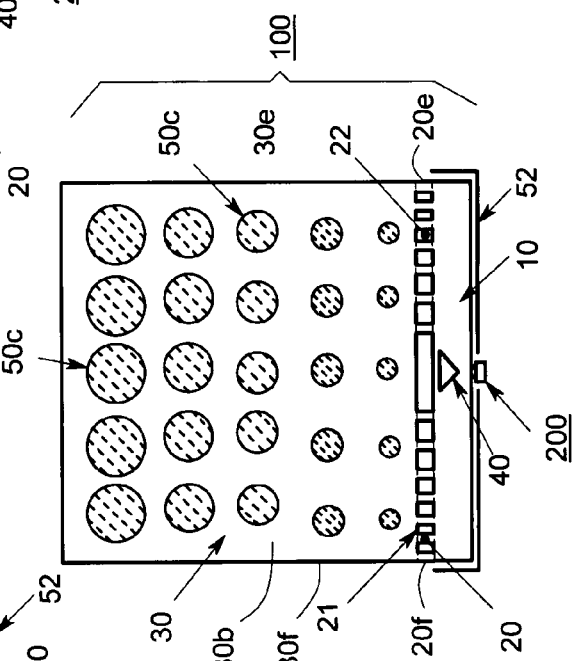

SURFACE LIGHT SOURCE

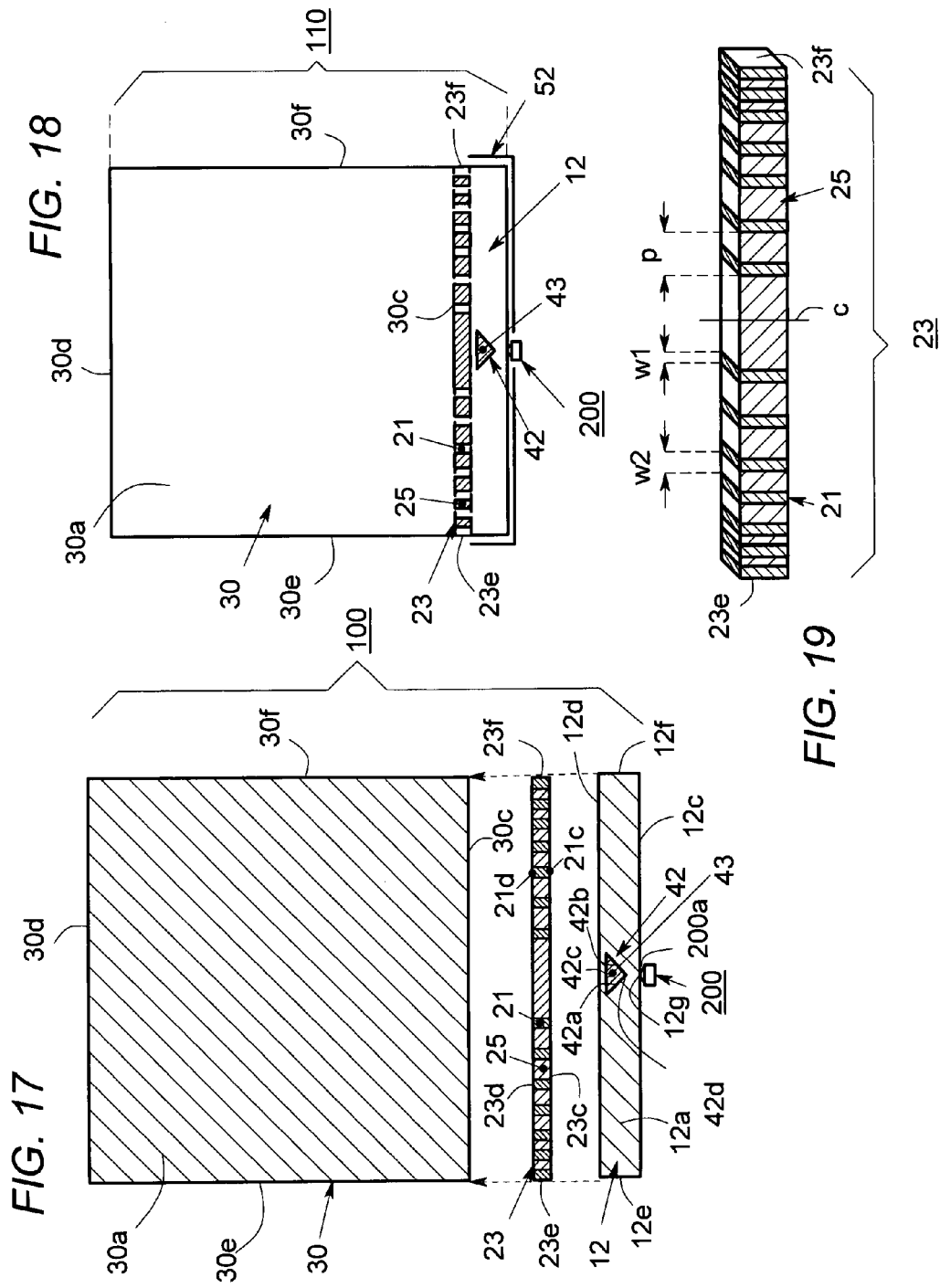

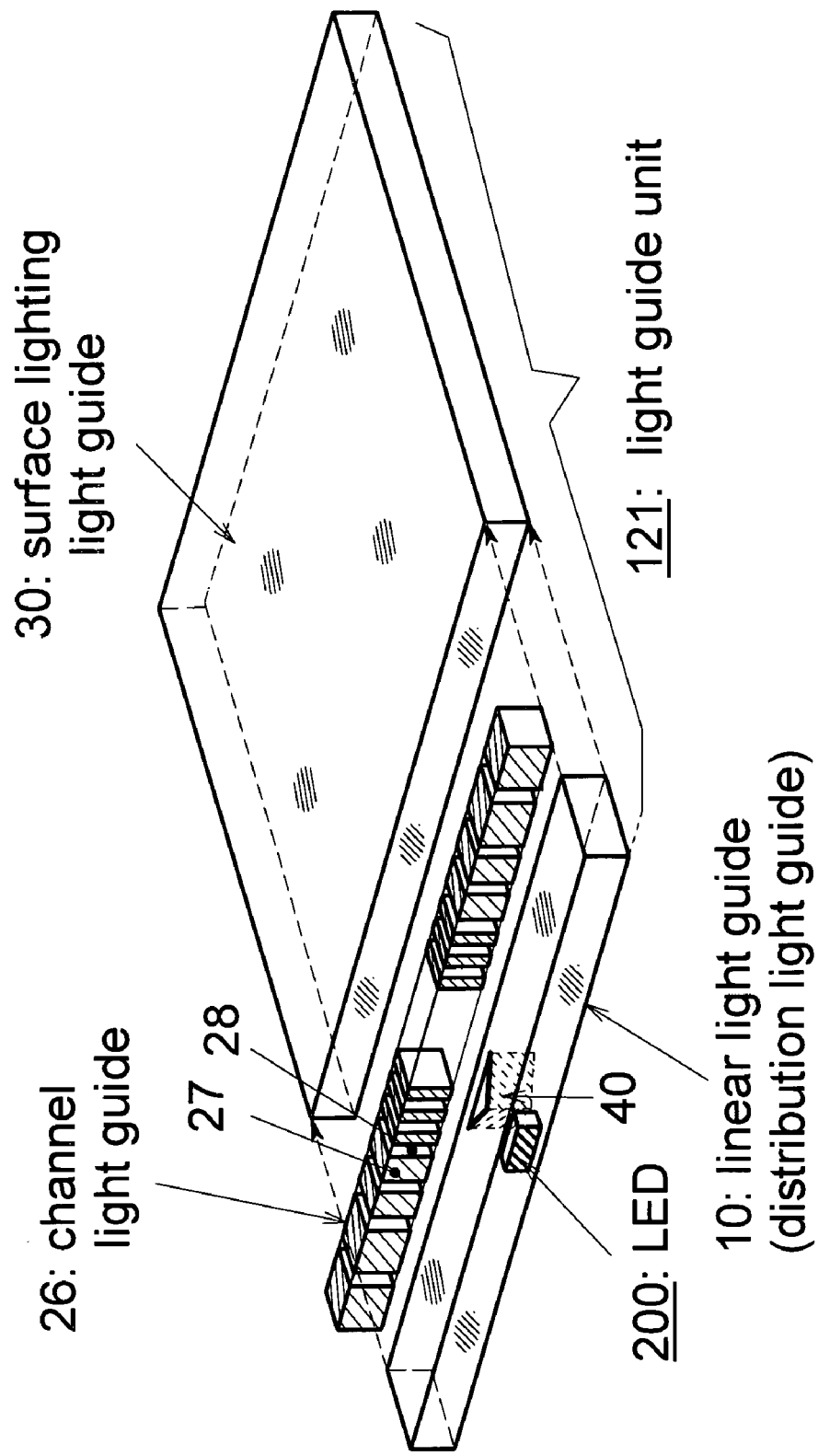
FIG. 25  SURFACE LIGHT SOURCE

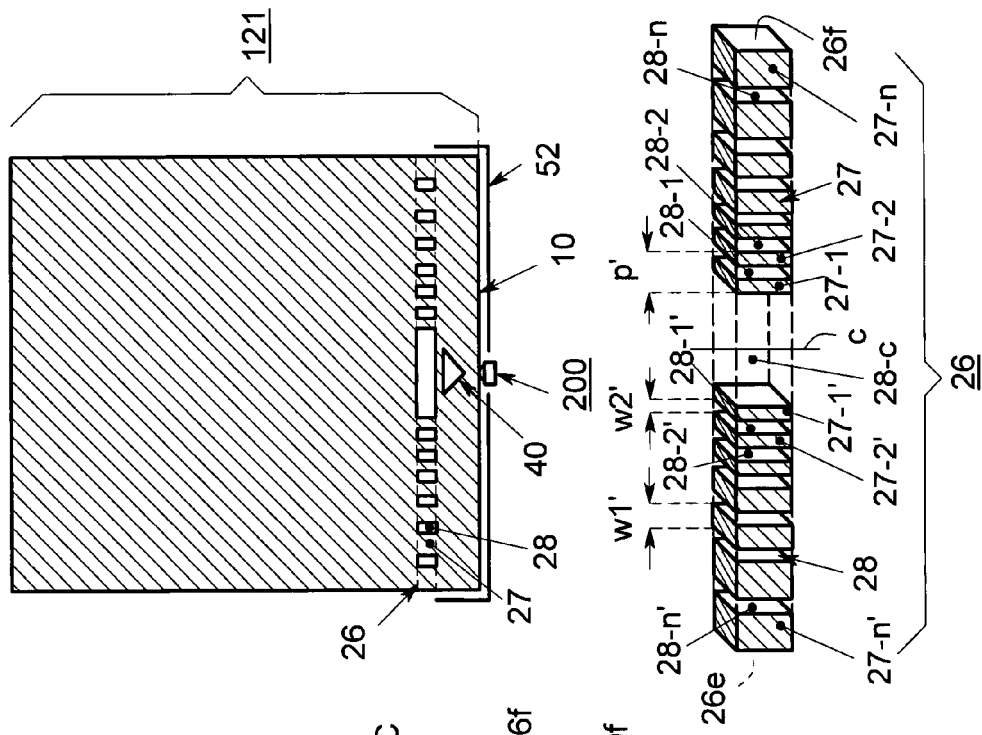
FIG. 27
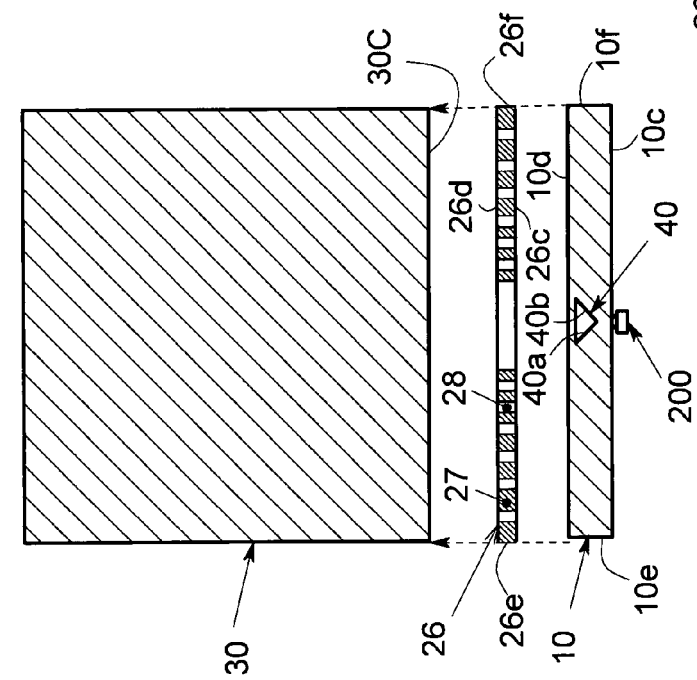
FIG. 28
FIG. 26

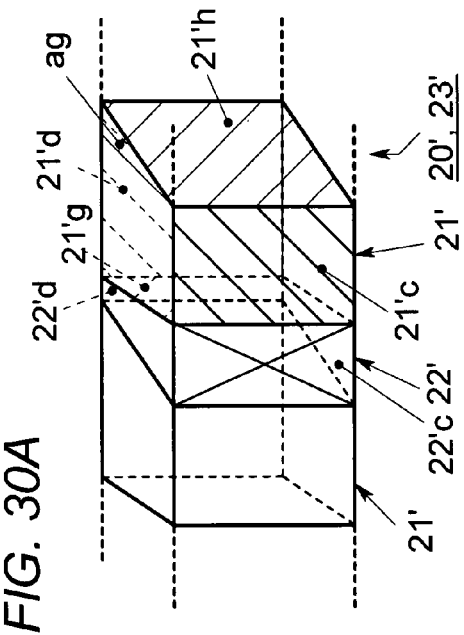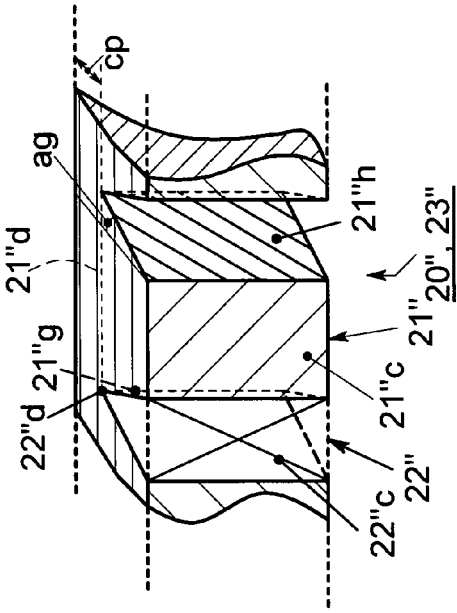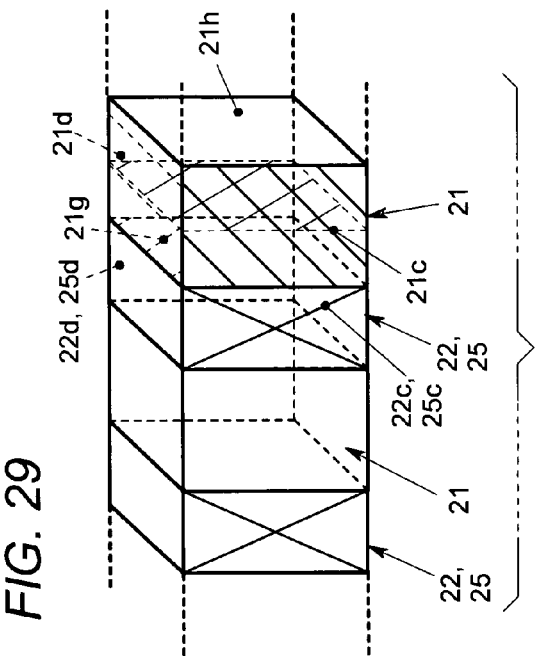

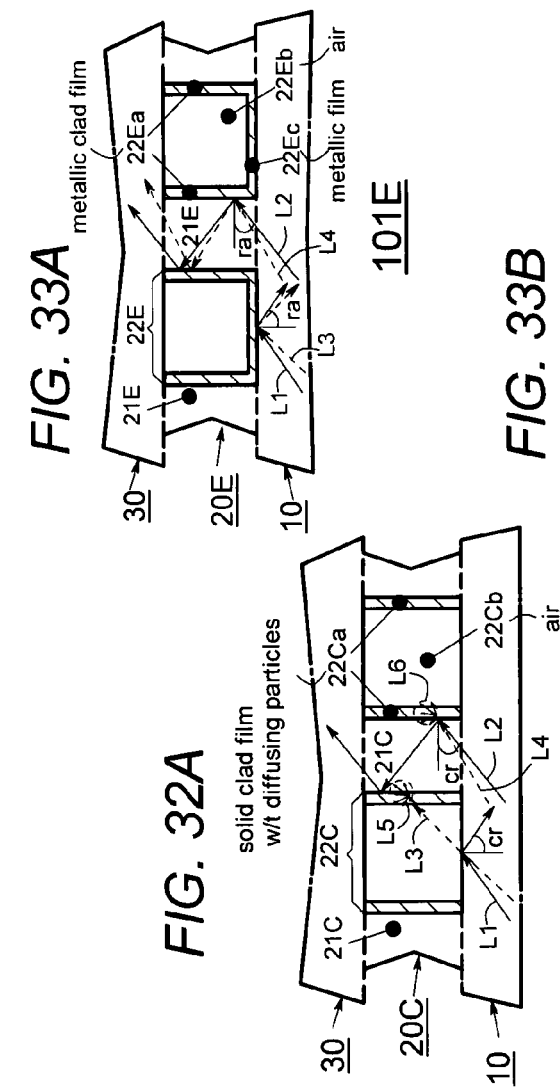
FIG. 33A
FIG. 32A
FIG. 31A
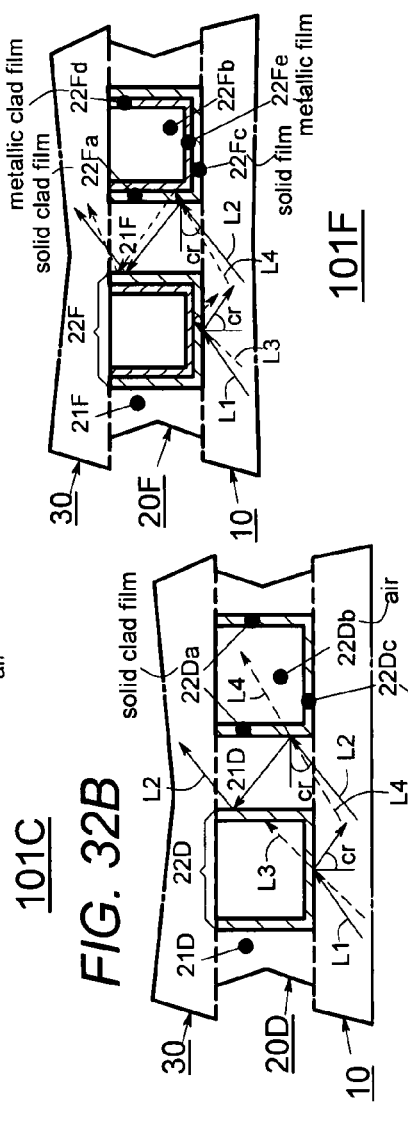
FIG. 33B
FIG. 32B
FIG. 31B

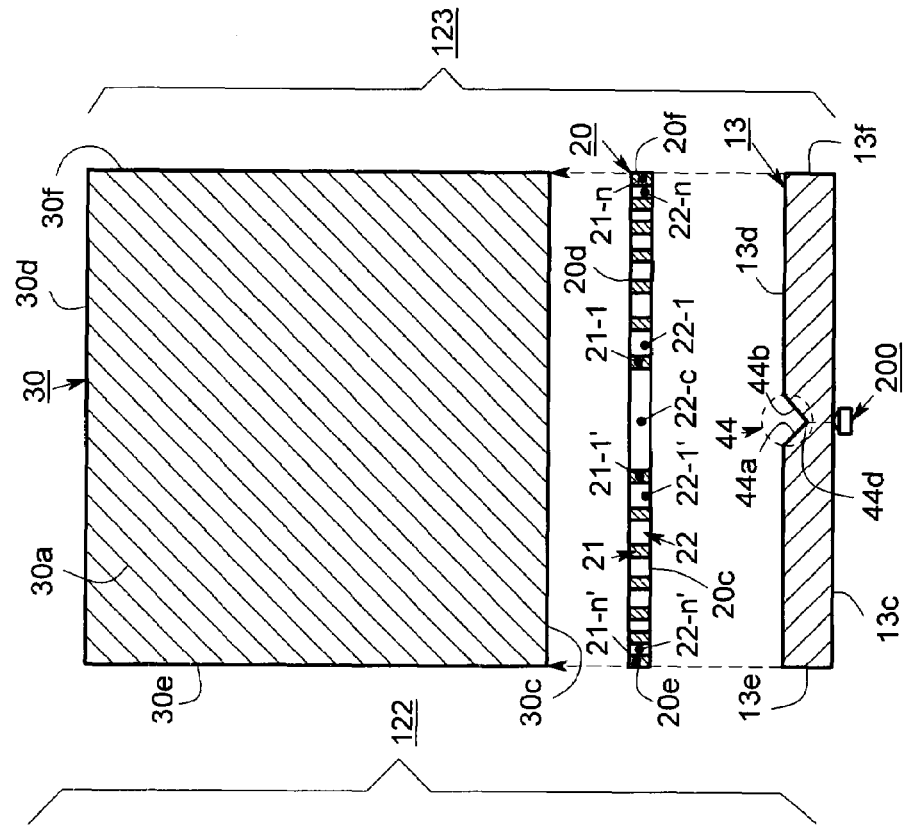
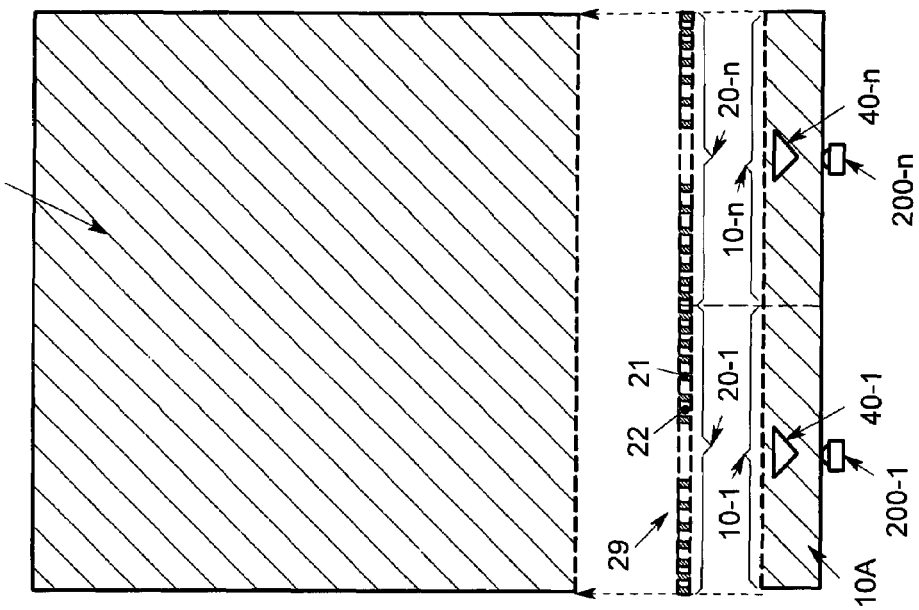

SURFACE LIGHT SOURCE

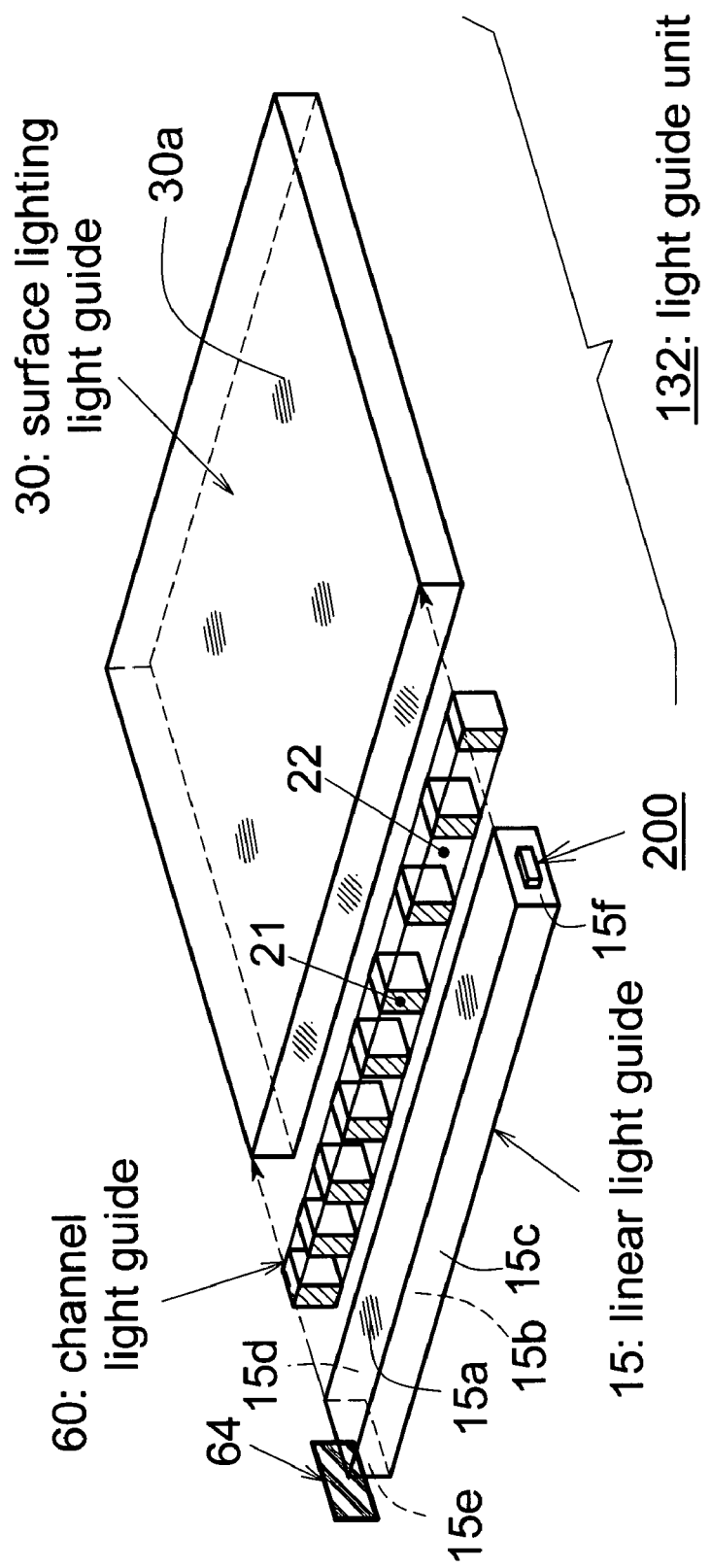

SURFACE LIGHT SOURCE

FIG. 85    SURFACE LIGHT SOURCE
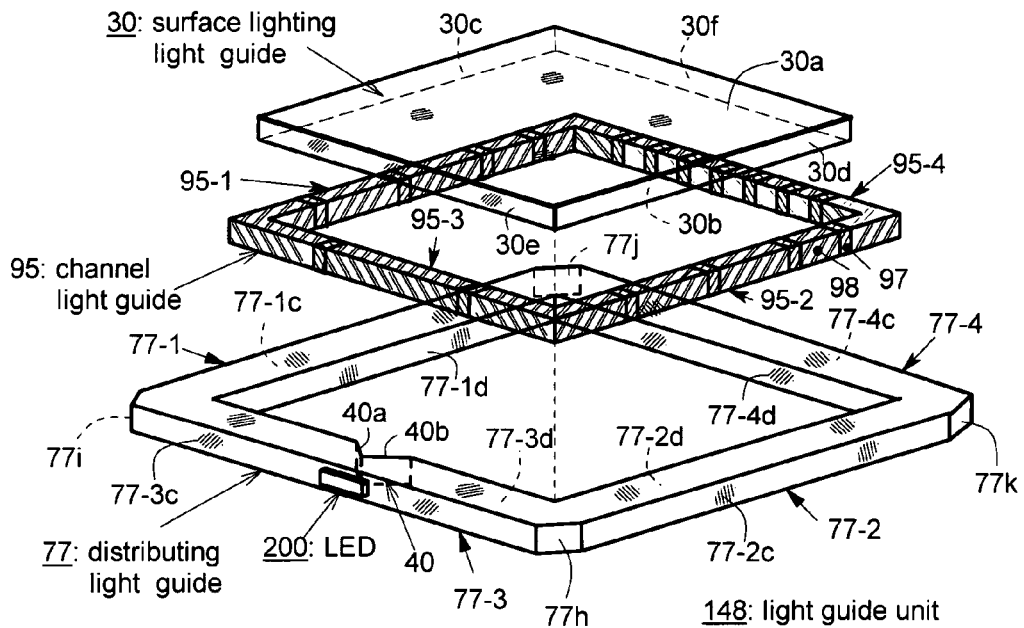
FIG. 86
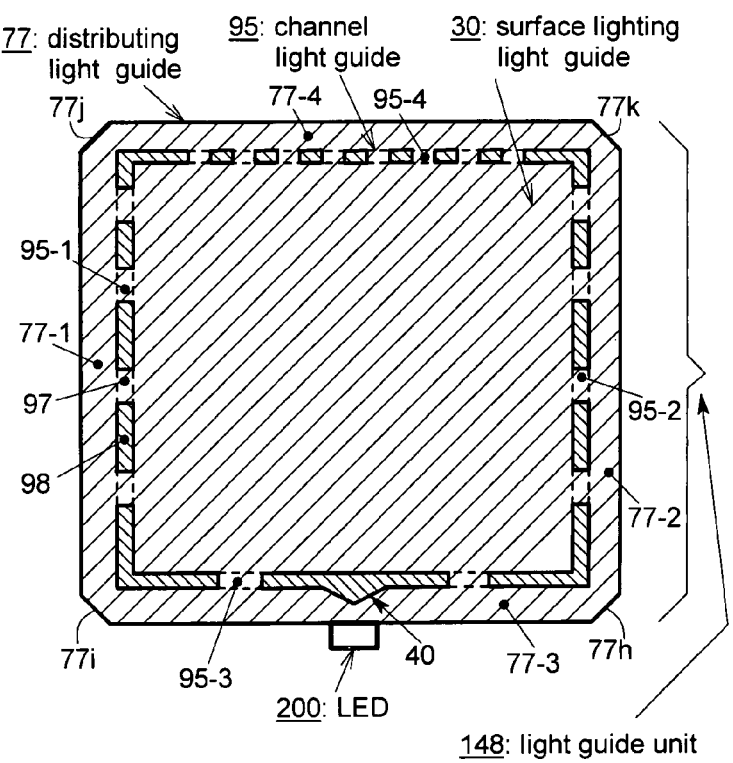

SURFACE LIGHT SOURCE

LIGHT GUIDE UNIT

CROSS-REFERENCE TO RELATED APPLICATIONS

This application is a divisional application of the U.S. patent application Ser. No. 11/151,092 filed on Jun. 14, 2005 now U.S. Pat. No. 7,218,830, that is based on the prior Japanese Patent application No. 2004-176193 filed on Jun. 14, 2004, and the entire disclosure of which is incorporated herein by reference in its entirety.

BACKGROUND OF THE INVENTION

1. Field of the Invention

The present invention relates to a light guide unit.

The present invention further relates to a surface illuminator having the light guide unit and at least one light emitting diode/diodes (LED/LEDs), which is typically used in a backlighting or front-lighting of a liquid crystal display (LCD).

2. Description of the Related Art

The liquid crystal displays (LCDs) are being widely used as information displays for mobile or portable electronic information devices such as mobile cellular telephones, digital cameras, video cameras, mobile electronic information terminals such as PDA (private digital assistant), portable or notebook-like personal computers and television receivers.

Since the liquid crystal displays are non-emissive or passive opt-electronic information displays, the liquid crystal displays are generally used in combination with the surface light source as backlighting or front-lighting devices that illuminate the liquid crystal displays from back side or front side thereof.

The liquid crystal display provided with a surface light source having the LED/LEDs with low power consumption and the light guide member (i.e. light guide plate or panel) is being widely used for such mobile or portable electronic information devices, because these mobile electronic information devices are mainly driven by batteries.

A first conventional surface illuminator using a light guide plate and at least one point-like light source is shown as a prior art, for example, in FIG. 5 of U.S. Pat. No. 6,627,922 B1 (the corresponding Japan Patent publication No. P2000-315825 A).

According to the specification related to FIG. 5 of U.S. Pat. No. 6,627,922, the conventional light source is such that: "In the case where such light emitting device is installed on the side surface of the light transmitting plate to constitute a backlight, as shown in FIG. 5, the chip-type light emitting device has a structure constituted in such a manner that a side surface emitting chip-type light emitting device 20 is arranged on one side wall of the light transmitting plate 30 in a definite interval, light is allowed to be incident on the inside of the light transmitting plate 30 and is allowed to be scattered within the light transmitting plate 30 to allow light to be applied from the surface the light transmitting plate 30. As a consequence, a bundle of light that is radiated from one side surface is such that a strong light is emitted in a central direction and the directivity thereof is narrowed down. As a consequence, as shown in FIG. 5, when light emitting devices are arranged in a definite interval on a side surface of the light transmitting plate 30, a portion which is referred to as a dark portion 31 is generated in which light is not allowed to be incident at a portion of the light transmitting plate 30 between the light emitting devices 20. A portion of such dark portion 31 is compensated with light which is reflected and brought back within the light transmitting plate 30, but the dark portion 31 has a problem such that the portion has a different luminance from a portion on which light is directly allowed to be incident so that the luminance does not become uniform on the entire surface of the light transmitting plate 30".

A second conventional surface illuminator using a light guide plate and at least one point-like light source is illustrated, in which the second conventional surface light source is indicated as a prior art, for example, in FIG. 10 of U.S. Pat. No. 6,283,602 B1 (the corresponding Japan Patent publication No. 10-260405).

According to the specification related to FIG. 10 of U.S. Pat. No. 6,283,602 B1, the conventional light source is such that: "Hitherto, as the foregoing lighting device, the lighting device shown in FIG. 10 is known which has a planar light guide 101 and point-source lights 102 which are positioned to face a light incident surface 101a of the light guide 101. In this conventional device, the light emitted from the point-source lights 102 is diverged by lenses 103, respectively, and the diverged light then radiates in a planar form from a light emitting surface 101b of the light guide 101. In the above known type of lighting device, however, the area in which the light emitted from the point-source lights 102 can be guided is restricted to predetermined angular areas A. A sufficient luminance level of light can be obtained in the areas A, but not in the portions outside the areas A. As a result, the overall light emitting surface 101b cannot emit light with a uniform luminance level.

In these conventional surface illuminators, one or more point-like light sources are positioned adjacent to, in contact with or buried into a side surface of the light guide plate.

These conventional surface illuminators have such drawback that it is difficult to produce a uniform surface brightness or luminance of the light guide plate along entire areas of that surface lighting surface i.e. light output surface, since the point-like light source, especially LED has a very narrow spread angle or directivity and resultantly the surface lighting surface has not only bright areas but also dark areas, i.e. uneven surface brightness or luminance along or over its lighting surface area.

One prior art is U.S. Pat. No. 6,627,922 B1 (the corresponding Japan Patent publication No. P2000-315825 A) that discloses a chip-type light emitting diode having a directivity, with wide radiation angle in order to improve the drawback of conventional chip-type light emitting diodes having narrow directivity as shown in FIG. 10 of the same U.S. and JAPAN Patent documents. However many number of the improved light emitting diodes (LEDs) are yet required when the LEDs are used in backlighting or front-lighting of the liquid crystal displays with a comparatively large sized viewing screen used as the mobile information terminals.

Another prior arts are disclosed to improve the drawback of the first and second conventional surface light sources or surface illuminator, for example, in FIG. 1 to FIG. 6 of U.S. Pat. No. 6,283,602 (the corresponding Japan Patent publication No. 10-260405), in FIG. 1 to FIG. 14 of U.S. Pat. No. 6,193,383 (the corresponding Japan Patent publication No. 2000-011723 A), U.S. Pat. No. 6,283,602 (the corresponding Japan Patent publication No. 10-284803), Japan Patent publication No. 10-282368 and U.S. Pat. No. 5,664,862.

U.S. Pat. No. 6,283,602 disclosed such a lighting device that in a lighting device in which planar light is emitted from the planar light emitting surface of a light guide by using a point-source light, such as an LED, the emitted light having a uniform luminance level is obtained on the overall light emitting surface. The lighting device has a point-source light 18 for emitting light in a point-like form. A planar light guide 16 radiates light in a planar form from the planar light emitting surface 16a. A linear light guide 19 is disposed between the point-source light 18 and the planar light guide 16. The point-like light emitted from the point-source light 18 is converted into linear light by the linear light guide 19, and the linear light is guided into the planar light guide 16 through the light incident surface 16b. Since the linear light is incident on the planar light guide 16, the light having a uniform luminance level can be obtained on the overall light emitting surface 16a.

U.S. Pat. No. 6,193,383 discloses such a linear light source unit that an elongated transparent light leading member is provided above a light source, leading member is provided opposite to the light source and a hole is formed in the light leading member at a position above the light source. The hole has an inverted triangular shape, opposite sides of the hole are provided for reflecting light beams emitted from the light source in a longitudinal direction of the light leading member.

U.S. Pat. No. 5,664,862 discloses such an edge light for a panel display that the edge light for projecting light into a lighting panel through an end surface of the lighting panel. The edge light includes a thin transparent optical guide member having an elongate portion and at least one end portion extending from the elongate portion. The elongate portion has a planar surface and a shaped surface generally parallel to the planar surface and configured for reflecting light within the guide member through one of the planar surface and the shaped surface. Either the planar surface or the shaped surface is positioned adjacent the end surface of the lighting panel when the edge light is used to illuminate the panel. The edge light also includes a light source positioned at the end portion for projecting light into the elongate portion of the optical guide member.

U.S. Pat. No. 6,283,602 discloses such linear light guide unit that an elongated transparent light leading member is provided above a light source, leading member is provided opposite to the light source and a hole is formed in the light leading member at a position above the light source. The hole has an inverted triangular shape, opposite sides of the hole are provided for reflecting light beams emitted from the light source in a longitudinal direction of the light leading member.

The surfaces light sources or the linear light guides disclosed in these prior arts are such that the surface illuminator includes a linear (i.e. bar-like or rod-like) light guide member having a linear light output side and dual opposed end surfaces, at least one point light source or LED positioned adjacent to the at least one end surface and a substantially rectangular surface lighting light guiding plate having a side surface and a surface lighting major surface, in which the linear light guide member is positioned adjacent to along the side surface of the surface lighting light guiding plate.

However, the surface illuminators in these prior arts are not yet sufficient to produce a uniform surface brightness or luminance along or over an entire area of a surface lighting or light emitting surface of the surface lighting light guide member.

BRIEF SUMMARY OF THE INVENTION

A main object of the present invention is to improve the surface illuminators i.e. surface light sources described in the related art, in which the present invention proposes the surface illuminator having a more uniform surface brightness or luminance along or over an entire area of the surface lighting or emitting surface of the surface lighting light guide member.

In accordance with one embodiment of the present invention, a surface illuminator comprises: a first light guide member for a surface lighting having a first light exiting surface and a first light entering surface; a second light guide member for a light distribution having a second light exiting surface and a second light entering surface; at least one point light source optically communicated with the second light entering surface; a channel light guide member having a fiber optic channel array having a plurality of light guiding portions optically isolated one another; and wherein the channel light guide member is disposed between the first light guide member and the second light guide member. The first light guide member, the channel light guide member channel light guide member and the second light guide member are interposed laterally or vertically respectively in that order. The second light guide member is a light distributing light guide that acts as a light distribution for distributing, spreading or dispensing light entered therein from the point light source.

In accordance with another embodiment of the present invention, a surface illuminator comprises: a surface lighting light guide member having a light emitting first major surface, a second major surface opposed to the first major surface and at least one light side surface; an elongated light guide member having a linear or nonlinear elongated member, at least one surface and at least one light receiving portion; at least one point light source optically communicated with the at least one light receiving portion; and a channel light guide member having a plurality of optical core channel elements and a plurality of optical clads alternately aligned to form an elongated fiber optic channel array having a plurality of light entrance core surfaces and a plurality of exit core surfaces opposed to the light entrance core surfaces; and wherein the channel light guide member is interposed between the surface lighting light guide member and the elongate light guide member.

In accordance with a still another embodiment of the present invention, a surface illuminator comprises: a surface lighting light guide member having a light emitting first major surface, a second major surface opposed to the first major surface and at least one side surface; an elongated light guide member having a linear or nonlinear elongated member, at least one surface and at least one end surface and/or corner surface that act as at least one light receiving portion; at least one point light source optically communicated with the at least one light receiving portion; a channel light guide member having a plurality of optical core channel elements and a plurality of optical clads alternately aligned to form an elongated fiber optic channel array having a plurality of light entrance core surfaces and a plurality of exit core surfaces opposed to the light entrance core surfaces; wherein light from the at least one point light source enters the elongate light guide member and the light transmits therein toward at least one substantially lengthwise direction thereof; and wherein the channel light guide member is interposed between the surface lighting light guide member and the elongate light guide member.

In these embodiments of the invention, the light entrance core surfaces and the light exit core surfaces may be disposed to be in contact with, connected with and/or in close vicinity to the at least one surface of the elongate light guide member and the at least one side surface of the surface lighting light guide member respectively in that order.

That is, the light entrance core surfaces may be disposed to be in contact with, connected with and/or in close vicinity to the at least one surface of the elongate light guide member and the light exit core surfaces may be disposed to be in contact with, connected with and/or in close vicinity to the at least one side surface of the surface lighting light guide member.

In these embodiments of the invention, light may enter from the light entrance core surfaces into the cores, may exit from the light exit core surface and the light may be received in the at least one light side surface to transmit within the surface lighting light guide member for outputting from the light emitting surface.

In these embodiments of the invention, the optical clads may be composed of air having a refractive index lower than the refractive index of the cores made of substantially transparent light guide material.

In these embodiments of the invention, the optical clads may be composed of substantially transparent light guide material having a refractive index lower than the refractive index of the cores made of substantially transparent light guide material.

In these embodiments of the invention, the optical clads may be composed of substantially light reflecting material.

In the some embodiments of the present invention, the surface lighting light guide member, the channel light guide member and the elongate light guide member may be positioned in close vicinity in that order.

In the some embodiments of the present invention, the surface lighting light guide member, the channel light guide member and the elongate light guide member may be connected in that order to form an integrated light guide unit.

In the some embodiments of the present invention, each of the optical channel elements may have a light entrance surface/portion and a light exit surface/portion opposed to the light entrance surface/portion, and an area of the light entrance surface/portion is similar in size to the area of the light exit surface/portion.

In the some embodiments of the present invention, each of the optical channel elements may have a light entrance surface/portion and a light exit surface/portion opposed to the light entrance surface/portion, and an area of the light entrance surface/portion is smaller in size than the area of the light exit surface/portion.

In the some embodiments of the present invention, a width of each of the optical channel elements may be substantially unchanged along the elongated optical channel array.

In the some embodiments of the present invention, a width of each of the optical channel elements may be variably changed along the elongated optical channel array.

In the some embodiments of the present invention, a width of each of the optical channel elements may be variably changed along the elongated optical channel array in such a way that the width increases in accordance with a distance from the point light source.

In the some embodiments of the present invention, a pitch between adjacent optical channel elements may be substantially unchanged along the elongated optical channel array.

In the some embodiments of the present invention, a pitch between adjacent optical channel elements may be variably changed along the elongated optical channel array.

In the some embodiments of the present invention, a pitch between adjacent optical channel elements may be variably changed along the elongated optical channel array in such a way that the pitch decreases in accordance with a distance from the point light source.

A light guide unit comprises the surface lighting light guide member (or portion), the channel light guide member (or portion) and the linear or nonlinear light guide member (or portion).

In some embodiments of the present invention, the light guide unit may comprise a single integrated first composite unit, wherein the surface lighting light guide member (or portion), the channel light guide member (or portion) and the linear or nonlinear light guide member (or portion) are connected laterally to one another to form the single integrated first composite unit or a unitary composite, as shown in e.g. FIG. 12 and FIG. 23.

In stead, in another embodiments of the present invention, the light guide unit may comprise the surface lighting light guide member (or portion) and a second composite unit composed of the channel light guide member (or portion) and the linear or nonlinear light guide member (or portion) as shown in e.g. FIG. 10 and FIG. 21.

The channel light guide member (or portion) is laterally connected with the linear or nonlinear light guide member (or portion) to form the second composite unit and the surface lighting light guide portion is laterally in contact with or adjacent to the channel light guide portion of the composite unit.

In stead, in still another embodiments of the present invention, the light guide unit may comprise the linear or nonlinear light guide member (or portion) and a composite unit composed of the surface lighting light guide member (or portion) and the channel light guide member (or portion) as shown in e.g. FIG. 11 and FIG. 22.

The surface lighting light guide member (or portion) is laterally connected with the channel light guide member (or portion) to form a third composite unit and the channel light guide portion of the third composite unit is laterally in contact with or adjacent to the linear or nonlinear light guide member (or portion).

In stead, in other embodiments of the present invention, the light guide unit is composed of separated members of the surface lighting light guide member, the channel light guide member and the linear or nonlinear light guide member as shown in e.g. FIG. 20.

The separated members are disposed in such a manner that the channel light guide member is sandwiched laterally between the surface lighting light guide member and the linear or nonlinear light guide member (or portion), in which the surface lighting light guide member is laterally in contact with or adjacent to the channel light guide member and the channel light guide member is laterally in contact with or adjacent to the linear or nonlinear light guide member.

A refractive index (n) i.e. an index of refraction in regards to the linear or nonlinear light guide member or portion (n=n1), the channel light guide member or portion having the channel light guide elements (n=n2) and the interposers (n=n4), and the surface lighting light guide member portion (n=n3) may be selected from anyone in the following combination of the index (a), (b), (c), (d), (e) and (f):

(a); n1=n2=n3>n4 (e.g. FIG. 12, FIG. 23, FIG. 20),
(b); n1=n2<n3 and n1=n2>n4 (e.g. FIG. 10, FIG. 21, FIG. 20),
(c); n1<n2=n3 and n2>n4 (e.g. FIG. 11, FIG. 22, FIG. 20),
(d); n1<n2<n3 and n2>n4 (e.g. FIG. 20),
(e); n1=n2>n3 and n2>n4 (e.g. FIG. 20), and
(f); n1<n2=n3>n4 (e.g. FIG. 20).

BRIEF DESCRIPTION OF THE SEVERAL VIEWS OF THE DRAWING

For a more complete understanding of the present invention and the advantage thereof, reference is now made to the following descriptions taken in conjunction with the accompanying drawings, in which:

FIG. 5 is a schematic top view showing the surface illuminator of the first embodiment;

FIG. 6 is a schematic bottom view showing the surface illuminator of the first embodiment showing a first kind of diffusing pattern of a light diffusing means;

FIG. 7 is a schematic enlarged perspective view showing a channel light guide member 20 of the first embodiment;

FIG. 13 is a schematic bottom views of the surface illuminator of the first embodiment of the present invention showing a modification of the defusing pattern of the light diffusing means 50 of the surface lighting light guide 30 in FIG. 6;

FIG. 14 is a schematic bottom views of the surface illuminator of the first embodiment of the present invention showing another modification of the defusing pattern of the light diffusing means 50 of the surface lighting light guide 30 in FIG. 6;

FIG. 15 is a schematic bottom views of the surface illuminator of the first embodiment of the present invention showing a still another modification of the defusing pattern of the light diffusing means 50 of the surface lighting light guide 30 in FIG. 6;

FIG. 17 is a schematic exploded top view showing the second embodiment of the present invention;

FIG. 18 is a schematic top view showing the second embodiment of the present invention;

FIG. 19 is a schematic enlarged perspective view showing a channel light guide 23 used for the second embodiment of the present invention;

FIG. 25 is a schematic exploded perspective view showing a fourth embodiment of the present invention;

FIG. 26 is a schematic exploded top view showing the fourth embodiment of the present invention;

FIG. 27 is a schematic top view showing the fourth embodiment of the present invention;

FIG. 28 is a schematic enlarged perspective view showing a channel light guide 26 of the fourth embodiment of the present invention;

FIG. 29 is a schematic enlarged partial perspective view showing a first type of optical channel element of a fifth embodiment that is a first modification of an optical channel of the first embodiment:

FIG. 30A and FIG. 30B each is a schematic enlarged partial perspective view showing a second type of optical channel element of the fifth embodiment that is a second modification of an optical channel of the first embodiment;

FIG. 31A and FIG. 31B each is a schematic enlarged partial top view showing a sixth embodiment showing a first modified interposers;

FIG. 32A and FIG. 32B each is a schematic enlarged partial top view showing a seven embodiment showing a second modified interposers;

FIG. 33A and FIG. 33B each is a schematic enlarged partial top view showing a seven is a schematic enlarged partial top view showing an eighth embodiment showing a third modified interposers;

FIG. 34 is a schematic top view showing the ninth embodiment of the present invention, showing another channel light guide with a plurality of reflectors therein and a plurality of LEDs, each LED to position relative to each reflector;

FIG. 35 is a schematic top view showing the tenth embodiment of the present invention, showing a modification of the reflector shown in e.g. FIG. 1 in the first embodiment;

FIG. 51 is a schematic exploded perspective view showing a thirteenth embodiment of the present invention;

FIG. 85 is a schematic exploded perspective view showing a surface illuminator of other embodiment;

FIG. 86 is a schematic top view showing the surface illuminator in the FIG. 85;

DETAILED DESCRIPTION OF THE INVENTION

Figure 1:
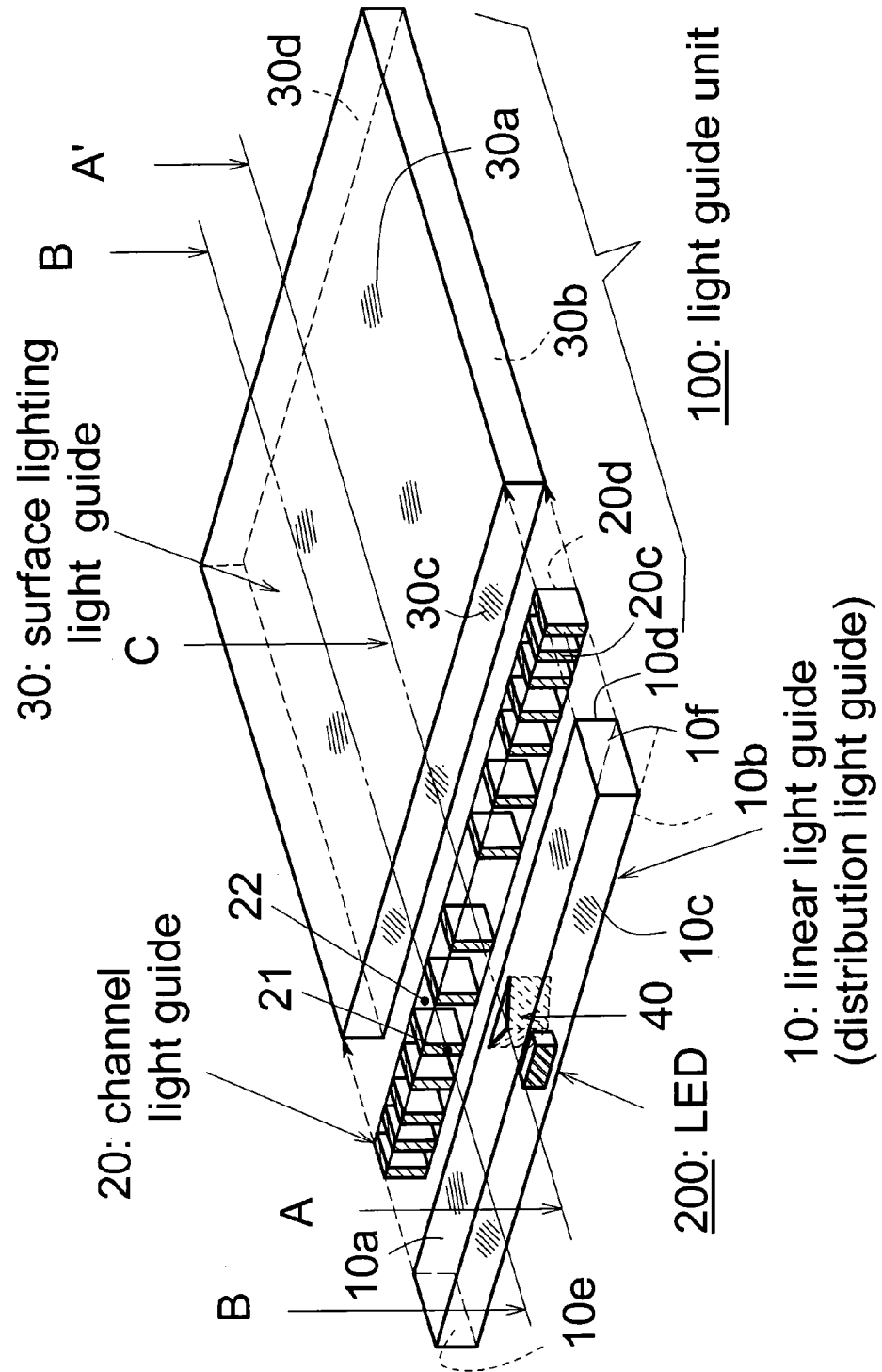
FIG. 1 is a schematic exploded perspective view showing a surface illuminator showing a first embodiment.

The present invention will now be described in detail with reference to the accompanying drawings, wherein elements or parts depicted in the drawings are not necessarily shown to scale and wherein like or similar elements, parts or portions are denoted by the same reference numeral in the several views.

Therefore, a duplicated description for the like or similar elements, parts or portions attached with the same reference numeral may be omitted.

First Embodiment (Embodiment: No. 1)

Reference is made to FIG. 1 through FIG. 12 showing a first embodiment of the present invention.

Figure 2:
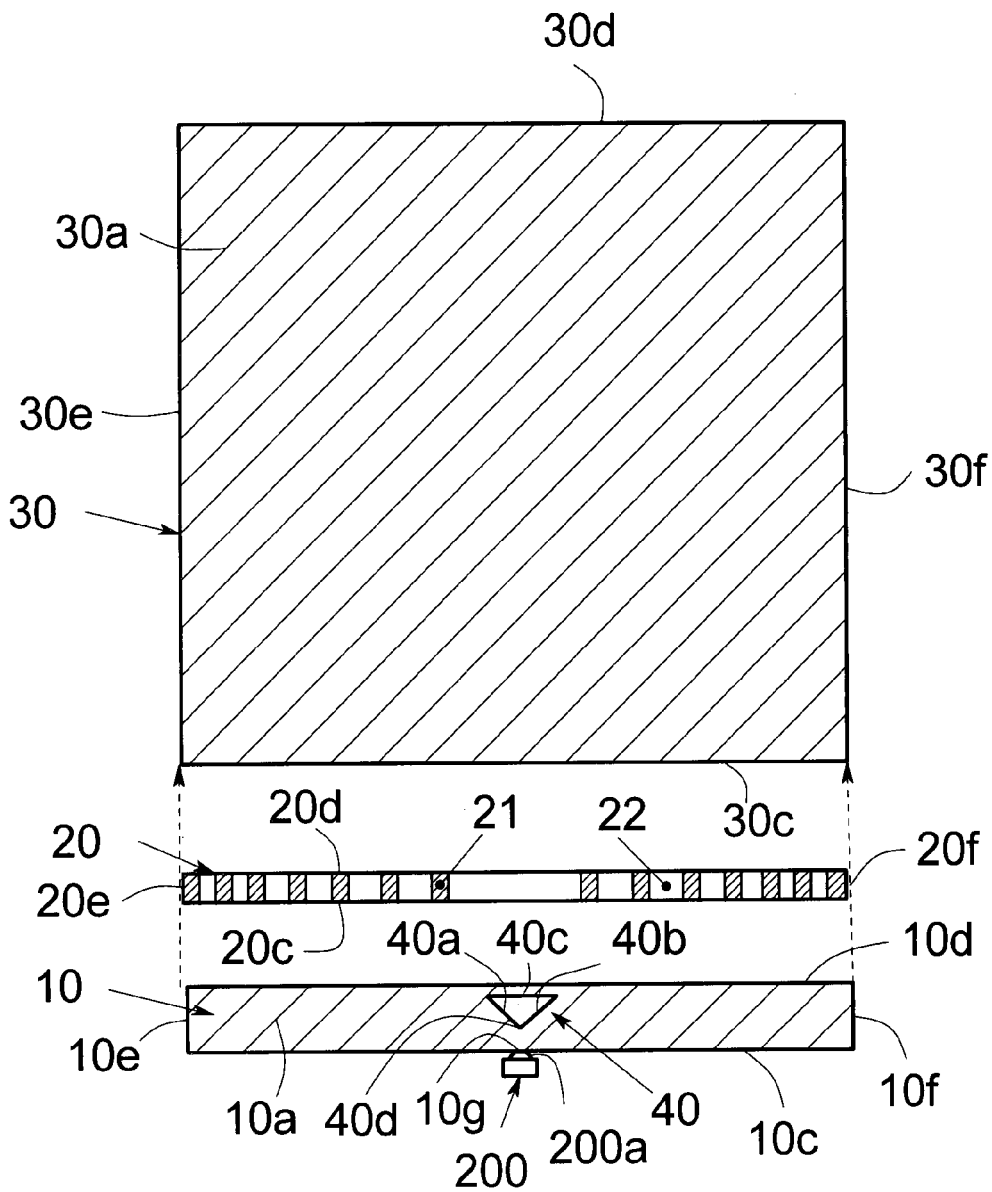
FIG. 2 is a schematic exploded top view showing the surface illuminator of the first embodiment.
Figure 3:
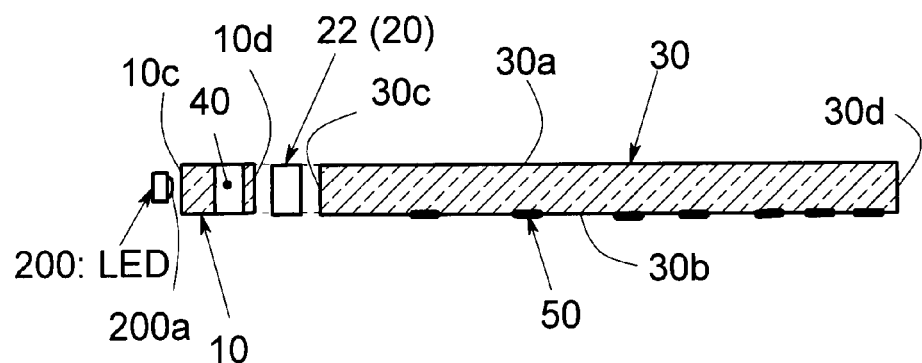
FIG. 3 is a schematic cross sectional view showing the surface illuminator of the first embodiment taken along the line A-A' in FIG. 1.
Figure 4:
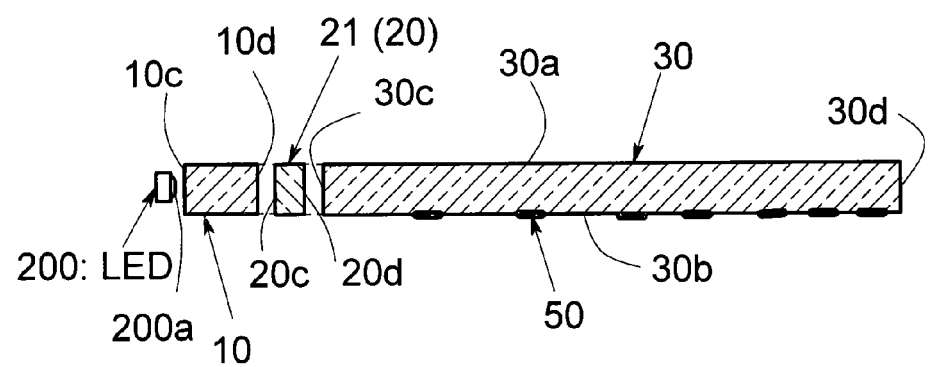
FIG. 4 is a schematic cross sectional view showing the surface illuminator of the first embodiment taken along the line B-B in FIG. 1.
Figure 8:
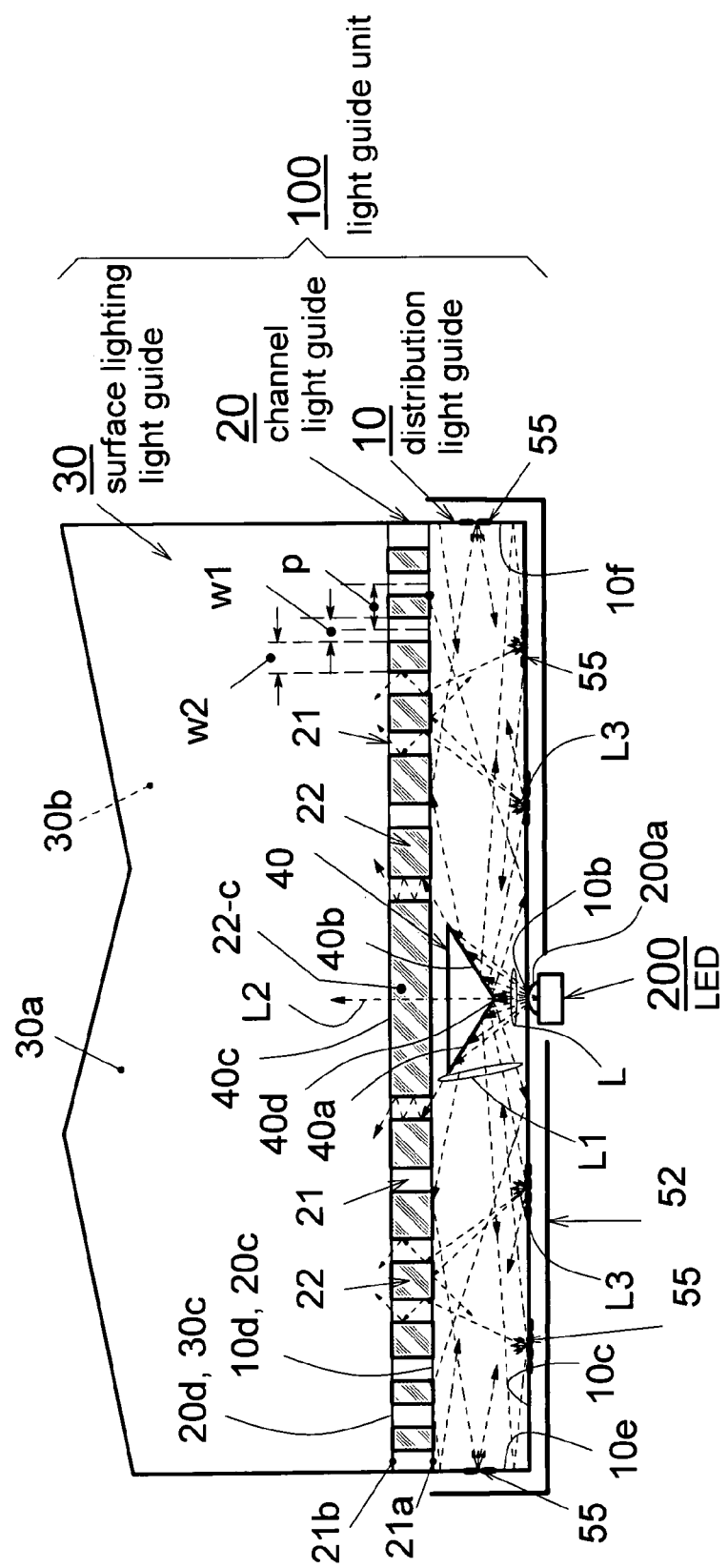
FIG. 8 is an enlarged partial top view showing the first embodiment for explaining optical path of light from a light emitting diode (LED)

In the drawings; FIG. 1 is a schematic exploded perspective view showing a surface illuminator of a first embodiment, FIG. 2 is a schematic exploded top view showing the surface illuminator of the first embodiment, FIG. 3 is a schematic cross sectional view showing the surface illuminator of the first embodiment taken along the line A-A' of FIG. 1, FIG. 4 is a schematic cross sectional view showing the surface illuminator of the first embodiment taken along the line B-B of FIG. 1, FIG. 5 is a schematic top view showing the surface illuminator, FIG. 6 is a schematic bottom view showing the surface illuminator, FIG. 7 is a schematic enlarged perspective view showing the optical channel light guide, and FIG. 8 is a schematic enlarged partial top view showing the surface illuminator showing an example of optical path of light which travels within the light guide unit 100.

As shown in FIG. 1 through FIG. 8, a surface illuminator is briefly composed of a light guide unit 100 and at least one light emitting diode (LED) or point light source.

The surface illuminator is generally called as a surface lighting device or apparatus, a planer or plane light source, a flat light source, an edge light source or a side light source, in which these technical terms are substantially similar, the same or equivalent meanings.

The light guide unit or light guiding unit 100 is composed of at least one light transmitting member having a substantially transparent (i.e. transparent, translucent, opaque or semi-transparent, semi-translucent, semi-opaque, light transmissive, light transmitting or light permeable) material.

As the substantially transparent materials for the light guide unit or light guiding unit 100, substantially transparent or light transmissive polymers or resin may be suitably used such as acrylic resin, typically polymethyl-methacrylate (PMMA) with a refractive index of about 1.49-1.50, polycarbonate (PC) with a refractive index of about 1.58-1.59, polystyrene (PS) with a refractive index of about 1.59-1.60, acryl-polystyrene copolymer with a refractive index of about 1.51-1.57, polyethylene terephthalate (PET) with a refractive index of about 1.66, epoxy with a refractive index of about 1.55-1.61, polyimide fluoride with a refractive index of about 1.46-1.47, polyvinylidene chloride with a refractive index of about 1.47, silicone resin with a refractive index of about 1.41, silicone rubber with a refractive index of about 1.42, polytetrafluoroethylene (PTFE) with a refractive index of about 1.35, etc.

As such materials, transparent polymer or resin with a controllable refractive index may also be used such as the UV curable epoxy based resin including fluorine and sulfur contents with the controllable refractive index range between 1.42 and 1.70 that is commercially available from such as NTT Advanced Technology Corporation (NTTAT), JAPAN.

The light guide unit 100 is composed of a surface lighting light guide member (surface lighting light guide) 30 having a substantially transparent planer plate-like member, a linear light guide member (linearly elongated light guide) 10 having a substantially transparent plate-like, bar-like or rod-like linear member and an optical channel light guide member (channel light guide) 20 disposed therebetween, in which the optical channel light guide member 20 is sandwiched laterally by the linear light guide member 10 and the surface lighting light guide member 30.

The surface lighting light guide plate 30 may be further composed of typically or generally a substantially transparent rectangular member having a first major surface i.e. a front surface 30a to act as a surface lighting surface i.e. light emitting surface, a second major surface i.e. a rear surface 30b opposed to the first major surface 30a, a first side surface (i.e. side, edge, end) 30c, a second side surface 30d opposed to the first side surface 30c, a third side surface 30e, a fourth side surface 30f opposed to the third side surface 30e.

The surface lighting surface 30a may have a substantially rectangular and a substantially planer surface.

The surface lighting light guide member 30 may have a substantially uniform or equal thickness between the opposed major surfaces 30a and 30b as shown in FIG. 1, FIG. 3 and FIG. 4.

Figure 9:
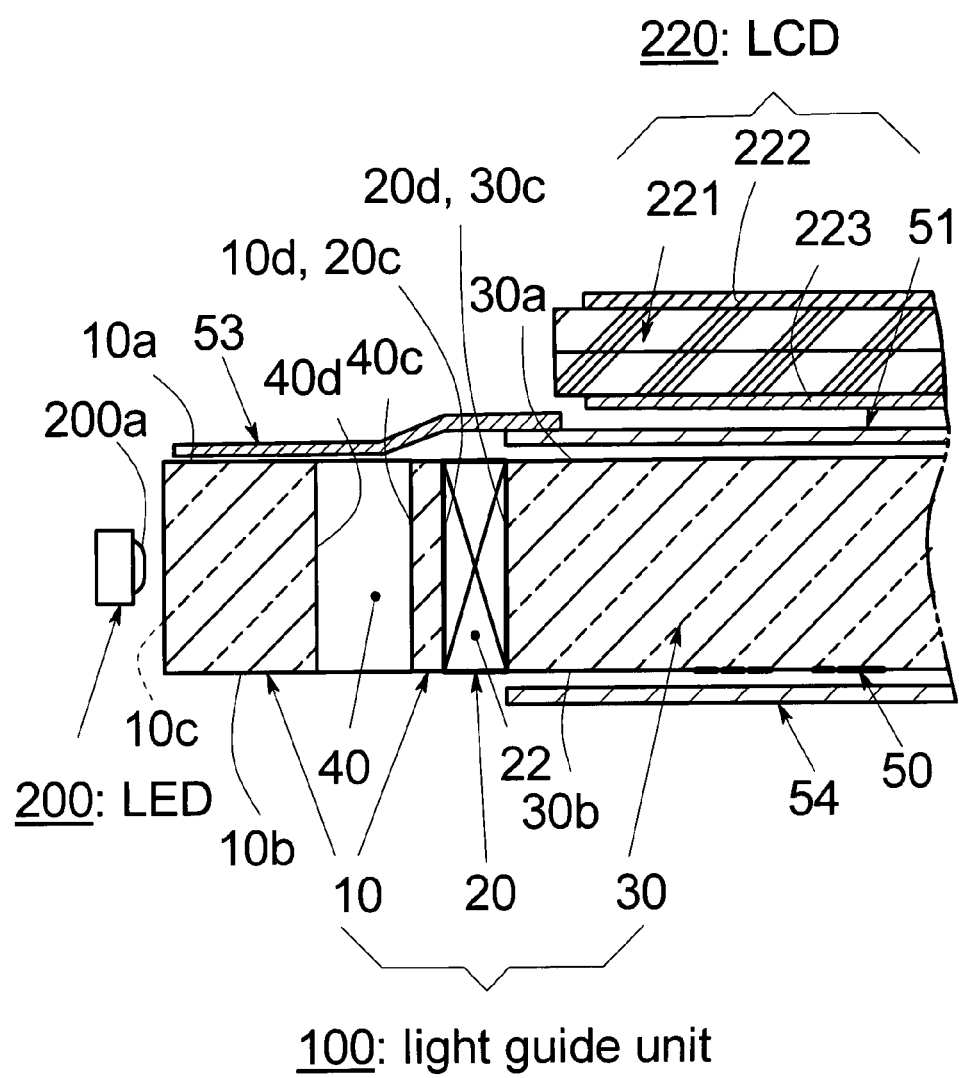
FIG. 9 is an enlarged partial cross sectional view showing the first embodiment for explaining an example of lighting applications of the surface illuminator of the present invention, in which the surface illuminator is used as a backlight of a liquid crystal display device (LCD)

The second major surface 30b may have at least one light diffusing means 50 disposed thereon/therein for diffusing or scattering the light reached or struck to the light diffusing means 50 to redirect the light toward the first major surface 30a so that the light emits from the first major surface 30a to an exterior thereof for illuminating a liquid crystal display (LCD) 220 in FIG. 9.

The light diffusing means 50 may be composed of at least one light diffusing or scattering film or at least one rough surface area, at least one grooved surface area and/or at least one prism surface area and may be disposed partially or entirely on the second major surface 30b, while the surface areas without the light diffusing means 50 may be planer, smooth or flat.

The light diffusing means 50 is preferably provided with a predetermined diffusing pattern on the second major surface 30b to produce a substantially uniform, even or equal surface brightness or luminance along or over the surface lighting surface 30a.

As shown in FIG. 6 (and FIG. 3, FIG. 4), a plurality of the light diffusing means 50 may form a linear gradation pattern having a plurality of stripes, belts or lines with a substantially uniform width aligned in parallel to one another with a variable distance.

The linear gradation pattern may be made in such a manner that a quantity of the stripes, belts or lines gradually increase in a stepwise or continuous fashion from the first side surface 30c to act as a light entrance or incident portion toward the opposed second side surface 30d, while a pitch or spacing between the adjacent stripes, belts or lines gradually decrease in a stepwise or continuous fashion from the light entrance side surface 30c toward the opposed side surface 30d.

Since the light diffusing means 50 have such a gradation pattern for diffusing light, diffusing areas in the surface lighting light guide 30 can be increased in proportion to a distance from the light entrance side surface 30c toward the opposed side surface 30d, thereby a uniform surface luminance can be produced from the surface lighting surface 30a of the surface lighting light guide 30.

The first side surface 30c to act as a light entrance, receiving or incident portion receives light exit or output from the channel light guide 20 in order to introduce the light into the surface lighting light guide member 30.

The channel light guide or optical channel light guide member 20 is composed of a plurality of optical channel elements 21 to act as optical cores in the fiber optics (i.e. optical channels, channel light guide elements) with air gaps (air spacing, openings, through holes or interposers) 22 to act as optical clads or claddings in the fiber optics.

The optical channel elements 21 and the air gaps 22 are disposed alternately to align substantially in parallel to form a linear optical channel array or a fiber optic channel array.

The optical channel elements 21 are separated so as to be isolated optically to one another by the air gaps 22 that are present adjacently between the optical channel elements 21.

The channel light guide member 20 is disposed laterally so as to be sandwiched between the surface lighting light guide member 30 and the linear light guide member 10, in such a manner that a light exit surface or face i.e. light output surface or face 20d of the channel light guide member 20 is connected with, in contact with or adjacent to the light receiving side surface i.e. light incident side surface 30c of the surface lighting light guide member 30 and a light entrance surface or face i.e. light input surface or face 20c of the channel light guide member 20 is connected with, in contact with or adjacent to the light exit front side surface 10d of the linear light guide member 10.

As shown in FIG. 7, the channel light guide member 20 may be composed of a plurality of optical channel elements or optical cores 21 (21-1, 21-2, . . . and 21n, and 21-1', 21-2', . . . and 21-n') and a plurality of optical clads (or interposers, air spacing, openings, through holes, air gaps) 22 (22-c, and 22-1, 22-2, ... and 22n, and 22-1', 22-2', ... 22-n' and 22-c) that exist to position between the adjacent optical channel elements 21 are isolated by the adjacent openings 22.

Each of the optical channel elements 21 has parallel opposed walls. Width "w1" of the optical channel elements 21 is substantially equal, while width "w2" of the air clads is variable.

The optical core channel elements 21 and the clads 22 are aligned alternately substantially in parallel to form a linear array or a fiber optic channel array of the optical channel light guide 20 as a whole.

In this embodiment, the optical core channel elements (or optical channel portions) 21 are variably distributed in quantity along the linear length of the channel light guide member 20 in proportion to the distance from a center "c" of the channel light guide plate 20 toward the opposed ends 20e and 20f, in which the center "c" of the channel light guide 20 i.e. a center air gap 22-c faces the point_like light source 200 positioned at a vicinity of the rear side surface 10c of the linear light guide member 10.

A pitch "p" between the adjacent optical channel elements 21 and a width "w" of the slits or air gaps 22 variably or gradually decrease to form a predetermined gradation pattern in a continuous or stepwise manner from the center "c" of the channel light guide 20 toward the end 20e and 20f thereof.

Thereby a substantially uniform light output from the light output side or face 20d of the channel light guide member 20 can be produced along the linear length thereof.

Since the optical core channel elements 21 with a high refractive index n1 (n1>1) are interposed between the air cores or interposers 22 with the refractive index n2 (n2=1) lower than that of the optical core channel elements 21 along the lengthwise direction of the linear fiber optic array of the channel light guide 20, a plurality of independent small optical waveguides or solid light pipes 21 (21-1, 21-2, ... and 21n, and 21-1', 21-2', ... and 21-n') that are optically isolated to one another are formed in the channel light guide member or the fiber optic array 20.

The optical core channel elements 21 have a substantially rectangular shape in this embodiment as shown in FIG. 7, in which the light input (entrance) surface (i.e. proximate end face) 21c is substantially equal to the light output (exit) surface (i.e. distal end face) 21d in that area size in each of the optical channel element 21 and each of the optical channel elements 21 has parallel opposed walls.

However, each of the optical channel elements 21 may have other shapes, in stead, such as a substantially trapezoidal shape having the opposed light input and output surfaces 21c and 21d and opposed inclined walls.

When each of the optical channel elements forms the substantially trapezoidal shape having the area size of the light exit or output surface (distal end face) 21d larger than the area size of the light entrance or input surface (proximate end face) 21c, light beams output from the light exit surface 21d can expand more than the light beams received at the light entrance surface 21c so that the light beams output from the light exit surface 21d have wider directive angle wider than the directive angle of the light beams of the optical core channel elements 21 in FIG. 7.

Back to FIG. 1 through FIG. 6, the linear light guide member 10 may be composed of opposed major surfaces 10a and 10b, opposed front and rear side surface (or sides or side face) 10c and 10d, opposed end surfaces 10e and 10f, at least one light receiving portion 10g in the rear side surface 10c and a light reflecting means or reflector 40.

The light reflecting means or reflector 40 in this embodiment has a substantially triangular opening or through hole positioned in a substantially center portion of the linear length of the linear guide member 10, in which the light reflecting means 40 i.e. the substantially triangular opening is composed of opposed reflecting surfaces 40a and 40b with a letter "V" shaped configuration, another surface 40c to connect the opposed reflecting surfaces 41 and 42 and a crossed point 40d of the opposed surfaces 41 and 42.

The opposed reflecting surfaces 40a and 40b may have opposed inclined or slanted surfaces of which opposed angle may be the same, preferably 30 to 60 degree.

The linear light guide member 10 may be disposed to be connected with, in contact with, or adjacent to a first side face 20c of the channel light guide member or plate 20 so that light output from the linear light guide member 10 can pass through mainly the optical channel elements 21.

At least one light emitting diode 200 (LED) may be disposed relative to, or in optical communication with the linear light guide member 10 so as to position at the light receiving portion 10g thereof so that a light emitting surface 200a of the LED 200 faces the light reflecting means 40 or the opposed reflecting surfaces 40a and 40b and an optical axis of the LED coincides the cross point 40d of the reflecting surfaces 40a and 40b.

Any types of the light emitting diodes (LEDs) may be used for the present invention as point-like light sources such as bare LED chips, encapsulated or packaged LED chips, surface mountable LEDs (SMD type LEDs) and conventional semi-circular or semi-round type LEDs.

An encapsulated or packaged LED device having three different kinds of bare LED chips or LED dies may suitably be used for emitting a mixing color of white in conjunction with the light guide unit of the present invention for lighting the liquid crystal displays to display full color images, in which the bare LED chips for emitting different color light i.e. blue, green and red are enclosed in one capsule or package to emit white light from a light emitting window that is made by mixing the different colors therein.

Other white color LED devices may be used for the present invention, in which the white color LED devices are composed of a short wavelength (i.e. UV, purple or blue) emitting LED chip and a phosphor material, in which the phosphor material converts light with UV rays, purple or blue color to light with white color.

These white color LEDs are commercially available from manufacturers such as Lumileds Lighting U.S. LLS, NICHIA Corporation, Japan, TOYODA GOSEI Co., Ltd, Japan, Stanley Electric Co., Ltd. Japan, Citizen Electronics Co., Ltd. Japan and SEIWA Electric MFG. Co., Ltd. Japan.

Referring to FIG. 8 showing a typical optical path within the light guide unit 100, the at least one light emitting diode (LED) 200 may be positioned in contact with, adjacent to or within the light receiving portion 10g of the linear light guide member 10, in which a light emitting window i.e. a light emitting surface 200a of the LED 200 faces the opposed light reflecting surfaces 40a and 40b of the light reflecting means or reflector 40 having a substantially triangular opening within the linear light guide member 10, in which the opposed light reflecting surfaces 40a and 40b have a symmetrical inclined i.e. slant angle with respect to the a vertical line of the another surface 40c.

The surfaces 40a and 40b may constitute an interface between the linear light guide member 10 having a first refractive index (n1>1) and air of the opening 40 having a second refractive index (n2=1) lower than the first refractive index.

Light "L" indicated by dotted lines with arrows in FIG. 8 (i.e. light rays or light beams) emitting from the LED 200 enters the linear light guide member 10 and the light advances toward the reflector 40.

Large volume of light "L1" among the light "L" from the LED 200 reaches the opposed inclined reflecting surfaces 40a and 40b, the light "L1" incident with more than critical angle is reflected by at the opposed inclined reflecting surfaces 40a and 40b based on the total internal reflection (TIR) toward substantially lateral first and second directions opposed to each other and the light "L1" advances to reflect repeatedly based on the TIR toward the substantially opposed ends 10e and 10f along the length of the linear light guide member 10 therein, The rest volume of light "L2" passes the reflector 40 to transmit into the surface lighting light guide member 30 through the substantially triangular opening 40 and the center air clad 22-c, since the light "L2" reached the reflector 40 with less than a critical angle of TIR passes the reflector 40 without reflecting at the inclined reflecting surfaces 40a and 40b.

The reflecting sheet or plate 52 may be disposed adjacent to the light diffusing means 53 except for the light receiving portion 10b of LED 200 so as to redirect the light leaked from the linear light guide 10 to return thereto.

The optical channel element 21 (i.e. channel light guide elements, optical core channel elements, optical cores) are separated or optically isolated by the interposers 22 (i.e. air clads in this embodiment, optical clads) existing between each of the optical channel element 21, in which a refractive index of the air clads 22 is lower than the refractive index of the optical channel element 21 that are surrounded by air of the slits 22, so that each of the optical channel element 21 constitutes an independent optical waveguide, i.e. optical pipe or light pipe.

When the light "L1" reaches the rear side surface 10c of the linear light guide 10, the light "L1" reflects at the rear side surface 10c toward the optical channel light guide 20, the light "L1" further travels to reach the optical channel light guide elements 21 or the air interposers 22.

When the light "L1" with more than the critical angle of the TIR reaches the air interposers 22 after reflecting at the rear side surface 10c or after reflecting at the reflector 40, the light is reflected by the air interposers 22 to advance toward substantially lateral direction/directions (i.e. the rear side surface 10c or the end surfaces 10e and/or 10f).

When the light "L1" with less than the critical angle of the TIR reaches the air interposers 22 after reflecting at the rear side surface 10c or after reflecting at the reflector 40, the light passes through the air interposers 22 to enter the light incident side surface 30c of the surface lighting light guide 30.

The light "L1" reached the light diffusing means 55 diffuses or scatters to become diffused light "L3" and the diffused light "L3" travels toward the optical channel light guide member 20 (the optical core channel elements 21 and the air clad or interposers 22).

The diffused light "L3" reached the optical channel light guide elements 21 advances therein to reflect at least one time based on the TIR and the diffused light "L3" passes therethrough to enter the surface lighting light guide member 30 via the light incident or input side surface 30c thereof.

The diffused light "L3" with more than the critical angle of the TIR reached the air interposers 21 reflects based on the TIR to advance toward the substantially lateral direction within the linear light guide 10, while the diffused light "L3" with less than the critical angle reached the air clads i.e. air interposers 21 passes therethrough to enter the surface lighting light guide member 30 via the light incident or input side surface 30c thereof.

The light "L1" reached the end surface/surfaces 10e and/or 10f reflects at planer, flat or smooth surface portions thereof or diffused at the light diffusing means 55 to become diffused light "L3", in which the reflected light "L1" further travels to a substantially lateral opposite direction within the linear light guide member 10 and the diffused light "L3" travels to plural directions within the linear light guide member 10.

The light "L1" and/or "L3" leaked from the rear side surfaces 10c or from the end surfaces 10e and/or 10f are reflected by the reflecting or diffusing sheet or plate 52 to return the linear light guide member 10.

It should be noted that a first volume of the light L1 entered the optical core channel elements 21 is larger than a second volume of the light L1 entered the air clads 22, since all the light L1 reached the optical core channel elements 21 can enter therein, while only the light L1 with less than the critical angle of the TIR reached the air interposers 22 can pass therethrough and the light L1 with more than the critical angle of the TIR reached the air interposers 22 reflects within the linear light guide 10 without passing the air interposers 22.

A large volume of first light with strong brightness exits from the optical core channel elements 21 in which the output light has a wide spread angle similar to optical fibers exits therefrom, while a small volume of second light with week brightness exits from the air clads 22.

The channel light guide member (i.e. the linear fiber optic array) 20 exits the first bright light and the second week light adjacent to one another along the linear length of the linear fiber optic array 20 and the first bright light and the second week light enter the surface lighting light guide member 30 from the light receiving side surface 30c thereof.

The first bright light and the second week light are mixed together at a vicinity of the light receiving side surface 30c within the surface lighting light guide member 30, thereby a substantially uniform or equalized linear light can transmit within the surface lighting light guide member 30.

The substantially uniform linear light within the surface lighting light guide member 30 transmits to reflect repeatedly between the opposed major surfaces 30a and 30b based on the TIR from the light receiving side surface 30c toward the opposed side surface 30d and the light gradually emits from the light emitting major surface 30a on the way of transmission.

Therefore, the planer output light with a substantially uniform or equalized brightness or luminance can be produced substantially over of the surface lighting major surface 30a of the surface lighting light guide member 30.

As described in the above, in this embodiment, since the optical channel light guide elements (optical core channel elements) 21 and/or the interposers (air optical clads) 22 are variably distributed to form the linear fiber optic array as a whole having the gradation pattern, in which the pitch "p" of the optical channel light guide elements 21 and/or the width "w" of the interposers 22 are variably aligned, the channel light guide member 20 can exit a substantially uniform light output along the linear length of the linear fiber optic array and resultantly a uniform surface lighting from the surface lighting light guide member or plate 30 over the light exit major surface 30a thereof can be produced.

Referring to FIG. 9, a typical example of the application of the surface illuminator of the present invention, in which FIG. 9 is a schematic enlarged partial cross sectional view showing the first embodiment taken along the line A-C of FIG. 1.

As shown in FIG. 9, the surface illuminator composed of the light guide unit 100 and the LED 200 is typically utilized for a surface lighting such as a backlighting of a liquid crystal display device (LCD) 200, so that a viewer or user can see a displayed image of the LCD 220 illuminated by light from the surface lighting light guide member 30 positioned in a backside of the LCD 200.

As described in above in detail, the light guide unit 100 is briefly composed of the linear light guide member 10 having the opposed major surface 10a and 10b, the light receiving side face 10c, the light exit side face 10d and the reflector 40, the optical channel light guide member 20 having the light receiving side face 20c and the light exit side face 20d, and the surface lighting light guide member 30 having the surface lighting front surface 30a, the opposed rear surface 30b and the light diffusing means 50 disposed in/on the rear surface 30b.

The liquid crystal display (LCD) 220 is briefly composed of a liquid crystal panel 221 having opposed transparent plates with opposed transparent electrode films disposed their inner surfaces and liquid crystal material filled between the opposed transparent plates, and opposed polarized films 222 and 223 disposed so as to sandwich the liquid crystal panel 221.

A light spreading or prism sheet 51 may be disposed on or adjacent to the surface lighting surface 30a of the surface lighting light guide 30 and a light reflecting sheet or plate 54 may be disposed on or adjacent to the rear surface 30b of the surface lighting light guide 30.

The light reflective or shielding sheet 53 may be disposed on or adjacent to cover an end portion of the front surface 30a of the surface lighting light guide 30, a front surface of the linear members 20 and the front surface of the channel light guide member 20, in which only the air clad i.e. air interposer 22 is shown in FIG. 9 and the optical core channel element 21 is not shown in FIG. 9), The light reflective or shielding sheet 53 returns the light leaked undesirably from the front surfaces of the light guide unit 100 thereto and shields light from entering from outside into the light guide unit 100.

In stead, the surface illuminator can be utilized for a front lighting (not shown in FIG. 9) of the liquid crystal display device 220 in such a manner that the light reflecting sheet 54 is removed so that the viewer can see indirectly the liquid crystal display 220 through the surface lighting light guide member 30.

Figure 10:
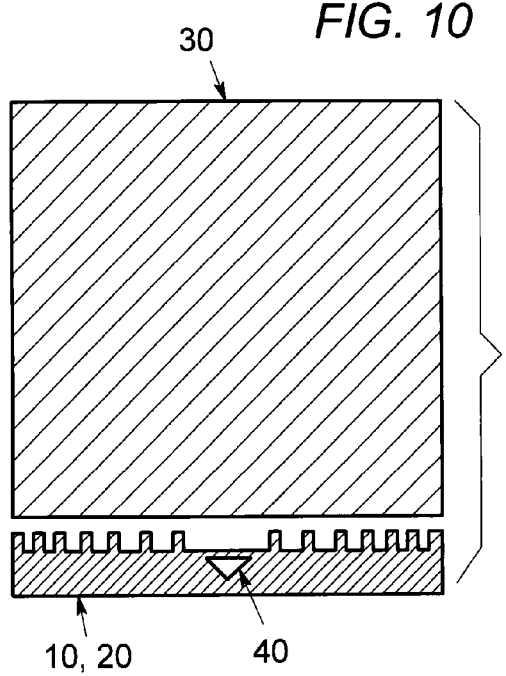
FIG. 10 is a first form of the light guide unit 100 having a surface lighting light guide 30 and a composite of a linear light guide member 10 and a channel light guide 20.
Figure 11:
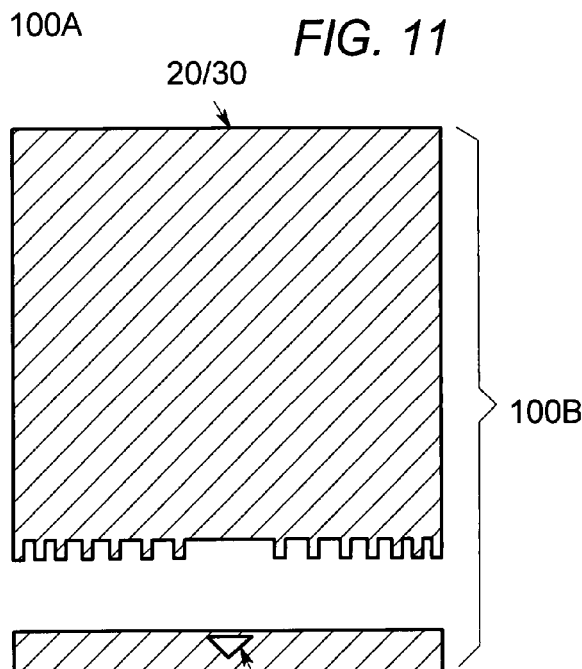
FIG. 11 is a second form of the light guide unit 100 having the linear light guide 10 and a composite of the surface lighting light guide 30 and the channel light guide 20.
Figure 12:
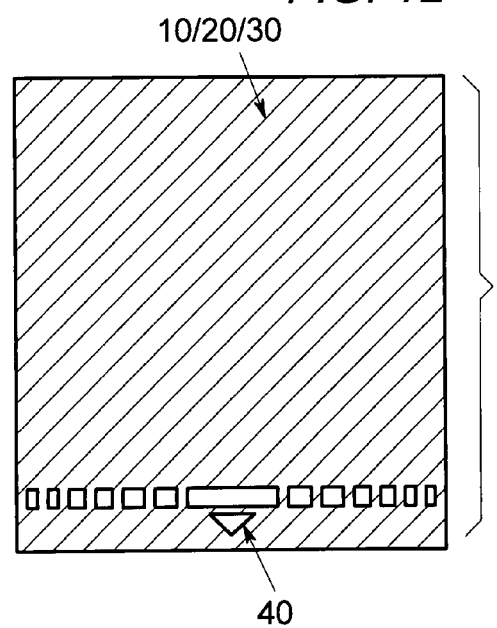
FIG. 12 is a third form of the light guide unit 100 in which the linear light guide 10, the channel light guide 20 and the surface lighting light guide 30 are integrated into a single unit.

Reference is made to FIG. 10, FIG. 11 and FIG. 12 illustrating top views of the light guide unit 100 showing three kinds of the light guide unit 100 of the first embodiment.

As shown in FIG. 10, a first kind of the light guide unit 100A is composed of the surface lighting light guide member 30 and a composite light guide member (10, 20) of the linear light guide member 10 having the reflector 40 disposed therein and the channel light guide member 20, in which the linear light guide member 10 and the channel light guide member 20 are integrated to form a single unit, and the surface lighting light guide member 30 are preferably positioned laterally in contact with the composite light guide member (10, 20).

Light entered the optical core channels 21 of the channel light guide portion 20 in the composite light guide member (10, 20) from the linear light guide portion 10 of the composite light guide member (10, 20) may travel within the optical core channels to reflect one or more times therein toward light exit end surfaces 21d thereof and the light may exit effectively from the light exit end surfaces 21d to enter the light receiving side surface 30c of the surface lighting light guide 30 to transmit therein.

The composite light guide member (10, 20) and the surface lighting light guide member The composite light guide member (10, 20) and the surface lighting light guide member 30 may be preferably composed of a substantially transparent polymer material, in which a refractive index of the composite light guide member (10, 20) must be substantially the same or lower than the refractive index of the surface lighting light guide member 30.

For example, the substantially transparent polymer material used as the composite light guide member (10, 20) may be polymethyl-methacrylate (PMMA) with a refractive index of about 1.49-1.50 and the substantially transparent polymer material used as the surface lighting light guide member 30 may be polymethyl-methacrylate (PMMA) with a refractive index of about 1.49-1.5 or polycarbonate (PC) with a refractive index of about 1.58-1.59.

Therefore, light output from an optical channel light guide portion of the composite light guide member (10, 20) toward the surface lighting light guide 30 is prevented from returning back to the composite light guide member (10, 20) by reflecting at the interface between the optical channel light guide portion and the light input side surface of the surface lighting light guide 30.

As shown in FIG. 11, a second kind of the light guide unit 100B is composed of the linear light guide member 10 having the reflector 40 and a composite light guide member (20, 30), in which he surface lighting light guide member 30 and the channel light guide member 20 are integrated to form a single unit, and the composite light guide member (20, 30) are preferably positioned in substantially contact with the linear light guide member 10.

The composite light guide member (20, 30) and the linear light guide member 10 may be preferably composed of a substantially transparent polymer material, in which a refractive index of the composite light guide member (20, 30) is preferably substantially the same or higher than the refractive index of the linear light guide member 10. For example, the composite light guide member (20, 30) may be made of "PMMA" or "PC" and the linear light guide member 10 may be made of "PMMA".

As shown in FIG. 12, a third kind of the light guide unit 100C is composed of a unitary composite light guide unit (10, 20, 30), in which the surface lighting light guide member 30, the channel light guide member 20 and the linear light guide member 10 having the reflector 40 are connected or unified in that order to form a single integrated unit.

The light guide unit 100C i.e. the composite light guide unit (10, 20, 30) may be preferably composed of a substantially transparent polymer material and there is no attention with respect to a combination of the refractive index because of a completely integrated single unit with a single refractive index that differs from the light guide unit 100A and 100B.

Therefore, the light guide unit 100C composed of a single polymer material may be manufactured by an injection molding process at the same time.

The composite light guide member or unit (10, 20) of the light guide unit 100A in FIG. 10, the composite light guide member or unit (20, 30) of the light guide unit 100B in FIG. 11 and the composite light guide member or unit (10, 20, 30) of the light guide unit 100C in FIG. 12, may be manufactured by various processes using a substantially transparent polymer, for example, laser cutting process, injection molding process, casting molding (or polymerization) process or compression molding process.

The laser cutting process may be made by using a laser cutting or engraving machine, in which a light guide plate is processed by scanning of laser beam energy so as to cut in accordance with a predetermined pattern relative to at least the channel light guide 20 and the reflector 40.

The injection molding process may be made by using a molding die with a molding pattern including a channel pattern relative to at least the channel light guide 20 and a reflector pattern relative to the reflector 40, in which melted or softened polymer is injected into the molding die and the solid polymer light guide (10, 20) in FIG. 10 and (20, 30) in FIG. 11 or (10, 20, 30) in FIG. 12 is taken out from the molding die after cooling.

The casting molding or polymerization process may be made by using a casting die with a pattern including a channel pattern relative to at least the channel light guide portion 20 and a reflector pattern relative to the reflector portion 40, in which liquid resin or monomer including a thermo-sensitive or light-sensitive hardener (i.e. photo-initiator) is poured into the casting die and the solid polymer light guide (10, 20) in FIG. 10 and (20, 30) in FIG. 11 or (10, 20, 30) in FIG. 12 is taken out from the casting die after hardening or polymerizing by application of heat or light.

The compression molding process may be made by using a molding die with a molding pattern including a channel pattern relative to at least the channel light guide 10 and a reflector pattern relative to the reflector 40, in which melted or softened polymer are placed in the molding die and compressed by pressing the molding die and the solid polymer light guide (10, 20) in FIG. 10 and (20, 30) in FIG. 11 or (10, 20, 30) in FIG. 12 is taken out from the molding die after cooling.

When the above-mentioned process is applied for making the light guide unit 100A, 100B or 100C, a mass production thereof is easily carried out and the light guide unit 100A, 100B or 100C can be supplied in a short delivery time and in comparatively low cost.

Reference is made to FIG. 13, FIG. 14 and FIG. 15 showing three modifications of the defusing pattern of the light diffusing means 50 of the surface lighting light guide 30 in FIG. 6, in which FIG. 13, FIG. 14 and FIG. 15 is schematic bottom views of the surface illuminator of the first embodiment of the present invention.

As shown in FIG. 13 (and FIG. 3, FIG. 4), a plurality of the light diffusing means 50a disposed in/on the second major surface 30b may be composed of a plurality of dots or dot-like areas 50a to form a gradation pattern and each of the dots or dot-like areas has a substantially uniform area with an arbitrary shape such as a circle in FIG. 13, ellipse, rectangle or polygon.

A quantity of the dots or dot-like areas 50a increases in accordance with the distance from the light entrance side surface 30c toward the opposed side surface 30d so that a distributing density of the dots or dot-like areas 50a increases in a stepwise or continuous fashion. Thereby a substantially uniform surface brightness can be produced over substantially entire areas of the surface lighting surface 30a of the surface lighting light guide 30.

As shown in FIG. 14 and FIG. 15 (and FIG. 3, FIG. 4), a plurality of the light diffusing means 50b and 50c disposed in/on the second major surface 30b may be composed of a plurality of island-like areas or isolated areas to form a gradation pattern.

Each of the island-like areas 50b and 50c may have a different sized area with an arbitrary shape such as the light diffusing means 50b with a rectangular pattern in FIG. 14, the light diffusing means 50c with a circular pattern in FIG. 15.

The island-like areas 50b and 50c increase in each size in a stepwise or continuous fashion from the light receiving side surface 30c toward the opposed side surface 30d. Thereby a substantially uniform surface brightness can be produced over substantially entire areas of the surface lighting surface 30a of the surface lighting light guide 30.

Second Embodiment (Embodiment: No. 2)

Reference is made to FIG. 16 through FIG. 19 showing a second embodiment of the present invention.

Figure 16:
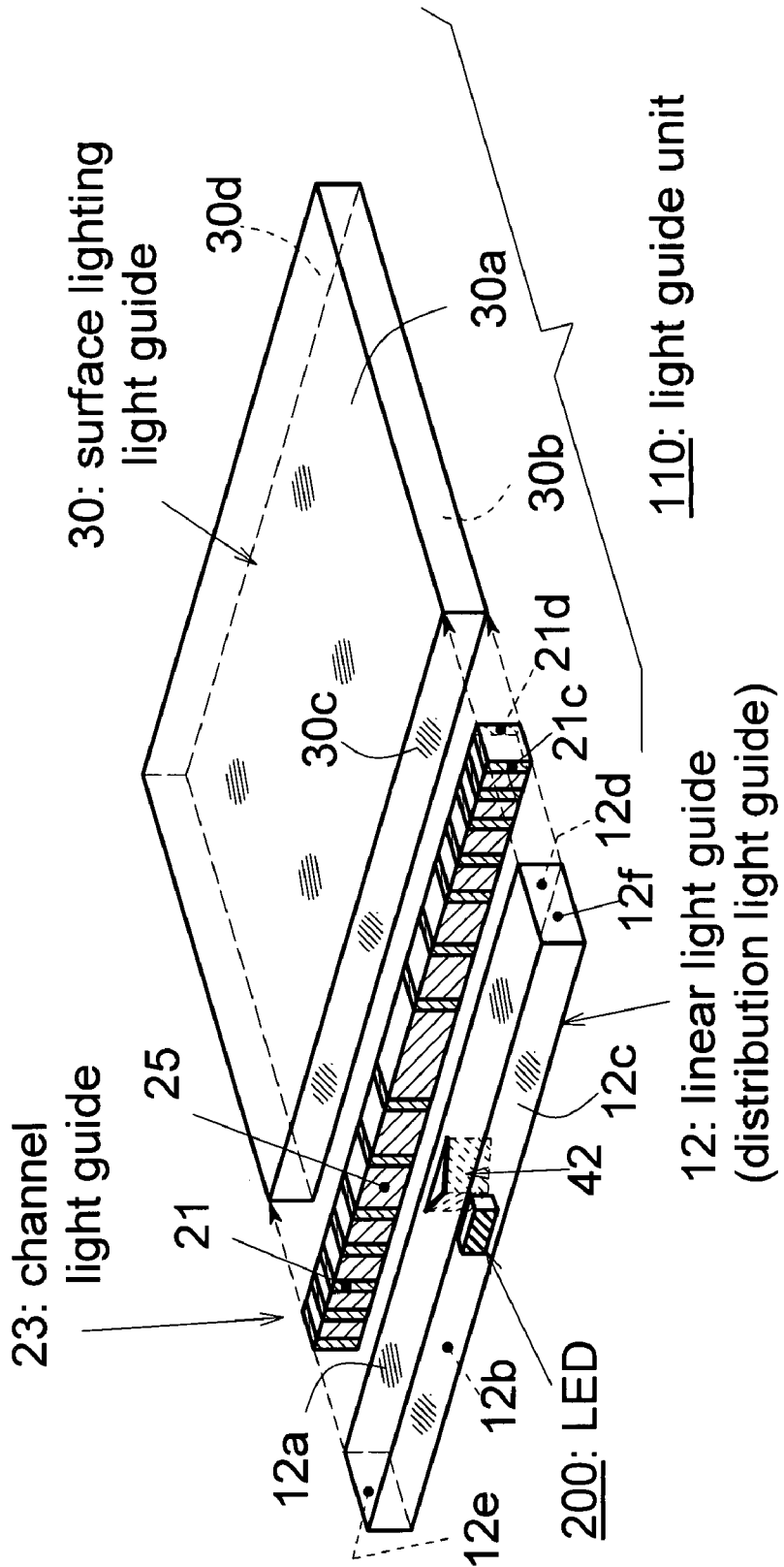
FIG. 16 is a schematic exploded perspective view showing a second embodiment of the present invention.

FIG. 16 is a schematic exploded perspective view showing a surface illuminator, FIG. 17 is a schematic exploded top view showing the surface illuminator and FIG. 18 is a schematic top view showing the surface illuminator and FIG. 19 is a schematic perspective view showing a channel light guide 23 used for the surface illuminator.

The second embodiment (FIG. 16 through FIG. 19) differs from the first embodiment (e.g. FIG. 1 through FIG. 15) described hereinbefore in the constitution of a channel guide member 23 and a linear light guide member 12 and like or similar elements, parts or portions are denoted by the same reference numeral in these Figures. Therefore, a duplicated description for the like or similar elements, parts or portions attached with the same reference numeral may be omitted hereinafter.

A surface illuminator is composed of the light guide unit 110 and a light emitting diode (LED) 200 as a point-like light source.

The light guide unit 110 is composed of a plate-like surface lighting light guide member 30, a channel light guide member 23 and a plate-like linear light guide member 12, in which these light guide members 30, 23 and 12 are made of substantially transparent, light transmitting, light guiding or light conducting material.

The surface lighting light guide member 30, the channel light guide member 23 and the linear light guide member 12 are disposed laterally in that order so that the channel light guide member 23 is sandwiched between the surface lighting light guide member 30 and the linear light guide member 12.

The linear guide member 12 may be composed of a substantially linearly elongated transparent plate having opposed major surfaces 12a and 12b, opposed side surfaces 12c and 12d, opposed ends or end surfaces 12e and 12f, a light receiving portion 12g disposed in/on the rear side surface 12c, a substantially triangular light reflecting means 42 disposed in an interior of the linear guide member 12 and a substantially transparent material 43 disposed in a substantially triangular space of the light reflecting means 42.

The light reflecting means or reflector 42 in this embodiment may be composed of opposed reflecting inclined surfaces 42a and 42b with a substantially "V" shape and another surface 42c to connect the opposed reflecting surfaces 42a and 42b and the substantially transparent triangular polymer member 43 filled in the substantially triangular opening (denoted as the reference numeral 40 in e.g. FIG. 1), in which the reflector 42 may be positioned near a central portion of the linear light guide 12.

A refractive index of the substantially transparent triangular polymer member 43 must be lower than the refractive index of the linear light guide member 12, thereby the opposed reflecting inclined surfaces 42a and 42b can reflect light within the linear light guide 12 without entering the polymer member 43, when light with more than critical angle of the TIR reach the opposed reflecting inclined surfaces 42a and 42b.

The point_like light source (or LED) 200 is disposed in a light receiving area 12g, i.e. that is a portion near a center "c" of the rear side surface 12c of the linear light guide member 12, in such a manner that a light emitting window or surface of the LED 200 faces the opposed light reflecting surfaces 42a and 42c of the reflector 42.

The channel light guide member 23 is composed of a plurality of optical channel elements 21 to act as optical solid cores and a plurality of substantially transparent solid interposers to act as optical solid clads 25.

The solid interposers or optical solid clads 25 are disposed between the adjacent optical channels elements or optical solid cores 21 in such a manner that the optical solid cores 21 and the optical solid clads 25 are alternately aligned in substantially parallel to form a linear fiber optic channel array 23.

Therefore, the optical solid cores 21 are separated to isolate optically to one another by the optical solid clads 25 in the lengthwise direction of the channel light guide member 23 i.e. the linear fiber optic channel array 23.

As shown in FIG. 19, in this embodiment, the optical channel elements (or optical channel portions) 21 have substantially the same width "w1" and the optical channel elements 21 are variably distributed to increase in quantity or distribution density along the linear length of the channel light guide member 23 in proportion to the distance from a center "c" of the channel light guide member 23 toward the opposed ends 23e and 23f.

A pitch "p" between the adjacent optical core channel elements 21 and a width "w2" of the solid clad interposers 25 are variably or gradually decreased in a continuous or stepwise manner to form a gradation pattern from the center "c" of the channel light guide member 23 or a center solid clad interposer 25-c toward the end 23e and 23f of the channel light guide member 23, thereby a substantially uniform linear light output from the light output side surface 23d of the channel light guide member 23 can be produced along the linear length thereof.

A refractive index or an index of refraction of the interposers (i.e. solid clads) 25 must be lower than the refractive index of the optical channel elements (i.e. optical cores) 21.

The solid interposers i.e. solid clads 25 with a comparatively low refractive index may be composed of substantially transparent polymer material selected from, for example, polyimide fluoride with a refractive index of about 1.46-1.47, silicone resin with a refractive index of about 1.41, polyvinylidene chloride with a refractive index of about 1.47 and epoxy based resin including fluorine and sulfur contents with the refractive index range that is controlled from 1.42 to 1.48.

While the optical channel elements (i.e. solid cores) 21 with a comparatively high refractive index may be composed of substantially transparent polymer material selected from, for example, polymethyl-methacrylate (PMMA) with a refractive index of about 1.49-1.50, polycarbonate (PC) with a refractive index of about 1.58-1.59, polystyrene (PS) with a refractive index of about 1.59-1.60, epoxy with a refractive index of about 1.55-1.61 and epoxy based resin including fluorine and sulfur contents with the refractive index range that is controlled from 1.49 to 1.70.

Since each of the optical channel elements (optical cores) 21 with a refractive index "n2" is surrounded or interposed laterally by the interposers (solid clads) 25 with the refractive index "n4" lower than "n2" except for the opposed light input surfaces (i.e. proximate end surfaces or light entrance surfaces) 21c and light output surfaces (i.e. distal end surfaces or light exit surfaces) 21d along a lengthwise direction, the independent optical waveguides or light pipes 21 between the opposed light input and output surfaces 21c and 21d are produced separately to one another within the channel light guide plate 23.

The optical channel elements 21 and the interposers 23 have a substantially rectangular shape as shown in FIG. 16, in which the opposed light input and output surface 21c and 21d have substantially the same area size.

However, each of the optical channel elements 21 and the interposers 15 may have other shapes such as a substantially trapezoidal shape.

Further, each area of the light output surfaces 21d of the optical channel elements 21 may be larger than each area of the light input surface 21c of the optical channel elements 21, while the interposers 25 is reversed to the optical channel elements 21, so that light entered the light input surface 21c exits from the light output surface 21d so as to expand the light with wider directivity.

The solid interposers 25 may contain a plurality of light diffusing particles to disperse therein and the light diffusing particles may be selected from substantially transparent glass or polymer beads with a refractive index different from the refractive index of the solid interposers 26 or light reflecting or diffusing pigments so that light with wider spread angle can exit from the solid interposers 25 when the light enters an interior of the solid interposers therefrom.

Reference is made to FIG. 20 through FIG. 23 illustrating top views of the light guide units 110 showing four kinds of the light guide units 110A, 110B, 100C and 110D of the second embodiment of the present invention.

Figure 20:
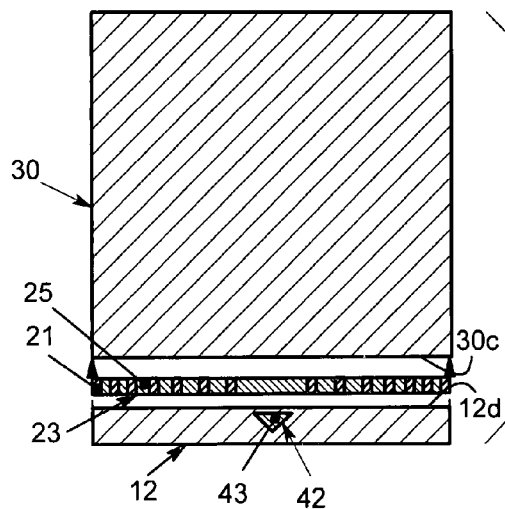
FIG. 20 is a schematic top view showing the second embodiment of the present invention, showing a first kind of a light guide unit 110A.

As shown in FIG. 20, a first kind of the light guide unit 110A is composed of the surface lighting light guide member 30, the channel light guide member 23 having the channel light guide elements 21 and the interposers 25, and the linear light guide member 12 having the reflector 42 and the substantially transparent polymer member 43 filled therein, in which all the light guide members 30, 23 and 12 are separated to one another.

The light guide members 30, 23 and 12 may be positioned laterally in a side-by-side relationship in that order so as to be or to come in substantially contact with to one another so that the channel light guide member 23 is sandwiched laterally between the light receiving side face 30c of the surface lighting light guide member 30 and the light output surface 12d of the linear light guide member 12.

Figure 21:
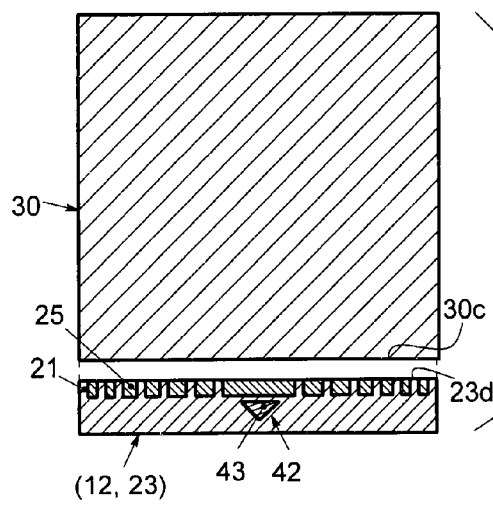
FIG. 21 is a schematic top view showing the second embodiment of the present invention, showing a second kind of a light guide unit 110B.

As shown in FIG. 21, a second kind of the light guide unit 110B is composed of the surface lighting light guide member 30 and a composite light guide member (12, 23) of the channel light guide member 23 having the channel light guide elements 21 and the interposers 25, and the linear light guide member 12 having the reflector 42 and the substantially transparent filler member filled therein, in which the composite light guide member (12, 23) and the surface lighting light guide member 30 are separated to one another.

The composite light guide member (12, 23) may be positioned in substantially contact with the surface lighting light guide members 30, so that the light output surface 23d of the composite light guide member (12, 23) faces the light receiving surface 30c of the surface lighting light guide member 30.

Figure 22:
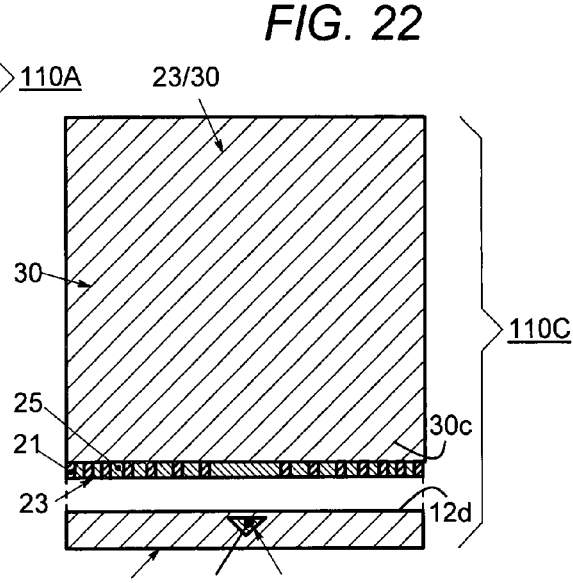
FIG. 22 is a schematic top view showing the second embodiment of the present invention, showing a third kind of a light guide unit 110C.

As shown in FIG. 22, a third kind of the light guide unit 110C is composed of the linear light guide member 12a having the reflector 42 and the substantially transparent filler member 43 filled therein, and a composite light guide member (23, 30) of the surface lighting light guide member 30 and the channel light guide member 23 having the channel light guide elements 21 and the interposers 25, in which the surface lighting light guide member 30 and the channel light guide member 23 are integrated to form a single unit.

The composite light guide member (23, 30) may be positioned in substantially contact with the linear light guide member 12 so that the light exit surface 12d of the linear light guide member 12 contacts with the light receiving side surface 23c of the channel light guide portion 23 of the composite light guide member (23, 30).

Figure 23:
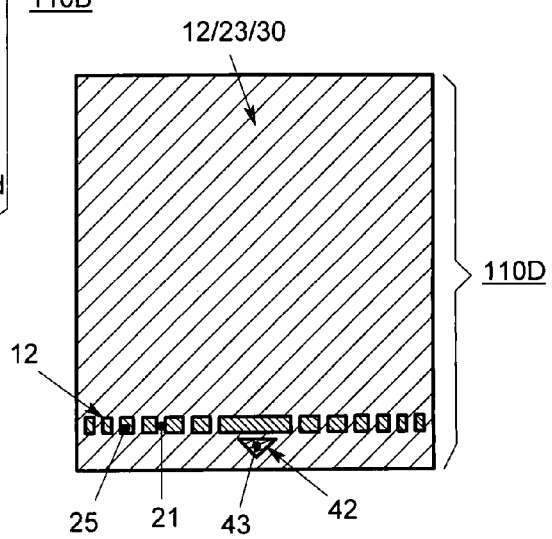
FIG. 23 is a schematic top view showing the second embodiment of the present invention, showing a fourth kind of a light guide unit 110D.

As shown in FIG. 23, a fourth kind of the light guide unit 110D is composed of a unitary composite light guide member (12, 23, 30) is composed of the surface lighting light guide member 30, the channel light guide member 23 having the channel light guide elements 21 and the interposers 25 and the linear light guide member 12 having the reflector 42 and the substantially transparent polymer member 43 filled therein, in which all the light guide members 12, 23 and 30 are completely connected to one another in that order or completely integrated in a single unit.

Third Embodiment (Embodiment: No. 3)

Figure 24:
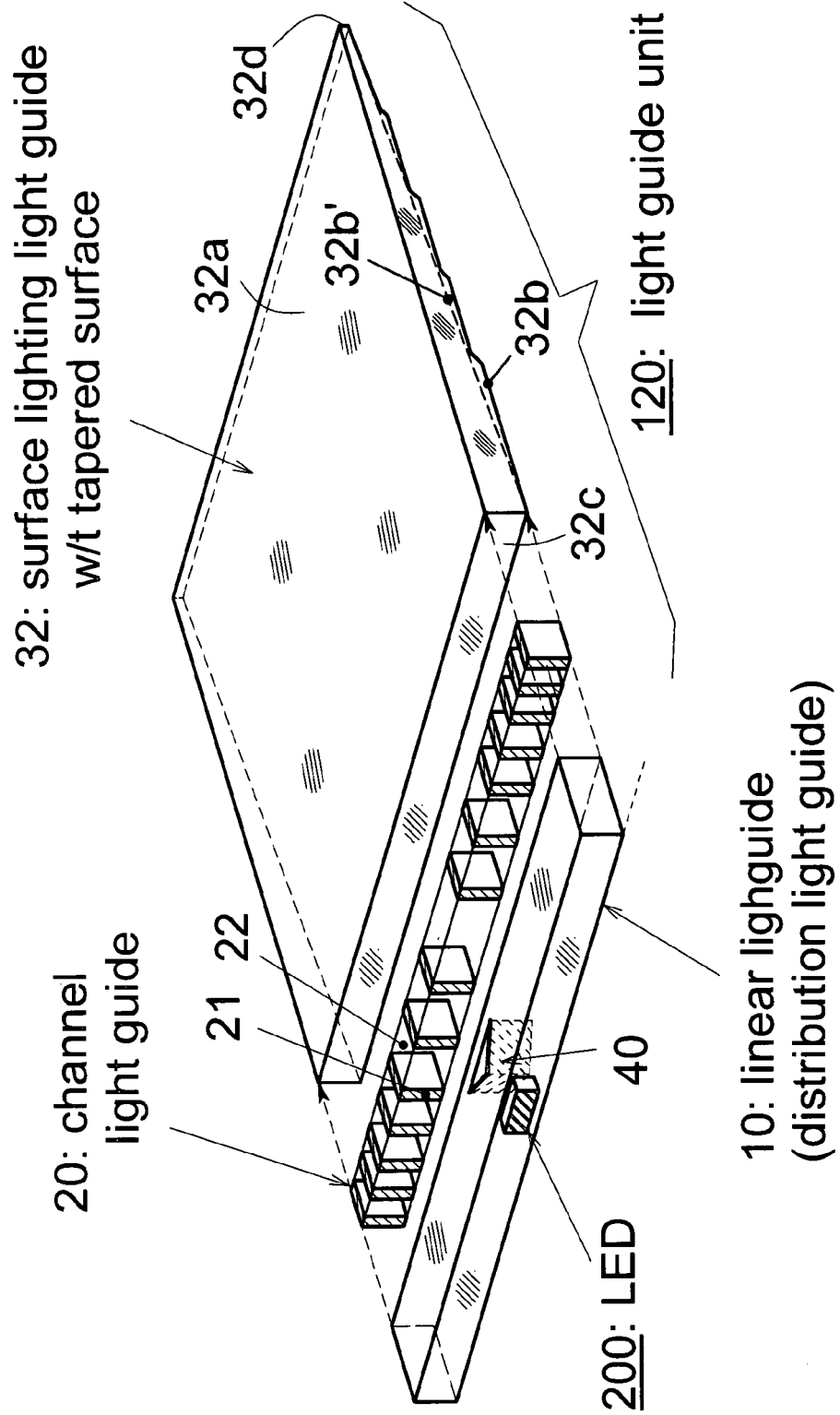
FIG. 24 is a schematic exploded perspective view showing a third embodiment of the present invention.

Reference is made to FIG. 24 showing a third embodiment of the present invention, in which FIG. 24 is a schematic perspective view.

The surface illuminator of the third embodiment is a modification of the first embodiment described referring to e.g. FIG. 1 to FIG. 4.

A surface lighting light guide member 32 in the third embodiment differs from the lighting light guide member 30 in the first embodiment, while the linear light guide member 10 and the channel light guide member 20 in the first and second embodiments are the same as that in the first embodiment, in which the same numerals are attached.

As shown in FIG. 24, the surface illuminator is briefly composed of a light guide unit 120 and a LED 200 as a point source.

The light guide unit 120 is composed of a linear light guide member 10 having a substantially triangular reflector 40 therein, a channel light guide member 20 having optical channel elements 21 (optical cores) and openings or air interposers (optical air clad) 22 and the surface lighting light guide member 32.

In this embodiment, the surface lighting light guide member 32 is composed of a substantially rectangular and substantially transparent plate having a substantially planer surface lighting first major surface 32a and a tapered second major surface i.e. an inclined, wedge-like or slanted surface 32b or 32b' opposed to the first major surface 32a, a light receiving side surface 32c i.e. light input side and another side surface 32d opposed to the light receiving side surface 32c.

The surface lighting light guide member 32 has a variable thickness in which one type of the surface lighting light guide member 32 is provided with the tapered surface 32b indicated by a continuous line in FIG. 24 so that the surface lighting light guide member 32 varies in the thickness so as to decrease in a stepwise fashion from the light receiving side surface 32c toward the opposed side surface 32d, while the surface lighting light guide member 32 has a substantially uniform thickness as shown in e.g. FIG. 1 to FIG. 4.

Instead, another type of the surface lighting light guide member 32 has the continuous tapered surface 32b' indicated by a dotted or dashed line in FIG. 24 so that the surface lighting light guide member 32 varies in the thickness so as to decrease gradually in a continuous fashion from the light receiving side surface 32c toward the opposed side surface 32d.

Due to the tapered surface 32b/32b', the light reached the surface lighting surfaces 32a has the variable critical angle of the TIR that narrows in accordance with a distance from the light receiving side 32c toward the opposed side 32d, more volume of the light leaks from the surface lighting surfaces 32a in accordance with the distance so that light diffusing means 50 in e.g. FIG. 6 is not necessarily required.

The air clads 22 may be replaced to the solid clads 25 as the second embodiment (e.g. FIG. 7, FIG. 10) in such a manner that the openings or spacing 22 of the air clads 22 is filled with a substantially transparent polymer having a refractive index lower than the refractive index of the optical channel elements 21.

Fourth Embodiment (Embodiment: No. 4)

Reference is made to FIG. 25 through FIG. 28 showing a fourth embodiment of the present invention.

FIG. 25 is a schematic exploded perspective view showing the fourth embodiment, FIG. 26 is a schematic exploded top view showing the fourth embodiment, FIG. 27 is a schematic top view a of the fourth embodiment and FIG. 28 is a schematic enlarged perspective view showing a channel light guide 26 in FIG. 25.

Duplicated description may be omitted as much as possible in this embodiment in respect to the portions or elements denoted by the same reference numerals as in the embodiments described in detail hereinbefore.

A surface illuminator of the fourth embodiment is composed of a light guide unit 121 and a LED 200.

The lighting light guide unit 121 is composed of a plate-like linear light guide member 10 having a triangular reflector 40 with opposed reflecting surfaces 40a and 40b disposed near a center of the linear light guide member 10, a surface lighting light guide member 30 and a channel light guide member 26 having a plurality of channel elements 27 and a plurality of slit-like air clads 28.

The channel light guide member 26 is positioned laterally between the linear light guide member 10 and the surface lighting light guide member 30 to be in substantially contact with or connected with one another.

As shown in FIG. 28, the channel light guide member 26 may be composed of a plurality of the optical channel elements i.e. solid cores 27 (27-1, 27-2, . . . , and 27n, and 27-1', 27-2', . . . , and 27-n') and a plurality of air interposers i.e. air clads 28 (28-c, and 28-1, 28-2, . . . , and 28n, and 28-1', 28-2', . . . , and 28-n').

The optical channel elements 27 are sandwiched by the adjacent air interposers 28, in which each of the optical channel elements 27 are separated to isolate optically by the adjacent air interposers 28.

The optical channel elements 27 and the air interposers 28 are alternately aligned in substantially parallel in order to form a linear fiber optic array as a whole.

Since the optical core channel elements 21 with a relatively high refractive index n1 (n1>1) are interposed between the air interposers or air clads 22 with the refractive index n2 (n2=1) lower than that of the optical core channel elements 21 along the lengthwise direction of the linear fiber optic array i.e. the channel light guide 20, a plurality of independent optical waveguides or solid light pipes 21 (21-1, 21-2, . . . and 21n, and 21-1', 21-2', . . . and 21-n').

That independent optical waveguides or solid light pipes 21 are optically isolated to one another are formed in the channel light guide member or the linear fiber optic array 20.

It should be noted that, in this embodiment, each pitch "p'" between the adjacent optical channel elements 27 and each width "w1'" of the optical channel elements 27 are variably changed to increase in a stepwise or continuously fashion along the linear length of the channel light guide member 26 in accordance with, or in proportion to the distance from a center "c" of the channel light guide member 26 toward the end 26e and 26f thereof to form a gradation pattern, while each width "w2'" of substantially all the air interposers or air clads 28 is substantially equal to one another.

However, in the channel light guide member 20 of the first embodiment as shown in FIG. 7 that differs from the channel light guide member 26 of the fourth embodiment, each pitch "p" between the adjacent optical channel elements 27 and each width "w2" of substantially all the air interposers 28 are variably changed to decrease in a stepwise or continuously fashion along the linear length of the channel light guide member 20 in proportion to the distance from a center "c" of the channel light guide member 20 toward the end 20e and 20f thereof to form a gradation pattern, while each width "w1" of the optical channel elements 21 is substantially equal to one another.

The channel light guide member 26 in this embodiment differs from the channel light guide member 20 in the first embodiment in the constitution.

However, an effect obtained by both channel light guide members 26 and 20 is equivalent such that these gradation patterns produce a substantially uniform light output along the length of the channel light guide member 26 or 20.

In the fourth embodiment, the air interposers or air clads 28 may be filled with substantially transparent solid polymer material therein with a refractive index lower than the refractive index of the channel guide elements 27, as well as the refractive index of the solid clads 23 as shown in FIG. 8.

In the fourth embodiment, the opening of the triangular reflector 40 may be filled with substantially transparent solid material with a refractive index lower than the linear light guide 10, as well as the solid filler of the reflector 42 as shown in FIG. 8.

Fifth Embodiment (Embodiment: No. 5)

Before the fifth embodiment is described referring to FIG. 30A and FIG. 30B, the optical channel light guides 10 and 23 in the before-mentioned embodiments are described as bellow referring to FIG. 29.

Referring to FIG. 29 illustrating an enlarged partial perspective view, showing the optical channel light guides 10 and 23 in the embodiments described in the above.

As shown in FIG. 29, the optical channel light guides 20 and 23 are composed of the optical channel elements 21 and the interposers 22 or 25 alternately aligned to form the linear fiber optic array, in which each of the optical channel elements 21 and the interposers 22 or 25 have a substantially rectangular shape.

Each of the optical channel elements 21 to act as optical cores of light pipes is composed of a substantially rectangular light entrance or input side surface 21c, a substantially rectangular light exit or output side surface 21d opposed to and in parallel with the entrance or input side surface 21c, a substantially rectangular first side wall 21h, a substantially rectangular second side wall 21g opposed to and in parallel with the first side wall 21h and opposed and parallel top and bottom surfaces, in which an area size of the light entrance and exit side surfaces 21c and 21d is substantially equal.

Each of the air or solid interposers 22 or 25 to act as optical clads or claddings of light pipes is composed of a substantially rectangular first side surface 22c or 25c, a substantially rectangular second side surface 22d or 25d opposed to and in parallel with the first side surface 22c or 25c, the substantially rectangular first and second side walls and the substantially rectangular top and bottom surfaces, in which the first and second side walls are common portions with the first and second side walls 21g and 21h of the optical channel elements 21.

When light transmitted within the linear light guide member 10 or 12 (see e.g. FIG. 1 and FIG. 16) reaches the light entrance side surfaces 21c of the optical channel elements 21, the light enters interiors of the optical channel elements 21, the light reflects at least one time based on the TIR at the side walls 21g and 21h and/or the top and bottom surfaces and the light exits from the light exit side surfaces 21d.

When light transmitted within the linear light guide member 10 or 12 reaches the first side surfaces 22c or 25c of the clad interposers 22 or 25, the light with the angle more than the critical angle of the TIR is reflected at the first side surfaces 22c or 25c by the clad interposers 22 or 25 to return the linear light guide member 10 or 12 without entering the clad interposers 22 or 25, while the light with the angle less than the critical angle of the TIR enters interiors of the clad interposers 22 or 25 from the first side surfaces 22c or 25c and the light to exits from the second surfaces 22d or 25d.

Therefore, substantially all volume of the light reached the light entrance side surfaces 21c of the optical channel elements 21 can pass effectively through the optical channel elements 21 to exit from the light exit surface 21d, while a volume of the light reached the first side surfaces 22c or 25c of the clad interposers 22 or 25 partially passes through the clad interposers 22 or 25 to exit from the second side surface 22d or 25d and the rest volume of the light returns the linear light guide member to transmit therein.

Referring to FIG. 30A and FIG. 30B illustrating schematic perspective enlarged partial views showing the fifth embodiment having optical channel elements 21' and 21" having a substantially trapezoidal shape.

As shown in FIG. 30A, the optical channel element 21' to act as an optical core may be composed of a trapezoidal structure having a light entrance surface 21'c with a first surface area, a light exit surface 21'd with a second surface area larger than the first surface area, opposed to, parallel with the light entrance surface 21'c, a first side wall 21'g, a second side wall 21'h opposed to, nonparallel with the first side wall 21'g and opposed, parallel top and bottom surfaces.

The first and second side walls 21'g and 21'h have inclined, sloped or slanted surfaces so that an surface area of the light exit side surfaces 21'd becomes larger in size than the surface area of the light entrance side surfaces 21'c.

An interposer 22' to act as an optical clad or cladding is composed of a trapezoidal structure having a first side surface 22'c with a first surface area, a second side surface 22'd with a second surface area smaller than the first surface area, opposed inclined, sloped or slanted side walls with an inclined angle "ag" and top and bottom surfaces, and the interposer 22' is positioned between the walls 21'g and 21'h of the adjacent optical channel element 21'.

Since the surface area of the light exit surface 21'd of the optical channel element 21' is larger than the surface area of the light entrance surface 21'c of the optical channel element 21', light entered from the light entrance surface 21'c to an interior of the optical channel element 21' can exit from the light exit surface 21'd to expand its directivity with wide radiation angle.

Therefore, the surface lighting light guide 30 in this embodiment, can receive the light with a more uniform brightness or luminance along the length of the light receiving side surface 30c thereof, than the surface lighting light guide 30 in the before-mentioned embodiments.

As shown in FIG. 30B, the optical channel element 21" to act as an optical core may be composed of a trapezoidal structure having a light entrance surface 21"*c* with a first surface area, a light exit surface 21"*d* with an opposed second surface area larger than the first surface area, opposed inclined, wedge-like or slanted side walls 21"*e* and top and bottom surfaces.

An interposer 22" to act as an optical clad or cladding is composed of a triangular structure having a first surface 22"*c* with a surface area, opposed inclined, wedge-like or slanted side walls, top and bottom surfaces and a crossed line 22"*d* to connect the opposed inclined, wedge-like or slanted side walls with an inclined angle "ag", and the interposer 22" is positioned between the walls 21"*e* of the adjacent optical channel element 21".

In this embodiment, the light entrance side surfaces 21"*c* of the adjacent optical channel elements 21" are separated by the interposers 22", while plural optical channel elements 21" are connected to one another by a connection portion "cp" elongated from the light exit surface 21"*d* along a lengthwise direction in the light exit surface 21"*d*, therefore the channel light guide 20" or 23" form a linear continuous fiber optic channel integrated array, even if the interposers 22" are air clads.

Since the surface area of the light exit surface 21"*d* of the optical channel element 21" is larger than the surface area of the light entrance surface 21"*c* of the optical channel element 21', light entered from the light entrance surface 21"*c* to an interior of the optical channel element 21" can exit from the continuous light exit surface 21"*d* to expand its directivity with wide radiation angle so that the surface lighting light guide 30 can receive the light with a more uniform brightness or luminance along the light receiving side surface 30*c* thereof.

Sixth Embodiment (Embodiment: No. 6)

Referring to FIG. 31A and FIG. 31B illustrating a schematic enlarged partial top view showing the sixth embodiment showing surface illuminators having modified optical cores in optical channel light guides.

In FIG. 31A, a light guide unit 101A is composed of a surface lighting light guide 30, an optical channel light guide 20A and a linear light guide 10, in which three light guides 30, 20A and 10 are laterally connected in that order to form an integrated composite unit.

The optical channel light guide 20A is composed of a plurality of optical channel light guide elements (i.e. optical cores) 21A and a plurality interposers (i.e. optical clads) 22A having substantially transparent films 22Aa and air spacing 22Ab.

The optical clads 22A, i.e. the transparent films 22Aa and the air 22Ab have a refractive index lower than the refractive index of the optical cores 21A and the linear light guide 10.

The transparent clad films 22Aa are disposed on side walls of the optical cores 21A so that liquid polymer may be coated and hardened on the side walls of the optical cores 21A to form the transparent clad films 22Aa.

When light rays L1 or L3 traveled within the linear light guide 10 reach to an interface between the front surfaces or front surface portions of the linear light guide 10 and the optical clads 22A (i.e. the transparent solid clad films 22Aa or the air 22Ab), the light rays L1 indicated as continuous lines in FIG. 31A reflect at the interface because the light rays L1 have more than a critical angle "cr".

While the light rays L3 indicated as dotted lines in FIG. 31A pass through the interface because the light rays L3 have less than the critical angle "cr".

When light rays L2 or L4 traveled within the linear light guide 10 enter each interior of the cores 21A and reach to interfaces of the transparent solid clad films 22Aa, the light rays L2 indicated as continuous lines in FIG. 31A reflect at least one time at the interface to opposite direction within the cores 21A and exit from exit surfaces or exit surface portions of the cores 21A into the surface lighting light guide or surface lighting light guide portions 30 because the light rays L2 have a light incident angle more than a critical angle "cr".

While the light rays L4 indicated as dotted lines in FIG. 31A pass through the solid clad films 22Aa and the air spacing 22Ab because the light rays L4 have a light incident angle less than the critical angle "cr".

In FIG. 31B showing a modification of the light guide unit 101A, light reflecting metallic films 22Ba to act as optical clads may be substitute for the transparent solid polymer clad films 22Aa in FIG. 31A.

A light guide unit 101B is composed of a surface lighting light guide 30, an optical channel light guide 20B having optical cores 21B and optical clads 22B and a linear light guide 10, in which three light guides 30, 20B and 10 are laterally connected in that order to form an integrated composite unit.

The light reflecting metallic films 22Ba are disposed on side walls of the optical cores 21B so as to be formed selectively on side walls of the optical cores 21B preferably by a vacuum plating process or non-electrolyte plating process using light reflecting metals such as silver or aluminum.

When light rays L1 or L3 traveled within the linear light guide 10 reach to an interface between the front surfaces or front surface portions of the linear light guide 10 and the air clads 22Bb), the light rays L1 indicated as continuous lines in FIG. 31B reflect at the interface because the light rays L1 have a light incident angle more than a critical angle "cr".

While the light rays L3 indicated as dotted lines in FIG. 31B pass through the interface because the light rays L3 have a light incident angle less than the critical angle "cr" and the light rays L3 enter the air clads 22Bb and reflect at the light reflecting metallic films 22Ba to opposite direction.

When light rays L2 and L4 traveled within the linear light guide 10 enter each interior of the cores 21B and reach to the light reflecting metallic films 22Ba i.e. metallic clads, the light rays light rays L2 indicated as continuous lines in FIG. 31B and the light rays light rays L4 indicated as dotted lines in FIG. 31B reflect at least one time at the light reflecting metallic films 22Ba to opposite direction within the cores 21B and exit from exit surfaces or exit surface portions of the cores 21B into the surface lighting light guide or surface lighting light guide portions 30.

Therefore, he light rays with an arbitrary incident angle such as light rays L2 and L4 can transmit within the cores 21B without escaping from the side walls thereof and the light rays can exit from the light exit surface or exit surface portions thereof to enter the surface lighting light guide 30.

Seventh Embodiment (Embodiment: No. 7)

Referring to FIG. 32A and FIG. 32B illustrating a schematic enlarged partial top view showing the sixth embodiment showing surface illuminators having modified optical channel light guides.

In FIG. 32A, a light guide unit 101C is composed of a surface lighting light guide 30, an optical channel light guide 20C and a linear light guide 10, in which three light guides 30, 20C and 10 are laterally connected in that order to form an integrated composite unit.

The optical channel light guide 20C may be composed of a plurality of optical channel light guide elements (i.e. optical cores) 21C and a plurality of clads 22C having substantially transparent polymer films 22Ca and air 22Cb.

In this embodiment, the substantially transparent polymer films 22Ca may contain a plurality of light diffusing particles dispersed therein in which the light diffusing particles may be selected from transparent glass and polymer beads, gaseous bubbles having a refractive index different from the refractive index of the transparent films 22Ca, and light reflecting metallic particles such as aluminum or silver.

The clads 22C, i.e. the transparent films 22Ca and the air 22Cb have a refractive index lower than the refractive index of the optical cores 21C and the linear light guide 10.

The transparent films 22Ca with the light diffusing particles are disposed on side walls of the optical cores 21C so that transparent liquid polymer containing the light diffusing particles solid may be coated and hardened on the side walls of the optical cores 21A to form the transparent films 22Ca with the light diffusing particles.

When light rays L1 or L3 traveled within the linear light guide 10 reach to an interface between the front surfaces or front surface portions of the linear light guide 10 and the optical clads (i.e. the transparent solid clad films 22Ca or the air 22Cb), the light rays L1 indicated as continuous lines in FIG. 32A reflect at the interface because the light rays L1 have more than a critical angle "cr".

While the light rays L3 indicated as dotted lines in FIG. 32A pass through the interface because the light rays L3 have less than the critical angle "cr" and the light rays L3 entered the air clad 22Cb further advance to the solid clad films 22Ca with diffusing particles where the light rays L3 diffuse to become diffused light L5.

When light rays L2 or L4 traveled within the linear light guide 10 enter each interior of the cores 21C and reach to interfaces of the transparent films 22Ca with the light diffusing particles, the light rays L2 indicated as continuous lines in FIG. 32A reflect at least one time at the transparent films 22Ca to opposite direction within the cores 21C and exit from exit surfaces or exit surface portions of the cores 21C into the surface lighting light guide or surface lighting light guide portions 30 because the light rays L2 have more than a critical angle "cr", while the light rays L4 indicated as dotted lines in FIG. 32A pass through the solid clads 22Ca and the air 22Cb because the light rays L4 have less than the critical angle "cr".

In FIG. 32B showing a modification of the light guide unit 101A in FIG. 31A, a light guide unit 101D is composed of a surface lighting light guide 30, an optical channel light guide 20D and a linear light guide 10, in which three light guides 30, 20D and 10 are laterally connected in that order to form an integrated composite unit.

The optical channel light guide 20D may be composed of a plurality of optical channel light guide elements 21D (i.e. optical cores 21D) and a plurality of clads 22D having air spacing 22Db and substantially transparent first and second polymer films 22Da and 22Dc, in which the transparent first polymer films 22Da are disposed on side walls of the optical cores 21D and the transparent second polymer films 22Dc are disposed on portions of front side surface of the linear light guide 10 to face the air spacing 22Db where optical cores 21D are not present.

The clads 22D, i.e. the transparent polymer clad films 22Da and 22Dc and the air spacing 22Db have a refractive index lower than the refractive index of the optical cores 21D and the linear light guide 10.

The transparent polymer clad films 22Da and 22Dc may be made so that liquid polymer or monomer may be coated and hardened on the side walls of the optical cores 21D and the portions of front side surface of the linear light guide 10.

When light rays L1 or L3 traveled within the linear light guide 10 reach to an interface between the front surfaces or front surface portions of the linear light guide 10 and the transparent solid clad films 22Dc, the light rays L1 indicated as continuous lines in FIG. 32B reflect at the interface because the light rays L1 have more than a critical angle "cr", while the light rays L3 indicated as dotted lines in FIG. 32B pass through the transparent solid clad films 22Dc and enter the air spacing 22Db because the light rays L3 have less than the critical angle "cr".

cores 21D and reach to interfaces of the transparent solid clad films 22Da, the light rays L2 indicated as continuous lines in FIG. 32B reflect at least one time at the side walls of the cores 21D to opposite direction within the cores 21D and exit from exit surfaces or exit surface portions of the cores 21D into the surface lighting light guide or surface lighting light guide portions 30 because the light rays L2 have more than a critical angle "cr", while the light rays L4 indicated as dotted lines in FIG. 32B pass through the solid clads 22Da because the light rays L4 have less than the critical angle "cr" and the light rays enter the air spacing 22Db.

Eighth Embodiment (Embodiment: No. 8)

Referring to FIG. 33A and FIG. 33B illustrating a schematic enlarged partial top view showing the sixth embodiment showing surface illuminators having modified optical cores in optical channel light guides.

In FIG. 33A showing a modification of the light guide unit 101D in FIG. 32B, a light guide unit 101E is composed of a surface lighting light guide 30, an optical channel light guide 20E and a linear light guide 10, in which three light guides 30, 20E and 10 are laterally connected in that order to form an integrated composite unit.

The optical channel light guide 20E may be composed of a plurality of optical channel light guide elements 21E (or optical cores) and a plurality of clads 22E having air 22Eb and first and second light reflecting metallic films 22Ea and 22Ec, in which the first light reflecting metallic films 22Ea are disposed on side walls of the optical cores 21E and the second light reflecting metallic films 22Ec are disposed on portions of front side surface of the linear light guide 10 to face the air space 22Eb where optical cores 21E are not present.

The first and second light reflecting metallic films 22Ea and 22Ec may be preferably made by a non-electrolyte plating process or a vacuum plating process selectively on the side walls of the optical cores 21E and the portions of front side surface of the linear light guide 10 where the optical cores 21E are not present.

When light rays L1 or L3 traveled within the linear light guide 10 reach to the second light reflecting metallic films 22Ec, the light rays L1 with incident angle "ra" indicated as continuous lines in FIG. 33A and the light rays L3 indicated as dotted lines in FIG. 33A reflect at the second light reflecting metallic films 22Ec to opposite direction within the linear light guide 10.

When light rays L2 or L4 traveled within the linear light guide 10 enter each interior of the cores 21E and reach to the first light reflecting metallic films 22Ea, the light rays L2 with incident angle "ra" indicated as continuous lines in FIG. 33A and the light rays L4 indicated as dotted lines in FIG. 33A reflect at least one time at the first light reflecting metallic films 22Ea to opposite direction within the cores 21E and exit from exit surfaces or exit surface portions of the cores 21E into the surface lighting light guide or surface lighting light guide portions 30.

In this embodiment, as described in the above, it is noted that all the light rays L1 and L3 can be reflected by the second metallic films 22Ec within the linear light guide 10 and also all the light rays L2 and L4 can be reflected at least one time by the first metallic films 22Ea within the optical cores 21E to exit into the surface lighting light guide 30.

In FIG. 33B showing a combination of the light guide unit 101D in FIG. 32B and the light guide unit 101E in FIG. 33A, a light guide unit 101F is composed of a surface lighting light guide 30, an optical channel light guide 20F and a linear light guide 10, in which three light guides 30, 20F and 10 are laterally connected in that order to form an integrated composite unit.

The optical channel light guide 20F may be composed of a plurality of optical channel light guide elements 21F (or optical cores) and a plurality of optical clads 22F having air spacing 22Fb, substantially transparent first and second polymer films 22Fa and 22Fc and first and second light reflecting metallic films 22Fd and 22Fe.

The first polymer films 22Fa are disposed on side walls of the optical cores 21F, the second polymer films 22Fc are disposed on portions of front side surface of the linear light guide 10 to face the air spacing 22Fb where optical cores 21F are not present.

The first and second light reflecting metallic films 22Fd and 22Fe are disposed on the first and second polymer films 22Fa and 22Fc respectively in that order.

When light rays L1 or L3 traveled within the linear light guide 10 reach to the second polymer film 22Fc, the light rays L1 indicated as continuous lines in FIG. 33B reflect thereat because the light rays L1 have more than a critical angle "cr", while the light rays L3 indicated as dotted lines in FIG. 32B pass through the transparent second polymer film 22Fc because the light rays L3 have less than the critical angle "cr" and then the light rays L3 are reflected by the second light reflecting metallic films 22Fe to return toward the linear light guide 10.

When light rays L2 or L4 traveled within the linear light guide 10 enter each interior of the cores 21F and reach to interfaces with the transparent solid clad films 22Fa, the light rays L2 indicated as continuous lines in FIG. 33B reflect at least one time at the side walls of the cores 21D to opposite direction within the cores 21F and exit from exit surfaces or exit surface portions of the cores 21F into the surface lighting light guide or surface lighting light guide portions 30 because the light rays L2 have an incident angle more than a critical angle "cr", while the light rays L4 indicated as dotted lines in FIG. 33B pass through the solid clads 22Fa because the light rays L4 have an incident angle less than the critical angle "cr" and the light rays L4 are reflected by the first light reflecting metallic films 22Fd to return within the cores 21F for exiting from the light exit surfaces of the cores 21F.

Back to FIG. 31B, FIG. 33A and FIG. 33B, the metallic films 22Ba in FIG. 31B, 22Ea and 22Ec in FIG. 33A and 22Fd and 22Fe in FIG. 33B may be partial reflective mirror or half mirror films instead, in which the partial reflective mirror or half mirror films have a desired reflectivity and transmittance that reflects and transmits light and the partial reflective mirror or half mirror thin films may be formed by a vacuum deposition process using e.g. Al, Ag, Cr and Au and a thickness of the partial reflective mirror or half mirror thin film may be from 0.001·m to 1·m.

Ninth Embodiment (Embodiment: No. 9)

Referring to FIG. 34 illustrating a schematic exploded top view showing the ninth embodiment of the present invention, a surface illuminator is composed of a light guide unit 122 having a linear light guide member 10A, a channel light guide member 29 and a surface lighting light guide 30, and a plurality of LEDs 200-1, . . . , and 200n for point sources.

The linear light guide member 10A is composed of a substantially transparent plate-like linear member having a plurality of light guide portions 10-1, . . . , and 10-n (where "n" is natural number) connected in series in a lengthwise direction thereof and a plurality of a substantially triangular openings to act as reflectors 40-1, . . . , 40n (where "n" is natural number) having opposed inclined reflecting side surfaces with substantially a letter "v" shape, in which the reflectors 40-1, . . . , and 40n are disposed within each center of the light guide portions 10-1, . . . , and 10-n.

portions 20-1, . . . , and 20-n (n: natural number) connected in series in a lengthwise direction and each of the channel light guide portions 20-1, . . . , and 20-n is composed of channel light guide elements 21 having substantially transparent solid optical core members with a comparatively high refractive index and a plurality of air clads 22 having with a lower refractive index than the refractive index of the channel light guide elements 21, in which the channel light guide elements 21 and the air clads 22 are alternately aligned to form a linear array.

Each of the LEDs 200-1, . . . , and 200-n (n: natural number) is positioned in contact with, adjacent to or buried in the linear light guide member 13 to face the opposed inclined surfaces of the reflector 40-1, . . . , and 40-n.

Each of the light guide portions 10-1, . . . , and 10-n with the reflectors 40-1, . . . , and 40n may be the same structure and configuration as the linear light guide member 10 in the first embodiment as shown in e.g. FIG. 1 and FIG. 2.

The surface lighting light guide 30 may have a uniform thickness similarly to the surface lighting light guide 30 as shown in e.g. FIG. 1 or may have a variable thickness similarly to the surface lighting light guide 32 as shown in FIG. 24.

The surface illuminator 122 (200-1 . . . and 200-n) in this embodiment can produce a surface lighting with a larger size and a brighter surface luminance than that of the surface illuminator (100 and 200) in the first embodiment.

Tenth Embodiment (Embodiment: No. 10)

Figure 36:
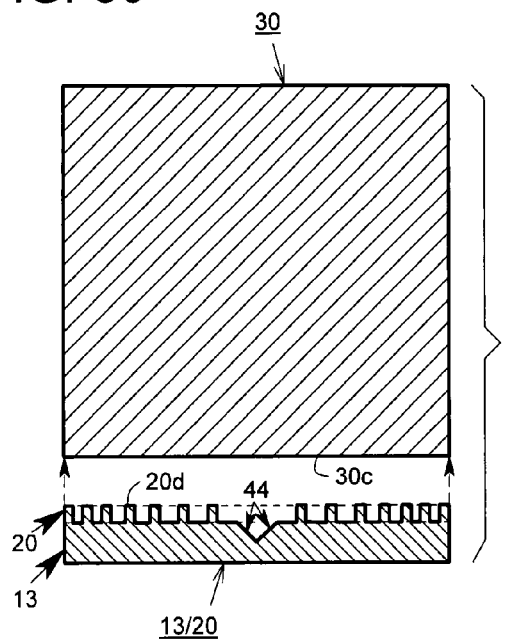
FIG. 36 is a schematic top view showing the tenth embodiment of the present invention, showing a first type of a light guide unit 123A.
Figure 37:
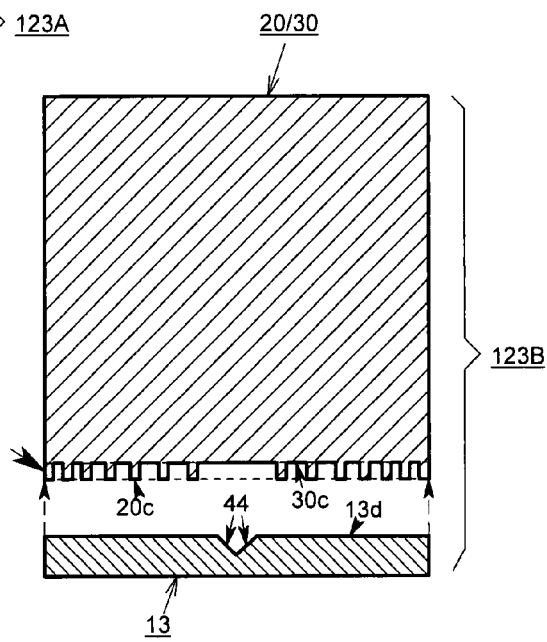
FIG. 37 is a schematic top view showing the tenth embodiment of the present invention, showing a second type of a light guide unit 123B.
Figure 38:
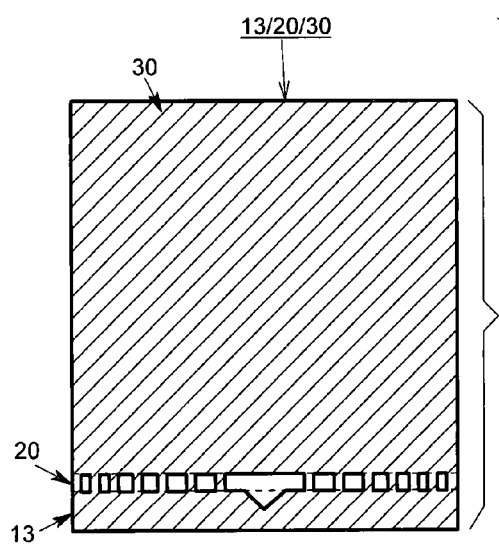
FIG. 38 is a schematic top view showing the tenth embodiment of the present invention, showing a third type of a light guide unit 123C.

Reference is made to FIG. 35 through FIG. 38 showing a tenth embodiment of the present invention, in which FIG. 35 is a schematic exploded top view showing the tenth embodiment of the present invention, showing a modification of the reflector shown in e.g. FIG. 1 in the first embodiment and FIG. 36 through FIG. 38 is schematic top views showing three types of configuration of the tenth embodiment.

In FIG. 35, a surface illuminator is composed of a substantially transparent light guide unit 123 and LED/LEDs 200, in which the light guide unit 123 is composed of a linear light guide member 13, a channel light guide member 20 having optical channel light guide elements i.e. solid cores 21 and air interposers 22 i.e. air clads and a surface lighting light guide member 30.

The linear light guide member 13 is composed of opposed major surfaces, opposed rear and front side surfaces 13c and 13d and opposed end surfaces 13e and 13f.

The rear side surface 13*d* has opposed reflecting side surfaces 44*a* and 44*b* therein near a center thereof, in which the opposed reflecting surfaces 44*a* and 44*b* act as a reflector or reflecting portion 44 forming a substantially "V" shape of a letter or character (as indicated to be surrounded by a circle with a dotted circular line in FIG. 35).

The front side surface 13*c* has a light receiving portion near a center thereof, where a LED 200 is positioned in contact therewith or adjacent thereto so as to face the opposed reflecting surfaces 44*a* and 44*b* of the reflector 44 through the linear light guide member 13, in which an optical axis of LED 200 coincides a cross point of the opposed surfaces 44*a* and 44*b*.

The channel light guide member 20 is composed of optical channel elements i.e. solid cores 21 (21-1, • 21-*n*, and 21-1', •, 21-*n*') ("n" and "n'": natural number) and air interposers i.e. air clads 22 (22-*c*, 22-1, •, 22-*n* and 22-1', •, 22-*n*') ("n" and "n'": natural number).

Each of the optical channel elements 21 may have a substantially equal width and substantially equal light input side surface area and each of the interposers 22 may have a substantially variable width.

The optical channel elements 21 and the air interposers 22 are alternately aligned in parallel to one another so as to form a linear fiber optic channel array, in which the optical channel elements 21 are distributed variably in a pitch therebetween in a stepwise or continuous manner to form a gradation pattern in such a manner that a distributed density of the channel elements 21 increases from a center of the channel light guide member 20 toward both of the end surfaces 20*e* and 20*f* thereof as shown in FIG. 35.

Therefore, the light emitted from LED 200 enters the linear light guide member or portion 13, reflects at the reflector 40, advances to substantially opposed lateral directions within the linear light guide member or portion 13, enters the channel light guide member or portion 20 and then the light can exit therefrom with a substantially uniform luminance along the length thereof.

Thereby, a surface lighting with substantially uniform surface luminance or brightness can be produced over substantially entire areas of the surface lighting surface 30*a* in the surface lighting light guide member or portion 30.

As shown in FIG. 36, a first type of the light guide unit 123A is composed of the surface lighting light guide member 30 and a composite light guide member 13/20 of the linear light guide member or portion 13 having the reflector 44 and the channel light guide member or portion 20, in which the linear light guide member or portion 13 and the channel light guide member or portion 20 are connected and integrated to form a single unit.

The composite light guide member 13/20 is disposed relative to the surface lighting light guide member 30 in such a manner that the light exit side surface 20*d* of the channel light guide portion 20 of the composite light guide member 13/20 may be positioned in contact with the light receiving side surface or light input side surface 30*c* of the surface lighting light guide member 30.

As shown in FIG. 37, a second type of the light guide unit 123B is composed of the linear light guide member 13 and a composite light guide member 20/30 of the surface lighting light guide member 30 and the channel light guide member 20, in which the surface lighting light guide member 30 and the channel light guide member 20 are connected and integrated to form a single unit.

The composite light guide member 20/30 may be disposed relative to the linear light guide member 13 in such a manner that the light entrance side surface 20*c* of the channel light guide portion 20 in the composite light guide member 13/20 may be positioned in contact with the front side surface 13*d* of the linear light guide member 13.

As shown in FIG. 38, a third type of the light guide unit 123C is composed of a single composite member 13/20/30, in which the surface lighting light guide member or portion 30, the channel light guide member or portion 20 and the linear light guide member or portion 13 are connected and completely integrated to form a single unit.

Eleventh Embodiment (Embodiment: No. 11)

Figure 39:
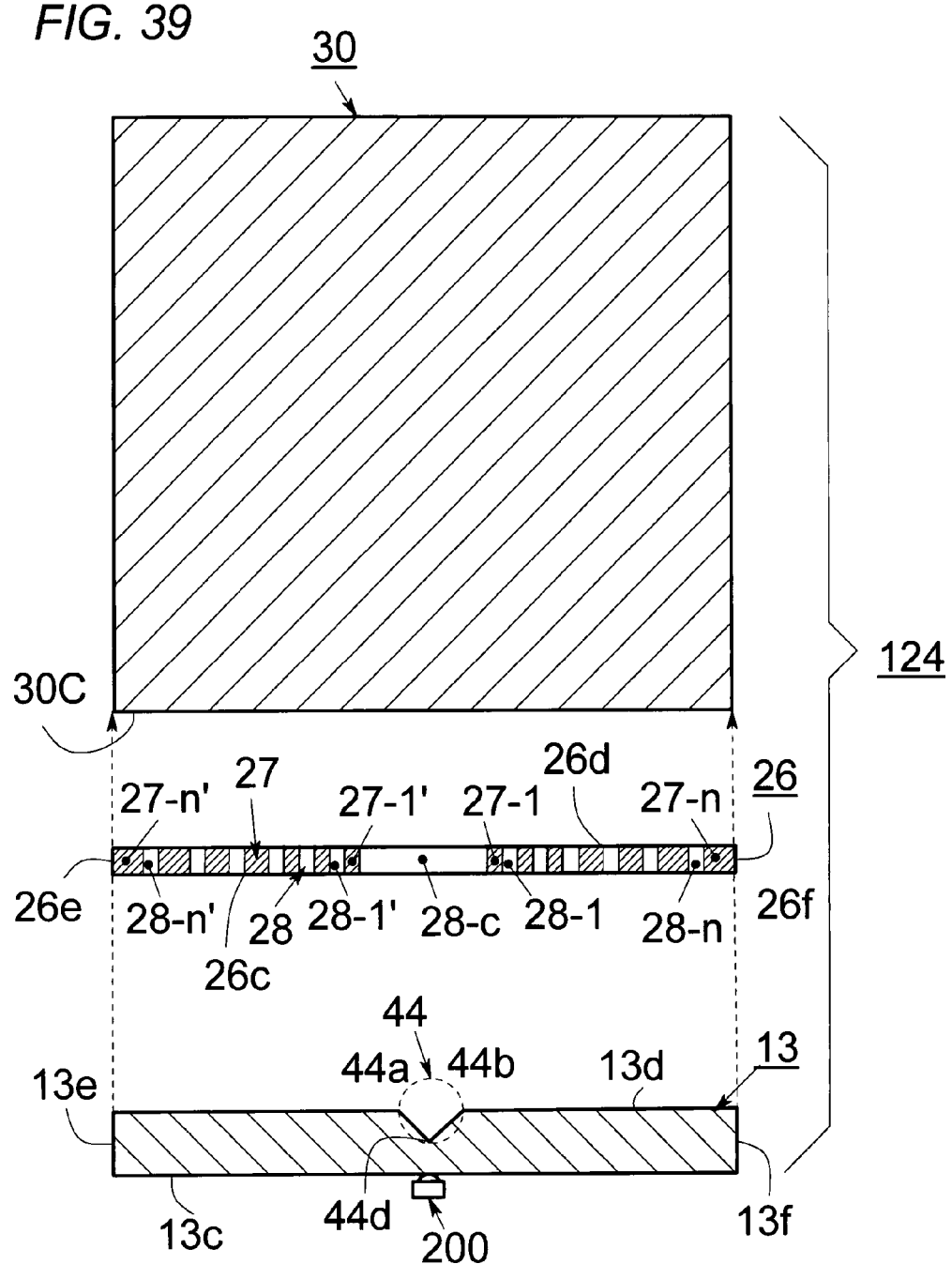
FIG. 39 is a schematic exploded top view showing an eleventh embodiment of the present invention.
Figure 40:
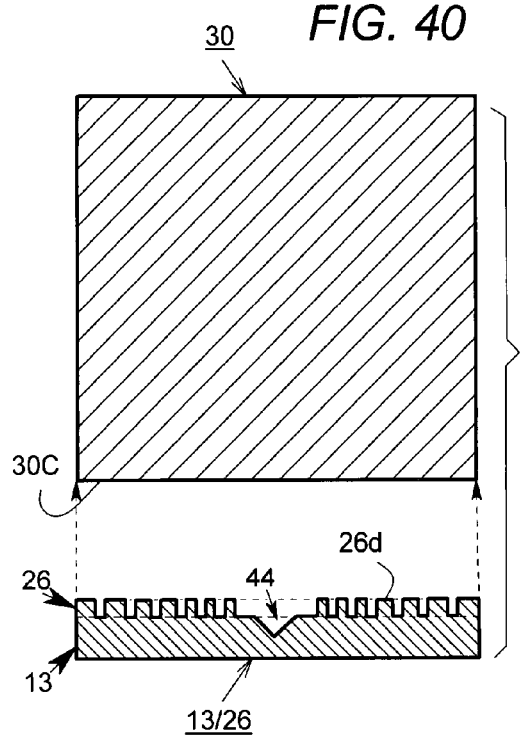
FIG. 40 is a schematic top view showing the eleventh embodiment of the present invention showing a first type of a light guide unit 124A.
Figure 41:
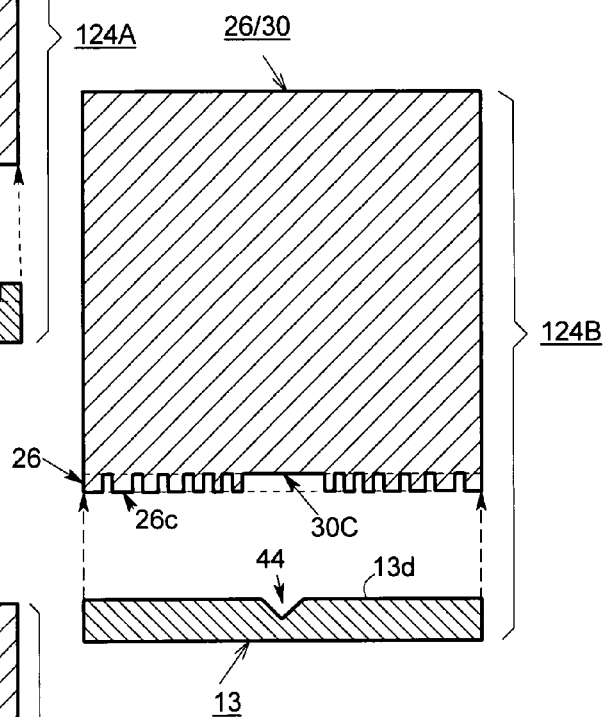
FIG. 41 is a schematic top view showing the eleventh embodiment of the present invention showing a second type of a light guide unit 124B.
Figure 42:
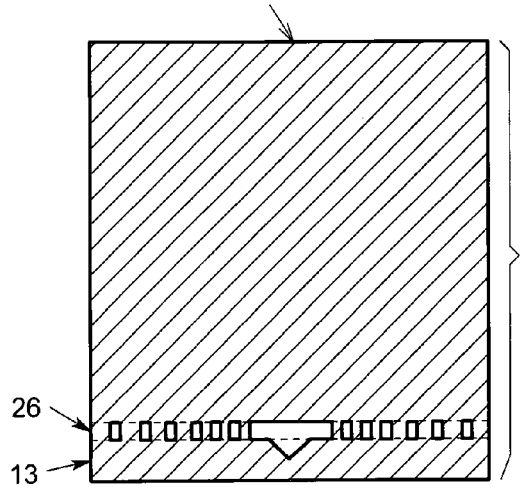
FIG. 42 is a schematic top view showing the eleventh embodiment of the present invention showing a third type of a light guide unit 124C.

Reference is made to FIG. 39 through FIG. 42 showing an eleventh embodiment of the present invention, in which FIG. 39 is a schematic exploded top view and FIG. 40, FIG. 41 and FIG. 42 are schematic top views showing three types of light guide units.

In FIG. 39, a surface illuminator of the eleventh embodiment is composed of a substantially transparent light guide unit 124 and a LED 200, in which the light guide unit 124 is composed of a linear light guide member 13, a channel light guide member 26 having optical channel elements (i.e. solid cores) 27 and air interposers (i.e. air clads) 28 and a surface lighting light guide member 30.

The linear light guide member 13 is composed of at least opposed major surfaces, opposed rear and front surfaces 13*c* and 13*d* and opposed end surfaces 13*e* and 13*f*.

The front side surface 13*d* includes opposed reflecting side surfaces 44*a* and 44*b* thereon near a center thereof, in which the opposed reflecting side surfaces 44*a* and 44*b* act as a reflector or reflecting portion 44 forming a substantially "V" shape of a letter or character (as indicated to be surrounded by a circle with a circular dotted line FIG. 39).

The rear side surface 13*c* includes light receiving portion near a center thereof, where LED 200 is positioned in contact therewith or adjacent thereto so as to face the opposed reflecting surfaces 44*a* and 44*b* of the reflector 44 through the linear light guide member 13, in which an optical axis of LED 200 coincides a cross point of the opposed surfaces 44*a* and 44*b*.

The channel light guide member 26 is composed of optical channel elements i.e. solid cores 27 (27-1, . . . , 27-*n*, and 27-1', . . . , 27-*n*') ("n" and "n'": natural number) and air interposers i.e. air clads 28 (28-*c*, 28-1, . . . , 28-*n* and 28-1', . . . , 28-*n*') ("n" and "n'": natural number).

Each of the optical channel elements 27 may be composed of a variable width, while each of the interposers 28 may be composed of a substantially equal width and equal light input surface area except for the center interposer 28-*c*.

The optical channel elements 27 and the air interposers 28 are alternately aligned in parallel to one another so as to form a linear fiber optic channel array, in which the optical channel elements 27 are distributed variably in a pitch therebetween.

Each width of the optical channel elements 27 variably increases in a stepwise or continuously fashion along the linear length of the channel light guide member 26 in proportion to the distance from a center of the channel light guide member 26 toward the end surfaces 26*e* and 26*f* thereof to form a gradation pattern, while each width of the air interposers 28 is substantially equal to one another.

The optical channel elements 27 and the air interposers 28 are alternately aligned in parallel to one another so as to form a linear fiber optic channel array, in which the optical channel elements 27 are distributed variably in a pitch therebetween.

Each width of the optical channel elements 27 variably increases in a stepwise or continuously fashion along the linear length of the channel light guide member 26 in accordance with the distance from a center of the channel light guide member 26 toward the end surfaces 26*e* and 26*f* thereof to form a gradation pattern, while each width of the air interposers 28 is substantially equal to one another except for the center interposer 28-*c*.

Therefore, the light emitted from LED 200 enters the linear light guide member or portion 13, reflects at the reflector 40, advances to substantially opposed lateral directions within the linear light guide member or portion 13, enters the channel light guide member or portion 26 and then the light can exit therefrom with a substantially uniform luminance along the length thereof.

Thereby, a surface lighting with substantially uniform surface luminance or brightness can be produced over substantially entire areas of the surface lighting surface 30*a* in the surface lighting light guide member or portion 30.

As shown in FIG. 40, a first type of the light guide unit 124A is composed of the surface lighting light guide member 30 and a composite light guide member 13/26 of the linear light guide member or portion 13 having the reflector 44 and the channel light guide member or portion 26, in which the linear light guide member or portion 13 and the channel light guide member or portion 26 are connected and integrated to form a single unit.

The composite light guide member 13/26 may be disposed relative to the surface lighting light guide member 30 in such a manner that the light exit side surface 26*d* of the composite light guide member 13/26 may be positioned in contact with the light receiving side surface or light input side surface 30*c* of the surface lighting light guide member 30.

As shown in FIG. 41, a second type of the light guide unit 124B is composed of the linear light guide member 13 having the reflector 44 and a composite light guide member 26/30 of the surface lighting light guide member 30 and the channel light guide member 26, in which the surface lighting light guide member 30 and the channel light guide member 26 are connected and integrated to form a single unit.

The composite light guide member 26/30 may be disposed relative to the linear light guide member 13 in such a manner that the light entrance side surface 26*c* of the channel light guide portion 26 in the composite light guide member 26/30 may be positioned in contact with the front side surface 13*d* of the linear light guide member 13.

As shown in FIG. 42, a third type of the light guide unit 124C is composed of a single composite member 13/26/30, in which the surface lighting light guide member or portion 30, the channel light guide member or portion 26 and the linear light guide member or portion 13 are connected and completely integrated to form a single unit.

Reference is made to FIG. 43 through FIG. 48, in which these Figures are schematic partial enlarged top views showing several modifications of the reflectors 40 in e.g. FIG. 1, FIG. 5 and the reflectors 44 in e.g. FIG. 35 to FIG. 38.

Figure 43:
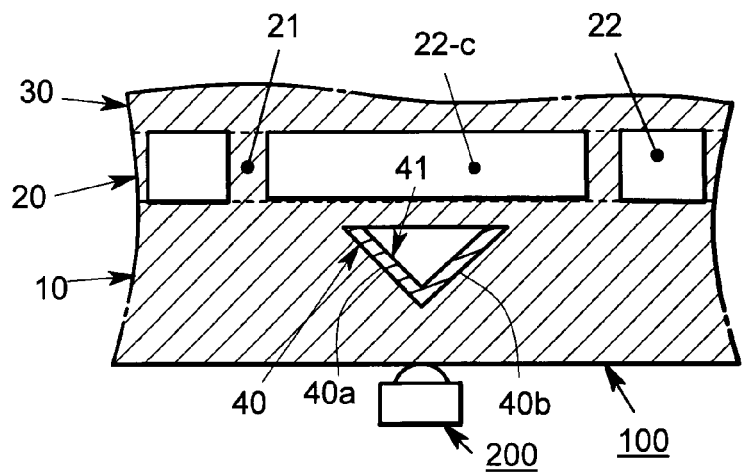
FIG. 43 through FIG. 48 are schematic partial enlarged top views showing several modifications of the reflectors.

Referring to FIG. 43, a surface illuminator is composed of a light guide unit 100 and a LED, in which the light guide unit 100 is composed of a surface lighting light guide 30, optical channel light guide 20 having solid cores 21 and air clads 22 and 22*c* and a linear light guide 10 having a substantially triangular reflector 40 being laterally connected to one another in that order to form a single integrated unit.

The substantially triangular reflector 40 is composed of a substantially rectangular opening having opposed side surfaces 40*a* and 40*b* with "V" shaped configuration and a substantially transparent polymer film or layer 41 disposed on the opposed side surfaces 40*a* and 40*b*, in which a refractive index of the substantially transparent polymer film or layer 41 is lower than the refractive index of the linear light guide 10.

A light diffusing film or layer may be substituted for the substantially transparent polymer film or layer 41, in which the light diffusing film or layer is composed of the substantially transparent film or layer 41 and a plurality of light diffusing particles dispersed therein.

When light from LED 200 reaches the light diffusing film or layer, the light incident to the opposed side surfaces 40*a* and 40*b* with an incident angle lower than a critical angle of the TIR is diffused by the light diffusing particles therein to advance with wide spread angle toward an upward direction or toward the center air interposer 22-*c*, while the light opposed side surfaces 40*a* and 40*b* with an incident angle more than the critical angle is reflected by the light diffusing film or layer to advance laterally within the linear light guide member or portion 10.

A light reflecting, mirror, partial reflective mirror or half-mirror film may be substituted for the substantially transparent polymer film or layer 41, in which the light reflecting, mirror or half-mirror film may be composed of light reflecting metallic thin film using reflecting metal such as silver, aluminum or nickel that is selectively formed only on the opposed reflecting side surfaces 40*a* and 40*b* by non-electrolyte plating, vacuum evaporation (i.e. vacuum metallization) or sputtering process.

The light reflecting, mirror, partial reflective mirror or half-mirror film controls the light incident thereto, in which the light reflects at the film to lateral directions within the linear light guide member 10 and/or the light passes through the film to an upward direction in accordance with the reflectance and/or transmittance of the film.

Figure 44:
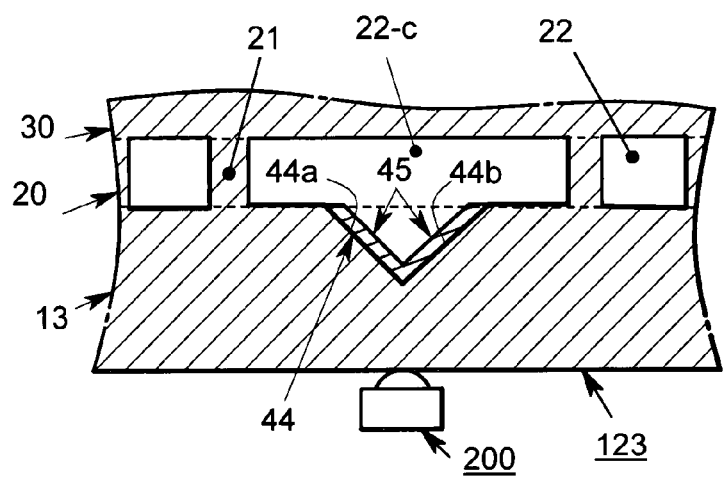

Referring to FIG. 44, a surface illuminator is composed of a light guide unit 123 and a LED 200, in which the light guide unit 123 is composed of a surface lighting light guide 30, optical channel light guide 20 having solid cores 21 and air clads 22 and 22*c* and a linear light guide 13 having a substantially "V" shaped reflector 44 being laterally connected to one another in that order to form a single integrated unit.

The substantially "V" shaped reflector 44 is composed of opposed side surfaces 44*a* and 44*b* with "V" shaped configuration and a substantially transparent polymer film or layer 45 disposed on the opposed side surfaces 44*a* and 44*b*, in which a refractive index of the substantially transparent polymer film or layer 45 is lower than the refractive index of the linear light guide 13.

A light diffusing film or layer may be substituted for the substantially transparent polymer film or layer 45, in which the light diffusing film or layer is composed of the substantially transparent film or layer 45 and a plurality of light diffusing particles dispersed therein.

When light from LED 200 reaches the light diffusing film or layer, the light with an incident angle lower than a critical angle of the TIR is diffused by the light diffusing particles therein to advance with wide spread angle toward an upward direction or toward the center air interposer 22-*c*, while the light with an incident angle more than the critical angle is reflected by the light diffusing film or layer to advance laterally within the linear light guide member or portion 13.

A light reflecting, mirror, partial reflective mirror or half-mirror film may be substituted for the substantially transparent polymer film 45, in which the light reflecting, mirror, partial reflective mirror or half-mirror film 45 may be composed of light reflecting metallic thin film using reflecting metal such as silver, aluminum or nickel that is selectively formed only on the opposed side surfaces 44*a* and 44*b* by non-electrolyte plating, vacuum evaporation (i.e. vacuum metallization) or sputtering process.

The light reflecting, mirror, partial reflective mirror or half-mirror film controls the light incident thereto, in which the light reflects at the film to advance toward lateral directions within the linear light guide member 13 and/or the light passes through the film to advance toward an upward direction or toward the center air interposer 22c in accordance with the reflectance and/or transmittance of the film.

Figure 45:
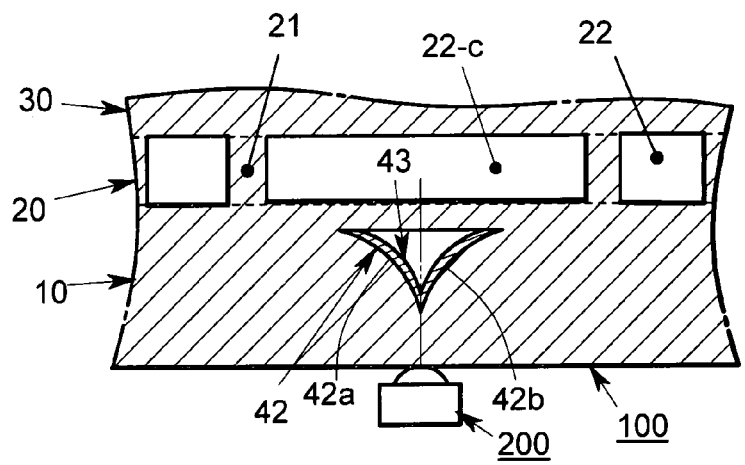

Referring to FIG. 45, a surface illuminator is composed of a light guide unit 100 and a LED 200, in which the light guide unit 100 is composed of a surface lighting light guide 30, optical channel light guide 20 having solid cores 21 and air clads 22 and 22c and a linear light guide 10 having a substantially triangular reflector 42 being laterally connected to one another in that order to form a single integrated unit, in which this substantially triangular reflector 42 is a modification of substantially triangular reflector 40 in FIG. 43.

The substantially triangular reflector 44 may be composed of opposed side surfaces 42a and 42b with substantially parabolic or curved shape and an optional light adjusting film 43 disposed on the substantially parabolic or curved, opposed side surfaces 42a and 42b.

The optional light adjusting film 43 may be selected from a substantially transparent polymer film with a refractive index lower than the refractive index of the linear light guide 10, the substantially transparent polymer film containing light diffusing particles therein or a light reflecting/mirror/ partial reflective mirror/half mirror film.

Figure 46:
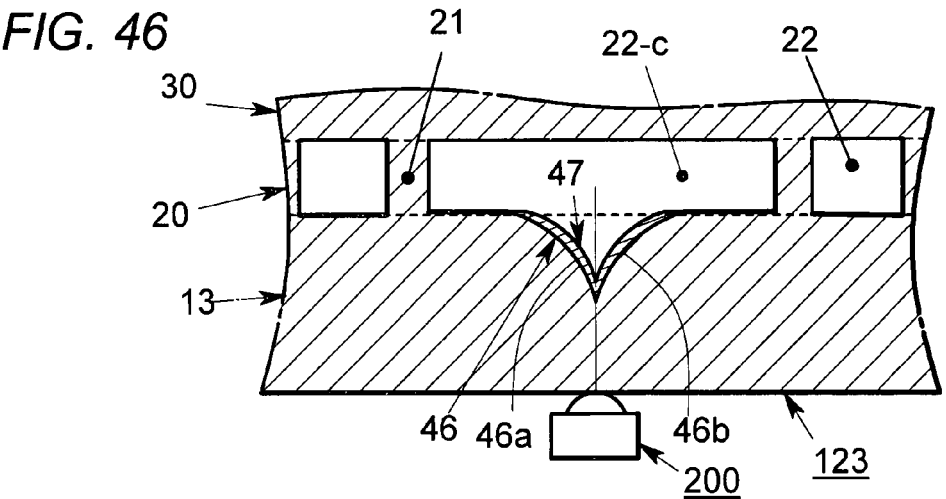

Referring to FIG. 46, a surface illuminator is composed of a light guide unit 123 and a LED 200, in which the light guide unit 123 is composed of a surface lighting light guide 30, optical channel light guide 20 having solid cores 21 and air clads 22 and 22c and a linear light guide 13 having a substantially "V" shaped reflector 46 being laterally connected to one another in that order to form a single integrated unit.

The substantially triangular reflector 46 may be composed of opposed side surfaces 46a and 46b with substantially parabolic or curved shape and an optional light adjusting film 47 disposed on the substantially parabolic or curved, opposed side surfaces 46a and 46b.

The optional light adjusting film 47 may be selected from a substantially transparent polymer film with a refractive index lower than the refractive index of the linear light guide 13, the substantially transparent polymer film containing light diffusing particles therein and a light reflecting, mirror, partial reflective mirror or half-mirror film with a predetermined reflectance and/or transmittance.

Figure 47:
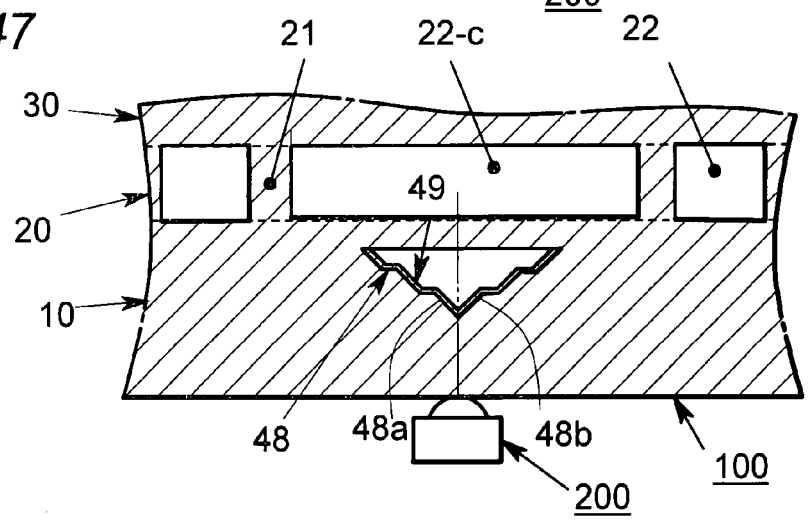

Referring to FIG. 47, a surface illuminator is composed of a light guide unit 100 and a LED 200, in which the light guide unit 100 is composed of a surface lighting light guide 30, optical channel light guide 20 having solid cores 21 and air clads 22 and 22c and a linear light guide 10 having a substantially triangular reflector 48 being laterally connected to one another in that order to form a single integrated unit.

Figure 48:
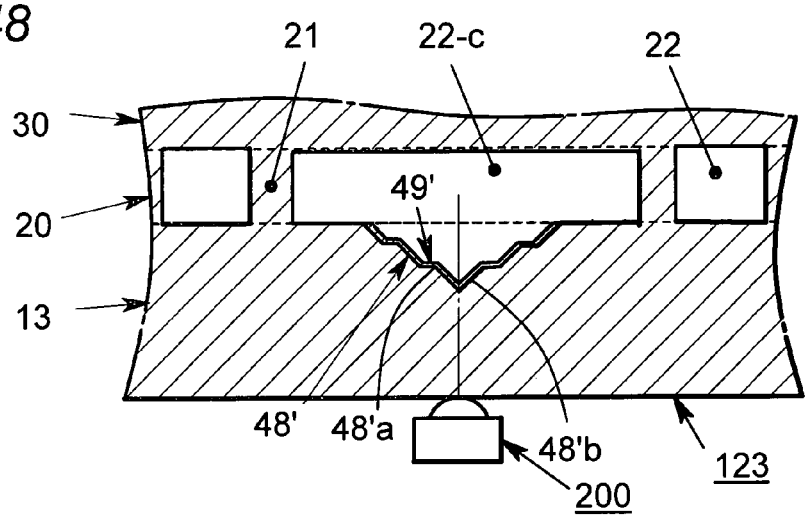

Referring to FIG. 48, a surface illuminator is composed of a light guide unit 123 and a LED 200, in which the light guide unit 123 is composed of a surface lighting light guide 30, optical channel light guide 20 having solid cores 21 and air clads 22 and 22c and a linear light guide 13 having a substantially "V" shaped reflector 48' being laterally connected to one another in that order to form a single integrated unit.

In FIG. 47 and FIG. 48, a reflector 48 or 48' may be composed of opposed side surfaces (48a and 48b) or (48'a and 48'b) having substantially "V" shaped configuration and an optional light adjusting film 49 or 49' disposed entirely or partially on the opposed side surfaces (48a and 48b) or (48'a and 48'b).

The optional light adjusting film 49 or 49' may be selected from a substantially transparent polymer film with a refractive index lower than the refractive index of the linear light guide 10 or 13, the substantially transparent polymer film containing light diffusing particles therein and a light reflecting, mirror or half-mirror film with a predetermined reflectance and/or transmittance.

The substantially "V" shaped side surfaces (48a and 48b) or (48'a and 48'b) are composed of inclined side surfaces and substantially horizontal side surfaces to connect the adjacent inclined side surfaces so as to form a stepwise configuration as a whole.

When light emitting from LED 200 reaches the substantially "V" shaped side surfaces (48a and 48b) or (48'a and 48'b), the light incident to the inclined faces reflects mostly toward substantially lateral direction within the linear light guide member 10 or 13, while light incident to the substantially horizontal faces passes mostly therefrom to the central air clad 22c or to the light adjusting film 49 or 49'.

Twelfth Embodiment (Embodiment: No. 12)

Figure 49:
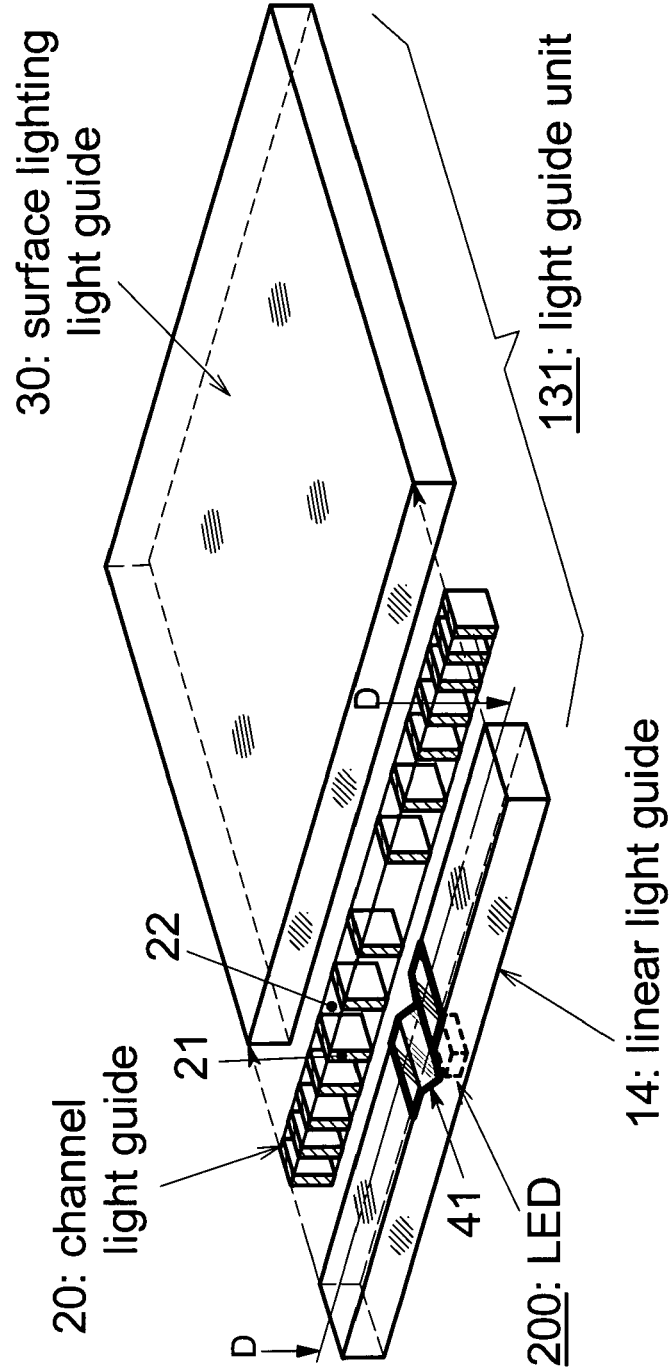
FIG. 49 is a schematic exploded perspective view showing a twelfth embodiment of the present invention.
Figure 50A:
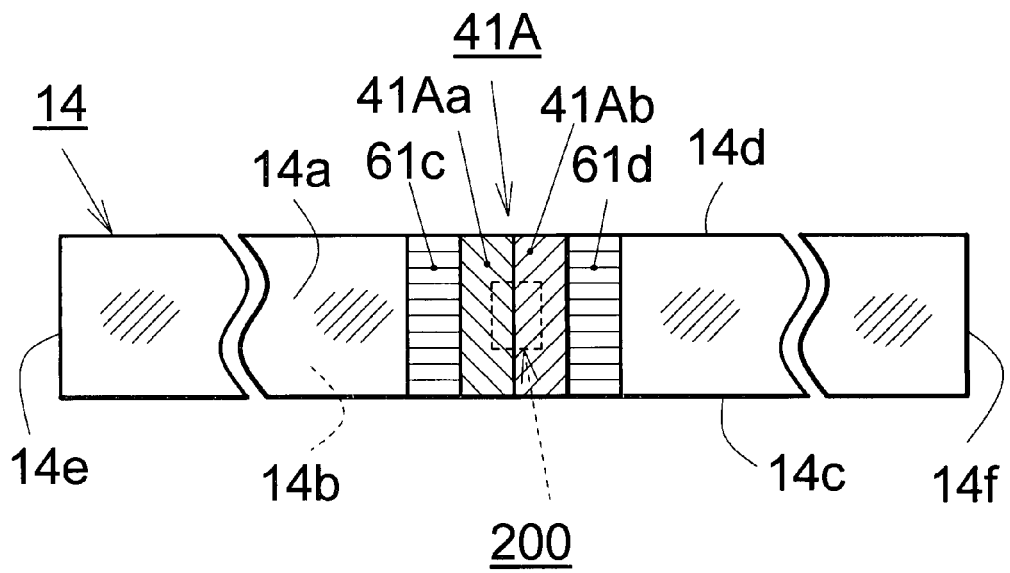
FIG. 50A is a schematic top view showing a linear light guide member 14 in FIG. 49.
Figure 50B:
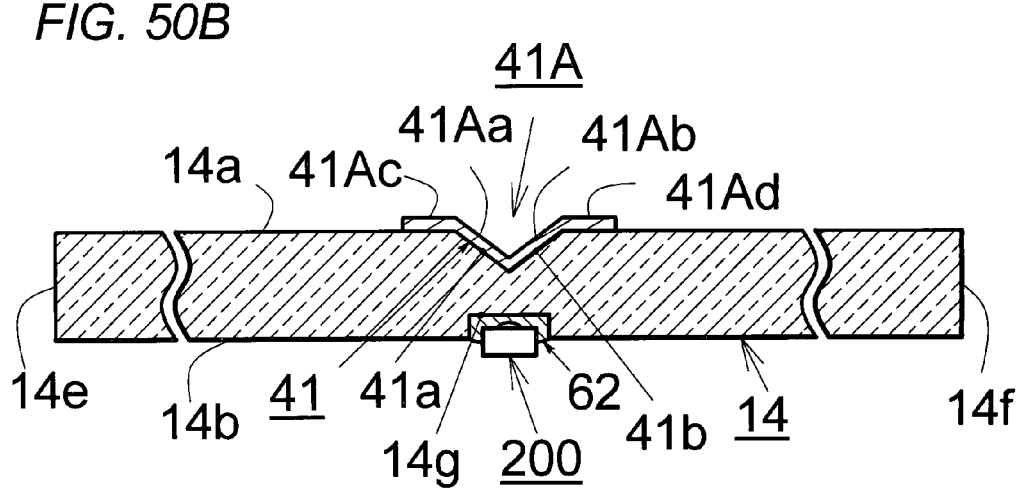
FIG. 50B is a schematic cross sectional view showing the linear light guide member 14 taken along the line D-D in FIG. 49.

Reference is made to FIG. 49, FIG. 50A and FIG. 50B showing a twelfth embodiment of the present invention, in which FIG. 49 is a schematic exploded perspective view, FIG. 50A is a schematic top view showing a linear light guide member 14 and FIG. 50B is a schematic cross sectional view showing the linear light guide member 14 taken along the line D-D in FIG. 49.

As shown in FIG. 49, a surface illuminator of this embodiment is composed of a light guide unit 131 having a linear light guide member 14, a channel light guide member 20 and a surface lighting light guide member 30, and a LED 200.

The channel light guide member 20 is composed of a plurality of optical channel elements i.e. solid cores 21 and a plurality of air interposers i.e. air clads 22 disposed therebetween, in which the optical channel elements 21 form a linear array, as described in detail hereinbefore.

The channel light guide member 20 is composed of a plurality of optical channel elements i.e. solid cores 21 and a plurality of air interposers i.e. air clads 22 laterally disposed therebetween to form a fiber optic linear array, as described in detail hereinbefore.

As shown in FIG. 49, FIG. 50A and FIG. 50B, the linear light guide member 14 is composed of a substantially transparent linear light guide member having opposed major surfaces 14a and 14b elongated linearly, opposed side surfaces 14c and 14d elongated linearly and opposed end surfaces 14e and 14f.

The major surface i.e. top surface 14a is further composed of substantially planer or flat dual surfaces and inclined (i.e. wedge-like or slanted) opposed surface 60 (60a and 60b) positioned therebetween near a center of the major surface 14a, in which the opposed surfaces 60 (60a and 60b) is acting as the reflector 60 having a substantially "V" shaped configuration.

A light reflecting film or layer 61 (61a, 61b, 61c and 61d) may be preferably formed on the inclined opposed surfaces 60 (60a and 60b) and portions of the planer surfaces extended from the inclined opposed surfaces 60, in which the reflecting film or layer 61 may be made of reflecting metal such vacuum evaporated silver or aluminum.

The linear light guide member 14 may have a grooved portion 14g (i.e. cavity, housing space or room) disposed on a center of the major surface i.e. bottom surface 14b so as to house at least light emitting portion of the LED 200.

The LED 200 may be adhered to the grooved portion 14g by a substantially transparent polymer adhesive 62 such as substantially transparent epoxy resin for optical adhesive purpose, in which the substantially transparent polymer adhesive 62 may preferably have a refractive index similar to or the same as the refractive index of the linear light guide member 14.

Thirteenth Embodiment (Embodiment: No. 13)

Figure 52:
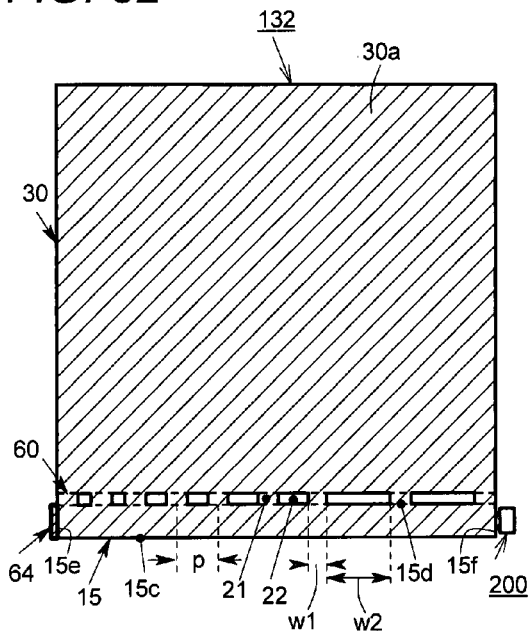
FIG. 52 is a schematic top view showing the thirteenth embodiment of the present invention.

Reference is made to FIG. 51 and FIG. 52 showing a thirteenth embodiment of the present invention, in which FIG. 51 is a schematic exploded perspective view and FIG. 52 is a schematic top view.

Referring to FIG. 51 and FIG. 52, a surface illuminator of this embodiment is composed of a light guide unit 132 and a LED 200, in which the light guide unit 132 is composed of a linear light guide member 15, a channel light guide member 60 and a surface lighting light guide member 30.

The linear light guide member 15 is composed of a substantially transparent linear light guide member having opposed major surfaces 15a and 15b elongated linearly, opposed side surfaces 15c and 15d elongated linearly and opposed end surfaces 15e and 15f.

In this embodiment, the linear light guide member 15 has not the substantially triangular reflector 40, 42, 44, 48, 48' or 60 in the embodiments described herein before.

The LED 200 is disposed relative to the end surface 15f, so that the LED 200 is positioned adjacent to, in contact with the end surface 15f and a reflecting film, sheet or plate 64 is disposed adjacent to, in contact with the end surface 15e opposed to the end surface 15f.

The channel light guide member 60 is composed of a plurality of optical channel elements i.e. solid cores 21 and a plurality of air interposers i.e. air clads 22, so that the optical channel elements 21 and the air interposers 22 are alternately aligned in parallel to form a fiber optic linear array.

As shown in FIG. 52, the optical channel elements 21 have a substantially equal width "w1", while the air interposers 22 have a substantially variable width "w2", in which the air interposers 22 are distributed to form a gradation pattern such that the width "w2" decreases in a stepwise fashion (or a continuous fashion) from the end surface 15f where the LED 200 is positioned toward the end surface 10e where the reflecting means 63 is positioned.

The optical channel elements 21A are distributed in such a way that a pitch "p" between the adjacent optical channel elements 21 decreases in accordance with a distance from the end surface 15e toward the opposed end surface 15f, in which the pitch "p" means a distance between the midpoints of the width "w1" of the adjacent optical channel elements 21.

Fourteenth Embodiment (Embodiment: No. 14)

Figure 53:
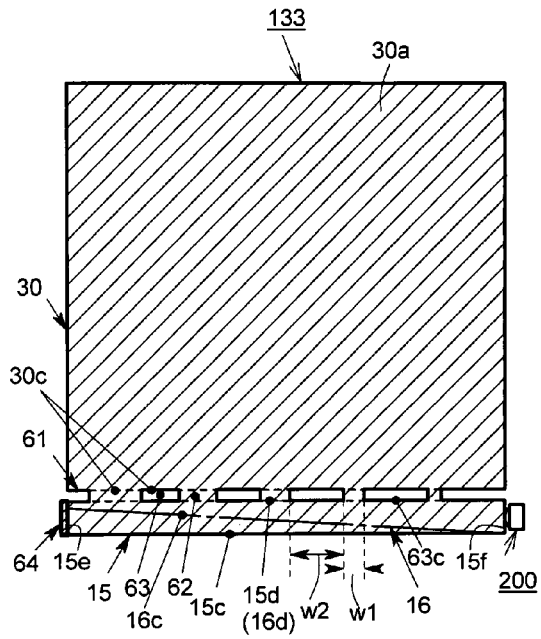
FIG. 53 is a schematic top view showing the thirteenth embodiment of the present invention.

Reference is made to FIG. 53 that is a top view showing a fourteenth embodiment of the present.

As shown in FIG. 53, a surface illuminator of this embodiment is composed of a light guide unit 133 and a LED 200, in which the light guide unit 133 is composed of a linear light guide member 15, a channel light guide member 61 and a surface lighting light guide member 30.

The light guide unit 133 in this embodiment differs from the light guide unit 132 of the thirteenth embodiment shown in FIG. 51 and FIG. 52 in the channel light guide member 61, while the linear light guide member 15 and the surface lighting light guide member 30 are the same as that of the thirteenth embodiment.

The linear light guide member or portion 15 is composed of a substantially transparent linear light guide member or portion having opposed major surfaces elongated linearly, opposed side surfaces 15c and 15d elongated linearly and opposed end surfaces 15e and 15f.

The LED 200 is disposed relative to the end surface 15f, so that the LED 200 is positioned adjacent to, in contact with the end surface 15f and a reflecting means 64 such as a reflecting film, sheet or plate is disposed adjacent to, in contact with the end surface 15e opposed to the end surface 15f.

The channel light guide member 61 is composed of a plurality of optical channel elements i.e. solid cores 62 and a plurality of air interposers i.e. air clads 63 disposed therebetween, in which the optical channel elements 62 and the air interposers 63 are alternately aligned laterally and in parallel to form a fiber optic linear array.

As shown in FIG. 53, the optical channel elements 62 are distributed to have a substantially variable width "w1" and also the air interposers 63 are distributed to have a substantially variable width "w2", along the fiber optic linear array.

The optical channel elements 62 and the air interposers 63 are distributed in the fiber optic linear array to form a gradation pattern in such a way that the width "w1" of the optical channel elements 62 and the width "w2" of the air interposers 63 change oppositely in that size in a stepwise fashion (or a continuous fashion) from the end surface 15f near the LED 200 toward the opposed end surface 10e near the reflecting means 63, so that the width "w1" of the optical channel elements 62 increases in proportion to a distance from the end surface 15f to the end surface 15e, while the width "w2" of the air interposers 63 decreases in proportion to a distance from the end surface 15f to the opposed end surface 15e.

Light emitting from LED 200 via the end surfaces 15f enters the linear light guide member or portion 15 via the end surface 15f and the light travels to reflect repeatedly between the opposed side surfaces 15c and 15d, and between the opposed major surfaces so as to advance towards the opposed end surfaces 15d linearly along the length of the linear light guide member or portion 15.

When a portion of a second light reaches the front side surface portion 63c of the air interposers 63 with an incident angle more than a critical angle, the light reflects at the front side surface portion 63c to return within the linear light guide member or portion 15.

When the rest portion of the second light reaches the front side surface portion 63c of the air interposers 63 with an incident angle less than the critical angle, the light enters the air interposers 63 and passes therethrough.

The linear light guide member 15 in this embodiment, a distance or width between the opposed rear and front side surfaces 15c and 15d is substantially equal along the length of the linear light guide member 15, however a linear tapered light guide member 16 indicated by a chain or un-continuous line in FIG. 53 may be substituted for the linear light guide member 15 indicated by a continuous line.

The linear tapered light guide member 16 has an inclined i.e. slanted rear surface 16c and a horizontal front surface 16d opposed to each other and the distance or width between the rear and front surfaces 16c and 16d and decreases gradually from the end surface 15f near the LED 200 to the end surface 15e near the reflecting means 64.

Fifteenth Embodiment (Embodiment: No. 15)

Figure 54:
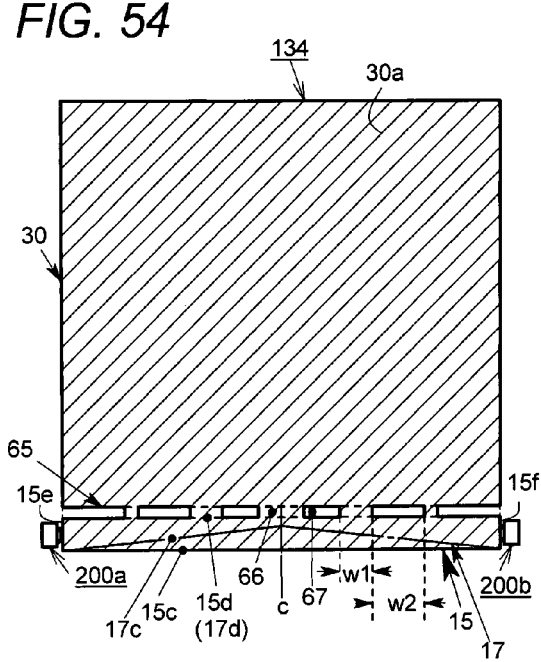
FIG. 54 is a schematic top view showing a fourteenth embodiment of the present.

Reference is made to FIG. 54 showing a fifteenth embodiment of the present invention, in which FIG. 54 is a schematic top view showing the fifteenth embodiment.

As shown in FIG. 54, a surface illuminator of this embodiment is composed of a light guide unit 134 and two LEDs 200a and 200b, in which the light guide unit 134 is composed of a linear light guide member 15, a channel light guide member 65 and a surface lighting light guide member 30.

The linear light guide member or portion 15 is composed of a substantially transparent linear light guide member or portion having opposed major surfaces elongated linearly, opposed side surfaces 15c and 15d elongated linearly.

The first LED 200a is disposed adjacent to or in contact with the first end surface 15e and the second LED 200b is disposed adjacent to or in contact with the second end surface 15f.

The channel light guide member 65 is composed of a plurality of optical channel elements i.e. solid cores 66 and a plurality of air interposers i.e. air clads 67 disposed therebetween, in which the optical channel elements 66 and the air interposers 67 are alternately aligned laterally and in parallel to form a fiber optic linear array.

As shown in FIG. 54, the optical channel elements 66 are distributed to have a substantially variable width "w1" and also the air interposers 67 are distributed to have a substantially variable width "w2", along the fiber optic linear array.

The optical channel elements 66 and the air interposers 67 are distributed in the fiber optic linear array 65 to form a gradation pattern in such a way that the width "w1" of the optical channel elements 66 and the width "w2" of the air interposers 67 change oppositely in that size in a stepwise fashion (or a continuous fashion) from both of the opposed end surface 15e and 15f toward a substantially a center "c" of the linear light guide member or portion 15, so that the width "w1" of the optical channel elements 62 increases in proportion to a distance from the end surfaces 15e and 15f to the center "c", while the width "w2" of the air interposers 67 decreases in proportion to a distance from the end surface 15f the center "c".

The linear light guide member 15 in this embodiment, a distance or width between the opposed rear and front side surfaces 15c and 15d is substantially equal along the length of the linear light guide member 15, however a linear tapered light guide member 17 indicated by a chain or un-continuous line in FIG. 53 may be substituted for the linear light guide member 15 indicated by a continuous line.

The linear light guide member 17 has an inclined or slanted rear surface 17c and a horizontal front surface 17d opposed to each other, in which the distance or width between the inclined rear surface 17c and the horizontal front side surface 17d decreases gradually from the end surfaces 15e and 15f toward the center "c".

Sixteenth Embodiment (Embodiment: No. 16)

Figure 55:
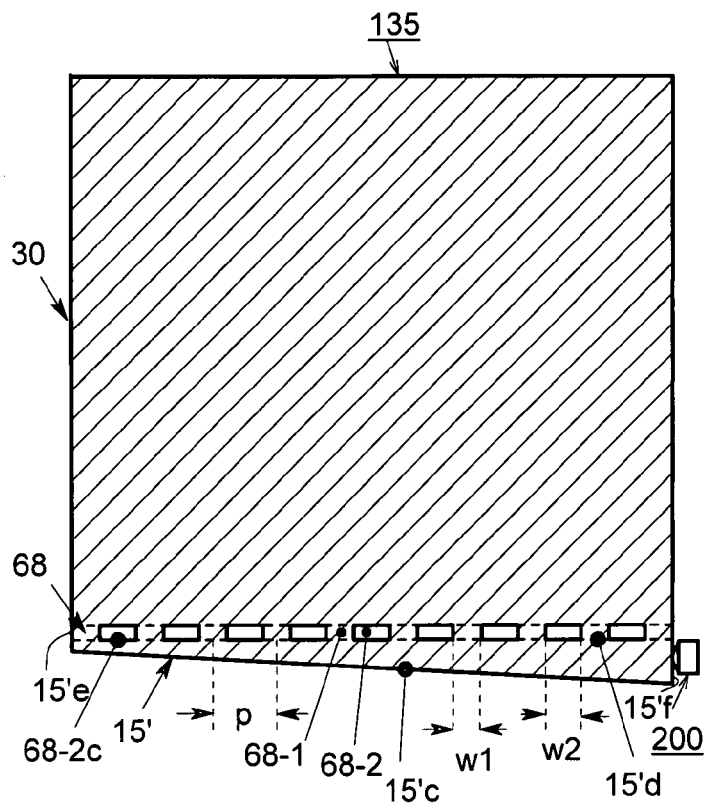
FIG. 55 is a schematic top view showing a fifteenth embodiment.

Reference is made to FIG. 55 showing a sixteenth embodiment of the present invention, in which FIG. 55 is a schematic top view showing the sixteenth embodiment.

As shown in FIG. 55, a surface illuminator of this embodiment is composed of a light guide unit 135 and a LED 200, in which the light guide unit 135 is composed of a linear light guide member 15', a channel light guide member 68 and a surface lighting light guide member 30.

The linear light guide member or portion 15' is composed of a substantially transparent linear light guide member or portion having opposed major surfaces, a tapered, inclined, sloped or slanted rear side surface 15'c, a front side surface 15'd opposed to the rear side surface 15'c, a first end surface 15'e and a second end surface 15'f where a LED 200 is positioned, in which a distance between the tapered rear side surface 15'c, and the non-tapered front surface 15'd decreases gradually from the second end surface 15'f toward the first end surface 15'e, in which the critical angle of incident light within the linear tapered light guide 15' decreases according to the distance from the second surface 15'f.

The channel light guide member 68 is composed of a plurality of optical channel elements 68-1 and a plurality of air interposers or slit-like openings 68-2 disposed therebetween, in which the optical channel elements 68-1 and the air interposers 68-2 are alternately aligned laterally in parallel to form a linear optical channel array.

Figure 56:
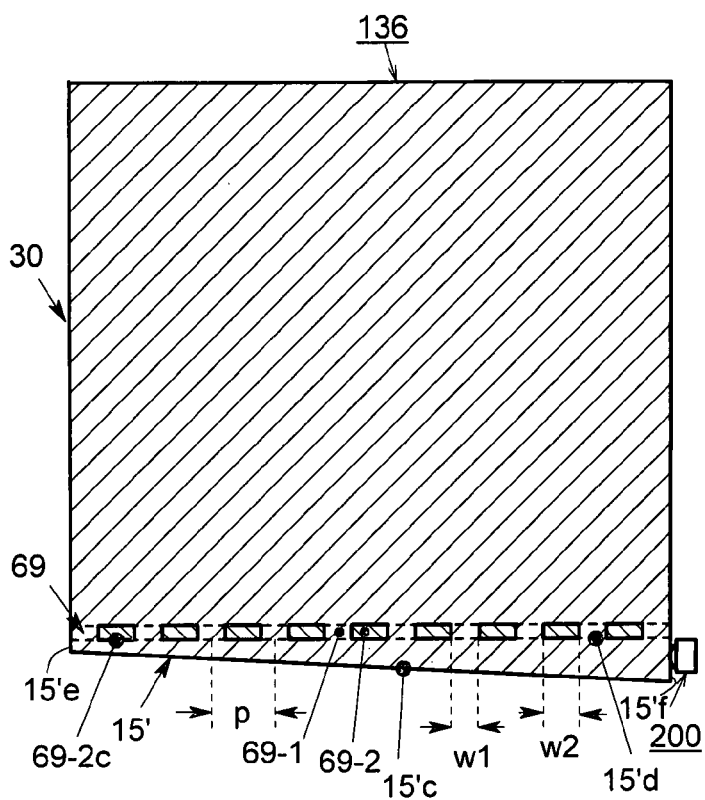
FIG. 56 is a schematic top view showing a sixteenth embodiment.

It is noted that all the optical channel elements 68-1 in this embodiment have a substantially equal width "w1" and also all the air interposers 68-2 have a substantially equal width "w2" as shown in FIG. 56, that differ from the optical channel light guides in the embodiments as mentioned in the above.

Some light entered from the second end surface 15'f transmits to reflect repeatedly between the tapered rear surface 15'c and bottom surfaces 68-2c of the air interposers 68-2 in accordance with the total internal reflection (TIR) until incident light is less than the critical angle.

Another light entered from the second end surface 15'f transmits within the linear tapered light guide 15' and the light reached the light entrance surface 15'c enters the channel light guide elements 68-1 because a refractive index of the channel light guide elements 68-1 is the same as or higher than the refractive index of the tapered light guide 15' so that the light entered the channel light guide elements 68-1 exits from the light exit side surfaces or portions to enter the surface lighting light guide 30.

Seventeenth Embodiment (Embodiment: No. 17)

Reference is made to showing a seventeenth embodiment of the present invention, in which FIG. 56 is a schematic top view showing the seventeenth embodiment.

As shown in FIG. 56, a surface illuminator of this embodiment is composed of a light guide unit 136 and a LED 200, in which the light guide unit 136 is composed of a linear light guide member 15', a channel light guide member 69 and a surface lighting light guide member 30.

The linear light guide member or portion 15' is composed of a substantially transparent linear light guide member or portion having opposed major surfaces, a tapered, inclined, sloped or slanted rear side surface 15'c, a front side surface 15'd opposed to the rear side surface 15'c a first end surface 15'e and a second end surface 15'f where a LED 200 is positioned, in which a distance between the tapered rear side surface 15'c, and the non-tapered front surface 15'd decreases gradually from the second end surface 15'f toward the first end surface 15'e in which the critical angle of incident light within the linear tapered light guide 15' decreases according to the distance from the second surface 15'f.

The channel light guide member 69 is composed of a plurality of optical channel elements 69-1 and a plurality of solid interposers or transparent polymer interposers 69-2 disposed therebetween, in which the optical channel elements 69-1 and the solid interposers 69-2 are alternately aligned laterally in parallel to form a linear optical channel array, in which a refractive index of the optical channel elements 69-1 is higher than the refractive index of the solid interposers 69-2.

It is noted that all the optical channel elements 69-1 in this embodiment have a substantially equal width "w1" and also all the solid interposers 69-2 have a substantially equal width "w2" as shown in FIG. 56, that differ from the optical channel light guides in the embodiments as mentioned in the above.

Some light entered from the second end surface 15'f transmits to reflect repeatedly between the tapered rear surface 15'c, and bottom surfaces 69-2c of the solid interposers 69-2 in accordance with the total internal reflection (TIR) until incident light is less than the critical angle.

Another light entered from the second end surface 15'f transmits within the linear tapered light guide 15' and the light reached the light entrance surface 15'c enters the channel light guide elements 69-1 because a refractive index of the channel light guide elements 69-1 is the same as or higher than the refractive index of the tapered light guide 15' so that the light entered the channel light guide elements 69-1 exits from the light exit side surfaces or portions to enter the surface lighting light guide 30.

Eighteenth Embodiment (Embodiment: No. 18)

Figure 57:
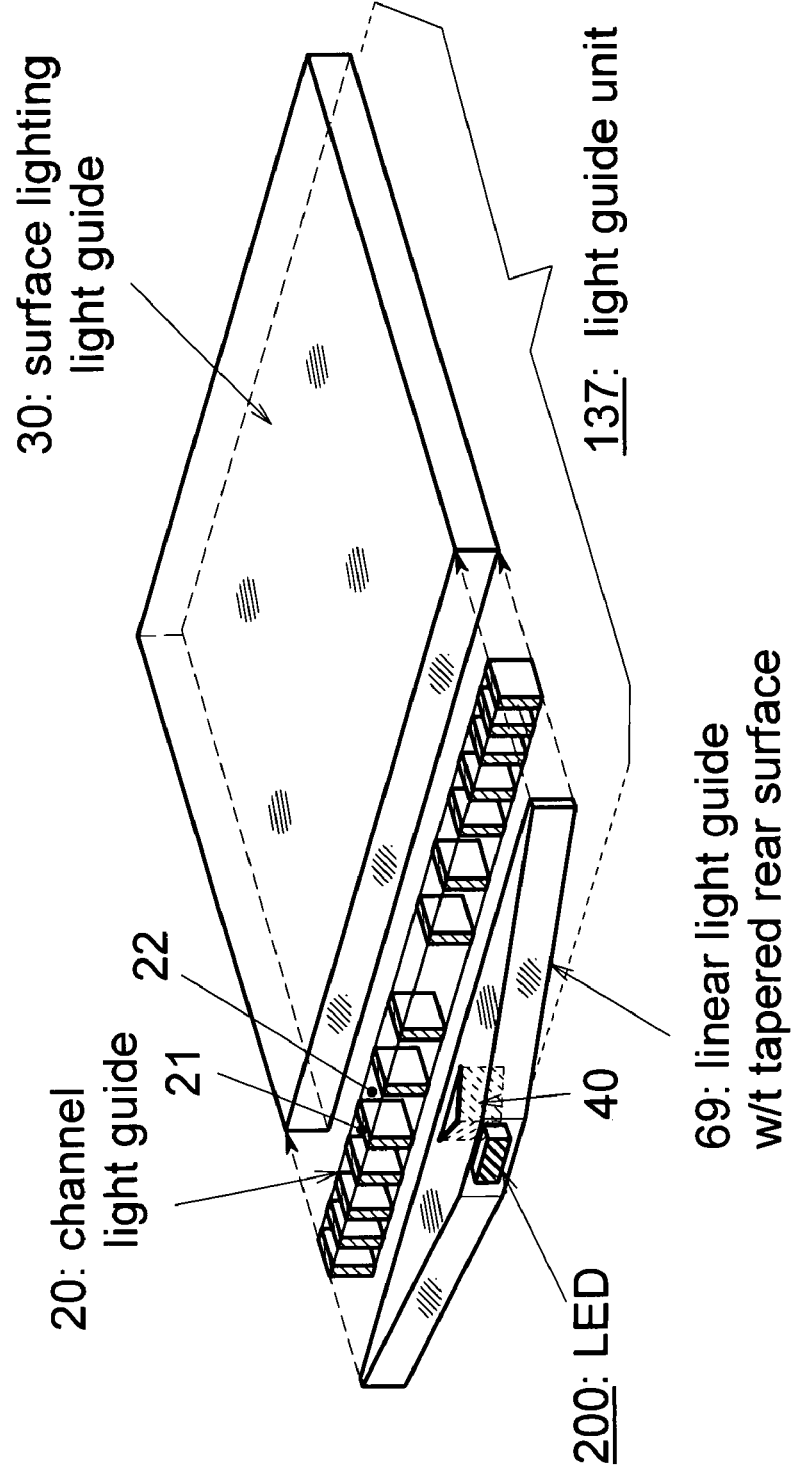
FIG. 57 is schematic exploded perspective view showing a seventeenth embodiment.
Figure 58:
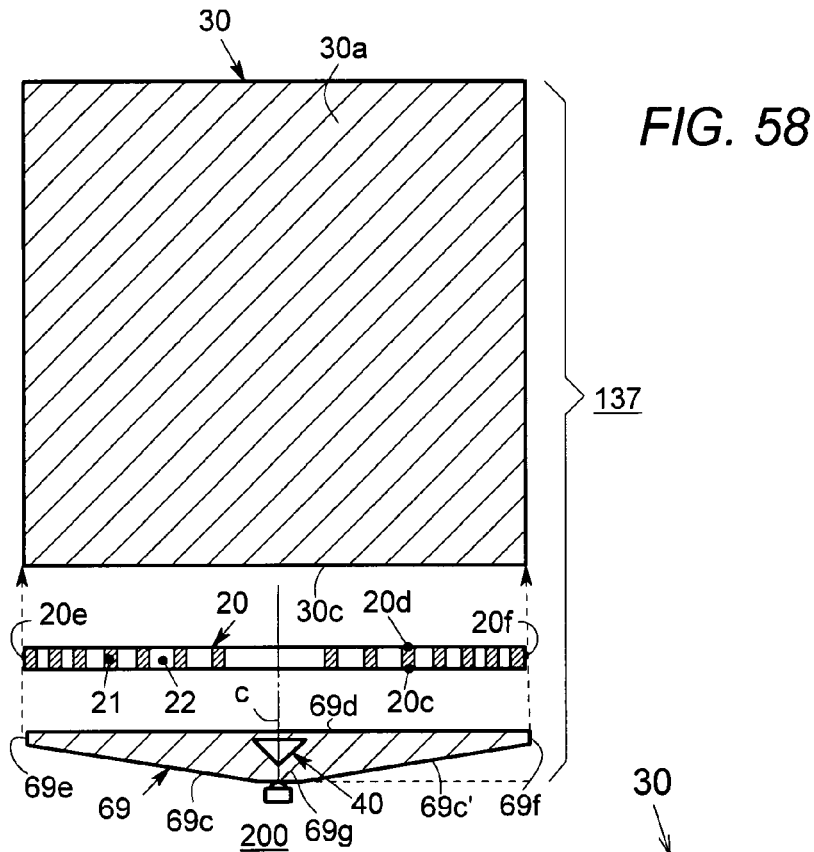
FIG. 58 is a schematic exploded top view showing a surface illuminator of a eighteenth embodiment.
Figure 59:
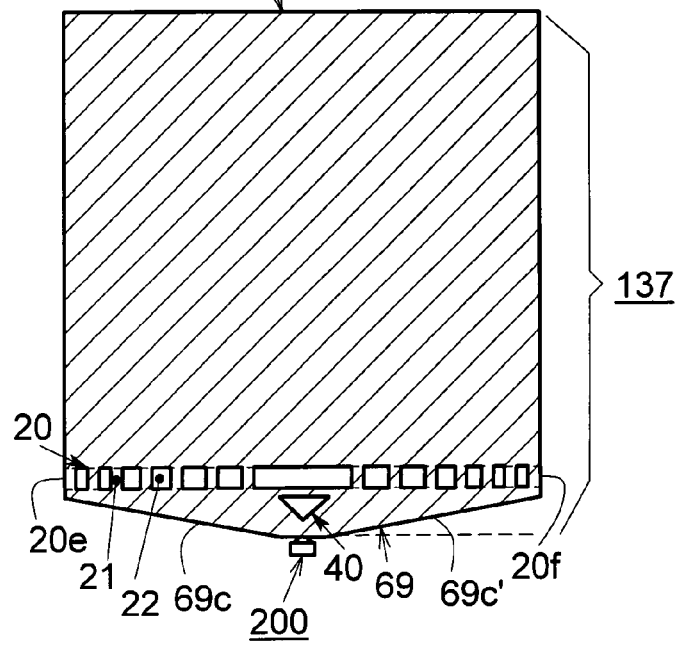
FIG. 59 is a schematic top view showing the surface illuminator of the eighteenth embodiment.

Reference is made to FIG. 57 through FIG. 59 showing an eighteenth embodiment of the present invention, which is a modification of the first embodiment.

FIG. 57 is a schematic exploded perspective view showing a surface illuminator of the eighteenth embodiment, FIG. 58 is a schematic exploded top view showing the surface illuminator of the eighteenth embodiment and FIG. 59 is a schematic top view showing the surface illuminator of the eighteenth embodiment.

As shown in FIG. 57 through FIG. 59, a surface illuminator is briefly composed of a light guide unit 137 and at least one LED 200.

The light guide unit 137 is made of a light transmitting member having a substantially transparent material.

The light guide unit 137 is composed of a surface lighting light guide member 30, a linear light guide member or portion 69 and an optical channel light guide member or portion 20 disposed therebetween, in which the optical channel light guide member or portion 20 is sandwiched laterally by the linear light guide member 69 and the surface lighting light guide member 30.

The optical channel light guide member 20 and the surface lighting light guide member 30 are similar to or the same as that described in mentioned above in detail in the first embodiment, a detail description on these members 20 and 30 is omitted here.

The channel light guide or optical channel light guide member 20 is composed of a plurality of optical channels or optical channel elements 21 aligned in parallel to form a linear array, in which the optical channel elements 21 are isolated or separated to one another by interposers or slit-like openings 22 between the dual optical channel elements 21 adjacent to each other.

The optical channel elements 21 are, similar to that of the first embodiment, variably distributed in quantity along the linear length of the channel light guide member 20 in proportion to the distance from a center "c" of the channel light guide plate 20 toward the opposed ends 20e and 20f.

The linear light guide member 69 is, similarly to that of the first embodiment, composed of opposed major surfaces, opposed front and rear side surfaces 69c and 69d, opposed end surfaces 69e and 69f, at least one light receiving portion 69g in the rear side surface 69c and a reflector 40 having opposed reflecting surfaces to form a letter "V" shaped configuration.

The rear side surface 69c, different from that of the first embodiment, is further composed of first and second inclined, wedge-like or slanted surfaces 69c and 69c', in which the inclined, wedge-like or slanted surfaces 69c and 69c' are inclined, wedge-like in a continuous fashion (or a stepwise fashion) from a center "c" of the linear light guide member 69 toward the opposed end surfaces 69e and 69f, thereby the rear side surface 69c forms a letter "V" shape.

At least one LED 200 may be disposed relative to the linear light guide member 69 at the light receiving portion 69g thereof so that a light emitting surface 200 faces the light reflector 40.

Figure 60:
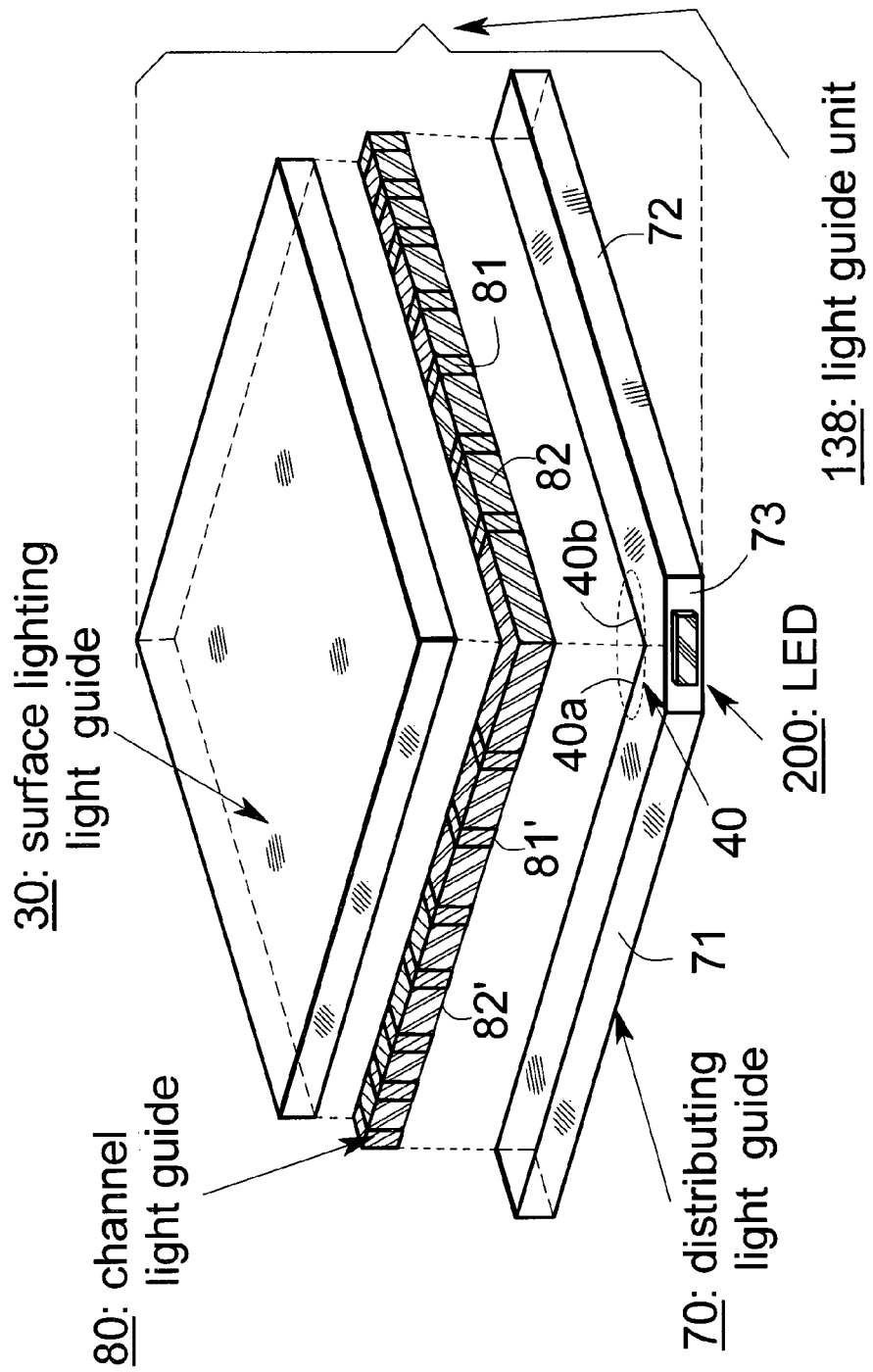
FIG. 60 is a schematic exploded perspective view showing the surface illuminator of a nineteenth embodiment.

As shown in FIG. 60, the light guide unit 137 may be composed of a completely integrated composite unit, in which the surface lighting light guide member 30, the optical channel light guide member 20 and the linear guide member 69 are connected to one another.

Instead, the light guide unit 137 may be composed of the linear guide member 69 and a composite unit of the surface lighting light guide member 30 and the optical channel light guide member 20, or composed of the surface lighting light guide member 30 and another composite unit of the linear guide member 69 and the optical channel light guide member 20.

Nineteenth Embodiment (Embodiment: No. 19)

Reference is made to FIG. 60 through FIG. 64 showing a nineteenth embodiment of the present invention, in which includes a nonlinear light guide member with a letter or character "L" shaped configuration.

Figure 61:
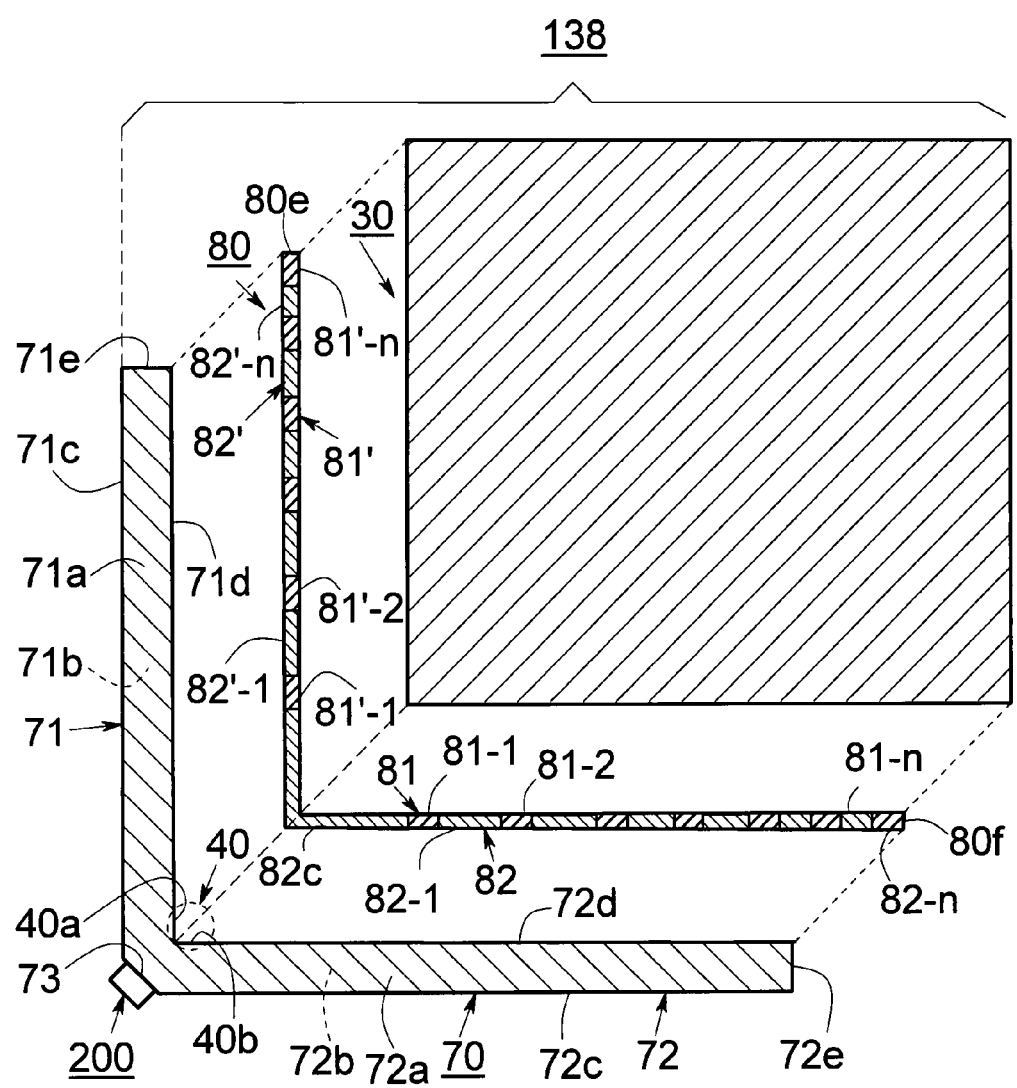
FIG. 61 is a schematic exploded top view showing the nineteenth embodiment of the present invention.
Figure 62:
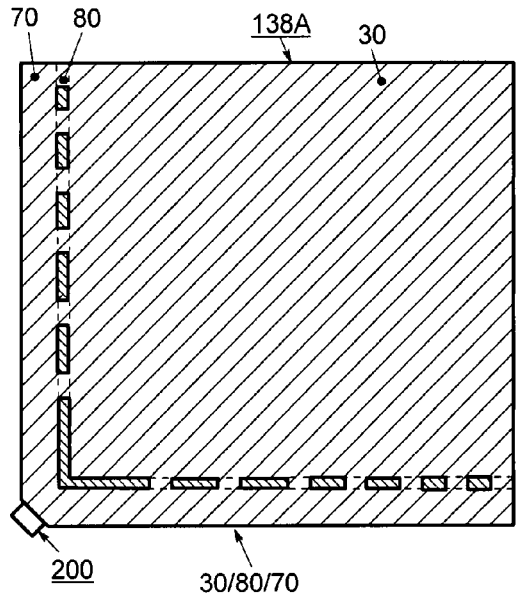
FIG. 62 is a schematic top view showing a first type of the surface illuminator showing the nineteenth embodiment of the present invention.
Figure 63:
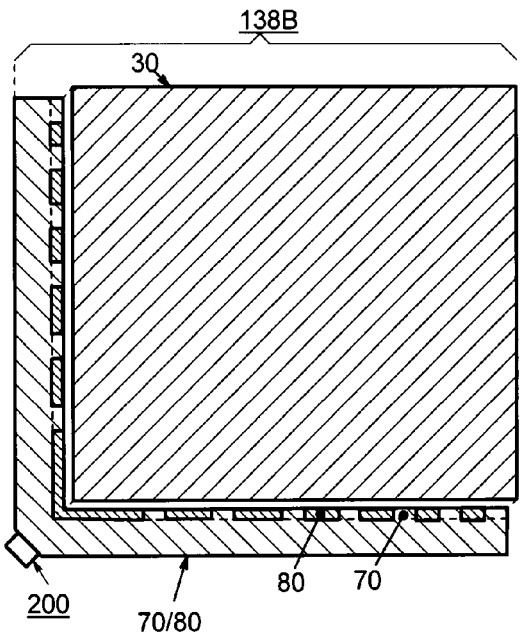
FIG. 63 is a schematic top view showing a second type of the surface illuminator showing the nineteenth embodiment of the present invention.
Figure 64:
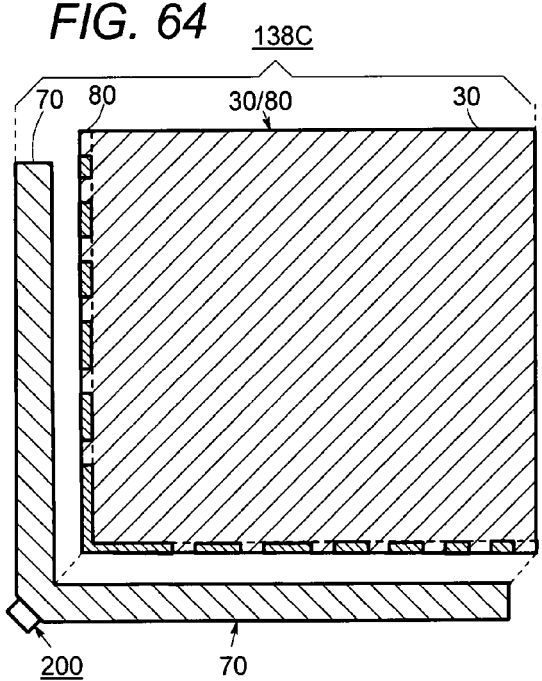
FIG. 64 is a schematic top view showing a schematic top view showing a third type of the surface illuminator showing the nineteenth embodiment of the present invention.

FIG. 60 is a schematic exploded perspective view, FIG. 61 is a schematic exploded top view showing a surface illuminator, FIG. 62 is a schematic top view showing a first type of the surface illuminator, FIG. 63 is a schematic top view showing a second type of the surface illuminator and FIG. 64 is a schematic top view showing a third type of the surface illuminator.

As shown in FIG. 60 and FIG. 61, the surface illuminator is briefly composed of a light guide unit 138 and at least one LED 200.

The light guide unit 138 is made of a light transmitting member having a substantially transparent material.

The light guide unit 138 is composed of a surface lighting light guide member 30, a nonlinear light guide member or portion 70 and an optical channel light guide member or portion 80 disposed therebetween, in which the optical channel light guide member or portion 80 is sandwiched laterally by the nonlinear light guide member 70 and the surface lighting light guide member 30.

The nonlinear light guide member 70 has a substantially "L" shaped configuration with an angle of about 90 degree as a whole, in which the nonlinear light guide member 70 is composed of a substantially linear first light guide member 71, a substantially linear second light guide member 72 connected with the first light guide member 71, a light receiving side surface, portion or area 73 and a reflector 40 having opposed reflecting surfaces or portions 40a and 40b with a substantially "V" shaped configuration.

The substantially linear first light guide member 71 further composed of opposed major surfaces 71a and 71b, opposed front and rear side surfaces 71c and 71d and an end surface 71e.

The substantially linear second light guide member 72 further composed of opposed major surfaces 72a and 72b, opposed front and rear side surfaces 72c and 72d and an end surface 72e, which is similar to the substantially linear first light guide member 71.

The opposed reflecting surfaces or portions with "V" shape 74a and 74b are positioned in a vicinity of a cross point of the opposed front side surfaces 40a and 40b.

The light receiving side surface, portion or area 73 are positioned in a vicinity of a cross point of the rear side surfaces 71c and 72c, in which LED 200 is disposed in contact with or adjacent to the light receiving side surface, portion or area 73 so as to face the opposed reflecting surfaces 40a and 40b.

The optical channel light guide member, channel light guide or channel light guide portion 80 has an "L" shaped configuration as a whole, similar to the nonlinear light guide member or distributing light guide 70.

The optical channel light guide member 80 is composed of a plurality of optical channels or first and second optical channel elements 81 and 81' to act as optical cores and a plurality of first and second interposers 82 and 82' to act as optical clads disposed therebetween, in which the optical channel elements 81 and 81' have a refractive index higher than the refractive index of the interposers 82 and 82'.

The first optical channel elements 81 (81-1, 81-2, ..., 81-$n$) and the first interposers 82 (82-1, 82-2, ..., 82-$n$) are alternately aligned in contact with and in parallel to one another to form a first linear array and the second optical channel elements 81' (81'-1, 81'-2, ..., 81'-$n$), similarly, the second interposers 82' (82'-1, 82'-2, ..., 82'-$n$) are alternately aligned in contact with and in parallel to one another to form a second linear array.

The first and second linear arrays are connected with or in contact with a "V" shaped center interposer 82c to form a nonlinear array with "L" shaped configuration, in which the optical channel elements 81 and 81' are isolated or separated to one another by the interposers 82 and 82' between the dual optical channel elements 81 and 81' adjacent to each other.

The optical channel elements 81 and 81', similarly to that of the first embodiment, are variably distributed in quantity along the nonlinear length of the channel light guide member 80 in proportion to the distance from a center of the channel light guide member 80 toward the opposed ends 71e and 72e.

The interposers 82 and 82', similarly to that of the first embodiment, are variably decreased in that width along the nonlinear length of the interposers 82 and 82' in proportion to the distance from a center of the channel light guide member 80 toward the opposed ends 71e and 72e.

LED 200 may be disposed relative to the nonlinear light guide member 70 at the light receiving portion 73 thereof so that a light emitting surface of the LED 200 faces the light reflector 40, i.e. the opposed reflecting surfaces 40a and 40b.

As shown in FIG. 62, a first type of the light guide unit 138A may be composed of a completely integrated composite light guide unit 30/80/70, in which the surface lighting light guide member 30 (or the surface lighting light guide portion), the optical channel light guide member 80 (or the optical channel light guide portion) and the nonlinear light guide member 70 (or the nonlinear light guide portion) are connected to one another in that order.

Instead, as shown in FIG. 63, a second type of the light guide unit 138B may be composed of the surface lighting light guide member 30 and a composite light guide unit 70/80 of the optical channel light guide member 80 and the nonlinear light guide member 70 connected therewith, while the optical channel light guide member 80 that is a portion of the composite light guide unit 70/80 is in contact with the surface lighting light guide member 30.

Instead, as shown in FIG. 64, a third type of the light guide unit 138C may be composed of the nonlinear light guide member 70 and a composite light guide unit 30/80 of the optical channel light guide member 80 and the surface lighting light guide member 30 connected therewith, while the optical channel light guide member 80 that is a portion of the composite light guide unit 30/80 is in contact with the nonlinear light guide member 70.

Back to FIG. 62, a fourth type of the surface lighting light guide member 30, the optical channel light guide member 80 and the nonlinear light guide member 70 may be separated to one another, in which three members 30, 80 and 70 may be disposed in contact with to one another in that order.

Twentieth Embodiment (Embodiment: No. 20)

Figure 65:
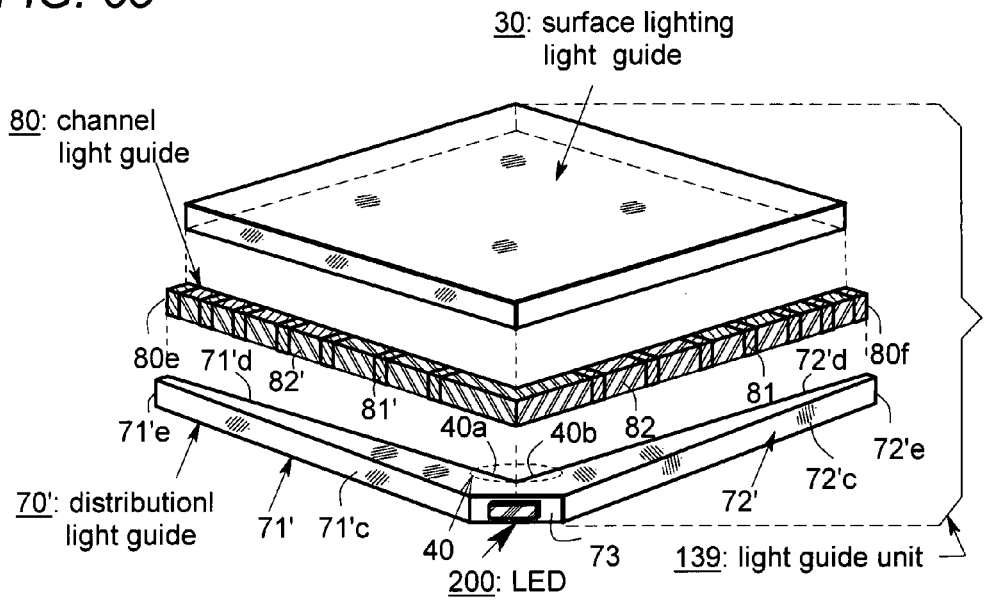
FIG. 65 is a schematic exploded perspective view showing a surface illuminator showing another embodiment.
Figure 66:
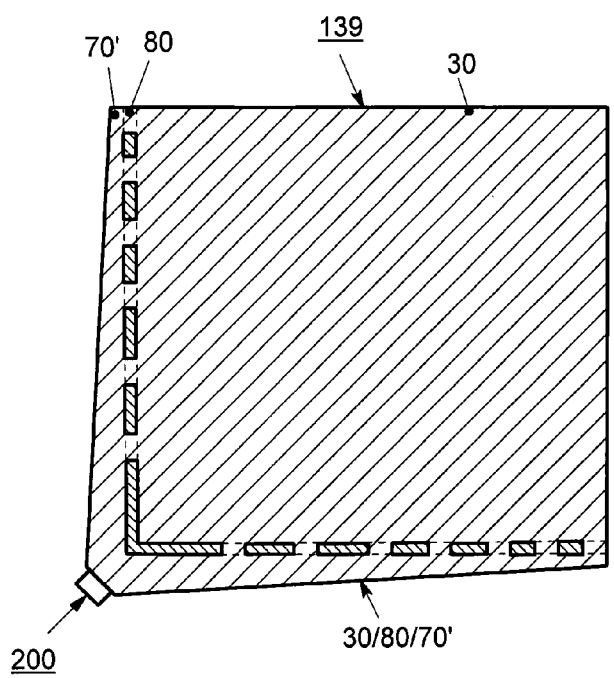
FIG. 66 is a schematic top view showing the surface illuminator in the FIG. 66.

Reference is made to FIG. 65 and FIG. 66 showing a twentieth embodiment of the present invention.

FIG. 65 is a schematic exploded perspective view showing a surface illuminator of the twentieth embodiment and FIG. 66 is a schematic top view showing the surface illuminator in the FIG. 66.

As shown in FIG. 65 and FIG. 66, a surface illuminator is briefly composed of a light guide unit 139 and at least one LED 200.

The light guide unit 139 is made of a light transmitting member having a substantially transparent material.

The light guide unit 139 is composed of a surface lighting light guide member 30, a nonlinear light guide member or portion 70' and an optical channel light guide member or portion 80 disposed therebetween, in which the optical channel light guide member or portion 80 is sandwiched laterally by the nonlinear light guide member 70' and the surface lighting light guide member 30.

The nonlinear light guide member 70' has a substantially "L" shaped configuration with an angle of about 90 degree as a whole, in which the nonlinear light guide member 70' (i.e. distributing light guide) is composed of a substantially linear first light guide member 71', a substantially linear second light guide member 72' connected with the first light guide member 71', a light receiving side surface, portion or area 73 and a reflector 40 having opposed reflecting surfaces or portions 40a and 40b with a substantially "V" shaped configuration.

It is noted that the substantially nonlinear light guide member 70' in this embodiment has the first and second substantially linear light guide members 71' and 72' having a tapered configuration, in which a distance between rear side surfaces 71'c and 72'c and front side surfaces 71'd and 72'd decreases from a center of the substantially nonlinear light guide member 70' toward ends thereof 71'e and 72'e, while the substantially nonlinear light guide member 70 in the fifteenth embodiment has a parallel configuration as shown in FIG. 61 through FIG. 63, in which a distance between rear side surfaces 71c and 72c and front side surfaces 71d and 72d substantially unchanged or equal from a center of the substantially nonlinear light guide member 70 toward ends thereof 71e and 72e.

In FIG. 66, the light guide unit 30/80/70' is composed of the surface lighting light guide 30, the channel light guide 80 and "L" shaped tapered nonlinear light guide 70', in which three light guides 30, 80 and 70' are connected to one another in that order to form a single integrated composite unit.

However, three light guides 30, 80 and 70' may be separated to be in contact with in that order to one another, or two light guides of the three light guides 30, 80 and 70' may form a composite.

Twenty First Embodiment (Embodiment: No. 21)

Figure 67:
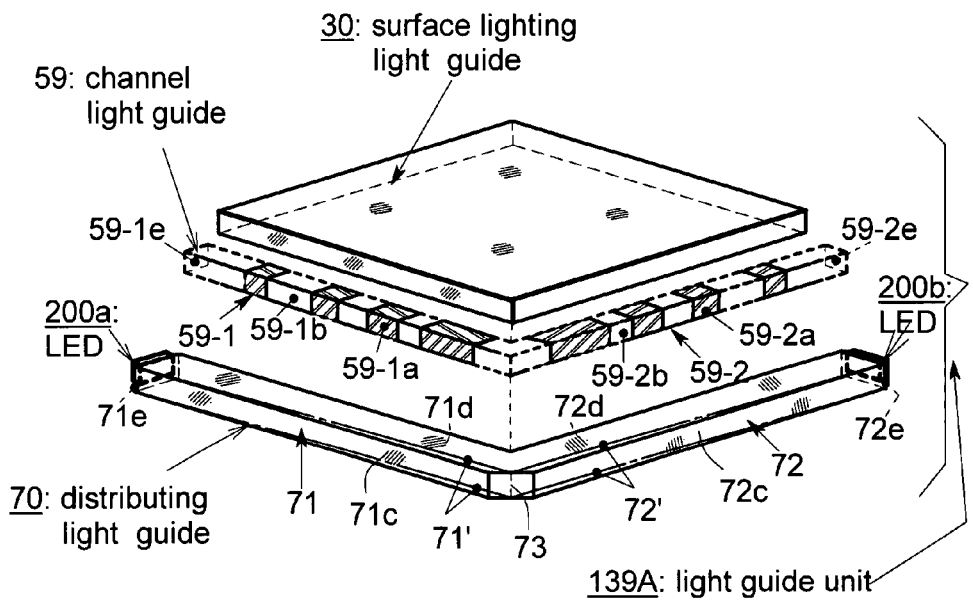
FIG. 67 is a schematic exploded perspective view showing a surface illuminator of a still another embodiment.
Figure 68:
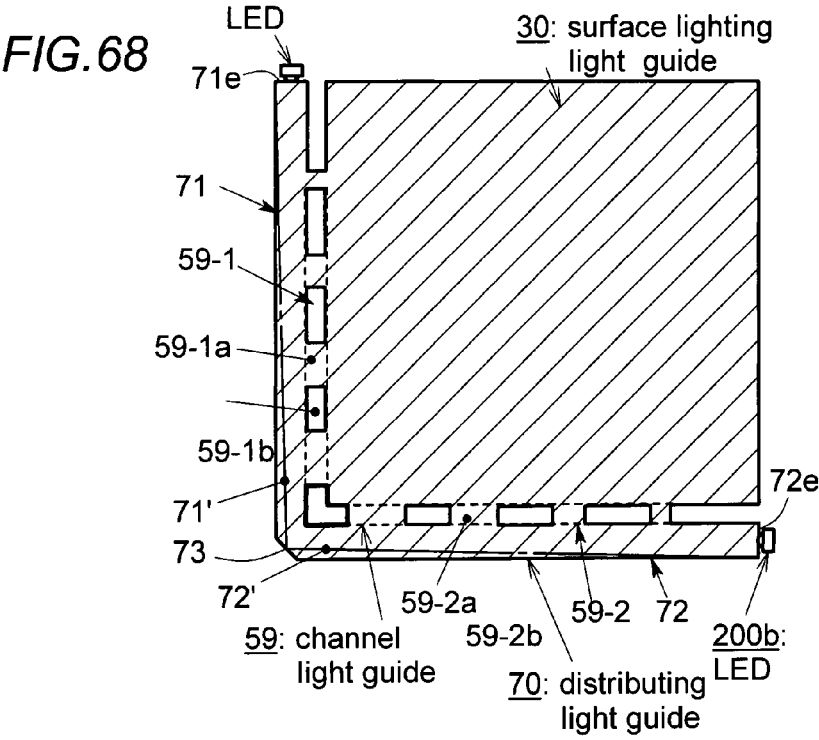
FIG. 68 is a schematic top view showing the surface illuminator in the FIG. 67.

Reference is made to showing a twenty first embodiment of the present invention, in which FIG. 67 is a schematic exploded perspective view showing a surface illuminator of the twenty first embodiment and FIG. 68 is a schematic top view showing the surface illuminator in the FIG. 67, which includes a nonlinear light guide member with a letter or character "L" shaped configuration.

This embodiment is typically a modification of the embodiment as shown in FIG. 60 through FIG. 66.

As shown in FIG. 67 and FIG. 68, the surface illuminator is briefly composed of a light guide unit 139A and two numbers or sets of LED 200a and 200b.

The light guide unit 139A is made of a light transmitting member having a substantially transparent material.

The light guide unit 139A is composed of a surface lighting light guide member 30, a nonlinear light guide member or portion 70 and an optical channel light guide member or portion 59 disposed therebetween, in which the optical channel light guide member or portion 59 is sandwiched laterally by the nonlinear light guide member 70 and the surface lighting light guide member 30.

The nonlinear light guide member 70 has a substantially "L" shaped configuration with an angle of about 90 degree as a whole, in which the nonlinear light guide member 70' is composed of a substantially linear first light guide portion 71, a substantially linear second light guide portion 72 and a corner surface 73 to connect the linear first and second portions 73.

The substantially linear first light guide member 71 further composed of opposed front and rear side surfaces 71c and 71d and an end surface 71e.

The substantially linear second light guide member 72 further composed of opposed front and rear side surfaces 72c and 72d and an end surface 72e, which is similar to the substantially linear first light guide member 71.

The LED 200a and 200b are disposed in contact with or adjacent to the end surfaces 71e and 72e so that each light emitting surface of the LED 200a and 200b faces the end surfaces 71e and 72e.

The optical channel light guide member 59 is composed of a substantially linear first optical channel light guide portion 59-1 and a substantially linear second optical channel light guide portion 59-2, in which the first and second optical channel light guide portion 59-1 and 59-2 are disposed to have an angle of about 90 degree to form a substantially "L" shaped configuration.

Each of the first and second optical channel light guide portion 59-1 and 59-2 is composed of a plurality of first and second optical channels elements 59-1a and 59-2a to act as optical cores and a plurality of first and second interposers 59-1b and 59-2b to act as optical clads disposed therebetween, in which the optical channel elements 59-1a and 59-2a have a refractive index higher than the refractive index of the interposers 59-1b and 59-2b.

In this embodiment, as shown in FIG. 67 and FIG. 68, air with value "1" of the refractive index is used as the interposers 59-1b and 59-2b, however solid interposers may be used instead.

The first optical channel elements 59-1a and the first interposers 59-1b are alternately aligned in parallel to one another to form a first linear array and the second optical channel elements 59-2a and the second interposers 59-2b are alternately aligned in contact with and in parallel to one another to form a second linear array, in which the first and second arrays form a nonlinear array having a substantially "L" shaped configuration as a whole.

The optical channel elements 59-1a and 59-2a are variably distributed along the nonlinear length of the channel light guide member 59 in such a manner that a width of the optical channel elements 59-1a and 59-2a increases in proportion to the distance from the end surfaces 59-1e and 59-2e toward the corner side surface 70h.

On the contrary, the interposers 59-1b and 59-2b variably distributed along the nonlinear length of the channel light guide member 59 in such a manner that a width of the interposers 59-1b and 59-2b decreases in proportion to the distance from the end surfaces 59-1e and 59-2e toward the corner side surface 70h.

In FIG. 68, the light guide unit 139A is composed of the surface lighting light guide 30, the substantially "L" shaped channel light guide member 59 and the substantially "L" shaped distributing light guide 71, in which three light guides 30, 59 and 71 are connected one another in that order to form a single integrated composite unit.

However, three light guides 30, 59 and 71 may be separated to be in contact with in that order to one another, or two light guides of the three light guides 30, 59 and 71 may form a composite, instead.

As shown in FIG. 67 and FIG. 68, a modification of the distributing light guide 70 is indicated as a first chain line 71' and a second chain line 72', in which the modified distributing light guide has slanted rear surfaces thereof so that the distance between the rear and front surfaces decreases from the end surfaces 71-e and 72-e toward the corner surface 73.

Twenty Second Embodiment (Embodiment: No. 22)

Figure 69:
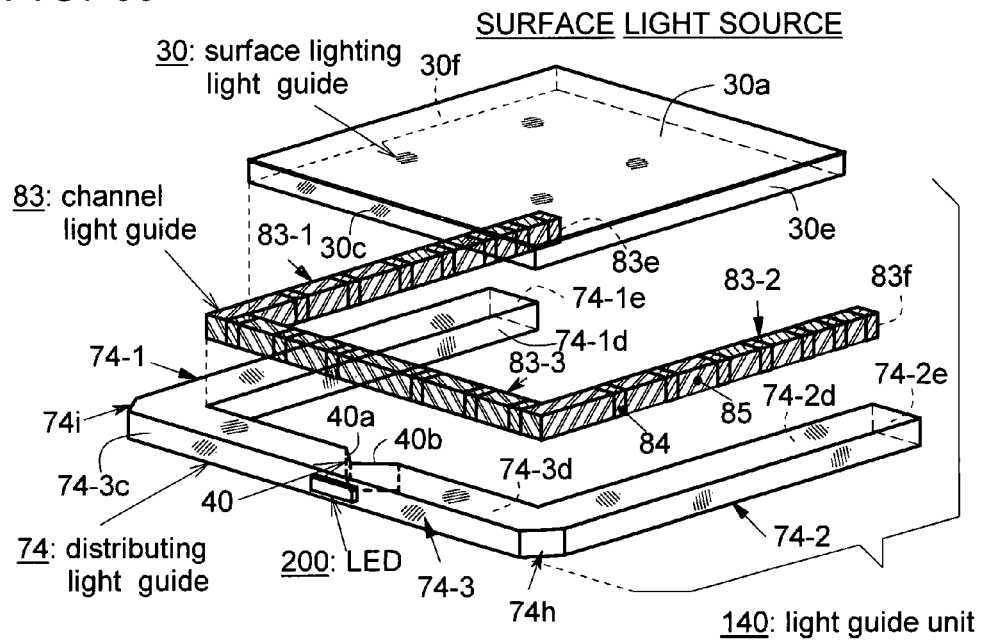
FIG. 69 is schematic exploded perspective view showing a surface illuminator of other embodiment.
Figure 70:
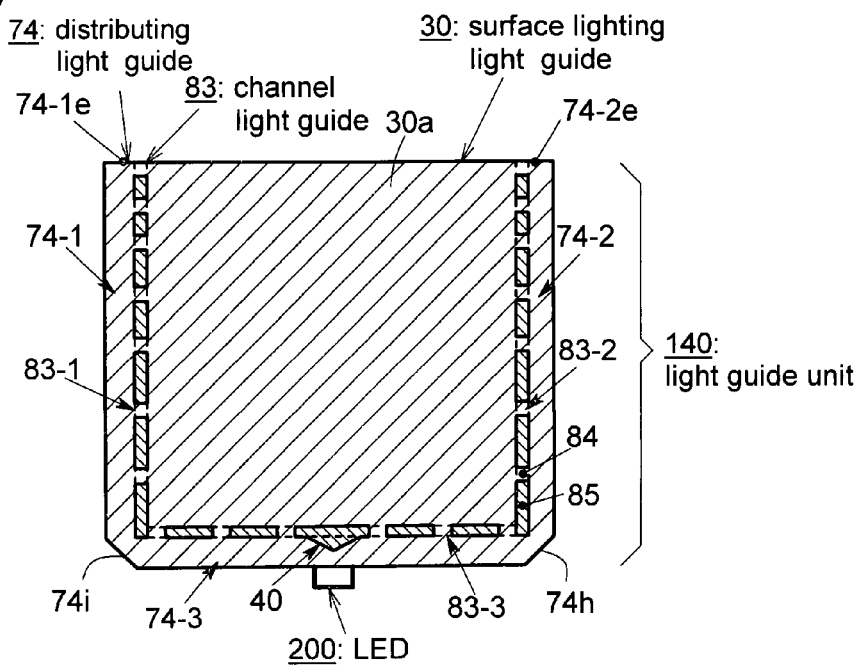
FIG. 70 is a schematic top view showing the surface illuminator in the FIG. 69.

Reference is made to FIG. 69 and FIG. 70 showing a twenty second embodiment of the present invention.

FIG. 69 is a schematic exploded perspective view showing a surface illuminator of the twenty second embodiment and FIG. 70 is a schematic top view showing the surface illuminator in the FIG. 69.

As shown in FIG. 69 and FIG. 70, a surface illuminator is briefly composed of a light guide unit 140 and at least one LED 200, in which the surface illuminator of this embodiment is a modification of the embodiment as shown in FIG. 35 through FIG. 38.

The light guide unit 140 is made of a light transmitting member having a substantially transparent material.

The light guide unit 140 is composed of a surface lighting light guide member 30, a nonlinear light guide member or portion 74 and an optical channel light guide member or portion 83 disposed therebetween, in which the optical channel light guide member or portion 83 is sandwiched laterally by the nonlinear light guide member 74 and the surface lighting light guide member 30.

The nonlinear light guide member 74 is acting as a distributing light guide for distributing light along an entire length thereof, in which the light is introduced from one limited area 73 thereof that is a corner surface area where LED 200 is positioned.

The nonlinear light guide member 74 is composed of a substantially "U" shaped light guide member having a substantially linear first leg portion 74-1, a substantially linear second leg portion 74-2 opposed to and parallel with the first leg portion 74-1 and a substantially linear bottom portion 74-3 connected with a first slanted side surface 74i of the first leg portion 74-1 and a second slanted side surface 74h of the second leg portion 74-2.

The first and second leg portions 74-1 and 74-2 have end surfaces 74-1e and 74-2e that are optically opposed to each other via an entire length of "U" shaped light guide 74.

The substantially linear bottom portion 74-3 is provided with a reflector 40 near a center thereof in a front side surface 74-3d, in which the reflector 40 is composed of opposed reflecting surfaces or portions 40a and 40b with a substantially "V" shaped configuration that is one portion of the front side surface 74-3d.

The LED 200 is disposed in contact with, adjacent to a rear side surface 74-3*d* near a center thereof in the substantially linear bottom portion 74-3 so that a light emitting window of the LED 200 faces the opposed reflecting surfaces 40*a* and 40*b* of the reflector 40.

The channel light guide or optical channel light guide member 83 is composed of a opposed linear first and second leg portions and a bottom linear portion connected with the linear first and second leg portions to form a substantially "U" shaped configuration as a whole similar to the configuration of the distributing light guide 74, in which an external contour with "U" shape of the channel light guide 83 is substantially equal in size to an internal contour with "U" shape of the distributing light guide 74 so as to be connected or in contact with to each other.

An internal contour with "U" shape of the channel light guide 83 is substantially equal in size to an contour with "U" shape of three adjacent side surfaces 30*c*, 30*e* and 30*f* of the surface lighting light guide 30 so as to be connected or in contact with to each other.

The channel light guide or optical channel light guide member 83 is further composed of a plurality of optical channel elements 84 and a plurality of interposers 85, in which the optical channel elements 84 and the adjacent interposers 85 are alternately aligned so as to form a substantially "U" shaped array as a whole, in such a manner that each of the optical channel elements 84 is positioned to be sandwiched by the adjacent interposers 85.

The interposers 85 are composed of a light transmitting solid member having a substantially transparent material having a refractive index lower than the refractive index of the optical channel elements 84.

The interposers 85 may substitute air for the light transmitting solid member since the refractive index (value=1) of the air is generally lower than that of the light transmitting solid member such as PMMA or PC.

Each of the optical channel elements 84 has a substantially equal width and equal light input surface area, while each of the interposers 85 has a substantially variable width.

The optical channel elements 84 are distributed variably in a pitch therebetween in a stepwise or continuous manner to form a gradation pattern in such a manner that the quantity of the channel elements 84 is increased from a center of the bottom portion 74-3 (or the slanted side surfaces 74*i* and 74*h* toward both of the end surfaces 74-1*e* and 74-2*e*, while the interposers 85 are distributed variably in the width in a stepwise or continuous manner to form a gradation pattern in such a manner that the width of the interposers 85 is decreased from a center of the bottom portion 74-3 (or the slanted side surfaces 74*i* and 74*h* toward both of the end surfaces 74-1*e* and 74-2*e*.

Therefore, light emitting from LED 200 to input into the nonlinear light guide member or portion 74 with "U" shaped configuration can output the light with a substantially uniform luminance along an entire length of the light output side surface or side surface portion 74-1*d*, 74-2*d* and 74-3*d* and resultantly a lighting with substantially uniform surface luminance or brightness can be produced from substantially entire areas of the surface lighting surface 30*a* of the surface lighting light guide member or portion 30.

In FIG. 69 and FIG. 70, the light guide unit 140 is composed of the surface lighting light guide 30, the substantially "U" shaped channel light guide 83 and the substantially "U" shaped nonlinear distributing light guide 74, in which three light guides 30, 83 and 74 are connected one another in that order to form a single integrated composite unit.

However, three light guides 30, 83 and 74 may be separated to be in contact with in that order to one another, or two light guides of the three light guides 30, 83 and 74 may form a composite, instead.

Twenty Third Embodiment (Embodiment: No. 23)

Figure 71:
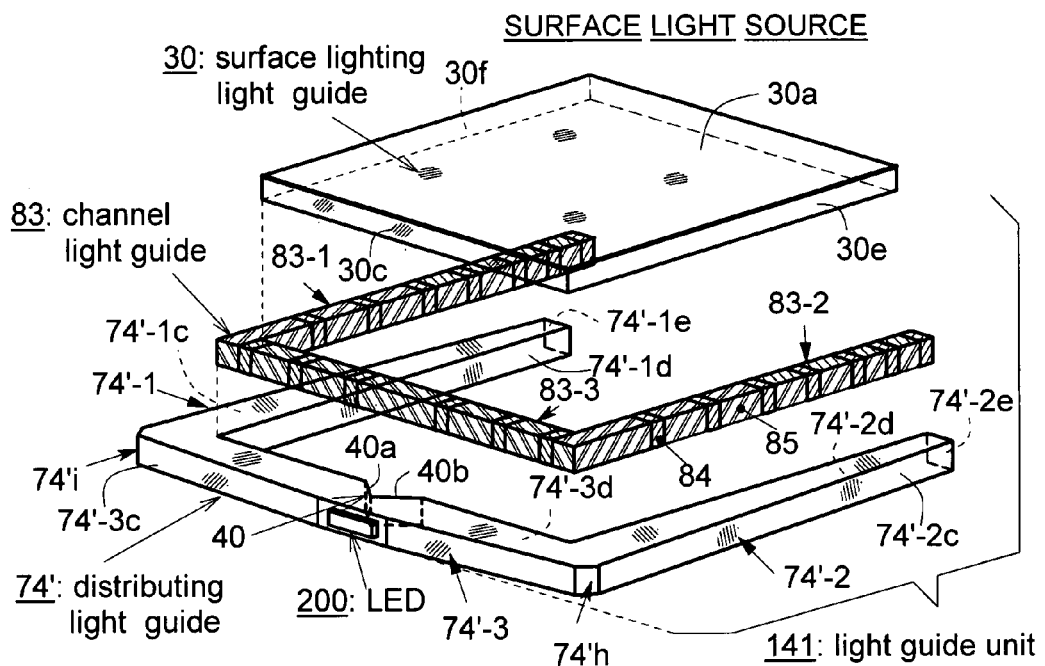
FIG. 71 is a schematic exploded perspective view showing the surface illuminator of other embodiment.
Figure 72:
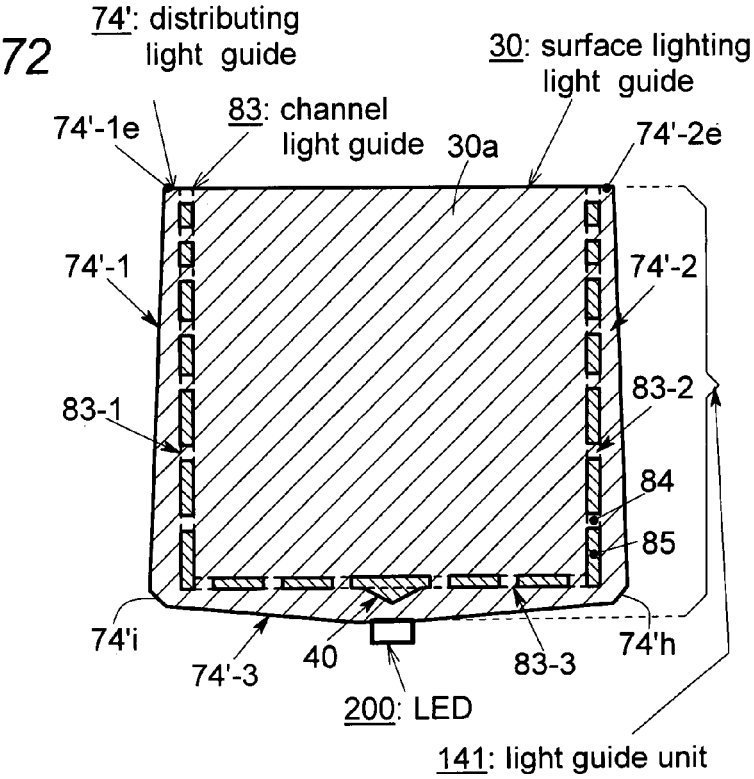
FIG. 72 is a schematic top view showing the surface illuminator in the FIG. 71.

Reference is made to FIG. 71 and FIG. 72 showing a twenty third embodiment of the present invention.

FIG. 71 is a schematic exploded perspective view showing a surface illuminator of the twenty third embodiment and FIG. 72 is a schematic top view showing the surface illuminator in the FIG. 71.

As shown in FIG. 71 and FIG. 72, a surface illuminator is briefly composed of a light guide unit 141 and at least one LED 200, in which the surface illuminator of this embodiment is a modification of the embodiment as shown in FIG. 69 and FIG. 70.

The light guide unit 141 is made of a light transmitting member having a substantially transparent material.

The light guide unit 141 is composed of a surface lighting light guide member 30, a nonlinear light guide member or portion 74' and an optical channel light guide member or portion 83 disposed therebetween, in which the optical channel light guide member or portion 83 is sandwiched laterally by the nonlinear light guide member 74' and the surface lighting light guide member 30.

The nonlinear light guide member 74' is acting as a distributing light guide for distributing light along an entire length thereof, in which the light is introduced from one limited area thereof.

The nonlinear light guide member 74' is composed of a substantially "U" shaped light guide member having a substantially linear first leg portion 74'-1, a substantially linear second leg portion 74'-2 opposed to and parallel with the first leg portion 74'-1 and a substantially linear bottom portion 74'-3 connected with a first slanted side surface 74'*i* of the first leg portion 74'-1 and a second slanted side surface 74'*h* of the second leg portion 74'-2.

The first and second leg portions 74'-1 and 74'-2 have end surfaces 74'-1*e* and 74'-2*e* that are optically opposed to each other via an entire length of "U" shaped light guide 74'.

The substantially linear bottom portion 74'-3 is provided with a reflector 40 near a center thereof in a front side surface 74'-3*d*, in which the reflector 40 is composed of opposed reflecting surfaces or portions 40*a* and 40*b* with a substantially "V" shaped configuration that is one portion of the front side surface 74'-3*d*.

LED 200 is disposed in contact with, adjacent to a rear side surface 74'-3*d* near a center thereof in the substantially linear bottom portion 74'-3 so that a light emitting window of the LED 200 faces the opposed reflecting surfaces 40*a* and 40*b* of the reflector 40.

The channel light guide or optical channel light guide member 83 is composed of a opposed linear first and second leg portions and a bottom linear portion connected with the linear first and second leg portions to form a substantially "U" shaped configuration as a whole similar to the configuration of the distributing light guide 74', in which an external contour with "U" shape of the channel light guide 83 is substantially equal in size to an internal contour with "U" shape of the distributing light guide 74' so as to be connected or in contact with to each other.

An internal contour with "U" shape of the channel light guide 83 is substantially equal in size to an contour with "U"

shape of three adjacent side surfaces 30c, 30e and 30f of the surface lighting light guide 30 so as to be connected or in contact with to each other.

The channel light guide or optical channel light guide member 83 is further composed of a plurality of optical channel elements 84 and a plurality of interposers 85, in which the optical channel elements 84 and the adjacent interposers 85 are alternately aligned so as to form a substantially "U" shaped array as a whole, in such a manner that each of the optical channel elements 84 is positioned to be sandwiched by the adjacent interposers 85.

The interposers 85 are composed of a light transmitting solid member having a substantially transparent material having a refractive index lower than the refractive index of the optical channel elements 84.

The interposers 85 may substitute air for the light transmitting solid member since the refractive index (value=1) of the air is generally lower than that of the light transmitting solid member such as PMMA or PC.

Each of the optical channel elements 84 has a substantially equal width and equal light input surface area, while each of the interposers 85 has a substantially variable width.

The optical channel elements 84 are distributed variably in a pitch therebetween in a stepwise or continuous manner to form a gradation pattern in such a manner that the quantity of the channel elements 84 is increased from a center of the bottom portion 74'-3 (or the slanted side surfaces 74'i and 74'h toward both of the end surfaces 74'-1e and 74'-2e, while the interposers 85 are distributed variably in the width in a stepwise or continuous manner to form a gradation pattern in such a manner that the width of the interposers 85 is decreased from a center of the bottom portion 74'-3 (or the slanted side surfaces 74'i and 74'h toward both of the end surfaces 74'-1e and 74'-2e.

Therefore, light emitting from LED 200 to input into the nonlinear light guide member or portion 74 with "U" shaped configuration can output the light with a substantially uniform luminance along an entire length of the light output side surface or side surface portion 74'-1d, 74'-2d and 74'-3d and resultantly a lighting with substantially uniform surface luminance or brightness can be produced from substantially entire areas of the surface lighting surface 30a of the surface lighting light guide member or portion 30.

It is noted that each of the first and second opposed light guides 74'-1 and 74'-2 and the bottom light guide 74'-3 has a tapered configuration, in which the first and second opposed light guides 74'-1 and 74'-2a have tapered rear side surfaces 74'-1c and 74'-2c and the bottom light guide 74'-3 has a tapered rear side surface 74'-3c, in which the distance between the tapered rear side surfaces 74'-1c and 74'-2c and the non-tapered front side surfaces 74'-1d and 74'-2d decreases from the corner sides 74'I and 74'h toward the end surfaces 74'-1e and 74'-2e and the distance between the tapered rear side surface 74'-3c and the front side surfaces 74'-3d decreases from near the center of the bottom light guide 74'-3 toward the corner sides 74'I and 74'h.

On the contrary, in the nineteenth embodiment as shown in FIG. 70 and FIG. 71, the distance between the rear and front side surfaces of the first and second leg light guides 74-1 and 71-2 are substantially equal or uniform and the distance between the rear and front side surfaces of the bottom light guide 74-3 is substantially equal or uniform except for a portion of the reflector 40.

In FIG. 71 and FIG. 72, the light guide unit 141 is composed of the surface lighting light guide 30, the substantially "U" shaped channel light guide 83 and the substantially "U" shaped nonlinear distributing light guide 74', in which three light guides 30, 83 and 74' are connected one another in that order to form a single integrated composite unit.

However, three light guides 30, 83 and 74' may be separated to be in contact with in that order to one another, or two light guides of the three light guides 30, 83 and 74' may form a composite, instead.

Twenty Fourth Embodiment (Embodiment: No. 24)

Figure 73:
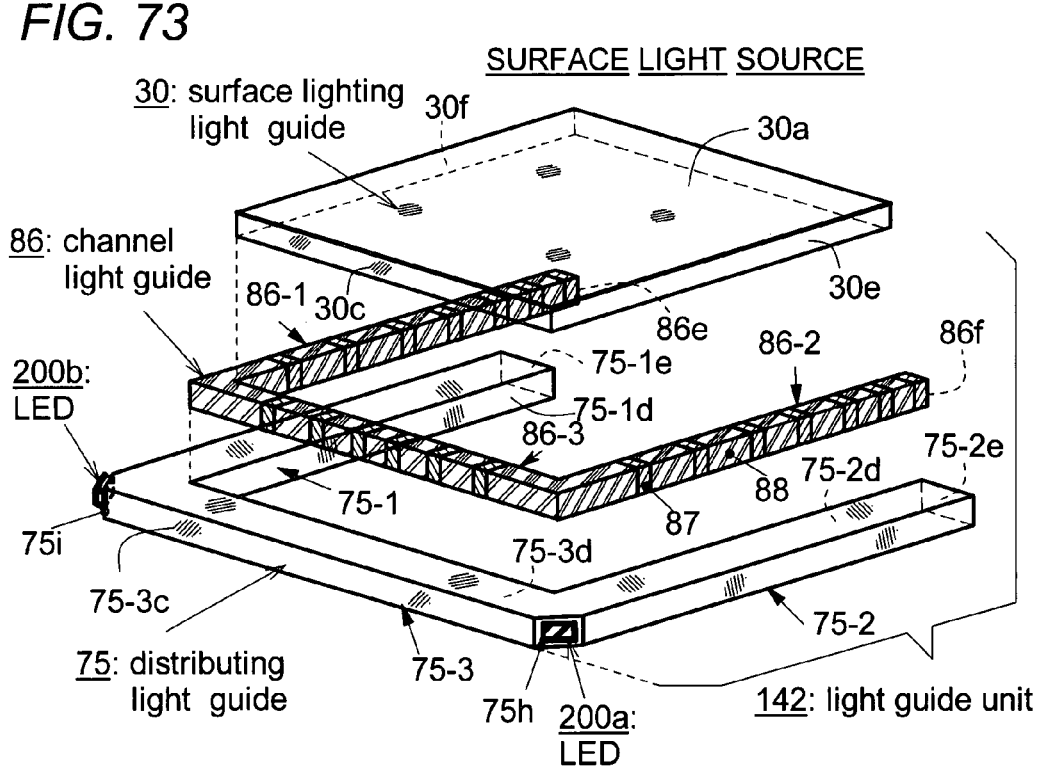
FIG. 73 is schematic exploded perspective view showing the surface illuminator of other embodiment.
Figure 74:
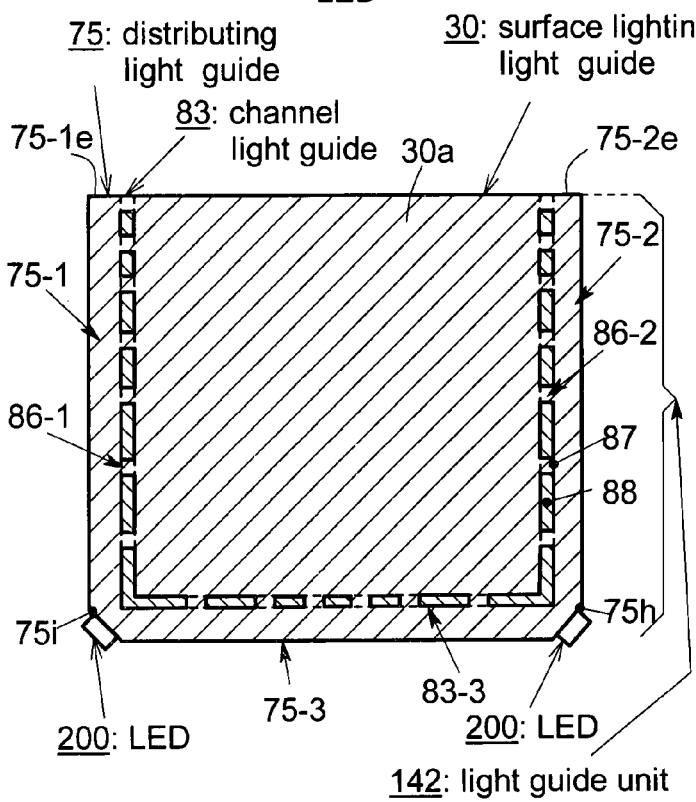
FIG. 74 is a schematic top view showing the surface illuminator in the FIG. 73.

Reference is made to FIG. 73 and FIG. 74 showing a twenty fourth embodiment of the present invention.

FIG. 73 is a schematic exploded perspective view showing a surface illuminator of the twenty fourth embodiment and FIG. 74 is a schematic top view showing the surface illuminator in the FIG. 73.

As shown in FIG. 73 and FIG. 74, a surface illuminator is briefly composed of a light guide unit 142 and two LEDs 200a and 200b, in which the surface illuminator of this embodiment is a modification of the fifteenth embodiment as shown in FIG. 61 through FIG. 65.

The light guide unit 142 is made of a light transmitting member having a substantially transparent material.

The light guide unit 142 is composed of a surface lighting light guide member 30, a nonlinear light guide member or portion 75 and an optical channel light guide member or portion 86 disposed therebetween, in which the optical channel light guide member or portion 86 is sandwiched laterally by the nonlinear light guide member 75 and the surface lighting light guide member 30.

The nonlinear light guide member 75 is acting as a distributing light guide for distributing light along an entire nonlinear length thereof, in which the light is introduced from two limited areas thereof that are two corner side surfaces 75i and 75h where LEDs 200a and 200b are positioned so as to be in contact with or adjacent to the corner surfaces 75i and 75h.

The nonlinear light guide member 75 is composed of a substantially "U" shaped light guide member having a substantially linear first leg portion 75-1, a substantially linear second leg portion 75-2 opposed to and parallel with the first leg portion 75-1 and a substantially linear bottom portion 75-3 connected with a first slanted side surface 75i of the first leg portion 75-1 and a second slanted side surface 75h of the second leg portion 75-2.

The first and second leg portions 75-1 and 75-2 have end surfaces 75-1e and 75-2e that are optically opposed to each other via an entire length of "U" shaped light guide 75.

The channel light guide or optical channel light guide member 86 is composed of opposed linear first and second leg portions 86-1 and 86-2 and a bottom linear portion 86-3 connected with the linear first and second leg portions to form a substantially "U" shaped configuration as a whole similar to the configuration of the distributing light guide 75, in which an external contour with "U" shape of the channel light guide 86 is substantially equal in size to an internal contour with "U" shape of the distributing light guide 75 so as to be connected or in contact with to each other.

An internal contour with "U" shape of the channel light guide 86 is substantially equal in size to an contour with "U" shape of three adjacent side surfaces 30c, 30e and 30f of the surface lighting light guide 30 so as to be connected or in contact with to each other.

The channel light guide or optical channel light guide member 86 is further composed of a plurality of optical channel elements 87 and a plurality of interposers 88, in which the optical channel elements 87 and the adjacent interposers 88 are alternately aligned so as to form a substantially "U" shaped array as a whole, in such a manner that each of the optical channel elements 87 is positioned to be sandwiched by the adjacent interposers 88.

The interposers 88 are composed of a light transmitting solid member having a substantially transparent material having a refractive index lower than the refractive index of the optical channel elements 87.

The interposers 88 may substitute air for the light transmitting solid member since the refractive index (value=1) of the air is generally lower than that of the light transmitting solid member such as PMMA or PC.

Each of the optical channel elements 87 has a substantially equal width and equal light input surface area, while each of the interposers 88 has a substantially variable width.

The optical channel elements 87 are distributed variably in a pitch therebetween in a stepwise or continuous manner to form a first gradation pattern in such a manner that the quantity of the channel elements 87 is increased from the dual corners of the bottom portion 86-3 of the channel light guide portion 86 toward the dual end surfaces of the first and second leg portions 86-1 and 86-2 and from the dual corners of the bottom portion 86-3 toward a center of the bottom portion 86-3.

The interposers 88 are distributed variably in the width in a stepwise or continuous manner to form a second gradation pattern in such a manner that the width of the interposers 88 is decreased f from the dual corners of the bottom portion 86-3 of the channel light guide portion 86 toward the dual end surfaces of the first and second leg portions 86-1 and 86-2 and from the dual corners of the bottom portion 86-3 toward a center of the bottom portion 86-3.

Therefore, light emitting from LEDs 200a and 200b to input into the nonlinear light guide member or portion 75 with "U" shaped configuration can output the light with a substantially uniform luminance along an entire length of the light output side surface or side surface portions of the distributing light guide 75 and resultantly a lighting with substantially uniform surface luminance or brightness can be produced from substantially entire areas of the surface lighting surface 30a of the surface lighting light guide member or portion 30.

In FIG. 73 and FIG. 74, the light guide unit 142 is composed of the surface lighting light guide 30, the "U" shaped channel light guide 86 and "U" shaped nonlinear distributing light guide 75, in which three light guides or light guide portions 30, 86 and 75 are connected one another in that order to form a single integrated composite unit.

However, three light guides 30, 86 and 75 may be separated to be in contact with in that order to one another, or two light guides of the three light guides 30, 86 and 75 may form a composite, instead.

Twenty Fifth Embodiment (Embodiment: No. 25)

Figure 75:
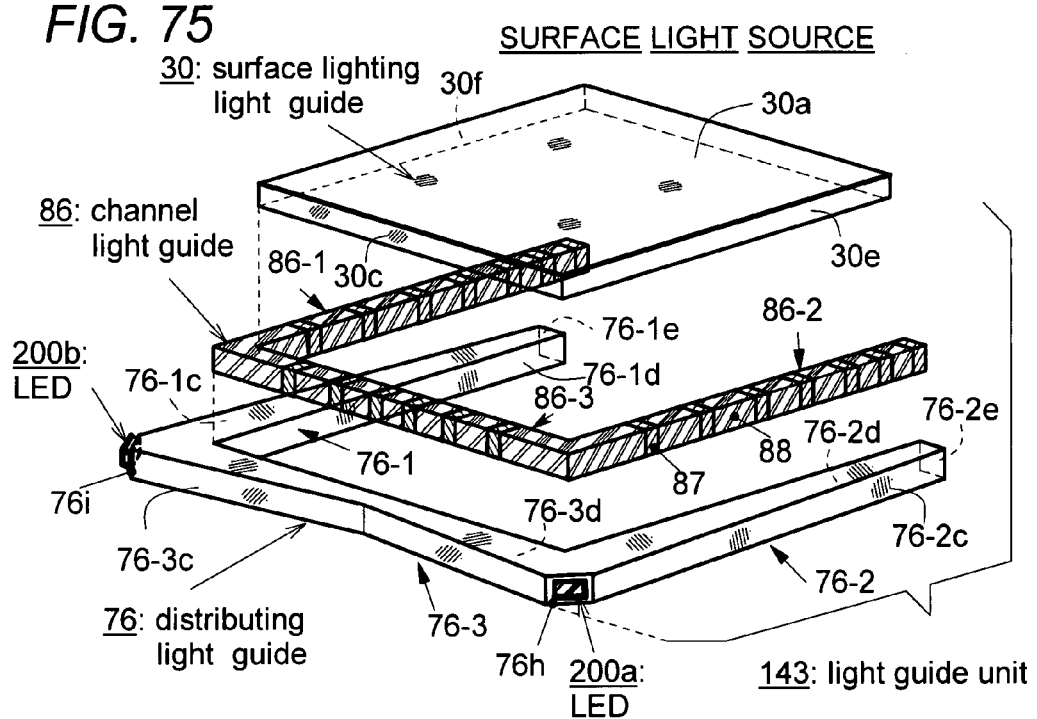
FIG. 75 is a schematic exploded perspective view showing a surface illuminator of other embodiment.
Figure 76:
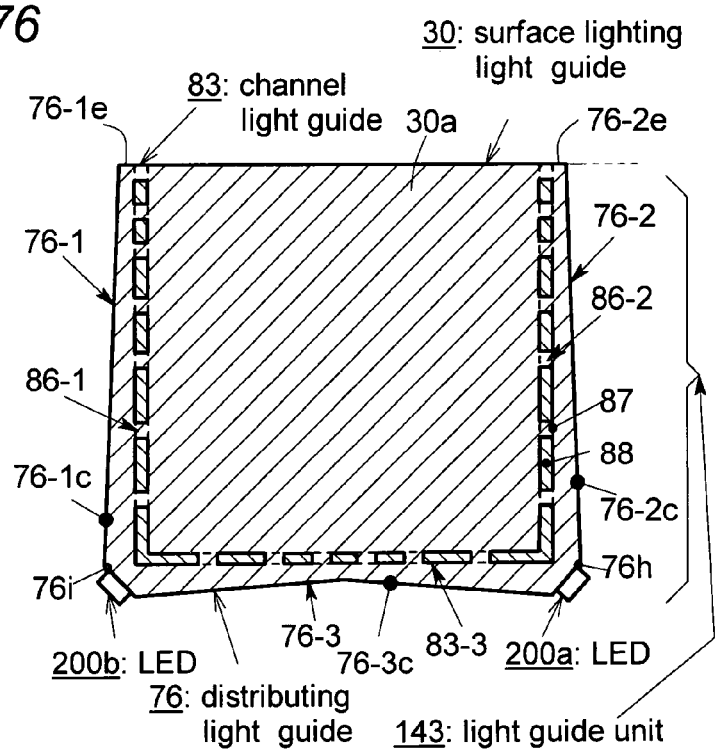
FIG. 76 is a schematic top view showing the surface illuminator in the FIG. 75.

Reference is made to FIG. 75 and FIG. 76 showing a twenty fifth embodiment of the present invention.

FIG. 75 is a schematic exploded perspective view showing a surface illuminator of the twenty fifth embodiment and FIG. 76 is a schematic top view showing the surface illuminator in the FIG. 75.

As shown in FIG. 75 and FIG. 76, a surface illuminator is briefly composed of a light guide unit 143 and two LEDs 200a and 200b, in which the surface illuminator of this embodiment is a modification of the twenty fourth embodiment as shown in FIG. 74 and FIG. 75.

The light guide unit 143 is made of a light transmitting member having a substantially transparent material.

The light guide unit 143 is composed of a surface lighting light guide member 30, a nonlinear light guide member or portion 76 and an optical channel light guide member or portion 86 disposed therebetween, in which the optical channel light guide member or portion 86 is sandwiched laterally by the nonlinear light guide member 76 and the surface lighting light guide member 30.

The nonlinear light guide member 76 is acting as a distributing light guide for distributing light along an entire nonlinear length thereof, in which the light is introduced from two limited areas thereof that are two corner side surfaces 76i and 76h where LEDs 200a and 200b are positioned so as to be in contact with or adjacent to the corner surfaces 76i and 76h.

The nonlinear light guide member 76 is composed of a substantially "U" shaped light guide member having a substantially linear first leg portion 76-1, a substantially linear second leg portion 76-2 opposed to and parallel with the first leg portion 76-1 and a substantially linear bottom portion 76-3 connected with a first slanted side surface 76i of the first leg portion 76-1 and a second slanted side surface 76h of the second leg portion 76-2.

The first and second leg portions 76-1 and 76-2 have end surfaces 76-1e and 76-2e that are optically opposed to each other via an entire length of "U" shaped light guide 76.

It is noted that each of the first and second opposed light guides 76-1 and 76-2 and the bottom light guide 76-3 has a tapered configuration, in which the first and second opposed light guides 76-1 and 76-2 have tapered rear side surfaces and the bottom light guide 76-3 has a tapered rear side surface, in which the distance between the tapered rear side surfaces 76-1 c and 76-2c and the non-tapered front side surfaces 76-1d and 76-2d decreases from the corner sides 76i and 76h toward the end surfaces 76-1e and 76-2e and the distance between the tapered rear side surface 76-3c and the front side surface 76-3d decreases from the corner sides 76I and 76h toward the center of the bottom light guide 76-3.

On the contrary, in the twenty first embodiment as shown in FIG. 74 and FIG. 75, the distance between the rear and front side surfaces of the first and second leg light guides 76-1 and 76-2 are substantially equal or uniform and the distance between the rear and front side surfaces of the bottom light guide 76-3 is substantially equal or uniform.

The channel light guide or optical channel light guide member 86 is composed of opposed linear first and second leg portions 86-1 and 86-2 and a bottom linear portion 86-3 connected with the linear first and second leg portions to form a substantially "U" shaped configuration as a whole similar to the configuration of the distributing light guide 76, in which an external contour with "U" shape of the channel light guide 86 is substantially equal in size to an internal contour with "U" shape of the distributing light guide 76 so as to be connected or in contact with to each other.

An internal contour with "U" shape of the channel light guide 86 is substantially equal in size to an contour with "U" shape of three adjacent side surfaces 30c, 30e and 30f of the surface lighting light guide 30 so as to be connected or in contact with to each other.

The channel light guide or optical channel light guide member 86 is further composed of a plurality of optical channel elements 87 and a plurality of interposers 88, in which the optical channel elements 87 and the adjacent interposers 88 are alternately aligned so as to form a substantially "U" shaped array as a whole, in such a manner that each of the optical channel elements 87 is positioned to be sandwiched by the adjacent interposers 88.

The interposers 88 are composed of a light transmitting solid member having a substantially transparent material having a refractive index lower than the refractive index of the optical channel elements 87.

The interposers 88 may substitute air for the light transmitting solid member since the refractive index (value=1) of the air is generally lower than that of the light transmitting solid member such as PMMA or PC.

Each of the optical channel elements 87 has a substantially equal width and equal light input surface area, while each of the interposers 88 has a substantially variable width.

The optical channel elements 87 are distributed variably in a pitch therebetween in a stepwise or continuous manner to form a first gradation pattern in such a manner that the quantity of the channel elements 87 is increased from the dual corners of the bottom portion 86-3 of the channel light guide portion 86 toward the dual end surfaces of the first and second leg portions 86-1 and 86-2 and from the dual corners of the bottom portion 86-3 toward a center of the bottom portion 86-3.

The interposers 88 are distributed variably in the width in a stepwise or continuous manner to form a second gradation pattern in such a manner that the width of the interposers 88 is decreased f from the dual corners of the bottom portion 86-3 of the channel light guide portion 86 toward the dual end surfaces of the first and second leg portions 86-1 and 86-2 and from the dual corners of the bottom portion 86-3 toward a center of the bottom portion 86-3.

Therefore, light emitting from LEDs 200a and 200b to input into the nonlinear light guide member or portion 76 with "U" shaped configuration can output the light with a substantially uniform luminance along an entire length of the light output side surface or side surface portions of the distributing light guide 76 and resultantly a lighting with substantially uniform surface luminance or brightness can be produced from substantially entire areas of the surface lighting surface 30a of the surface lighting light guide member or portion 30.

In FIG. 75 and FIG. 76, the light guide unit 143 is composed of the surface lighting light guide 30, the "U" shaped channel light guide 86 and "U" shaped nonlinear distributing light guide 76, in which three light guides or light guide portions 30, 86 and 76 are connected one another in that order to form a single integrated composite unit.

However, three light guides 30, 86 and 76 may be separated to be in contact with in that order to one another, or two light guides of the three light guides 30, 86 and 76 may form a composite, instead.

Twenty Sixth Embodiment (Embodiment: No. 26)

Figure 77:
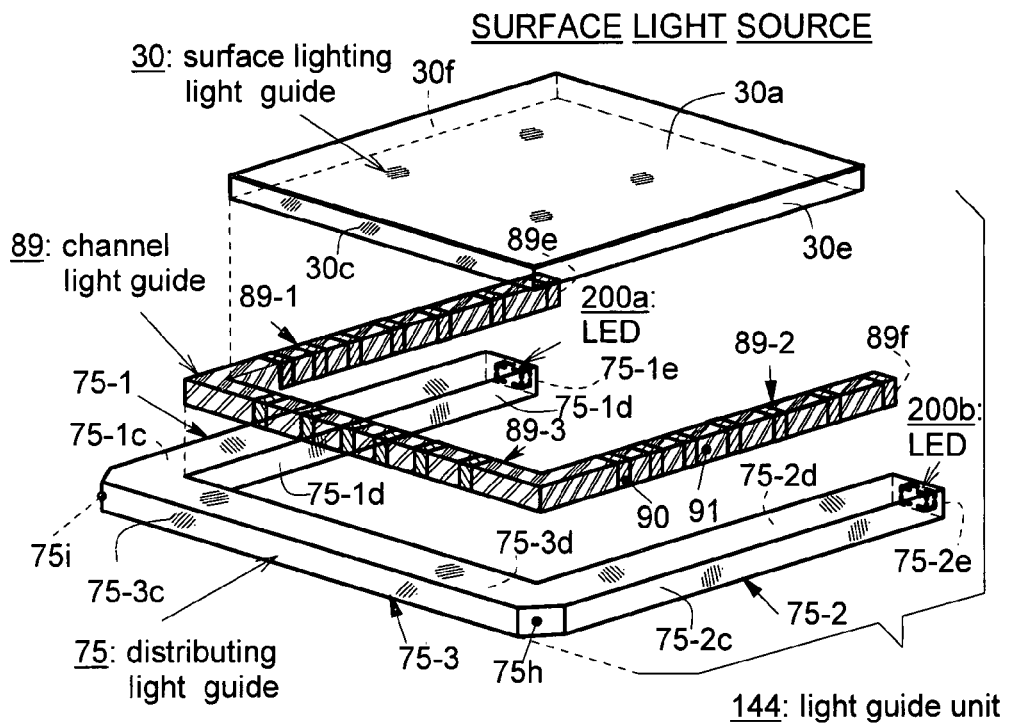
FIG. 77 is a schematic exploded perspective view showing a surface illuminator of other embodiment.
Figure 78:
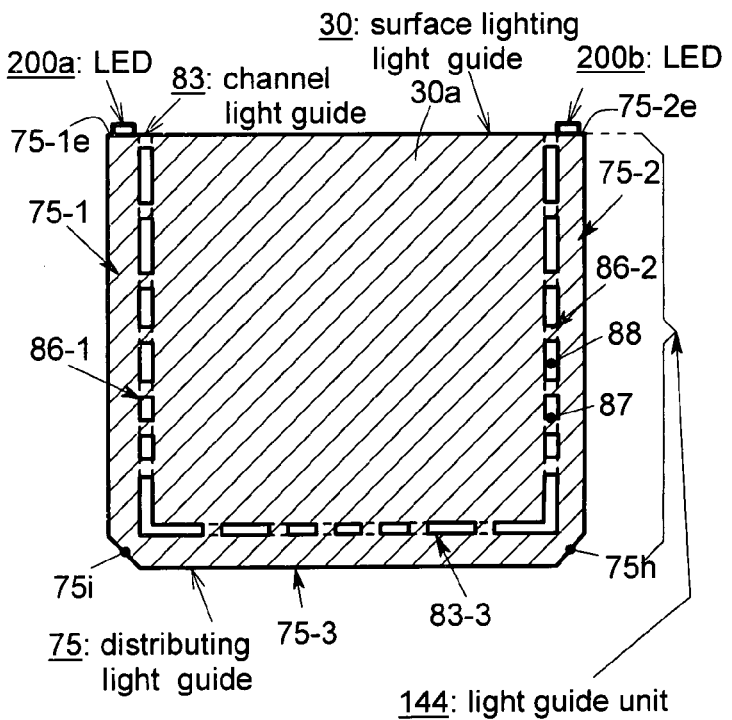
FIG. 78 is a schematic exploded top view showing the surface illuminator in the FIG. 77.

Reference is made to FIG. 77 and FIG. 78 showing a twenty sixth embodiment of the present invention.

FIG. 77 is a schematic exploded perspective view showing a surface illuminator of the twenty sixth embodiment and FIG. 78 is a schematic top view showing the surface illuminator in the FIG. 77.

As shown in FIG. 77 and FIG. 78, a surface illuminator is briefly composed of a light guide unit 144 and two LEDs 200a and 200b, in which the surface illuminator of this embodiment is a modification of the twenty first embodiment as shown in FIG. 74 and FIG. 75.

The light guide unit 144 is made of a light transmitting member having a substantially transparent material.

The light guide unit 144 is composed of a surface lighting light guide member 30, a nonlinear light guide member or portion 75 and an optical channel light guide member or portion 89 disposed therebetween, in which the optical channel light guide member or portion 89 is sandwiched laterally by the nonlinear light guide member 75 and the surface lighting light guide member 30.

The nonlinear light guide member 75 is composed of a substantially "U" shaped light guide member having a substantially linear first leg portion 75-1, a substantially linear second leg portion 75-2 that is opposed to and parallel with the first leg portion 75-1 and a substantially linear bottom portion 75-3 connected with a first slanted side surface 75i of the first leg portion 75-1 and a second slanted side surface 75h of the second leg portion 75-2.

The first and second leg portions 75-1 and 75-2 have first and second end surfaces 75-1e and 75-2e that are optically opposed to each other via an entire length of "U" shaped light guide 75.

The nonlinear light guide member 75 is acting as a distributing light guide for distributing light along an entire nonlinear length thereof, in which the light is introduced from the first and second end surfaces 75-1e and 75-2e where LEDs 200a and 200b are positioned so as to be in contact with or adjacent to the first and second end surfaces 75-1e and 75-2e.

The channel light guide or optical channel light guide member 89 is composed of opposed linear first and second leg portions 89-1 and 89-2 and a bottom linear portion 89-3 connected with the linear first and second leg portions to form a substantially "U" shaped configuration as a whole similar to the configuration of the distributing light guide 75, in which an external contour with "U" shape of the channel light guide 89 is substantially equal in size to an internal contour with "U" shape of the distributing light guide 75 so as to be connected or in contact with to each other.

An internal contour with "U" shape of the channel light guide 89 is substantially equal in size to an contour with "U" shape of three adjacent side surfaces 30c, 30e and 30f of the surface lighting light guide 30 so as to be connected or in contact with to each other.

The channel light guide or optical channel light guide member 89 is further composed of a plurality of optical channel elements 90 and a plurality of interposers 91, in which the optical channel elements 90 and the adjacent interposers 91 are alternately aligned so as to form a substantially "U" shaped array as a whole, in such a manner that each of the optical channel elements 90 is positioned to be sandwiched by the adjacent interposers 91.

The interposers 91 are composed of a light transmitting solid member having a substantially transparent material having a refractive index lower than the refractive index of the optical channel elements 91.

The interposers 91 may substitute air for the light transmitting solid member since the refractive index (value=1) of the air is generally lower than that of the light transmitting solid member such as PMMA or PC.

Each of the optical channel elements 90 has a substantially equal width and equal light input surface area, while each of the interposers 91 has a substantially variable width.

The optical channel elements 90 are distributed variably in a pitch therebetween in a stepwise or continuous manner to form a first gradation pattern in such a manner that the quantity of the channel elements 90 increases from the dual end surfaces of the first and second leg portions 89-1 and 89-2 toward the dual corners of the bottom portion 89-3 of the channel light guide portion 89 and from the dual corners of the bottom portion 89-3 toward a center of the bottom portion 89-3.

The interposers 91 are distributed variably in the width in a stepwise or continuous manner to form a second gradation pattern in such a manner that the width of the interposers 91 substantially decreases from the dual end surfaces of the first and second leg portions 89-1 and 89-2 toward the dual corners of the bottom portion 89-3 of the channel light guide portion 89 and from the dual corners of the bottom portion 89-3 toward a center of the bottom portion 89-3.

Therefore, light emitting from LEDs 200a and 200b to input into the nonlinear light guide member or portion 75 with "U" shaped configuration can output the light with a substantially uniform luminance along an entire length of the light output side surface or side surface portions of the distributing light guide 75 and resultantly a lighting with substantially uniform surface luminance or brightness can be produced from substantially entire areas of the surface lighting surface 30a of the surface lighting light guide member or portion 30.

In FIG. 77 and FIG. 78, the light guide unit 144 is composed of the surface lighting light guide 30, the "U" shaped channel light guide 89 and the "U" shaped nonlinear distributing light guide 75, in which three light guides or light guide portions 30, 89 and 75 are connected one another in that order to form a single integrated composite unit.

However, three light guides 30, 89 and 75 may be separated to be in contact with in that order to one another, or two light guides of the three light guides 30, 89 and 75 may form a composite, instead.

Twenty Seventh Embodiment (Embodiment: No. 27)

Figure 79:
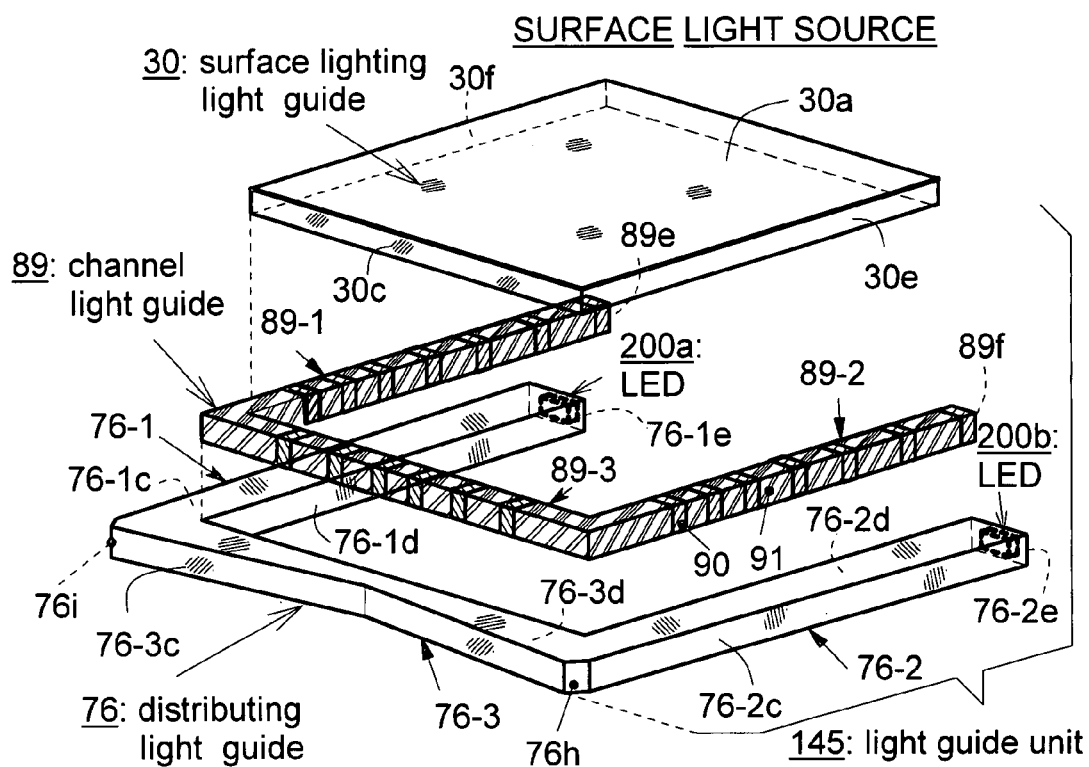
FIG. 79 is a schematic exploded perspective view showing a surface illuminator of other embodiment.
Figure 80:
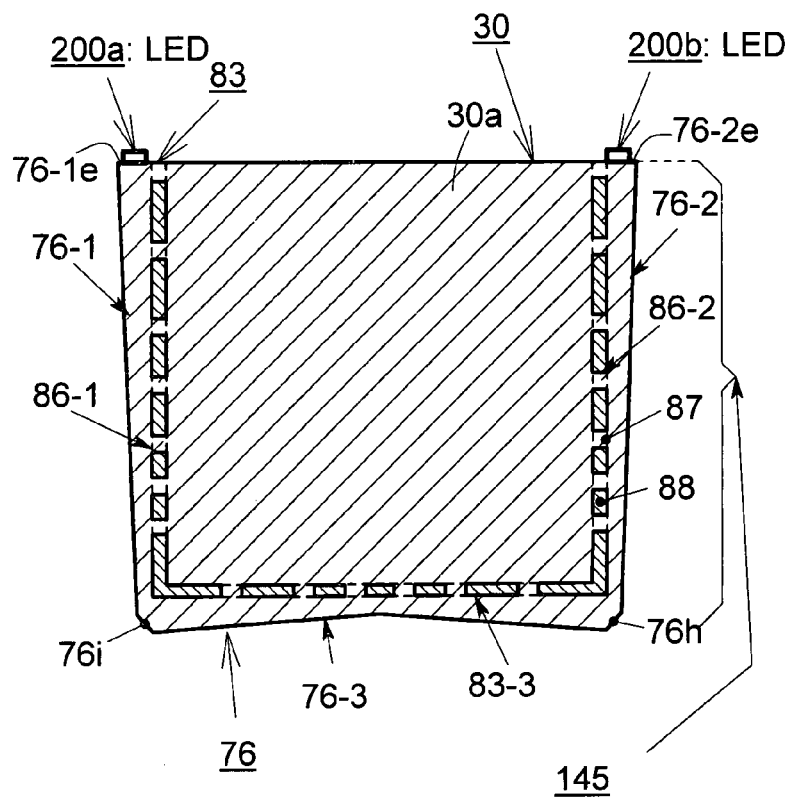
FIG. 80 is a schematic top view showing the surface illuminator in the FIG. 79.

Reference is made to FIG. 79 and FIG. 80 showing a twenty seventh embodiment of the present invention.

FIG. 79 is a schematic exploded perspective view showing a surface illuminator of the twenty seventh embodiment and FIG. 80 is a schematic top view showing the surface illuminator in the FIG. 79.

As shown in FIG. 70 and FIG. 80, a surface illuminator is briefly composed of a light guide unit 145 and two LEDs 200a and 200b, in which the surface illuminator of this embodiment is a modification of the embodiment as shown in FIG. 77 and FIG. 78.

The light guide unit 145 is made of a light transmitting member having a substantially transparent material.

The light guide unit 145 is composed of a surface lighting light guide member 30, a nonlinear light guide member or portion 76 and an optical channel light guide member or portion 89 disposed therebetween, in which the optical channel light guide member or portion 89 is sandwiched laterally by the nonlinear light guide member 76 and the surface lighting light guide member 30.

The nonlinear light guide member 76 is composed of a substantially "U" shaped light guide member having a substantially linear first leg portion 76-1, a substantially linear second leg portion 76-2 that is opposed to and parallel with the first leg portion 76-1 and a substantially linear bottom portion 76-3 connected with a first slanted side surface 76i of the first leg portion 76-1 and a second slanted side surface 76h of the second leg portion 76-2.

The first and second leg portions 76-1 and 76-2 have first and second end surfaces 76-1e and 76-2e that are optically opposed to each other via an entire length of "U" shaped light guide 76.

The nonlinear light guide member 76 is acting as a distributing light guide for distributing light along an entire nonlinear length thereof, in which the light is introduced from the first and second end surfaces 76-1e and 76-2e where LEDs 200a and 200b are positioned so as to be in contact with or adjacent to the first and second end surfaces 76-1e and 76-2e.

It is noted that each of the first and second opposed light guides 76-1 and 76-2 and the bottom light guide 76-3 has a tapered configuration, in which the first and second opposed light guides 76-1 and 76-2 have tapered rear side surfaces and the bottom light guide 76-3 has a tapered rear side surface, in which the distance between the tapered rear side surfaces 76-1c and 76-2c and the non-tapered front side surfaces 76-1d and 76-2d decreases from the corner sides 76i and 76h toward the end surfaces 76-1e and 76-2e and the distance between the tapered rear side surface 76-3c and the front side surface 76-3d decreases from the corner sides 76I and 76h toward the center of the bottom light guide 76-3.

On the contrary, in the twenty third embodiment as shown in FIG. 78 and FIG. 79, the distance between the rear and front side surfaces (75-1c and 75-1d) and (75-2c and 75-2d) of the first and second leg light guides 75-1 and 75-2 are substantially equal or uniform and the distance between the rear and front side surfaces 76-3c and 76-3d of the bottom light guide 76-3 is substantially equal or uniform.

The channel light guide or optical channel light guide member 89 is composed of opposed linear first and second leg portions 89-1 and 89-2 and a bottom linear portion 89-3 connected with the linear first and second leg portions to form a substantially "U" shaped configuration as a whole similar to the configuration of the distributing light guide 76, in which an external contour with "U" shape of the channel light guide 89 is substantially equal in size to an internal contour with "U" shape of the distributing light guide 76 so as to be connected or in contact with to each other.

An internal contour with "U" shape of the channel light guide 89 is substantially equal in size to an contour with "U" shape of three adjacent side surfaces 30c, 30e and 30f of the surface lighting light guide 30 so as to be connected or in contact with to each other.

The channel light guide or optical channel light guide member 89 is further composed of a plurality of optical channel elements 90 and a plurality of interposers 91, in which the optical channel elements 90 and the adjacent interposers 91 are alternately aligned so as to form a substantially "U" shaped array as a whole, in such a manner that each of the optical channel elements 90 is positioned to be sandwiched by the adjacent interposers 91.

The interposers 91 are composed of a light transmitting solid member having a substantially transparent material having a refractive index lower than the refractive index of the optical channel elements 91.

The interposers 91 may substitute air for the light transmitting solid member since the refractive index (value=1) of the air is generally lower than that of the light transmitting solid member such as PMMA or PC.

Each of the optical channel elements 90 has a substantially equal width and equal light input surface area, while each of the interposers 91 has a substantially variable width.

The optical channel elements 90 are distributed variably in a pitch therebetween in a stepwise or continuous manner to form a first gradation pattern in such a manner that the quantity of the channel elements 90 increases from the dual end surfaces of the first and second leg portions 89-1 and 89-2 toward the dual corners of the bottom portion 89-3 of the channel light guide portion 89 and from the dual corners of the bottom portion 89-3 toward a center of the bottom portion 89-3.

The interposers 91 are distributed variably in the width in a stepwise or continuous manner to form a second gradation pattern in such a manner that the width of the interposers 91 substantially decreases from the dual end surfaces of the first and second leg portions 89-1 and 89-2 toward the dual corners of the bottom portion 89-3 of the channel light guide portion 89 and from the dual corners of the bottom portion 89-3 toward a center of the bottom portion 89-3.

Therefore, light emitting from LEDs 200a and 200b to input into the nonlinear light guide member or portion 76 with "U" shaped configuration can output the light with a substantially uniform luminance along an entire length of the light output side surface or side surface portions of the distributing light guide 76 and resultantly a lighting with substantially uniform surface luminance or brightness can be produced from substantially entire areas of the surface lighting surface 30a of the surface lighting light guide member or portion 30.

In FIG. 79 and FIG. 80, the light guide unit 145 is composed of the surface lighting light guide 30, the "U" shaped channel light guide 89 and the "U" shaped nonlinear distributing light guide 76, in which three light guides or light guide portions 30, 89 and 76 are connected one another in that order to form a single integrated composite unit.

However, three light guides 30, 89 and 76 may be separated to be in contact with in that order to one another, or two light guides of the three light guides 30, 89 and 76 may form a composite, instead.

Twenty Eighth Embodiment (Embodiment: No. 28)

Figure 81:
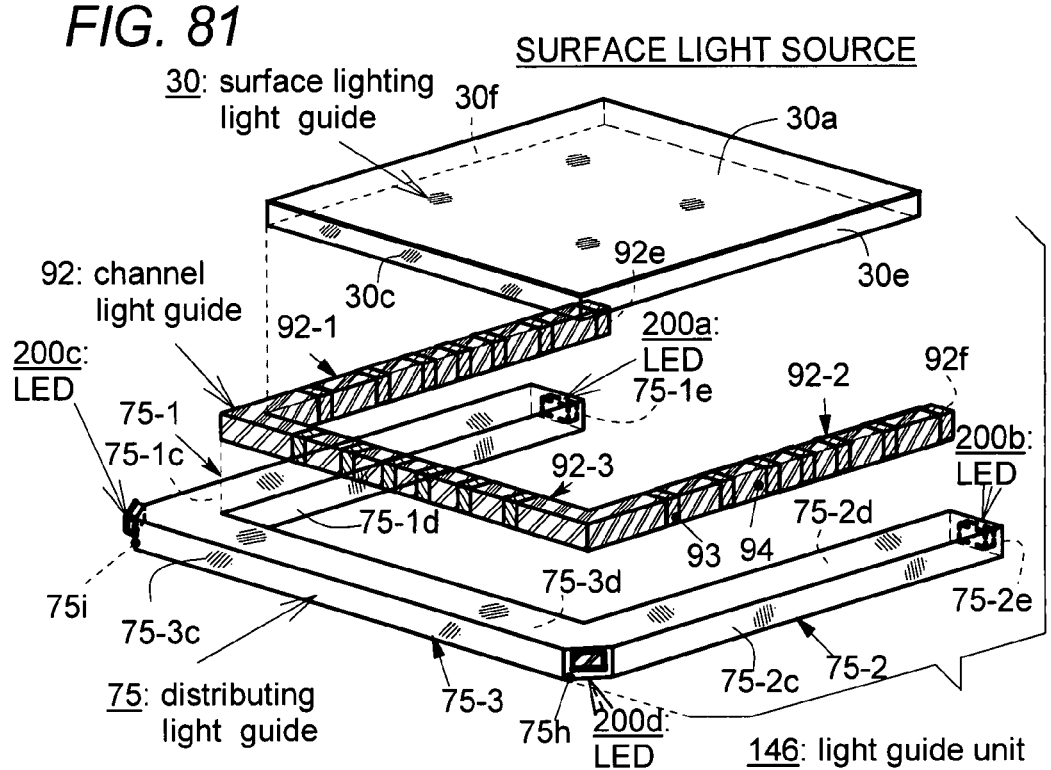
FIG. 81 is a schematic exploded perspective view showing a surface illuminator of other embodiment.
Figure 82:
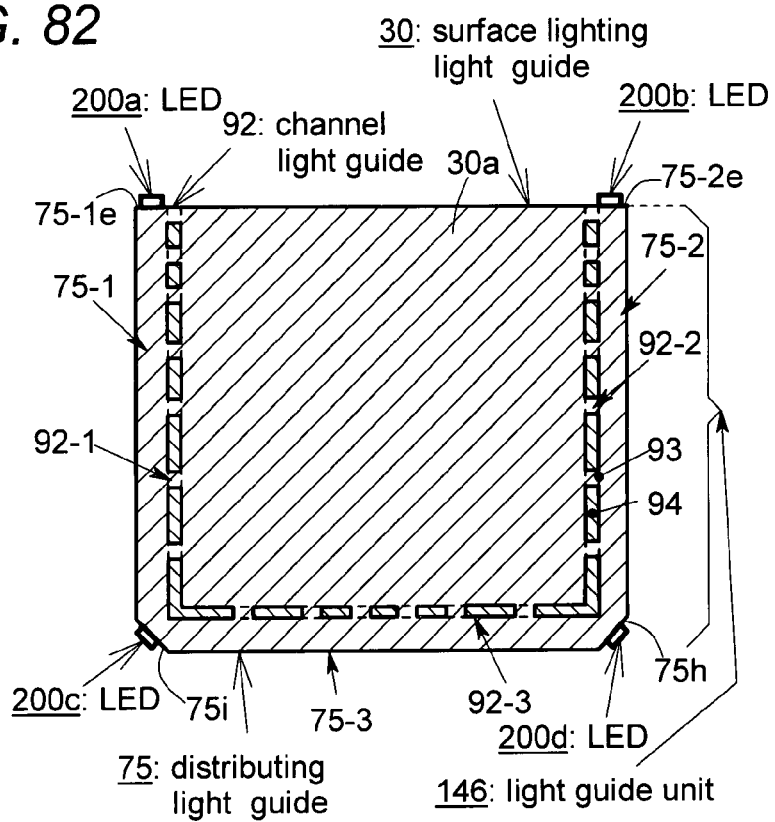
FIG. 82 is a schematic top view showing the surface illuminator in the FIG. 81.

Reference is made to FIG. 81 and FIG. 82 showing a twenty eighth embodiment of the present invention.

FIG. 81 is a schematic exploded perspective view showing a surface illuminator of the twenty eighth embodiment and FIG. 82 is a schematic top view showing the surface illuminator in the FIG. 81.

As shown in FIG. 81 and FIG. 82, a surface illuminator is briefly composed of a light guide unit 145 and four LEDs 200a, 200b, 200c and 200d.

The light guide unit 146 is made of a light transmitting member having a substantially transparent material.

The light guide unit 146 is composed of a surface lighting light guide member 30, a nonlinear light guide member or portion 75 and an optical channel light guide member or portion 92 disposed therebetween, in which the optical channel light guide member or portion 92 is sandwiched laterally by the nonlinear light guide member 75 and the surface lighting light guide member 30.

The nonlinear light guide member 75 is composed of a substantially "U" shaped light guide member having a substantially linear first leg portion 75-1, a substantially linear second leg portion 75-2 that is opposed to and parallel with the first leg portion 75-1 and a substantially linear bottom portion 75-3 connected with a first slanted side surface 75i of the first leg portion 75-1 and a second slanted side surface 75h of the second leg portion 75-2.

The first and second leg portions 75-1 and 75-2 have first and second end surfaces 75-1e and 75-2e that are optically opposed to each other via an entire length of "U" shaped light guide 75.

The nonlinear light guide member 75 is acting as a distributing light guide for distributing light along an entire nonlinear length thereof, in which the light is introduced from the first and second end surfaces 75-1e and 75-2e and dual corner inclined surfaces 75i and 75h, where the four LEDs 200a, 200b, 200c and 200d are positioned so as to be in contact with or adjacent to the first and second end surfaces 75-1e and 75-2e and the dual corner inclined surfaces 75i and 75h.

The distance between the rear and front side surfaces (75-1c and 75-1d) and (75-2c and 75-2d) of the first and second leg light guides 75-1 and 75-2 are substantially equal or uniform and the distance between the rear and front side surfaces 75-3c and 75-3d of the bottom light guide 75-3 is substantially equal or uniform.

THE channel light guide or optical channel light guide member 92 is composed of opposed linear first and second leg portions 92-1 and 92-2 and a bottom linear portion 92-3 connected with the linear first and second leg portions to form a substantially "U" shaped configuration as a whole similar to the configuration of the distributing light guide 75, in which an external contour with "U" shape of the channel light guide 92 is substantially equal in size to an internal contour with "U" shape of the distributing light guide 75 so as to be connected or in contact with to each other.

An internal contour with "U" shape of the channel light guide 92 is substantially equal in size to an contour with "U" shape of three adjacent side surfaces 30c, 30e and 30f of the surface lighting light guide 30 so as to be connected or in contact with to each other.

The channel light guide or optical channel light guide member 92 is further composed of a plurality of optical channel elements 93 and a plurality of interposers 94, in which the optical channel elements 93 and the adjacent interposers 94 are alternately aligned so as to form a substantially "U" shaped array as a whole, in such a manner that each of the optical channel elements 93 is positioned to be sandwiched by the adjacent interposers 94.

The interposers 94 are composed of a light transmitting solid member having a substantially transparent material having a refractive index lower than the refractive index of the optical channel elements 94.

The interposers 94 may substitute air for the light transmitting solid member since the refractive index (value=1) of the air is generally lower than that of the light transmitting solid member such as PMMA or PC.

Each of the optical channel elements 93 has a substantially equal width and equal light input surface area, while each of the interposers 94 has a substantially variable width.

The optical channel elements 93 are distributed variably in a pitch therebetween in a stepwise or continuous manner to form a first gradation pattern in such a manner that the quantity of the channel elements 93 increases from the dual end surfaces of the first and second leg portions 92-1 and 92-2 and the dual corners of the bottom portion 92-3 toward the centers of the first and second leg portions 92-1 and 92-2 and from the dual corners of the bottom portion 92-3 toward the center of the bottom portion 92-3.

The interposers 94 are distributed variably in the width in a stepwise or continuous manner to form a second gradation pattern in such a manner that the width of the interposers 94 substantially decreases from the dual end surfaces of the first and second leg portions 92-1 and 92-2 and the dual corners of the bottom portion 92-3 toward the centers of the first and second leg portions 92-1 and 92-2 and from the dual corners of the bottom portion 92-3 toward the center of the bottom portion 92-3.

Therefore, light emitting from the LEDs 200a, 200b, 200c and 200d to input into the nonlinear light guide member or portion 75 with "U" shaped configuration can output the light with a substantially uniform luminance along an entire length of the light output side surface or side surface portions 75-1d, 75-2d, and 75-3d of the distributing light guide 75 and resultantly a lighting with substantially uniform surface luminance or brightness can be produced from substantially entire areas of the surface lighting surface 30a of the surface lighting light guide member or portion 30.

Figure 83:
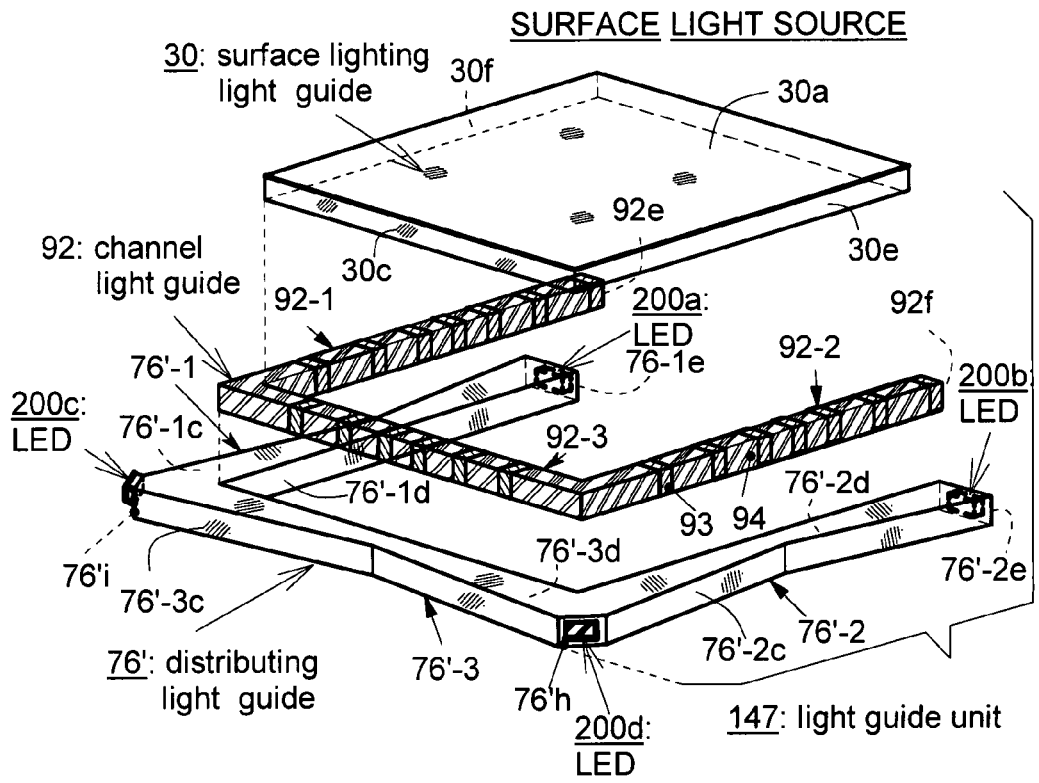
FIG. 83 is a schematic exploded perspective view showing a surface illuminator of other embodiment.

In FIG. 83, the light guide unit 146 is composed of the surface lighting light guide 30, the "U" shaped channel light guide 92 and the "U" shaped nonlinear distributing light guide 75, in which three light guides or light guide portions 30, 92 and 75 are connected one another in that order to form a single integrated composite unit.

However, three light guides 30, 92 and 75 may be separated to be in contact with in that order to one another, or two light guides of the three light guides 30, 92 and 75 may form a composite, instead.

Twenty Ninth Embodiment (Embodiment: No. 29)

Figure 84:
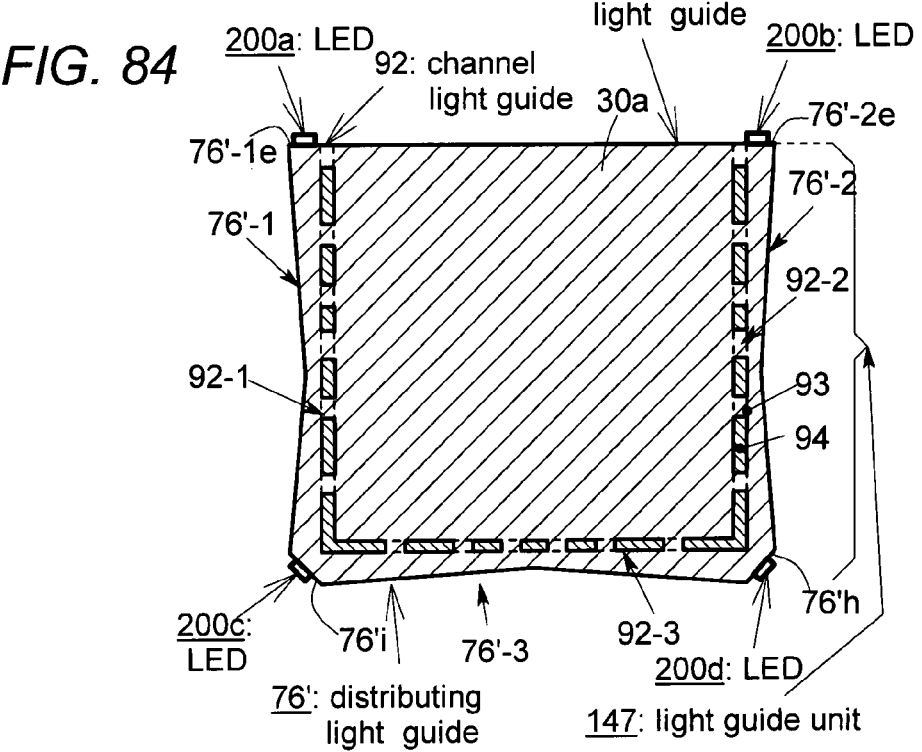
FIG. 84 is a schematic top view showing the surface illuminator in the FIG. 83.

Reference is made to FIG. 83 and FIG. 84 showing a twenty ninth embodiment of the present invention.

FIG. 83 is a schematic exploded perspective view showing a surface illuminator of the twenty ninth embodiment and FIG. 84 is a schematic top view showing the surface illuminator in the FIG. 83.

As shown in FIG. 83 and FIG. 84, a surface illuminator is briefly composed of a light guide unit 147 and four LEDs 200a, 200b, 200c and 200d, in which the surface illuminator of this embodiment is a modification of the embodiment as shown in FIG. 81 and FIG. 82.

The light guide unit 147 is made of a light transmitting member having a substantially transparent material.

The light guide unit 147 is composed of a surface lighting light guide member 30, a nonlinear light guide member or portion 76 and an optical channel light guide member or portion 92 disposed therebetween, in which the optical channel light guide member or portion 92 is sandwiched laterally by the nonlinear light guide member 76 and the surface lighting light guide member 30.

The nonlinear light guide member 76 is composed of a substantially "U" shaped light guide member having a substantially linear first leg portion 76-1, a substantially linear second leg portion 76-2 that is opposed to and parallel with the first leg portion 76-1 and a substantially linear bottom portion 76-3 connected with a first slanted side surface 76i of the first leg portion 76-1 and a second slanted side surface 76h of the second leg portion 76-2.

The first and second leg portions 76-1 and 76-2 have first and second end surfaces 76-1e and 76-2e that are optically opposed to each other via an entire length of "U" shaped light guide 76.

The nonlinear light guide member 76 is acting as a distributing light guide for distributing light along an entire nonlinear length thereof, in which the light is introduced from the first and second end surfaces 76-1e and 76-2e and dual corner inclined surfaces 76i and 76h, where the four LEDs 200a, 200b, 200c and 200d are positioned so as to be in contact with or adjacent to the first and second end surfaces 76-1e and 76-2e and the dual corner inclined surfaces 76i and 76h.

It is noted that each of the first and second opposed light guides 76-1 and 76-2 and the bottom light guide 76-3 has a tapered configuration, in which the first and second opposed light guides 76-1 and 76-2 have tapered rear side surfaces and the bottom light guide 76-3 has a tapered rear side surface, in which the distance between the tapered rear side surfaces 76-1c and 76-2c and the non-tapered front side surfaces 76-1d and 76-2d decreases from the corner sides 76i and 76h toward the end surfaces 76-1e and 76-2e and the distance between the tapered rear side surface 76-3c and the front side surface 76-3d decreases from the corner sides 76I and 76h toward the center of the bottom light guide 76-3.

On the contrary, in the twenty fifth embodiment as shown in FIG. 82 and FIG. 83, the distance between the rear and front side surfaces (75-1c and 75-1d) and (75-2c and 75-2d) of the first and second leg light guides 75-1 and 75-2 are substantially equal or uniform and the distance between the rear and front side surfaces 76-3c and 76-3d of the bottom light guide 76-3 is substantially equal or uniform.

The channel light guide or optical channel light guide member 92 is composed of opposed linear first and second leg portions 92-1 and 92-2 and a bottom linear portion 92-3 connected with the linear first and second leg portions to form a substantially "U" shaped configuration as a whole similar to the configuration of the distributing light guide 76, in which an external contour with "U" shape of the channel light guide 92 is substantially equal in size to an internal contour with "U" shape of the distributing light guide 76 so as to be connected or in contact with to each other.

An internal contour with "U" shape of the channel light guide 92 is substantially equal in size to an contour with "U" shape of three adjacent side surfaces 30c, 30e and 30f of the surface lighting light guide 30 so as to be connected or in contact with to each other.

The channel light guide or optical channel light guide member 92 is further composed of a plurality of optical channel elements 93 and a plurality of interposers 94, in which the optical channel elements 93 and the adjacent interposers 94 are alternately aligned so as to form a substantially "U" shaped array as a whole, in such a manner that each of the optical channel elements 93 is positioned to be sandwiched by the adjacent interposers 94.

The interposers 94 are composed of a light transmitting solid member having a substantially transparent material having a refractive index lower than the refractive index of the optical channel elements 94.

The interposers 94 may substitute air for the light transmitting solid member since the refractive index (value=1) of the air is generally lower than that of the light transmitting solid member such as PMMA or PC.

Each of the optical channel elements 93 has a substantially equal width and equal light input surface area, while each of the interposers 94 has a substantially variable width.

The optical channel elements 93 are distributed variably in a pitch therebetween in a stepwise or continuous manner to form a first gradation pattern in such a manner that the quantity of the channel elements 93 increases from the dual end surfaces of the first and second leg portions 92-1 and 92-2 and the dual corners of the bottom portion 92-3 toward the centers of the first and second leg portions 92-1 and 92-2 and from the dual corners of the bottom portion 92-3 toward the center of the bottom portion 92-3.

The interposers 94 are distributed variably in the width in a stepwise or continuous manner to form a second gradation pattern in such a manner that the width of the interposers 94 substantially decreases from the dual end surfaces of the first and second leg portions 92-1 and 92-2 and the dual corners of the bottom portion 92-3 toward the centers of the first and second leg portions 92-1 and 92-2 and from the dual corners of the bottom portion 92-3 toward the center of the bottom portion 92-3.

Therefore, light emitting from the LEDs 200a, 200b, 200c and 200d to input into the nonlinear light guide member or portion 76 with "U" shaped configuration can output the light with a substantially uniform luminance along an entire length of the light output side surface or side surface portions 76-1d, 76-2d, and 76-3d of the distributing light guide 76 and resultantly a lighting with substantially uniform surface luminance or brightness can be produced from substantially entire areas of the surface lighting surface 30a of the surface lighting light guide member or portion 30.

In FIG. 83 and FIG. 84, the light guide unit 147 is composed of the surface lighting light guide 30, the "U" shaped channel light guide 92 and the "U" shaped nonlinear distributing light guide 76, in which three light guides or light guide portions 30, 92 and 76 are connected one another in that order to form a single integrated composite unit.

However, three light guides 30, 92 and 76 may be separated to be in contact with in that order to one another, or two light guides of the three light guides 30, 92 and 76 may form a composite, instead.

Thirtieth Embodiment (Embodiment: No. 30)

Figure 87:
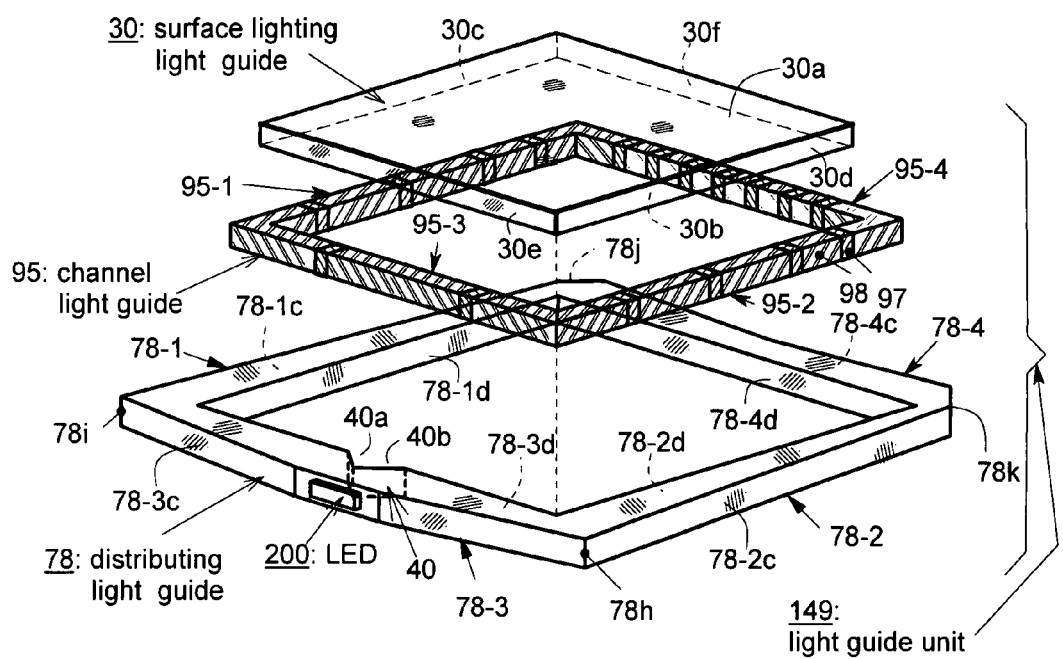
FIG. 87 is a schematic exploded perspective view showing a surface illuminator of other embodiment.

Reference is made to FIG. 86 and FIG. 87 showing a thirtieth embodiment of the present invention.

FIG. 85 is a schematic exploded perspective view showing a surface illuminator of the thirtieth embodiment and FIG. 86 is a schematic top view showing the surface illuminator in the FIG. 85.

As shown in FIG. 85 and FIG. 86, a surface illuminator is briefly composed of a light guide unit 148 and at least one LED 200, in which the surface illuminator of this embodiment is a modification of the embodiment as shown in FIG. 71 and FIG. 72.

The light guide unit 148 is made of a light transmitting member having a substantially transparent material.

The light guide unit 148 is composed of a surface lighting light guide member 30, a nonlinear light guide member or portion 77 and an optical channel light guide member or portion 95 disposed therebetween, in which the optical channel light guide member or portion 95 is sandwiched laterally by the nonlinear light guide member 77 and the surface lighting light guide member 30.

The nonlinear light guide member 77 is acting as a distributing light guide for distributing light along an entire length thereof.

The nonlinear light guide member 77 is composed of an annular light guide member having substantially rectangular flame, "O" shaped, flame-like, loop-like or ring-like light guide member, in which the nonlinear light guide member 77 is further composed of a substantially linear first portion 77-1, a substantially linear second portion 77-2 opposed to and parallel with the substantially linear first portion 77-1, a substantially linear third portion 77-3 and a substantially linear fourth portion 77-4 opposed to and parallel with the substantially linear first portion 77-3.

The nonlinear light guide member 77 is further provided with four corner surfaces 77i, 77h, 77j and 77k at the four corners of four substantially linear first, second, third and fourth portions 77-1, 77-2, 77-3 and 77-4, where the first, second, third and fourth portions 77-1, 77-2, 77-3 and 77-4 are connected to one another.

The first, second, third and fourth portions 77-1, 77-2, 77-3 and 77-4 have rear side surfaces 77-1c, 77-2c, 77-3c and 77-4c and front side surfaces 77-1d, 77-2d, 77-3d and 77-4d opposed to the rear side surfaces 77-1c, 77-2c, 77-3c and 77-4c respectively.

The substantially linear third portion 77-3 is provided with a reflector 40 near a center thereof in the front side surface 77-3d, in which the reflector 40 is composed of opposed reflecting surfaces or portions 40a and 40b with a substantially "V" shaped configuration that is one portion of the front side surface 77-3d.

LED 200 is disposed in contact with, adjacent to the rear side surface 77-3d near a center thereof in the substantially linear third portion 77-3 so that a light emitting window of the LED 200 faces the opposed reflecting surfaces 40a and 40b of the reflector 40.

The channel light guide or optical channel light guide member 95 is composed of an annular light guide member having a substantially rectangular flame, "O" shaped, flame-like, loop-like or ring-like light guide member, in which the optical channel light guide member 95 is further composed of a substantially linear first portion 95-1, a substantially linear second portion 95-2 opposed to and parallel with the substantially linear first portion 95-1, a substantially linear third portion 95-3 and a substantially linear fourth portion 95-4 opposed to and parallel with the substantially linear first portion 95-1.

The first, second, third and fourth portions 95-1, 95-2, 95-3 and 95-4 of the channel light guide or optical channel light guide member 95 are connected together to form the substantially flame-like configuration as a whole similar to the configuration of the distributing light guide 77, in which an external contour with the substantially rectangular flame-like configuration of the channel light guide 95 is substantially equal in size to an internal contour with the substantially rectangular flame-like configuration of the distributing light guide 77 so as to be connected or in contact with to each other.

An internal contour with the substantially rectangular flame-like configuration of the channel light guide 95 is substantially equal in size to an contour with the substantially rectangular shape of four side surfaces 30c, 30d, 30e and 30f of the surface lighting light guide 30 so as to be connected or in contact with to each other.

The channel light guide or optical channel light guide member 95 is further composed of a plurality of optical channel elements 97 and a plurality of interposers 98, in which the optical channel elements 97 and the adjacent interposers 98 are alternately aligned so as to form a substantially rectangular flame-like array as a whole, in such a manner that each of the optical channel elements 97 is positioned to be sandwiched by the adjacent interposers 98.

The interposers 98 are composed of a light transmitting solid member having a substantially transparent material having a refractive index lower than the refractive index of the optical channel elements 97.

The interposers 98 may substitute air for the light transmitting solid member since the refractive index (value=1) of the air is generally lower than that of the light transmitting solid member such as PMMA or PC.

Each of the optical channel elements 97 has a substantially equal width and equal light input surface area, while each of the interposers 98 has a substantially variable width.

The optical channel elements 97 are distributed variably in a pitch therebetween in a stepwise or continuous manner to form a gradation pattern in such a manner that the quantity of the channel elements 97 increases from a center of the third distributing light guide portion 77-3 where LED 200 is positioned toward a center of the fourth distributing light guide portion 77-4 via the first and second distributing light guide portions 77-1 and 77-2.

On the contrary, the interposers 98 are distributed variably in the width in a stepwise or continuous manner to form a gradation pattern in such a manner that the width of the interposers 98 decreases from a center of the third distributing light guide portion 77-3 where LED 200 is positioned toward a center of the fourth distributing light guide portion 77-4 via the first and second distributing light guide portions 77-1 and 77-2.

Therefore, light emitting from LED 200 to input into the nonlinear light guide member or portion 77 with the substantially rectangular flame-like shaped configuration can output the light with a substantially uniform luminance along an entire length of the light output side surface or side surface portion 77-1d, 77-2d, 77-3d and 77-4d and resultantly a lighting with substantially uniform surface luminance or brightness can be produced from substantially entire areas of the surface lighting surface 30a of the surface lighting light guide member or portion 30.

In FIG. 85 and FIG. 86, the light guide unit 148 is composed of the surface lighting light guide 30, the substantially rectangular flame-like shaped channel light guide 95 and the substantially rectangular flame-like shaped nonlinear distributing light guide 77, in which three light guides 30, 95 and 77 are connected one another in that order to form a single integrated composite unit.

However, three light guides 30, 95 and 77 may be separated to be in contact with in that order to one another, or two light guides of the three light guides 30, 95 and 77 may form a composite, instead.

Thirty First Embodiment (Embodiment: No. 31)

Figure 88:
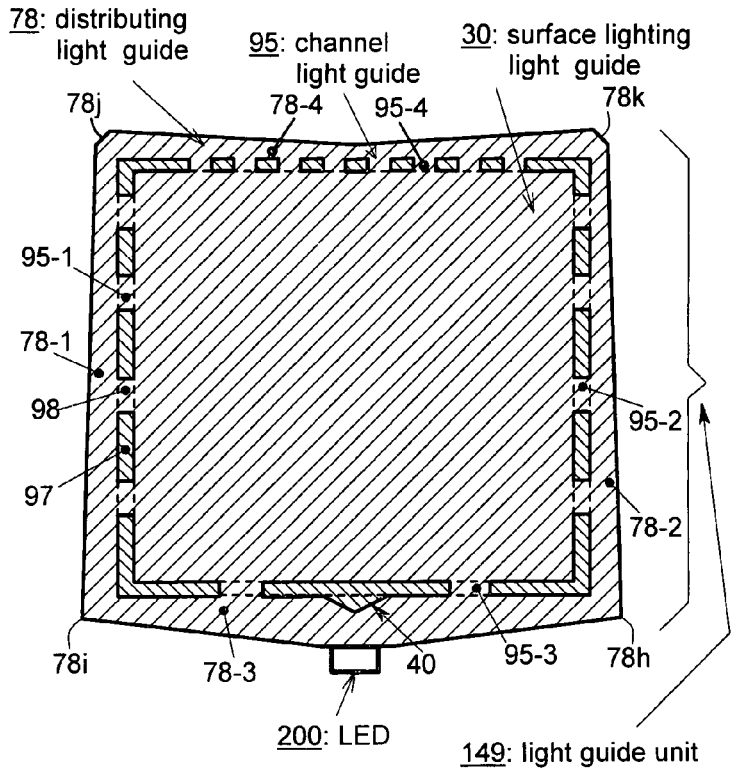
FIG. 88 is a schematic top view showing the surface illuminator in the FIG. 87.

Reference is made to FIG. 87 and FIG. 88 showing a thirty first embodiment of the present invention.

FIG. 87 is a schematic exploded perspective view showing a surface illuminator of the thirty first embodiment and FIG. 88 is a schematic top view showing the surface illuminator in the FIG. 87.

As shown in FIG. 87 and FIG. 88, a surface illuminator is briefly composed of a light guide unit 149 and at least one LED 200, in which the surface illuminator of this embodiment is a modification of the embodiment as shown in FIG. 85 and FIG. 86.

The light guide unit 149 is made of a light transmitting member having a substantially transparent material.

The light guide unit 149 is composed of a surface lighting light guide member 30, a nonlinear light guide member or portion 78 and an optical channel light guide member or portion 95 disposed therebetween, in which the optical channel light guide member or portion 95 is sandwiched laterally by the nonlinear light guide member 78 and the surface lighting light guide member 30.

The nonlinear light guide member or distributing light guide member 78 is acting as a distributing light guide for distributing light along an entire length thereof.

The nonlinear light guide member 78 is composed of an annular light guide member having a substantially rectangular flame, "O" shaped, flame-like, loop-like or ring-like light guide member, in which the nonlinear light guide member 78 is further composed of a substantially linear first portion 78-1, a substantially linear second portion 78-2 opposed to and parallel with the substantially linear first portion 78-1, a substantially linear third portion 78-3 and a substantially linear fourth portion 78-4 opposed to and parallel with the substantially linear first portion 78-3.

The nonlinear light guide member 78 is further provided with four corner and corner surfaces 78i, 78h, 78j and 78k at the four corners of four substantially linear first, second, third and fourth portions 78-1, 78-2, 78-3 and 78-4, where the first, second, third and fourth distributing light guide portions 78-1, 78-2, 78-3 and 78-4 are connected to one another.

The first, second, third and fourth portions 78-1, 78-2, 78-3 and 78-4 have rear side surfaces 78-1c, 78-2c, 78-3c and 78-4c and front side surfaces 78-1d, 78-2d, 78-3d and 78-4d opposed to the rear side surfaces 78-1c, 78-2c, 78-3c and 78-4c respectively.

It is noted that each of the first, second, third and fourth distributing light guide portions 78-1, 78-2, 78-3 and 78-4 has a tapered configuration, in which the distributing light guide portions 78-1, 78-2, 78-3 and 78-4 have tapered rear side surfaces 78-1c, 78-2c, 78-3c and 78-4c, in which the distance between the tapered rear side surfaces 78-1c and 78-2c and the non-tapered front side surfaces 78-1d and 78-2d decreases from the corners 78i and 78h toward the corner surfaces 78j and 78k and the distance between the tapered rear side surface 78-3c and 78-4c and the front side surface 78-3d and 78-4d decreases from the centers of the third and fourth distributing light guide 78-3 and 78-4 toward the corner surfaces 78j and 78k.

On the contrary, in the twenty sixth embodiment as shown in FIG. 86 and FIG. 87, the distance between the rear and front side surfaces (78-1c, 78-2c, 78-3c and 78-4c) and (78-1d, 78-2d, 78-3d and 78-4d) are substantially equal or uniform.

The substantially linear third portion 78-3 is provided with a reflector 40 near a center thereof in the front side surface 78-3d, in which the reflector 40 is composed of opposed reflecting surfaces or portions 40a and 40b with a substantially "V" shaped configuration that is one portion of the front side surface 78-3d.

LED 200 is disposed in contact with, adjacent to the rear side surface 78-3d near a center thereof in the substantially linear third portion 78-3 so that a light emitting window of the LED 200 faces the opposed reflecting surfaces 40a and 40b of the reflector 40.

The channel light guide or optical channel light guide member 95 is composed of an annular light guide member having a substantially rectangular flame, "O" shaped, flame-like, loop-like or ring-like light guide member, in which the optical channel light guide member 95 is further composed of a substantially linear first portion 95-1, a substantially linear second portion 95-2 opposed to and parallel with the substantially linear first portion 95-1, a substantially linear third portion 95-3 and a substantially linear fourth portion 95-4 opposed to and parallel with the substantially linear first portion 95-1.

The first, second, third and fourth portions 95-1, 95-2, 95-3 and 95-4 of the channel light guide or optical channel light guide member 95 are connected together to form the substantially flame-like configuration as a whole similar to the configuration of the distributing light guide 78, in which an external contour with the substantially rectangular flame-like configuration of the channel light guide 95 is substantially equal in size to an internal contour with the substantially rectangular flame-like configuration of the distributing light guide 78 so as to be connected or in contact with to each other.

An internal contour with the substantially rectangular flame-like configuration of the channel light guide 95 is substantially equal in size to an contour with the substantially rectangular shape of four side surfaces 30c, 30d, 30e and 30f of the surface lighting light guide 30 so as to be connected or in contact with to each other.

The channel light guide or optical channel light guide member 95 is further composed of a plurality of optical channel elements 97 and a plurality of interposers 98, in which the optical channel elements 97 and the adjacent interposers 98 are alternately aligned so as to form a substantially rectangular flame-like array as a whole, in such a manner that each of the optical channel elements 97 is positioned to be sandwiched by the adjacent interposers 98.

The interposers 98 are composed of a light transmitting solid member having a substantially transparent material having a refractive index lower than the refractive index of the optical channel elements 97.

The interposers 98 may substitute air for the light transmitting solid member since the refractive index (value=1) of the air is generally lower than that of the light transmitting solid member such as PMMA or PC.

Each of the optical channel elements 97 has a substantially equal width and equal light input surface area, while each of the interposers 98 has a substantially variable width.

The optical channel elements 97 are distributed variably in a pitch therebetween in a stepwise or continuous manner to form a gradation pattern in such a manner that the quantity of the channel elements 97 increases from a center of the third distributing light guide portion 78-3 where LED 200 is positioned toward a center of the fourth distributing light guide portion 78-4 via the first and second distributing light guide portions 78-1 and 78-2.

On the contrary, the interposers 98 are distributed variably in the width in a stepwise or continuous manner to form a gradation pattern in such a manner that the width of the interposers 98 decreases from a center of the third distributing light guide portion 78-3 where LED 200 is positioned toward a center of the fourth distributing light guide portion 78-4 via the first and second distributing light guide portions 78-1 and 78-2.

Therefore, light emitting from LED 200 to input into the nonlinear light guide member or portion 78 with the substantially rectangular flame-like shaped configuration can output the light with a substantially uniform luminance along an entire length of the light output side surface or side surface portion 78-1d, 78-2d, 78-3d and 78-4d and resultantly a lighting with substantially uniform surface luminance or brightness can be produced from substantially entire areas of the surface lighting surface 30a of the surface lighting light guide member or portion 30.

In FIG. 87 and FIG. 88, the light guide unit 149 is composed of the surface lighting light guide 30, the substantially rectangular flame-like shaped channel light guide 95 and the substantially rectangular flame-like shaped nonlinear distributing light guide 78, in which three light guides 30, 95 and 78 are connected one another in that order to form a single integrated composite unit.

However, three light guides 30, 95 and 78 may be separated to be in contact with in that order to one another, or two light guides of the three light guides 30, 95 and 78 may form a composite, instead.

Thirty Second Embodiment (Embodiment: No. 32)

Figure 89:
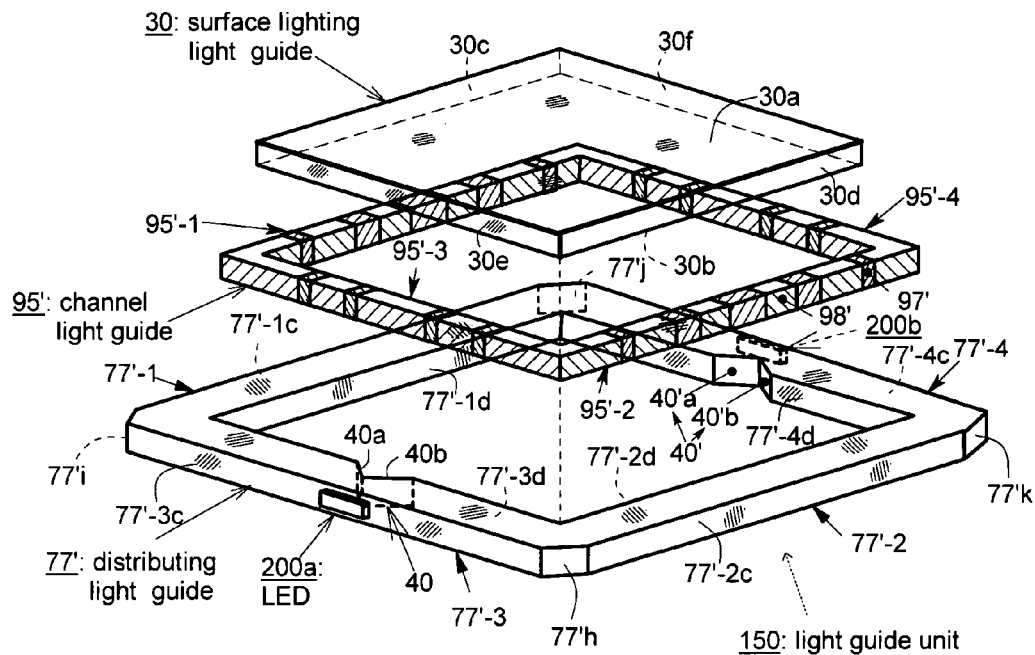
FIG. 89 is a schematic exploded perspective view showing a surface illuminator of other embodiment.
Figure 90:
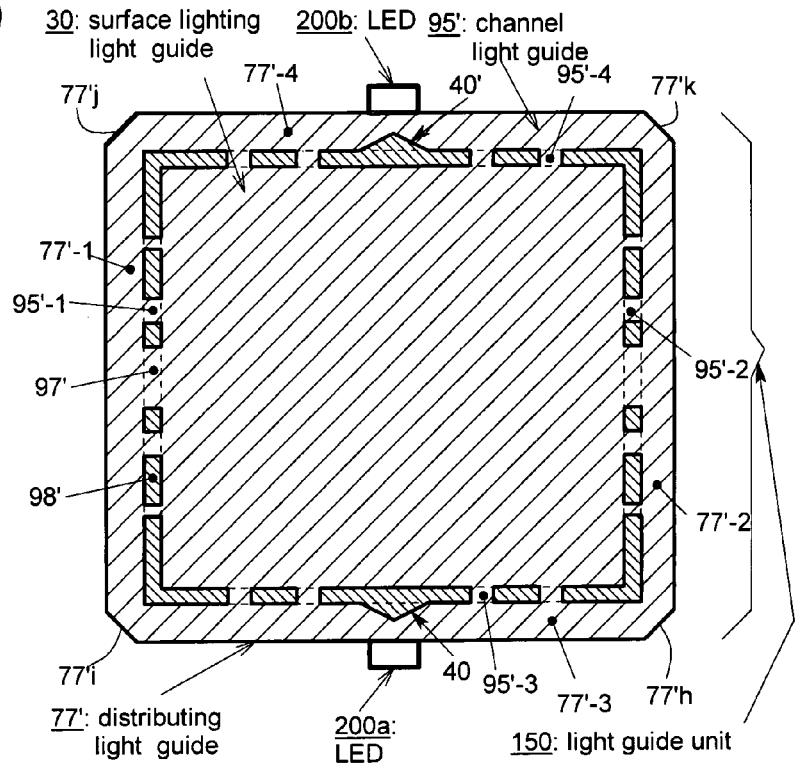
FIG. 90 is a schematic top view showing the surface illuminator in the FIG. 89.

Reference is made to FIG. 89 and FIG. 90 showing a thirty second embodiment of the present invention, in which FIG. 89 is a schematic exploded perspective view showing a surface illuminator of the thirty second embodiment and FIG. 90 is a schematic top view showing the surface illuminator in the FIG. 89.

As shown in FIG. 89 and FIG. 90, a surface illuminator is briefly composed of a light guide unit 150 and dual LEDs 200a and 200b, in which the surface illuminator of this embodiment is a modification of the embodiment as shown in FIG. 87 and FIG. 88.

The light guide unit 150 is made of a light transmitting member having a substantially transparent material.

The light guide unit 150 is composed of a surface lighting light guide member 30, a nonlinear light guide member or portion 78 and an optical channel light guide member or portion 95 disposed therebetween, in which the optical channel light guide member or portion 95' is sandwiched laterally by the nonlinear light guide member 78 and the surface lighting light guide member 30.

The nonlinear light guide member 78 is acting as a distributing light guide for distributing light along an entire length thereof.

The nonlinear light guide member 78 is composed of an annular light guide member having a substantially rectangular flame-like, "O" shaped, flame-like or ring-like light guide member, in which the nonlinear light guide member 78 is further composed of a substantially linear first portion 78-1, a substantially linear second portion 78-2 opposed to and parallel with the substantially linear first portion 78-1, a substantially linear third portion 78-3 and a substantially linear fourth portion 78-4 opposed to and parallel with the substantially linear first portion 78-3.

The nonlinear light guide member 78 is further provided with four corner surfaces 78i, 78h, 78j and 78k at the four corners of four substantially linear first, second, third and fourth portions 78-1, 78-2, 78-3 and 78-4, where the first, second, third and fourth portions 78-1, 78-2, 78-3 and 78-4 are connected to one another.

The first, second, third and fourth portions 78-1, 78-2, 78-3 and 78-4 have rear side surfaces 78-1c, 78-2c, 78-3c and 78-4c and front side surfaces 78-1d, 78-2d, 78-3d and 78-4d opposed to the rear side surfaces 78-1c, 78-2c, 78-3c and 78-4c respectively.

The substantially linear third and fourth distributing light guide portions 78-3 and 78-4 are provided with reflectors 40 and 40' near each center thereof in the front side surface 78-3d and 78-4d, in which each of the reflectors 40 and 40' is composed of opposed reflecting surfaces or portions (40a and 40b) or (40'a and 40'b) with a substantially "V" shaped configuration that is one portion of the front side surface 78-3d or 78-4d.

LEDs 200a and 200b are disposed in contact with, adjacent to the rear side surface 78-3c and 78-4d near the centers thereof in the substantially linear third and fourth distributing light guide portions 78-3 and 78-4 so that each light emitting window of the LEDs 200a and 200b faces the opposed reflecting surfaces (40a and 40b of the reflector 40) or (40'a and 40'b of the reflector 40').

The channel light guide or optical channel light guide member 95' is composed of an annular channel light guide member having a substantially rectangular flame-like channel light guide member, "O" shaped, flame-like, loop-like or ring-like light guide member, in which the optical channel light guide member 95' is further composed of a substantially linear first portion 95'-1, a substantially linear second portion 95'-2 opposed to and parallel with the substantially linear first portion 95'-1, a substantially linear third portion 95'-3 and a substantially linear fourth portion 95'-4 opposed to and parallel with the substantially linear first portion 95'-1.

The first, second, third and fourth portions 95'-1, 95'-2, 95'-3 and 95'-4 of the channel light guide or optical channel light guide member 95' are connected together to form the substantially flame-like configuration as a whole similar to the configuration of the distributing light guide 78, in which an external contour with the substantially rectangular flame-like configuration of the channel light guide 95' is substantially equal in size to an internal contour with the substantially rectangular flame-like configuration of the distributing light guide 78 so as to be connected or in contact with to each other.

An internal contour with the substantially rectangular flame-like configuration of the channel light guide 95' is substantially equal in size to an contour with the substantially rectangular shape of four side surfaces 30c, 30d, 30e and 30f of the surface lighting light guide 30 so as to be connected or in contact with to each other.

The channel light guide or optical channel light guide member 95' is further composed of a plurality of optical channel elements 97' and a plurality of interposers 98', in which the optical channel elements 97' and the adjacent interposers 98' are alternately aligned so as to form a substantially rectangular flame-like array as a whole, in such a manner that each of the optical channel elements 97' is positioned to be sandwiched by the adjacent interposers 98'.

The interposers 98' are composed of a light transmitting solid member having a substantially transparent material having a refractive index lower than the refractive index of the optical channel elements 97'.

The interposers 98' may substitute air for the light transmitting solid member since the refractive index (value=1) of the air is generally lower than that of the light transmitting solid member such as PMMA or PC.

Each of the optical channel elements 97' has a substantially equal width and equal light input surface area, while each of the interposers 98' has a substantially variable width.

The optical channel elements 97' are distributed variably in a pitch or width therebetween in a stepwise or continuous manner to form a first gradation pattern in such a manner that the quantity or width of the channel elements 97' increases from the centers of the third and fourth channel light guide portions 95'-3 and 95'-4 toward the centers of the first and second channel light guide portions 95'-3 and 95'-4.

On the contrary, the interposers 98' are distributed variably in a width or pitch in a stepwise or continuous manner to form a second gradation pattern in such a manner that the width of the interposers 98' decreases from the centers of the third and fourth channel light guide portions 95'-3 and 95'-4 toward the centers of the first and second channel light guide portions 95'-3 and 95'-4.

Therefore, light emitting from the dual LEDs 200a and 200b to input into the nonlinear i.e. annular light guide member or portion 78 with the substantially rectangular flame-like configuration can output the light with a substantially uniform luminance along an entire length of the light output side surface or side surface portion 78-1d, 78-2d, 78-3d and 78-4d and resultantly a lighting with substantially uniform surface luminance or brightness can be produced from substantially entire areas of the surface lighting surface 30a of the surface lighting light guide member or portion 30.

In FIG. 89 and FIG. 90, the light guide unit 150 is composed of the surface lighting light guide 30, the substantially rectangular flame-like channel light guide member 95' and the substantially rectangular flame-like distributing light guide 78, in which three light guides 30, 95' and 78 are connected one another in that order to form a single integrated composite unit.

However, three light guides 30, 95' and 78 may be separated to be in contact with in that order to one another, or two light guides of the three light guides 30, 95' and 78 may form a composite, instead.

Thirty Third Embodiment (Embodiment: No. 33)

Figure 91:
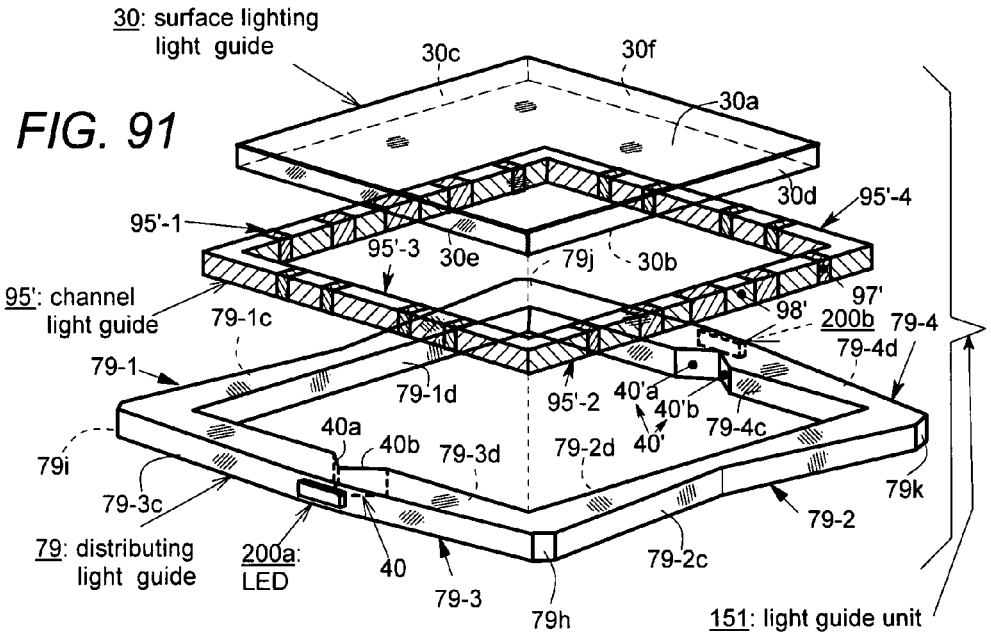
FIG. 91 is a schematic exploded perspective view showing a surface illuminator of t other embodiment.
Figure 92:
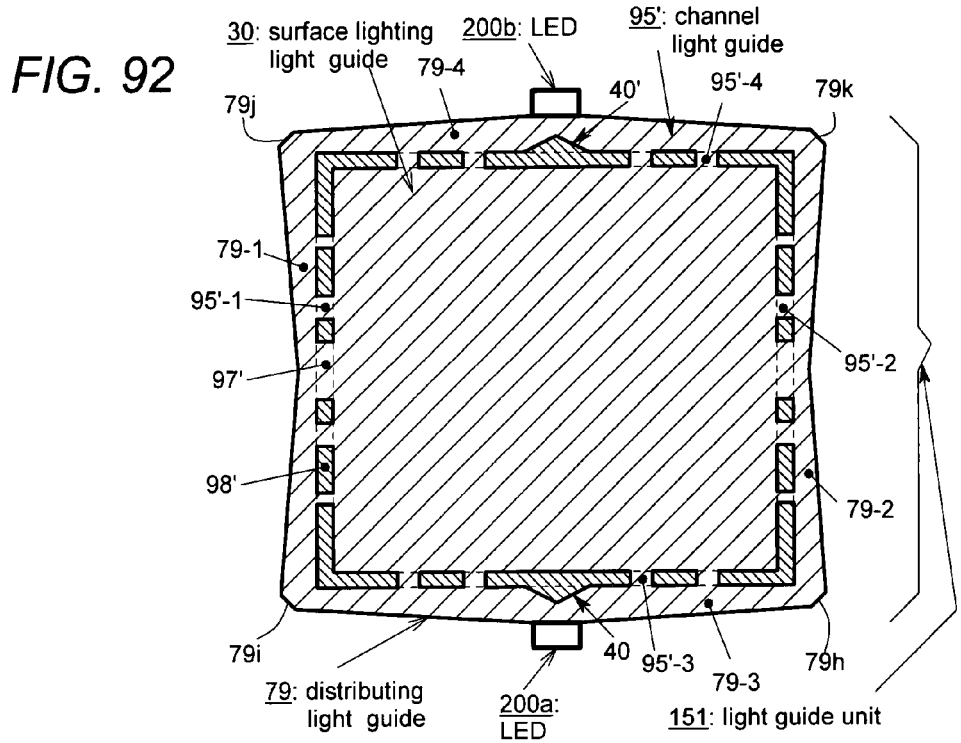
FIG. 92 is a schematic top view showing the surface illuminator in the FIG. 91.

Reference is made to FIG. 91 and FIG. 92 showing a thirty third embodiment of the present invention, in which FIG. 91 is a schematic exploded perspective view showing a surface illuminator of the thirty third embodiment and FIG. 92 is a schematic top view showing the surface illuminator in the FIG. 91.

As shown in FIG. 91 and FIG. 92, a surface illuminator is briefly composed of a light guide unit 151 and dual LEDs 200a and 200b.

The light guide unit 151 is made of a light transmitting member having a substantially transparent material.

The light guide unit 151 is composed of a surface lighting light guide member 30, a nonlinear light guide member or portion 79 and an optical channel light guide member or portion 95 disposed therebetween, in which the optical channel light guide member or portion 95' is sandwiched laterally by the nonlinear light guide member 79 and the surface lighting light guide member 30.

The nonlinear light guide member 79 is acting as a distributing light guide for distributing light along an entire length thereof.

The nonlinear light guide member 79 is composed of an annular light guide member having a substantially rectangular flame-like, "O" shaped, flame-like or ring-like light guide member, in which the nonlinear light guide member 79 is further composed of a substantially linear first portion 79-1, a substantially linear second portion 79-2 opposed to and parallel with the substantially linear first portion 79-1, a substantially linear third portion 79-3 and a substantially linear fourth portion 79-4 opposed to and parallel with the substantially linear first portion 79-3.

The nonlinear light guide member 79 is further provided with four corner surfaces 79i, 79h, 79j and 79k at the four corners of four substantially linear first, second, third and fourth portions 79-1, 79-2, 79-3 and 79-4, where the first, second, third and fourth portions 79-1, 79-2, 79-3 and 79-4 are connected to one another.

The first, second, third and fourth portions 79-1, 79-2, 79-3 and 79-4 have rear side surfaces 79-1c, 79-2c, 79-3c and 79-4c and front side surfaces 78-1d, 79-2d, 79-3d and 79-4d opposed to the rear side surfaces 79-1c, 79-2c, 79-3c and 79-4c respectively.

The substantially linear third and fourth distributing light guide portions 79-3 and 79-4 are provided with reflectors 40 and 40' near each center thereof in the front side surface 79-3d and 79-4d, in which each of the reflectors 40 and 40' is composed of opposed reflecting surfaces or portions (40a and 40b) or (40'a and 40'b) with a substantially "V" shaped configuration that is one portion of the front side surface 79-3d or 79-4d.

It is noted that each of the first, second, third and fourth distributing light guide portions 79-1, 79-2, 79-3 and 79-4 has a tapered configuration, in which the distributing light guide portions 79-1, 79-2, 79-3 and 79-4 have tapered rear side surfaces 79-1c, 79-2c, 79-3c and 79-4c, in which the distance between the tapered rear side surfaces 79-1c and 79-2c and the non-tapered front side surfaces 79-1d and 79-2d decreases from the corner surfaces 79h, 79i, 79j and 79k toward the centers of the first and second distributing light guide portions 79-1 and 79-2 and the distance between the tapered rear side surface 79-3c and 79-4c and the front side surface 79-3d and 79-4d decreases from the centers of the third and fourth distributing light guide 79-3 and 79-4 toward the corner surfaces (79h and 79i) and (79j and 79k).

On the contrary, in the twenty seventh embodiment as shown in FIG. 90 and FIG. 91, the distance between the rear and front side surfaces (78-1c, 78-2c, 78-3c and 78-4c) and (78-1d, 78-2d, 78-3d and 78-4d) are substantially equal or uniform.

LEDs 200a and 200b are disposed in contact with, adjacent to the rear side surface 79-3c and 79-4d near the centers thereof in the substantially linear third and fourth distributing light guide portions 79-3 and 79-4 so that each light emitting window of the LEDs 200a and 200b faces the opposed reflecting surfaces (40a and 40b of the reflector 40) or (40'a and 40'b of the reflector 40').

The channel light guide or optical channel light guide member 95' is composed of an annular channel light guide member having a substantially rectangular flame-like channel light guide member, "O" shaped, flame-like, loop-like or ring-like light guide member, in which the optical channel light guide member 95' is further composed of a substantially linear first portion 95'-1, a substantially linear second portion 95'-2 opposed to and parallel with the substantially linear first portion 95'-1, a substantially linear third portion 95'-3 and a substantially linear fourth portion 95'-4 opposed to and parallel with the substantially linear first portion 95'-1.

The first, second, third and fourth portions 95'-1, 95'-2, 95'-3 and 95'-4 of the channel light guide or optical channel light guide member 95' are connected together to form the substantially flame-like configuration as a whole similar to the configuration of the distributing light guide 79, in which an external contour with the substantially rectangular flame-like configuration of the channel light guide 95' is substantially equal in size to an internal contour with the substantially rectangular flame-like configuration of the distributing light guide 79 so as to be connected or in contact with to each other.

An internal contour with the substantially rectangular flame-like configuration of the channel light guide 95' is substantially equal in size to an contour with the substantially rectangular shape of four side surfaces 30*c*, 30*d*, 30*e* and 30*f* of the surface lighting light guide 30 so as to be connected or in contact with to each other.

The channel light guide or optical channel light guide member 95' is further composed of a plurality of optical channel elements 97' and a plurality of interposers 98', in which the optical channel elements 97' and the adjacent interposers 98' are alternately aligned so as to form a substantially rectangular flame-like array as a whole, in such a manner that each of the optical channel elements 97' is positioned to be sandwiched by the adjacent interposers 98'.

The interposers 98' are composed of a light transmitting solid member having a substantially transparent material having a refractive index lower than the refractive index of the optical channel elements 97'.

The interposers 98' may substitute air for the light transmitting solid member since the refractive index (value=1) of the air is generally lower than that of the light transmitting solid member such as PMMA or PC.

Each of the optical channel elements 97' has a substantially equal width and equal light input surface area, while each of the interposers 98' has a substantially variable width.

The optical channel elements 97' are distributed variably in a pitch or width therebetween in a stepwise or continuous manner to form a first gradation pattern in such a manner that the quantity or width of the channel elements 97' increases from the centers of the third and fourth channel light guide portions 95'-3 and 95'-4 toward the centers of the first and second channel light guide portions 95'-3 and 95'-4.

On the contrary, the interposers 98' are distributed variably in a width or pitch in a stepwise or continuous manner to form a second gradation pattern in such a manner that the width of the interposers 98' decreases from the centers of the third and fourth channel light guide portions 95'-3 and 95'-4 toward the centers of the first and second channel light guide portions 95'-3 and 95'-4.

Therefore, light emitting from the dual LEDs 200*a* and 200*b* to input into the nonlinear i.e. annular light guide member or portion 79 with the substantially rectangular flame-like configuration can output the light with a substantially uniform luminance along an entire length of the light output side surface or side surface portion 79-1*d*, 79-2*d*, 79-3*d* and 79-4*d* and resultantly a lighting with substantially uniform surface luminance or brightness can be produced from substantially entire areas of the surface lighting surface 30*a* of the surface lighting light guide member or portion 30.

In FIG. 91 and FIG. 92, the light guide unit 151 is composed of the surface lighting light guide 30, the substantially rectangular flame-like channel light guide member 95' and the substantially rectangular flame-like distributing light guide 79, in which three light guides 30, 95' and 79 are connected one another in that order to form a single integrated composite unit.

However, three light guides 30, 95' and 79 may be separated to be in contact with in that order to one another, or two light guides of the three light guides 30, 95' and 79 may form a composite, instead.

Thirty Fourth Embodiment (Embodiment: No. 34)

Figure 93:
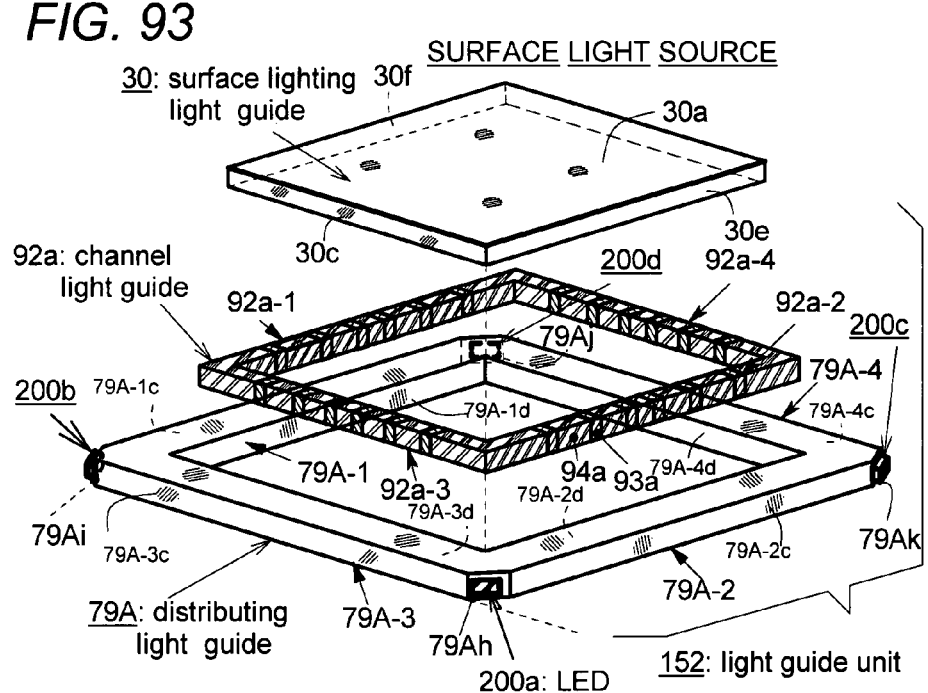
FIG. 93 is a schematic exploded perspective view showing a surface illuminator of other embodiment.
Figure 94:
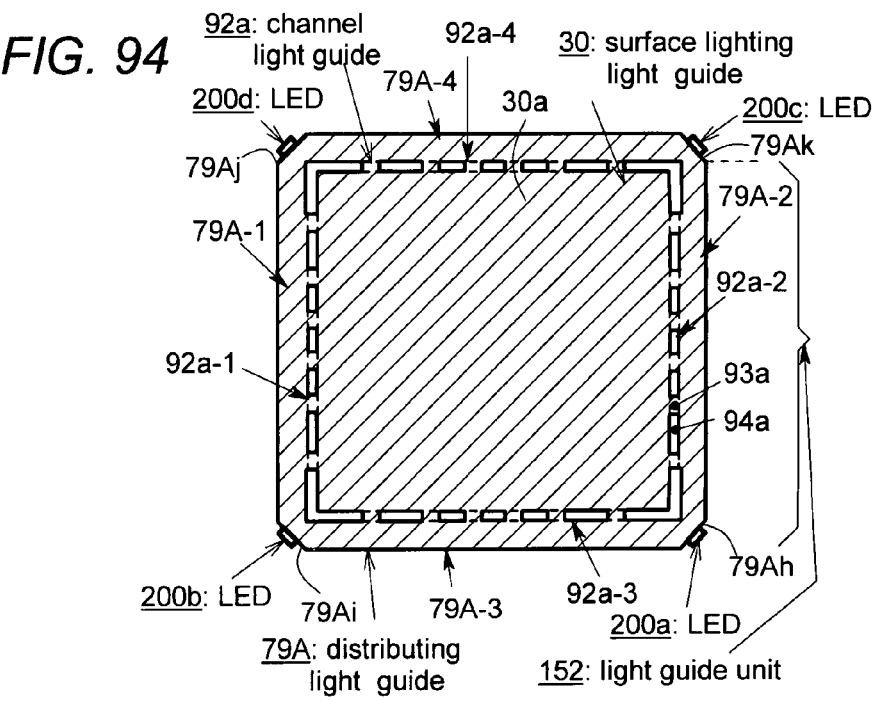
FIG. 94 is a schematic top view showing the surface illuminator in the FIG. 93.

Reference is made to FIG. 93 and FIG. 94 showing a thirty fourth embodiment of the present invention, in which FIG. 93 is a schematic exploded perspective view showing a surface illuminator of the thirty fourth embodiment and FIG. 94 is a schematic top view showing the surface illuminator in the FIG. 93.

As shown in FIG. 93 and FIG. 94, a surface illuminator is briefly composed of a light guide unit 152 and four LEDs 200*a*, 200*b*, 200*c* and 200*d*.

The light guide unit 152 is made of a light transmitting member having a substantially transparent material.

The light guide unit 152 is composed of a surface lighting light guide member 30, a nonlinear light guide member or portion 55 and an optical channel light guide member or portion 92*a* disposed therebetween, in which the optical channel light guide member or portion 92*a* is sandwiched laterally by the nonlinear light guide member 55 and the surface lighting light guide member 30.

The nonlinear light guide member 55 is acting as a distributing light guide for distributing light along an entire length thereof.

The nonlinear light guide member 55 is composed of an annular light guide member having a substantially rectangular flame-like, "O" shaped, flame-like or ring-like light guide member, in which the nonlinear light guide member 55 is further composed of a substantially linear first portion 55-1, a substantially linear second portion 55-2 opposed to and parallel with the substantially linear first portion 55-1, a substantially linear third portion 55-3 and a substantially linear fourth portion 55-4 opposed to and parallel with the substantially linear first portion 55-3.

The nonlinear light guide member 55 is further provided with four corner surfaces 55*i*, 55*h*, 55*j* and 55*k* at the four corners of four substantially linear first, second, third and fourth portions 55-1, 55-2, 55-3 and 55-4, where the first, second, third and fourth portions 55-1, 55-2, 55-3 and 55-4 are connected to one another.

The first, second, third and fourth distributing light guide portions 55-1, 55-2, 55-3 and 55-4 have rear side surfaces 55-1*c*, 55-2*c*, 55-3*c* and 55-4*c* and front side surfaces 55-1*d*, 55-2*d*, 55-3*d* and 55-4*d* opposed to the rear side surfaces 55-1*c*, 55-2*c*, 55-3*c* and 55-4*c* respectively.

The four numbers or sets of LEDs 200*a*, 200*b*, 200*c* and 200*d* are disposed in contact with, adjacent to the four corner side surface 55*h*, 55*i*, 55*j* and 55*k* of the substantially linear first, second, third and fourth distributing light guide portions 55-1, 55-2, 55-3 and 55-4.

The channel light guide or optical channel light guide member 92*a* is composed of an annular channel light guide member having a substantially rectangular flame-like channel light guide member, "O" shaped, flame-like, loop-like or ring-like light guide member, in which the optical channel light guide member 92*a* is further composed of a substantially linear first portion 92*a*-1, a substantially linear second portion 92*a*-2 opposed to and parallel with the substantially linear first portion 92*a*-1, a substantially linear third portion 92*a*-3 and a substantially linear fourth portion 92*a*-4 opposed to and parallel with the substantially linear first portion 92*a*-1.

The first, second, third and fourth portions 92*a*-1, 92*a*-2, 92*a*-3 and 92*a*-4 of the channel light guide or optical channel light guide member 92*a* are connected together to form the substantially rectangular flame-like configuration as a whole similar to the configuration of the distributing light guide 55, in which an external contour with the substantially rectangular flame-like configuration of the channel light guide 92*a* is substantially equal in size to an internal contour with the substantially rectangular flame-like configuration of the distributing light guide 55 so as to be connected or in contact with to each other.

An internal contour with the substantially rectangular flame-like configuration of the channel light guide 92*a* is substantially equal in size to an contour with the substantially rectangular shape of four side surfaces 30*c*, 30*d*, 30*e* and 30*f* of the surface lighting light guide 30 so as to be connected or in contact with to each other.

The channel light guide or optical channel light guide member 92*a* is further composed of a plurality of optical channel elements 93*a* and a plurality of interposers 94*a*, in which the optical channel elements 93*a* and the adjacent interposers 94*a* are alternately aligned so as to form a substantially rectangular flame-like array as a whole, in such a manner that each of the optical channel elements 93*a* is positioned to be sandwiched by the adjacent interposers 94*a*.

The interposers 94*a* are composed of a light transmitting solid member having a substantially transparent material having a refractive index lower than the refractive index of the optical channel elements 93*a*.

The interposers 94*a* may substitute air for the light transmitting solid member since the refractive index (value=1) of the air is generally lower than that of the light transmitting solid member such as PMMA or PC.

Each of the optical channel elements 93*a* has a substantially equal width and equal light input surface area, while each of the interposers 94*a* has a substantially variable width.

The optical channel elements 93*a* are distributed variably in a pitch therebetween in a stepwise or continuous manner to form a first gradation pattern in such a manner that the quantity of the channel elements 93*a* increases from the four corners of the channel light guide portions 92*a*-1, 92*a*-2, 92*a*-3 and 92*a*-4 toward the four centers of the channel light guide portions 92*a*-1, 92*a*-2, 92*a*-3 and 92*a*-4.

On the contrary, the interposers 94*a* are distributed variably in a width in a stepwise or continuous manner to form a second gradation pattern in such a manner that the width of the interposers 94*a* decreases from the four corners of the channel light guide portions 92*a*-1, 92*a*-2, 92*a*-3 and 92*a*-4 toward the four centers of the channel light guide portions 92*a*-1, 92*a*-2, 92*a*-3 and 92*a*-4.

Therefore, light emitting from the LEDs 200*a*, 200*b*, 200*c* and 200*d* to input into the nonlinear i.e. annular distributing light guide member or portion 55 with the substantially rectangular flame-like configuration can output the light with a substantially uniform luminance along an entire length of the light output side surface or side surface portion 55-1*d*, 55-2*d*, 55-3*d* and 55-4*d* and resultantly a lighting with substantially uniform surface luminance or brightness can be produced from substantially entire areas of the surface lighting surface 30*a* of the surface lighting light guide member or portion 30.

In FIG. 93 and FIG. 94, the light guide unit 152 is composed of the surface lighting light guide 30, the substantially rectangular flame-like channel light guide member 92*a* and the substantially rectangular flame-like distributing light guide 55, in which three light guides 30, 92*a* and 55 are connected one another in that order to form a single integrated composite unit.

However, three light guides 30, 92*a* and 55 may be separated to be in contact with in that order to one another, or two light guides of the three light guides 30, 92*a* and 55 may form a composite, instead.

Thirty Fifth Embodiment (Embodiment: No. 35)

Figure 95:
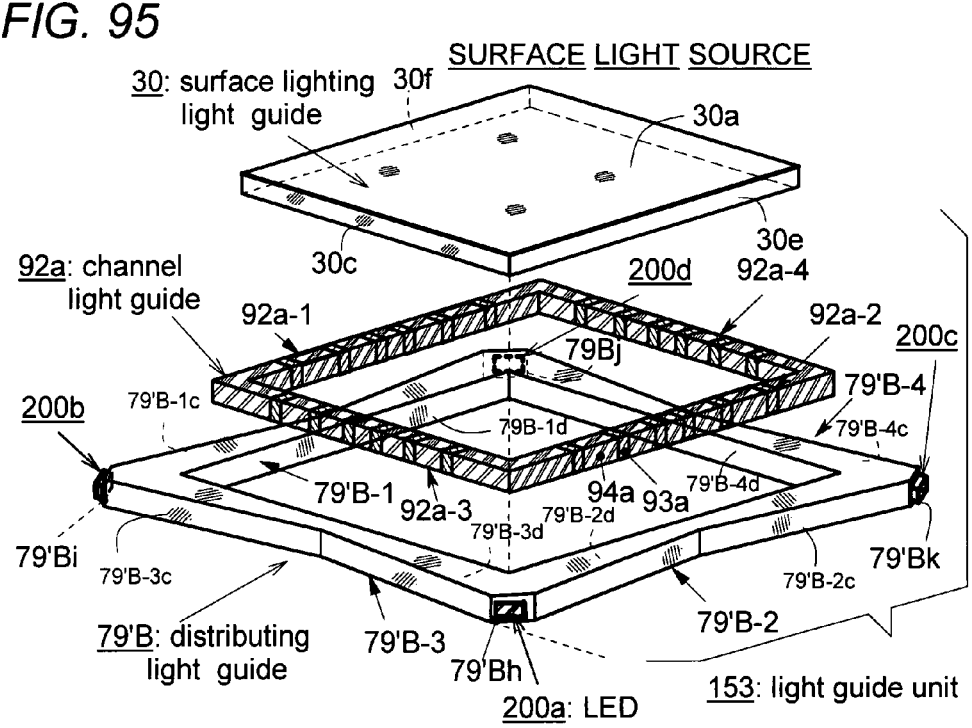
FIG. 95 is a schematic exploded perspective view showing a surface illuminator of other embodiment.
Figure 96:
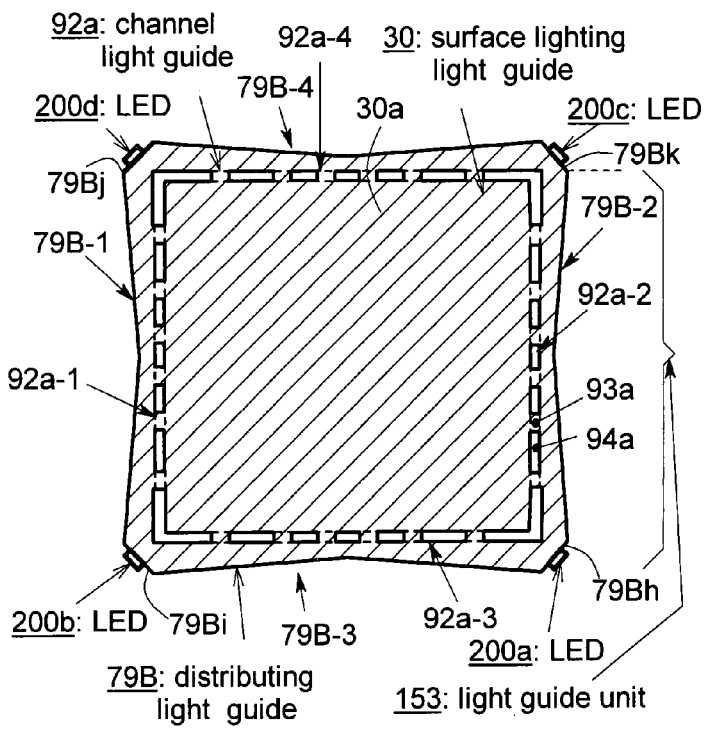
FIG. 96 is a schematic top view showing the surface illuminator in the FIG. 95.

Reference is made to FIG. 95 and FIG. 96 showing a thirty fifth embodiment of the present invention, in which FIG. 95 is a schematic exploded perspective view showing a surface illuminator of the thirty fifth embodiment and FIG. 96 is a schematic top view showing the surface illuminator in the FIG. 95, in which this embodiment is a modification of the embodiment as shown in FIG. 93 and FIG. 94.

As shown in FIG. 95 and FIG. 96, a surface illuminator is briefly composed of a light guide unit 153 and four LEDs 200*a*, 200*b*, 200*c* and 200*d*.

The light guide unit 153 is made of a light transmitting member having a substantially transparent material.

The light guide unit 153 is composed of a surface lighting light guide member 30, a nonlinear light guide member or portion 56 and an optical channel light guide member or portion 92*a* disposed therebetween, in which the optical channel light guide member or portion 92*a* is sandwiched laterally by the nonlinear light guide member 56 and the surface lighting light guide member 30.

The nonlinear light guide member 56 is acting as a distributing light guide for distributing light along an entire length thereof.

The nonlinear light guide member 56 is composed of an annular light guide member having a substantially rectangular flame-like, "O" shaped, flame-like or ring-like light guide member, in which the nonlinear light guide member 56 is further composed of a substantially linear first portion 56-1, a substantially linear second portion 56-2 opposed to and parallel with the substantially linear first portion 56-1, a substantially linear third portion 56-3 and a substantially linear fourth portion 56-4 opposed to and parallel with the substantially linear first portion 56-3.

The nonlinear light guide member 56 is further provided with four corner surfaces 56*i*, 56*h*, 56*j* and 56*k* at the four corners of four substantially linear first, second, third and fourth portions 56-1, 56-2, 56-3 and 56-4, where the first, second, third and fourth portions 56-1, 56-2, 56-3 and 56-4 are connected to one another.

The first, second, third and fourth distributing light guide portions 56-1, 56-2, 56-3 and 56-4 have rear side surfaces 56-1*c*, 56-2*c*, 56-3*c* and 56-4*c* and front side surfaces 56-1*d*, 56-2*d*, 56-3*d* and 56-4*d* opposed to the rear side surfaces 56-1*c*, 56-2*c*, 56-3*c* and 56-4*c* respectively.

The four numbers or sets of LEDs 200*a*, 200*b*, 200*c* and 200*d* are disposed in contact with, adjacent to the four corner side surfaces 56*h*, 56*i*, 56*j* and 56*k* of the substantially linear first, second, third and fourth distributing light guide portions 56-1, 56-2, 56-3 and 56-4.

It is noted that each of the first, second, third and fourth distributing light guide portions 56-1, 56-2, 56-3 and 56-4 has a tapered configuration, in which the distributing light guide portions 56-1, 56-2, 56-3 and 56-4 have tapered rear side surfaces 56-1*c*, 56-2*c*, 56-3*c* and 56-4*c*, in which the distance between the tapered rear side surfaces 56-1*c*, 56-2*c*, 56-3*c* and 56-4*c* and the non-tapered side surfaces 56-1*d*, 56-2*d*, 56-3*d* and 56-4*d* decreases from the corner surfaces 56*h*, 56*i*, 56*j* and 56*k* toward the centers of the distributing light guide portions 56-1, 56-2, 56-3 and 56-4.

On the contrary, in the thirtieth embodiment as shown in FIG. 94 and FIG. 95, the distance between the rear and front side surfaces (56-1*c*, 56-2*c*, 56-3*c* and 56-4*c*) and (56-1*d*, 56-2*d*, 56-3*d* and 56-4*d*) are substantially equal or uniform.

The channel light guide or optical channel light guide member 92*a* is composed of an annular channel light guide member having a substantially rectangular flame-like channel light guide member, "O" shaped, flame-like, loop-like or ring-like light guide member, in which the optical channel light guide member 92*a* is further composed of a substantially linear first portion 92*a*-1, a substantially linear second portion 92*a*-2 opposed to and parallel with the substantially linear first portion 92*a*-1, a substantially linear third portion 92*a*-3 and a substantially linear fourth portion 92*a*-4 opposed to and parallel with the substantially linear first portion 92*a*-1.

The first, second, third and fourth portions 92*a*-1, 92*a*-2, 92*a*-3 and 92*a*-4 of the channel light guide or optical channel light guide member 92*a* are connected together to form the substantially rectangular flame-like configuration as a whole similar to the configuration of the distributing light guide 56, in which an external contour with the substantially rectangular flame-like configuration of the channel light guide 92*a* is substantially equal in size to an internal contour with the substantially rectangular flame-like configuration of the distributing light guide 56 so as to be connected or in contact with to each other.

An internal contour with the substantially rectangular flame-like configuration of the channel light guide 92*a* is substantially equal in size to an contour with the substantially rectangular shape of four side surfaces 30*c*, 30*d*, 30*e* and 30*f* of the surface lighting light guide 30 so as to be connected or in contact with to each other.

The channel light guide or optical channel light guide member 92*a* is further composed of a plurality of optical channel elements 93*a* and a plurality of interposers 94*a*, in which the optical channel elements 93*a* and the adjacent interposers 94*a* are alternately aligned so as to form a substantially rectangular flame-like array as a whole, in such a manner that each of the optical channel elements 93*a* is positioned to be sandwiched by the adjacent interposers 94*a*.

The interposers 94*a* are composed of a light transmitting solid member having a substantially transparent material having a refractive index lower than the refractive index of the optical channel elements 93*a*.

The interposers 94*a* may substitute air for the light transmitting solid member since the refractive index (value=1) of the air is generally lower than that of the light transmitting solid member such as PMMA or PC.

Each of the optical channel elements 93*a* has a substantially equal width and equal light input surface area, while each of the interposers 94*a* has a substantially variable width.

The optical channel elements 93*a* are distributed variably in a pitch therebetween in a stepwise or continuous manner to form a first gradation pattern in such a manner that the quantity of the channel elements 93*a* increases from the four corners of the channel light guide portions 92*a*-1, 92*a*-2, 92*a*-3 and 92*a*-4 toward the four centers of the channel light guide portions 92*a*-1, 92*a*-2, 92*a*-3 and 92*a*-4.

On the contrary, the interposers 94*a* are distributed variably in a width in a stepwise or continuous manner to form a second gradation pattern in such a manner that the width of the interposers 94*a* decreases from the four corners of the channel light guide portions 92*a*-1, 92*a*-2, 92*a*-3 and 92*a*-4 toward the four centers of the channel light guide portions 92*a*-1, 92*a*-2, 92*a*-3 and 92*a*-4.

Therefore, light emitting from the LEDs 200*a*, 200*b*, 200*c* and 200*d* to input into the nonlinear i.e. annular distributing light guide member or portion 56 with the substantially rectangular flame-like configuration can output the light with a substantially uniform luminance along an entire length of the light output side surface or side surface portion 56-1*d*, 56-2*d*, 56-3*d* and 56-4*d* and resultantly a lighting with substantially uniform surface luminance or brightness can be produced from substantially entire areas of the surface lighting surface 30*a* of the surface lighting light guide member or portion 30.

In FIG. 95 and FIG. 96, the light guide unit 153 is composed of the surface lighting light guide 30, the substantially rectangular flame-like channel light guide member 92*a* and the substantially rectangular flame-like distributing light guide 56, in which three light guides 30, 92*a* and 56 are connected one another in that order to form a single integrated composite unit.

However, three light guides 30, 92*a* and 56 may be separated to be in contact with in that order to one another, or two light guides of the three light guides 30, 92*a* and 56 may form a composite, instead.

Thirty Sixth Embodiment (Embodiment: No. 36)

Figure 97:
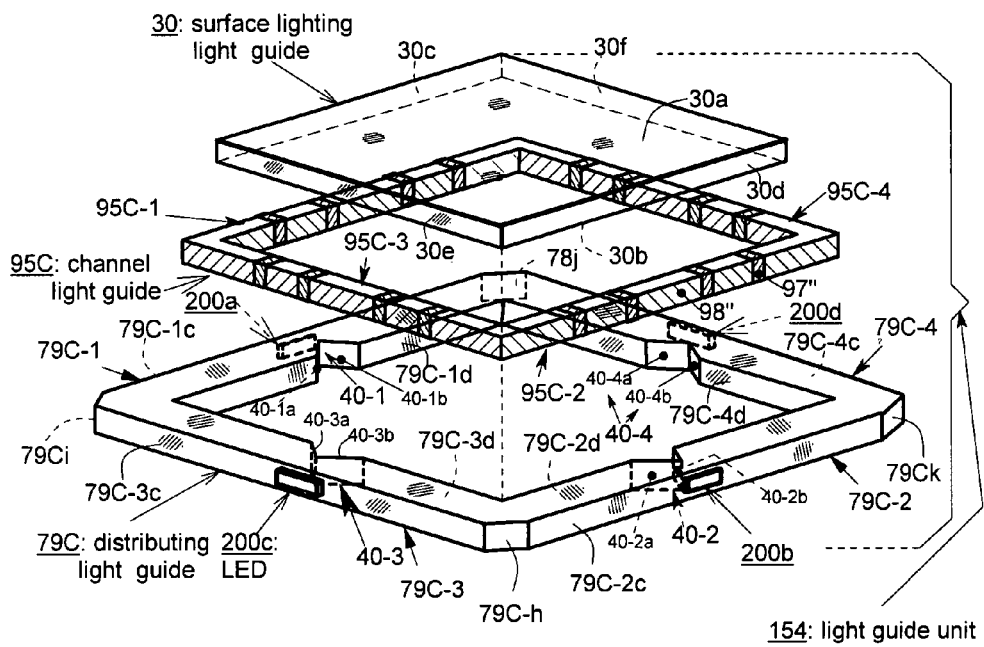
FIG. 97 is a schematic exploded perspective view showing a surface illuminator of other embodiment.
Figure 98:
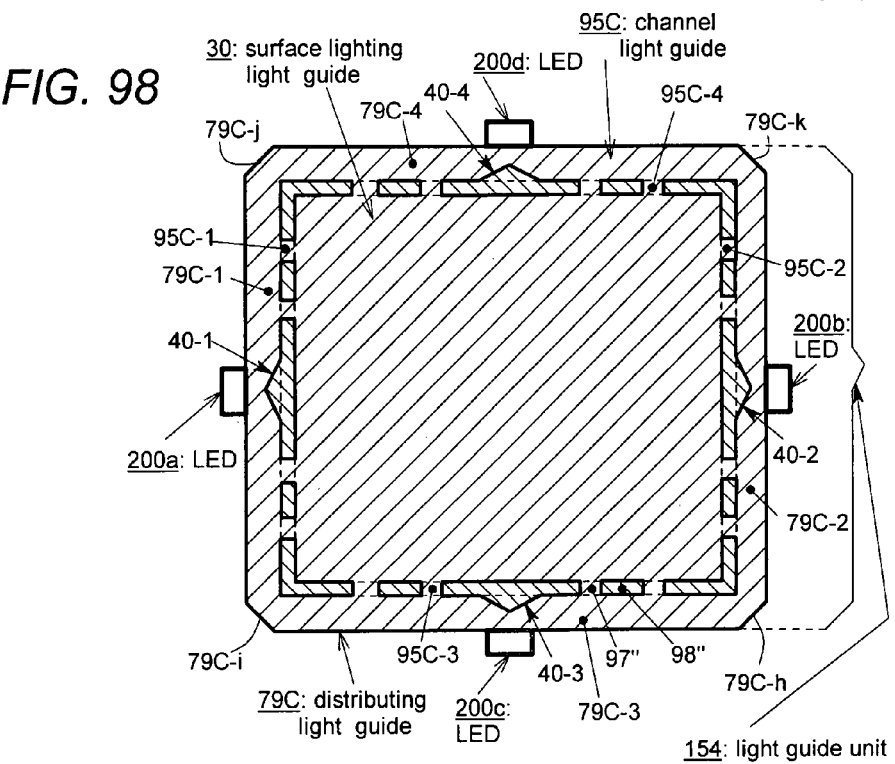
FIG. 98 is a schematic top view showing the surface illuminator in the FIG. 97.

Reference is made to showing a thirty sixth embodiment of the present invention, in which FIG. 97 is a schematic exploded perspective view showing a surface illuminator of a thirty sixth embodiment and FIG. 98 is a schematic top view showing the surface illuminator in the FIG. 97, in which this embodiment is a modification of the embodiment as shown in FIG. 89 and FIG. 90.

As shown in FIG. 97 and FIG. 98, a surface illuminator is briefly composed of a light guide unit 154 and four numbers or sets of LEDs 200*a*, 200*b*, 200*c* and 200*d*.

The light guide unit 154 is made of a light transmitting member having a substantially transparent material.

The light guide unit 154 is composed of a surface lighting light guide member 30, a nonlinear light guide member or portion (i.e. distributing light guide member) 57 and an optical channel light guide member or portion 95" disposed therebetween, in which the optical channel light guide member or portion 95" is sandwiched laterally by the nonlinear light guide member 57 and the surface lighting light guide member 30.

The nonlinear light guide member 57 is acting as a distributing light guide for distributing light along an entire length thereof.

The nonlinear light guide member 57 is composed of an annular light guide member having a substantially rectangular flame-like, "O" shaped, flame-like or ring-like light guide member, in which the nonlinear light guide member 57 is further composed of a substantially linear first portion 57-1, a substantially linear second portion 57-2 opposed to and parallel with the substantially linear first portion 57-1, a substantially linear third portion 57-3 and a substantially linear fourth portion 57-4 opposed to and parallel with the substantially linear first portion 57-3.

The nonlinear light guide member 57 is further provided with four corner surfaces 57*i*, 57*h*, 57*j* and 57*k* at the four corners of four substantially linear first, second, third and fourth portions 57-1, 57-2, 57-3 and 57-4, where the first, second, third and fourth portions 57-1, 57-2, 57-3 and 57-4 are connected to one another.

The first, second, third and fourth distributing light guide portions 57-1, 57-2, 57-3 and 57-4 have rear side surfaces 57-1*c*, 57-2*c*, 57-3*c* and 57-4*c* and front side surfaces 57-1*d*, 57-2*d*, 57-3*d* and 57-4*d* opposed to the rear side surfaces 57-1c, 57-2c, 57-3c and 57-4c respectively, in which the distance between the rear and front side surfaces (57-1c, 57-2c, 57-3c and 57-4c) and (57-1d, 57-2d, 57-3d and 57-4d) are substantially equal or uniform.

Four reflectors 40-1, 40-2, 40-3 and 40-4, each having a substantially V" shaped configuration are disposed in each center of the front side surfaces 57-1d, 57-2d, 57-3d and 57-4d of the distributing light guide portions 57-1, 57-2, 57-3 and 57-4.

Each of the reflectors 40-1, 40-2, 40-3 and 40-4 is composed of opposed reflecting surfaces or portions (40-1a and 40-1b), (40-2a and 40-2b), (40-3a and 40-3b) and (40-4a and 40-4b).

The LEDs 200a, 200b, 200c and 200d are disposed in contact with, adjacent to the rear side surface 57-1c, 57-2c, 57-3c and 57-4c near the centers thereof, so that each light emitting window of the LEDs 200a, 200b, 200c and 200d faces the opposed reflecting surfaces (40-1a and 40-1b), (40-2a and 40-2b), (40-3a and 40-3b) and (40-4a and 40-4b).

The channel light guide or optical channel light guide member 95" is composed of an annular channel light guide member having a substantially rectangular flame-like channel light guide member, "O" shaped, flame-like, loop-like or ring-like light guide member, in which the optical channel light guide member 95" is further composed of a substantially linear first portion 95"-1, a substantially linear second portion 95"-2 opposed to and parallel with the substantially linear first portion 95"-1, a substantially linear third portion 95"-3 and a substantially linear fourth portion 95"-4 opposed to and parallel with the substantially linear first portion 95"-1.

The first, second, third and fourth portions 95"-1, 95"-2, 95"-3 and 95"-4 of the channel light guide or optical channel light guide member 95" are connected together to form the substantially flame-like configuration as a whole similar to the configuration of the distributing light guide 57, in which an external contour with the substantially rectangular flame-like configuration of the channel light guide 95" is substantially equal in size to an internal contour with the substantially rectangular flame-like configuration of the distributing light guide 57 so as to be connected or in contact with to each other.

An internal contour with the substantially rectangular flame-like configuration of the channel light guide 95" is substantially equal in size to an contour with the substantially rectangular shape of four side surfaces 30c, 30d, 30e and 30f of the surface lighting light guide 30 so as to be connected or in contact with to each other.

The channel light guide or optical channel light guide member 95" is further composed of a plurality of optical channel elements 97" and a plurality of interposers 98", in which the optical channel elements 97" and the adjacent interposers 98" are alternately aligned so as to form a substantially rectangular flame-like array as a whole, in such a manner that each of the optical channel elements 97" are positioned to be sandwiched by the adjacent interposers 98".

The interposers 98" are composed of a light transmitting solid member having a substantially transparent material having a refractive index lower than the refractive index of the optical channel elements 97".

The interposers 98" may substitute air for the light transmitting solid member since the refractive index (value=1) of the air is generally lower than that of the light transmitting solid member such as PMMA or PC.

Each of the optical channel elements 97" has a substantially equal width and equal light input surface area, while each of the interposers 98" has a substantially variable width.

The optical channel elements 97" are distributed variably in a pitch therebetween in a stepwise or continuous manner to form a first gradation pattern in such a manner that the quantity of the channel elements 97" increases from the centers of the channel light guide portions 95"-1, 95"-2, 95"-3 and 95"-4 toward the corners of the channel light guide portions 95"-1, 95"-2, 95"-3 and 95"-4.

On the contrary, the interposers 98" are distributed variably in a width in a stepwise or continuous manner to form a second gradation pattern in such a manner that the width of the interposers 98" decreases from the centers of the channel light guide portions 95"-1, 95"-2, 95"-3 and 95"-4 toward the corners of the channel light guide portions 95"-1, 95"-2, 95"-3 and 95"-4.

Therefore, light emitting from the LEDs 200a, 200b, 200c and 200d to input into the nonlinear i.e. annular distributing light guide member or portion 57 with the substantially rectangular flame-like configuration can output the light with a substantially uniform luminance along an entire length of the light output side surface or side surface portion 57-1d, 57-2d, 57-3d and 57-4d and resultantly a lighting with substantially uniform surface luminance or brightness can be produced from substantially entire areas of the surface lighting surface 30a of the surface lighting light guide member or portion 30.

In FIG. 97 and FIG. 98, the light guide unit 154 is composed of the surface lighting light guide 30, the substantially rectangular flame-like channel light guide member 95" and the substantially rectangular flame-like distributing light guide 57, in which three light guides 30, 95" and 57 are connected one another in that order to form a single integrated composite unit.

However, three light guides 30, 95" and 57 may be separated to be in contact with in that order to one another, or two light guides of the three light guides 30, 95" and 57 may form a composite, instead.

Thirty Seventh Embodiment (Embodiment: No. 37)

Figure 99:
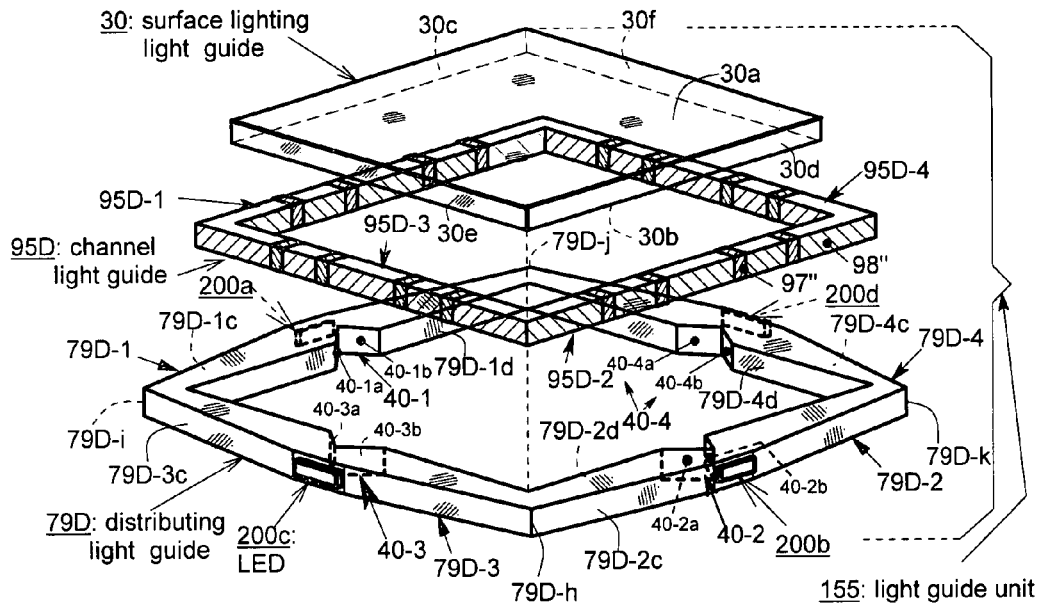
FIG. 99 is a schematic exploded perspective view showing a surface illuminator of other embodiment.
Figure 100:
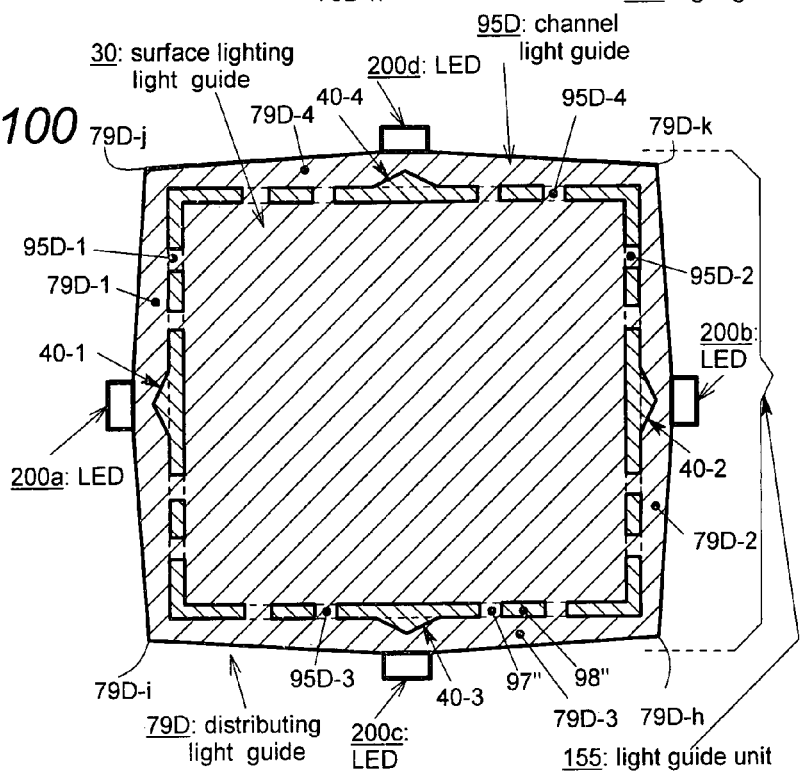
FIG. 100 is a schematic top view showing the surface illuminator in the FIG. 99.

Reference is made to FIG. 99 and FIG. 100 showing a thirty seventh embodiment of the present invention, in which FIG. 99 is a schematic exploded perspective view showing a surface illuminator of the thirty seventh embodiment and FIG. 100 is a schematic top view showing the surface illuminator in the FIG. 99, in which this embodiment is a modification of the embodiment as shown in FIG. 97 and FIG. 98.

As shown in FIG. 99 and FIG. 100, a surface illuminator is briefly composed of a light guide unit 155 and four numbers or sets of LEDs 200a, 200b, 200c and 200d.

The light guide unit 155 is made of a light transmitting member having a substantially transparent material.

The light guide unit 155 is composed of a surface lighting light guide member 30, a nonlinear light guide member or portion (i.e. distributing light guide member) 58 and an optical channel light guide member or portion 95" disposed therebetween, in which the optical channel light guide member or portion 95" is sandwiched laterally by the nonlinear light guide member 58 and the surface lighting light guide member 30.

The nonlinear light guide member 58 is acting as a distributing light guide for distributing light along an entire length thereof.

The nonlinear light guide member 58 is composed of an annular light guide member having a substantially rectangular flame-like, "O" shaped, flame-like or ring-like light guide member, in which the nonlinear light guide member 58 is further composed of a substantially linear first portion 58-1, a substantially linear second portion 58-2 opposed to and parallel with the substantially linear first portion 58-1, a substantially linear third portion 58-3 and a substantially linear fourth portion 58-4 opposed to and parallel with the substantially linear first portion 58-3.

The nonlinear light guide member 58 is further provided with four corner surfaces 58*i*, 58*h*, 58*j* and 58*k* at the four corners of four substantially linear first, second, third and fourth portions 58-1, 58-2, 58-3 and 58-4, where the first, second, third and fourth portions 58-1, 58-2, 58-3 and 58-4 are connected to one another.

The first, second, third and fourth distributing light guide portions 58-1, 58-2, 58-3 and 58-4 have rear side surfaces 58-1*c*, 58-2*c*, 58-3*c* and 58-4*c* and front side surfaces 58-1*d*, 58-2*d*, 58-3*d* and 58-4*d* opposed to the rear side surfaces 58-1*c*, 58-2*c*, 58-3*c* and 58-4*c* respectively.

It is noted that each of the first, second, third and fourth distributing light guide portions 58-1, 58-2, 58-3 and 58-4 has a tapered configuration, in which the distributing light guide portions 58-1, 58-2, 58-3 and 58-4 have tapered rear side surfaces 58-1*c*, 58-2*c*, 58-3*c* and 58-4*c*, in which the distance between the tapered rear side surfaces 58-1*c*, 58-2*c*, 58-3*c* and 58-4*c* and the non-tapered side surfaces 58-1*d*, 58-2*d*, 58-3*d* and 58-4*d* decreases from the corner surfaces 58*h*, 58*i*, 58*j* and 58*k* toward the centers of the distributing light guide portions 58-1, 58-2, 58-3 and 58-4.

On the contrary, in the thirty six embodiment as shown in FIG. 98 and FIG. 99, the distance between the rear and front side surfaces (57-1*c*, 57-2*c*, 57-3*c* and 57-4*c*) and (57-1*d*, 57-2*d*, 57-3*d* and 57-4*d*) are substantially equal or uniform.

Four reflectors 40-1, 40-2, 40-3 and 40-4, each having a substantially V" shaped configuration are disposed in each center of the front side surfaces 58-1*d*, 58-2*d*, 58-3*d* and 58-4*d* of the distributing light guide portions 58-1, 58-2, 58-3 and 58-4.

Each of the reflectors 40-1, 40-2, 40-3 and 40-4 is composed of opposed reflecting surfaces or portions (40-1*a* and 40-1*b*), (40-2*a* and 40-2*b*), (40-3*a* and 40-3*b*) and (40-4*a* and 40-4*b*).

The LEDs 200*a*, 200*b*, 200*c* and 200*d* are disposed in contact with, adjacent to the rear side surface 58-1*c*, 58-2*c*, 58-3*c* and 58-4*c* near the centers thereof, so that each light emitting window of the LEDs 200*a*, 200*b*, 200*c* and 200*d* faces the opposed reflecting surfaces (40-1*a* and 40-1*b*), (40-2*a* and 40-2*b*), (40-3*a* and 40-3*b*) and (40-4*a* and 40-4*b*).

The channel light guide or optical channel light guide member 95" is composed of an annular channel light guide member having a substantially rectangular flame-like channel light guide member, "O" shaped, flame-like, loop-like or ring-like light guide member, in which the optical channel light guide member 95" is further composed of a substantially linear first portion 95"-1, a substantially linear second portion 95"-2 opposed to and parallel with the substantially linear first portion 95"-1, a substantially linear third portion 95"-3 and a substantially linear fourth portion 95"-4 opposed to and parallel with the substantially linear first portion 95"-1.

The first, second, third and fourth portions 95"-1, 95"-2, 95"-3 and 95"-4 of the channel light guide or optical channel light guide member 95*e*" are connected together to form the substantially flame-like configuration as a whole similar to the configuration of the distributing light guide 58, in which an external contour with the substantially rectangular flame-like configuration of the channel light guide 95" is substantially equal in size to an internal contour with the substantially rectangular flame-like configuration of the distributing light guide 58 so as to be connected or in contact with to each other.

An internal contour with the substantially rectangular flame-like configuration of the channel light guide 95" is substantially equal in size to an contour with the substantially rectangular shape of four side surfaces 30*c*, 30*d*, 30*e* and 30*f* of the surface lighting light guide 30 so as to be connected or in contact with to each other.

The channel light guide or optical channel light guide member 95" is further composed of a plurality of optical channel elements 97" and a plurality of interposers 98", in which the optical channel elements 97" and the adjacent interposers 98" are alternately aligned so as to form a substantially rectangular flame-like array as a whole, in such a manner that each of the optical channel elements 97" are positioned to be sandwiched by the adjacent interposers 98".

The interposers 98" are composed of a light transmitting solid member having a substantially transparent material having a refractive index lower than the refractive index of the optical channel elements 97".

The interposers 98" may substitute air for the light transmitting solid member since the refractive index (value=1) of the air is generally lower than that of the light transmitting solid member such as PMMA or PC.

Each of the optical channel elements 97" has a substantially equal width and equal light input surface area, while each of the interposers 98" has a substantially variable width.

The optical channel elements 97" are distributed variably in a pitch therebetween in a stepwise or continuous manner to form a first gradation pattern in such a manner that the quantity of the channel elements 97" increases from the centers of the channel light guide portions 95"-1, 95"-2, 95"-3 and 95"-4 toward the corners of the channel light guide portions 95"-1, 95"-2, 95"-3 and 95"-4.

On the contrary, the interposers 98" are distributed variably in a width in a stepwise or continuous manner to form a second gradation pattern in such a manner that the width of the interposers 98" decreases from the centers of the channel light guide portions 95"-1, 95"-2, 95"-3 and 95"-4 toward the corners of the channel light guide portions 95"-1, 95"-2, 95"-3 and 95"-4.

Therefore, light emitting from the LEDs 200*a*, 200*b*, 200*c* and 200*d* to input into the nonlinear i.e. annular distributing light guide member or portion 58 with the substantially rectangular flame-like configuration can output the light with a substantially uniform luminance along an entire length of the light output side surface or side surface portion 58-1*d*, 58-2*d*, 58-3*d* and 58-4*d* and resultantly a lighting with substantially uniform surface luminance or brightness can be produced from substantially entire areas of the surface lighting surface 30*a* of the surface lighting light guide member or portion 30.

In FIG. 99 and FIG. 100, the light guide unit 155 is composed of the surface lighting light guide 30, the substantially rectangular flame-like channel light guide member 95" and the substantially rectangular flame-like distributing light guide 58, in which three light guides 30, 95" and 58 are connected one another in that order to form a single integrated composite unit.

However, three light guides 30, 95" and 58 may be separated to be in contact with in that order to one another, or two light guides of the three light guides 30, 95" and 58 may form a composite, instead.

Thirty Eighth Embodiment (Embodiment: No. 38)

Figure 101:
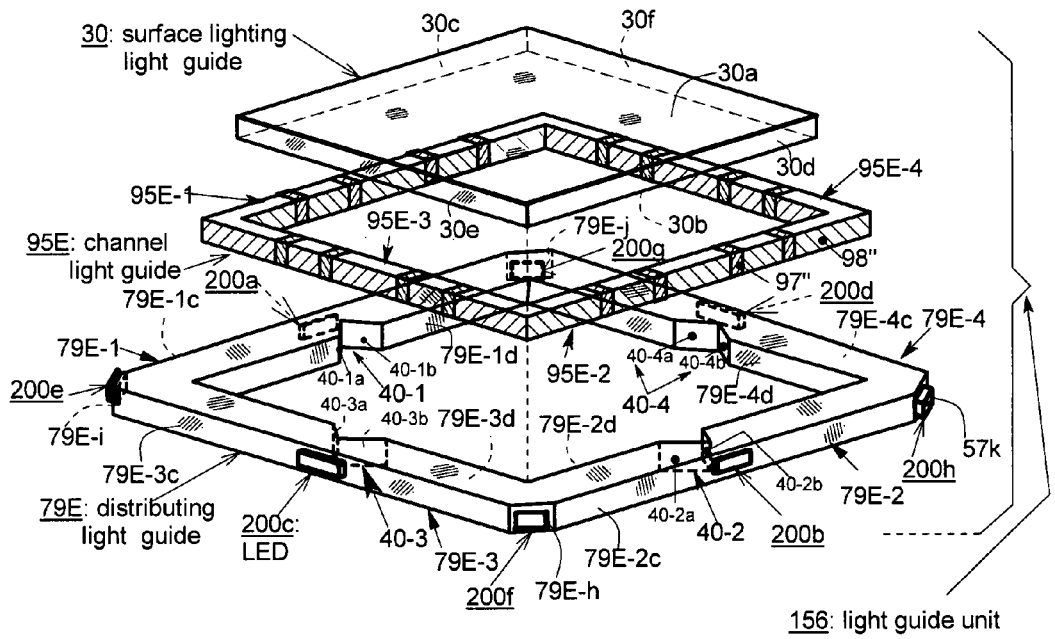
FIG. 101 is a schematic exploded perspective view showing a surface illuminator of other embodiment.
Figure 102:
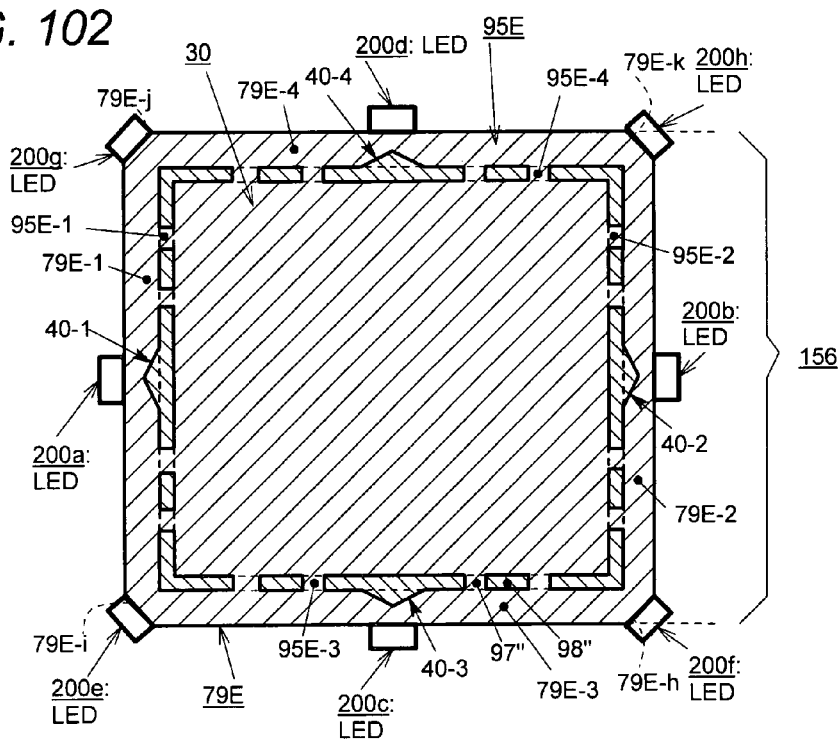
FIG. 102 is a schematic top view showing the surface illuminator in the FIG. 101.

Reference is made to showing a thirty eighth embodiment of the present invention, in which FIG. 101 is a schematic exploded perspective view showing a surface illuminator of the thirty eighth embodiment and FIG. 102 is a schematic top view showing the surface illuminator in the FIG. 101.

This embodiment is a modification of the embodiment as shown in FIG. 93 and FIG. 94 and the embodiment as shown in FIG. 97 and FIG. 98 that these two embodiments are combined.

As shown in FIG. 101 and FIG. 102, a surface illuminator is briefly composed of a light guide unit 156 and eight numbers or sets of LEDs 200a, 200b, 200c, 200d, 200e, 200f, 200g and 200h.

Since this embodiment enables to use eight numbers or sets of LEDs, a surface illuminator having a comparatively large surface area with a sufficient surface brightness and a uniform brightness along that entire surface area can be obtained and the surface illuminator is suitable for use in backlighting or front-lighting of the liquid crystal display devices (LCDs) with a comparatively large display screen.

The light guide unit 156 is made of a light transmitting member having a substantially transparent material.

The light guide unit 156 is composed of a surface lighting light guide member 30, a nonlinear light guide member or portion (i.e. distributing light guide member) 57 and an optical channel light guide member or portion 95" disposed therebetween, in which the optical channel light guide member or portion 95" is sandwiched laterally by the nonlinear light guide member 57 and the surface lighting light guide member 30.

The nonlinear light guide member 57 is acting as a distributing light guide for distributing light along an entire length thereof.

The nonlinear light guide member 57 is composed of an annular light guide member having a substantially rectangular flame-like, "O" shaped, flame-like or ring-like light guide member, in which the nonlinear light guide member 57 is further composed of a substantially linear first portion 57-1, a substantially linear second portion 57-2 opposed to and parallel with the substantially linear first portion 57-1, a substantially linear third portion 57-3 and a substantially linear fourth portion 57-4 opposed to and parallel with the substantially linear first portion 57-3.

The nonlinear light guide member 57 is further provided with four corner side surfaces 57i, 57h, 57j and 57k at the four corners of four substantially linear first, second, third and fourth portions 57-1, 57-2, 57-3 and 57-4, where the first, second, third and fourth portions 57-1, 57-2, 57-3 and 57-4 are connected to one another.

The first, second, third and fourth distributing light guide portions 57-1, 57-2, 57-3 and 57-4 have rear side surfaces 57-1c, 57-2c, 57-3c and 57-4c and front side surfaces 57-1d, 57-2d, 57-3d and 57-4d opposed to the rear side surfaces 57-1c, 57-2c, 57-3c and 57-4c respectively.

Four reflectors 40-1, 40-2, 40-3 and 40-4 having substantially V" shaped configuration are disposed in each center of the front side surfaces 57-1d, 57-2d, 57-3d and 57-4d of the distributing light guide portions 57-1, 57-2, 57-3 and 57-4.

Each of the reflectors 40-1, 40-2, 40-3 and 40-4 is composed of opposed reflecting surfaces or portions (40-1a and 40-1b), (40-2a and 40-2b), (40-3a and 40-3b) and (40-4a and 40-4b).

The LEDs 200a, 200b, 200c and 200d are disposed relative to the reflectors 40-1, 40-2, 40-3 and 40-4 respectively so that the LEDs 200a, 200b, 200c and 200d are in contact with or adjacent to the rear side surface 57-1c, 57-2c, 57-3c and 57-4c near the centers thereof, so that each light emitting window of the LEDs 200a, 200b, 200c and 200d faces the opposed reflecting surfaces (40-1a and 40-1b), (40-2a and 40-2b), (40-3a and 40-3b) and (40-4a and 40-4b).

Further, the LEDs 200e, 200f, 200g and 200h are disposed to be in contact with or adjacent to the corner side surfaces 57i, 57h, 57j and 57k.

The channel light guide or optical channel light guide member 95" is composed of an annular channel light guide member having a substantially rectangular flame-like channel light guide member, "O" shaped, flame-like, loop-like or ring-like light guide member, in which the optical channel light guide member 95" is further composed of a substantially linear first portion 95"-1, a substantially linear second portion 95"-2 opposed to and parallel with the substantially linear first portion 95"-1, a substantially linear third portion 95"-3 and a substantially linear fourth portion 95"-4 opposed to and parallel with the substantially linear first portion 95"-1.

The first, second, third and fourth portions 95"-1, 95"-2, 95"-3 and 95"-4 of the channel light guide or optical channel light guide member 95" are connected together to form the substantially flame-like configuration as a whole similar to the configuration of the distributing light guide 57, in which an external contour with the substantially rectangular flame-like configuration of the channel light guide 95" is substantially equal in size to an internal contour with the substantially rectangular flame-like configuration of the distributing light guide 57 so as to be connected or in contact with to each other.

An internal contour with the substantially rectangular flame-like configuration of the channel light guide 95" is substantially equal in size to an contour with the substantially rectangular shape of four side surfaces 30c, 30d, 30e and 30f of the surface lighting light guide 30 so as to be connected or in contact with to each other.

The channel light guide or optical channel light guide member 95" is further composed of a plurality of optical channel elements 97" and a plurality of interposers 98", in which the optical channel elements 97" and the adjacent interposers 98" are alternately aligned so as to form a substantially rectangular flame-like array as a whole, in such a manner that each of the optical channel elements 97" are positioned to be sandwiched by the adjacent interposers 98".

The interposers 98" are composed of a light transmitting solid member having a substantially transparent material having a refractive index lower than the refractive index of the optical channel elements 97".

The interposers 98" may substitute air for the light transmitting solid member since the refractive index (value=1) of the air is generally lower than that of the light transmitting solid member such as PMMA or PC.

Each of the optical channel elements 97" has a substantially equal width and equal light input surface area, while each of the interposers 98" has a substantially variable width.

The optical channel elements 97" are distributed variably in a pitch therebetween in a stepwise or continuous manner to form a first gradation pattern in such a manner that the quantity of the channel elements 97" increases from the centers of the channel light guide portions 95"-1, 95"-2, 95"-3 and 95"-4 toward the corners of the channel light guide portions 95"-1, 95"-2, 95"-3 and 95"-4.

Further, the quantity or density of the channel elements 97" increases from the corners of the channel light guide portions 95"-1, 95"-2, 95"-3 and 95"-4 toward the centers of the channel light guide portions 95"-1, 95"-2, 95"-3 and 95"-4.

On the contrary, the interposers 98" are distributed variably in a width in a stepwise or continuous manner to form a second gradation pattern in such a manner that the width of the interposers 98" decreases from the centers of the channel light guide portions 95"-1, 95"-2, 95"-3 and 95"-4 toward the corners of the channel light guide portions 95"-1, 95"-2, 95"-3 and 95"-4.

Further, the interposers 98" are distributed variably in a width in a stepwise or continuous manner to form a second gradation pattern in such a manner that the width of the interposers 98" decreases from the corners of the channel light guide portions 95"-1, 95"-2, 95"-3 and 95"-4 toward the centers of the channel light guide portions 95"-1, 95"-2, 95"-3 and 95"-4.

Therefore, light emitting from the LEDs 200a, 200b, 200c, 200d, 200e, 200f, 200g and 200h to input into the nonlinear i.e. annular distributing light guide member or portion 57 with the substantially rectangular flame-like configuration can output the light with a substantially uniform luminance along an entire length of the light output side surface or side surface portion 57-1d, 57-2d, 57-3d and 57-4d and resultantly a lighting with substantially uniform surface luminance or brightness can be produced from substantially entire areas of the surface lighting surface 30a of the surface lighting light guide member or portion 30.

In FIG. 101 and FIG. 102, the light guide unit 156 is composed of the surface lighting light guide 30, the substantially rectangular flame-like channel light guide member 95" and the substantially rectangular flame-like distributing light guide 57, in which three light guides 30, 95" and 57 are connected one another in that order to form a single integrated composite unit.

However, three light guides 30, 95" and 57 may be separated to be in contact with in that order to one another, or two light guides of the three light guides 30, 95" and 57 may form a composite, instead.

The surface illuminator of the present invention may be typically used with the liquid crystal devices such as liquid crystal displays as backlighting or front-lighting, further the surface illuminator of the present invention may be used for other various applications of lighting or illumination such as lighting fixtures, illumination of timepieces, film viewers, night lights, lighted posters, emergency lights and the backlighting or front-lighting of other passive or non-emissive devices or displays such as electro-chromic devices or displays and plasma addressed liquid crystal devices.

In the various embodiments described above, the first light guide member, the channel light guide member channel light guide member and the second light guide member are interposed laterally in that order.

In stead of a lateral disposition (positioning) of these three members, a vertical disposition of these three members may be applied, in which the first light guide member, the channel light guide member channel light guide member and the second light guide member may be interposed vertically in that order.

In the vertical disposition, these three members each may be composed of a plate and the three members may be composed to form a laminate or a stack.

These lateral and vertical dispositions may be selected according to the purpose.

Although illustrative embodiments of the present invention have been described referring to the accompanying drawings, it is to be understood that the present invention is not limited to those embodiments and that various changes, modifications or equivalents may be made in the present invention by those skilled in the art without departing from the spirit or the scope of the present invention and the appended claims.

What is claimed is:

1. A light guide unit comprising: a) a surface lighting light guide, b) a channel light guide and c) a distribution light guide;
   - a) the surface lighting light guide having a light emitting major surface and at least one light receiving side surface;
   - b) the channel light guide having a plurality of optical cores separated one another to form a linear or nonlinear fiber optic channel array, the channel array having a plurality of light entrance core surfaces and a plurality of light exit core surfaces to face the at least one light receiving side surface;
   - c) the distribution light guide having a linear or nonlinear light guide having at least one light receiving portion and at least one distribution light guide surface disposed to face the light entrance core surfaces; and
   - wherein each width of the optical cores increases in accordance with a distance from the at least one light receiving portion and/or each pitch between the optical cores decreases in accordance with a distance from the at least one light receiving portion.

2. The light guide unit according to claim 1, the distribution light guide further comprising at least one substantially "V" shaped reflector or at least one substantially triangular reflector, having opposed inclined surfaces, and wherein the reflector is disposed to face the at least one light receiving portion.

3. The light guide unit according to claim 2, wherein the reflector is disposed on/in at least one intermediate portion of the linear light guide.

4. The light guide unit according to claim 2, wherein the reflector is disposed on/in at least one cross portion of the nonlinear light guide having at least two linear light guides.

5. The light guide unit according to claim 1, further comprising a plurality of reflecting films disposed on the at least one distribution light guide surface at portions where the optical cores are not present, and wherein the reflecting films comprise light reflecting metallic films and/or substantially transparent solid film having a refractive index higher than the refractive index of the distribution light guide.

6. The light guide unit according to claim 1, wherein the light receiving portion is disposed on at least one end surface of the distribution light guide.

7. The light guide unit according to claim 1, wherein two or three light guides of the surface lighting light guide, the channel light guide and the distribution light guide are connected together, by a process selected from the group consisting of a laser cutting, an injection molding, a cast molding and a compression molding.

8. A light guide unit comprising: a) a surface lighting light guide, b) a channel light guide and c) a distribution light guide;
   - a) the surface lighting light guide having a light emitting first major surface and at least one light receiving side surface;
   - b) the channel light guide having a plurality of optical cores separated one another to form a linear or nonlinear fiber optic channel array, the channel array having a plurality of light entrance core surfaces and a plurality of light exit core surfaces disposed to face the light receiving side surface;
   - c) the distribution light guide having a linear or nonlinear light guide having at least one light receiving portion and at least one distribution light guide surface disposed to face the light entrance core surfaces; and
   - wherein each of the channel light guide and/or the distribution light guide has the shape selected from the group consisting of substantially "L" like shape, substantially "U" like shape and substantially "O" like shape.

9. The light guide unit according to claim 8, the distribution light guide further comprising at least one substantially "V"

shaped reflector or at least one substantially triangular reflector, having opposed inclined surfaces, and wherein the reflector is disposed to face the at least one light receiving portion.

10. The light guide unit according to claim 9, wherein the reflector is disposed on/in at least one intermediate portion of the linear light guide.

11. The light guide unit according to claim 9, wherein the reflector is disposed on/in at least one cross portion of the nonlinear light guide having at least two linear light guides.

12. The light guide unit according to claim 8, further comprising a plurality of reflecting films disposed on the light guide surface of the distribution light guide at portions where the optical cores are not present, and wherein the reflecting films comprise light reflecting metallic films and/or substantially transparent solid film having a refractive index higher than the refractive index of the distribution light guide.

13. The light guide unit according to claim 8, wherein each of the nonlinear channel light guide and the nonlinear distribution light guide comprises the substantially "L" like shape as a whole, in such a manner that each of the nonlinear channel and distribution light guides comprises an upright first linear portion and a lateral second linear portion connected together at that ends.

14. The light guide unit according to claim 8, wherein each of the nonlinear channel light guide and the nonlinear distribution light guide comprises the substantially "U" like shape as a whole, in such a manner that each of the nonlinear channel and distribution light guides comprises a substantially linear first leg portion, a substantially linear second leg portion opposed to, parallel with the first leg portion and a substantially linear bottom portion connected with the first and second leg portions.

15. The light guide unit according to claim 8, wherein each of the nonlinear channel light guide and the nonlinear distribution light guide comprises the substantially "O" like shape as a whole, in such a manner that each of the nonlinear channel and distribution light guides comprises a rectangular flame-like configuration.

16. The light guide unit according to claim 8, wherein the at least one light receiving portion is disposed on at least one end surface of the distribution light guide.

17. The light guide unit according to claim 8, wherein two or three light guides of the surface lighting light guide, the channel light guide and the distribution light guide are connected together, by a process selected from the group consisting of a laser cutting, an injection molding, a cast molding and a compression molding.

18. A light guide unit comprising: a) a surface lighting light guide, b) a channel light guide and c) a distribution light guide;
   a) the surface lighting light guide having a light emitting major surface and at least one light receiving side surface;
   b) the channel light guide having a plurality of optical cores separated one another to form a linear or nonlinear fiber optic channel array, the channel array having a plurality of light entrance core surfaces and a plurality of light exit core surfaces disposed to face the at least one light receiving side surface;
   c) the distribution light guide having a linear or nonlinear light guide having at least one light receiving portion and at least one distribution light guide surface to face the light entrance core surfaces and at least one tapered light guide surface opposed to the at least one distribution light guide surface;
   wherein a distance between the at least one distribution light guide surface and the at least one tapered light guide surface decreases in accordance with a distance from the at least one light receiving portion;
   wherein each of the channel light guide and/or the distribution light guide has a rod-like or bar-like linear shape as a whole, or wherein each of the channel light guide and/or the distribution light guide has a nonlinear shape selected from the group consisting of substantially "L" like shape, substantially "U" like shape substantially "O" like shape; and
   the distribution light guide further comprising at least one substantially "V" shaped reflector or at least one substantially triangular reflector, having opposed inclined surfaces, and wherein the reflector is disposed to face the at least one light receiving portion.

19. The light guide unit according to claim 18, wherein the reflector is disposed on/in at least one intermediate portion of the linear light guide.

20. The light guide unit according to claim 18, wherein the reflector is disposed on/in at least one cross portion of the nonlinear light guide having at least two linear light guides.

21. The light guide unit according to claim 18 further comprising a plurality of reflecting films disposed on the light guide surface of the distribution light guide at portions where the optical cores are not present, and wherein the reflecting films comprise light reflecting metallic films and/or substantially transparent solid film having a refractive index higher than the refractive index of the distribution light guide.

22. The light guide unit according to claim 18, wehrein the at least one light receiving portion is disposed on at least one end surface of the distribution light guide.

23. The light guide unit according to claim 18, wherein two or three light guides of the surface lighting light guide, the channel light guide and the distribution light guide are connected together, by a process selected from the group consisting of a laser cutting, an injection molding, a cast molding and a compression molding.

* * * * *